US012641194B2

(12) United States Patent
Peters et al.

(10) Patent No.: US 12,641,194 B2
(45) Date of Patent: May 26, 2026

(54) MANAGEMENT AND ANALYSIS OF RELATED CONCURRENT COMMUNICATION SESSIONS

(71) Applicant: REELAY MEETINGS, INC., Scottsdale, AZ (US)

(72) Inventors: Michael H Peters, Washington, DC (US); Alexander M. Stufflebeam, Indianapolis, IN (US)

(73) Assignee: Reelay Meetings, Inc., Scottsdale, AZ (US)

( * ) Notice: Subject to any disclaimer, the term of this patent is extended or adjusted under 35 U.S.C. 154(b) by 49 days.

(21) Appl. No.: 18/456,326

(22) Filed: Aug. 25, 2023

(65) Prior Publication Data

US 2024/0195939 A1 Jun. 13, 2024

Related U.S. Application Data

(63) Continuation of application No. 17/531,636, filed on Nov. 19, 2021, now Pat. No. 11,785,180, which is a (Continued)

(51) Int. Cl.
*H04N 7/15* (2006.01)
*G06V 20/40* (2022.01)

(52) U.S. Cl.
CPC .............. *H04N 7/152* (2013.01); *G06V 20/41* (2022.01)

(58) Field of Classification Search
CPC ....... A61B 5/418; A61B 5/6891; A61B 5/415; A63F 13/30; G06F 3/0482;

(Continued)

(56) References Cited

U.S. PATENT DOCUMENTS 5,528,289 A 6/1996 Cortjens et al.
6,496,594 B1 * 12/2002 Prokoski ................ A61B 5/415
382/125

(Continued)

FOREIGN PATENT DOCUMENTS

EP 2509006 10/2012

OTHER PUBLICATIONS

[No Author Listed] [online], "Zoom Hack! How to monitor multiple breakout rooms simultaneously?," May 18, 2020, retrieved on Mar. 8, 2022, retrieved from URL<https://www.youtube.com/watch?v=NmXq9g_VrmE>, 13 pages [Video Submission].

(Continued)

*Primary Examiner* — Gerald Gauthier
(74) *Attorney, Agent, or Firm* — Fish & Richardson P.C.

(57) ABSTRACT

In some implementations, a computer system identifies multiple sub-sessions of a network-based communication session in which multiple remote endpoint devices each provide media streams over a communication network. For each of the sub-sessions, the computer system can identify the endpoint devices included in the sub-session. The computer system can obtain user state data for each of the endpoint devices, the user state data for each endpoint device being generated based on analysis of face images of the user of the endpoint device. The computer system aggregates the user state data to determine a sub-session state for each of the sub-sessions. During the communication session, the computer system communicates over the communication network with a remote device associated with the communication session to cause a user interface of the remote device to indicate the sub-session states determined for one or more of the multiple sub-sessions.

21 Claims, 41 Drawing Sheets

Related U.S. Application Data continuation-in-part of application No. 17/186,977, filed on Feb. 26, 2021, now Pat. No. 11,290,686, which is a continuation-in-part of application No. 17/037,324, filed on Sep. 29, 2020, now Pat. No. 11,122,240, which is a continuation-in-part of application No. 16/993,010, filed on Aug. 13, 2020, now Pat. No. 11,165,991, which is a continuation of application No. 16/516,731, filed on Jul. 19, 2019, now Pat. No. 10,757,367, which is a continuation of application No. 16/128,137, filed on Sep. 11, 2018, now Pat. No. 10,382,722, said application No. 17/186,977 is a continuation-in-part of application No. 16/950,888, filed on Nov. 17, 2020, now abandoned, which is a continuation-in-part of application No. 16/993,010, filed on Aug. 13, 2020, now Pat. No. 11,165,991, which is a continuation of application No. 16/516,731, filed on Jul. 19, 2019, now Pat. No. 10,757,367, which is a continuation of application No. 16/128,137, filed on Sep. 11, 2018, now Pat. No. 10,382,722.

(60) Provisional application No. 63/116,797, filed on Nov. 20, 2020, provisional application No. 62/556,672, filed on Sep. 11, 2017, provisional application No. 63/072,936, filed on Aug. 31, 2020, provisional application No. 63/075,809, filed on Sep. 8, 2020, provisional application No. 63/088,449, filed on Oct. 6, 2020.

(58) Field of Classification Search
CPC . G06F 16/3329; G06F 3/04817; G06Q 10/10; G06T 7/344; G06T 13/205; G06T 13/80; G06V 20/41; G06V 20/174; G06V 40/166; G06V 40/171; G06V 40/172; G06V 40/174; G06V 40/176; G10L 15/08; G10L 21/0316; G11B 27/036; G16H 50/20; H04L 9/40; H04L 12/1822; H04L 65/1089; H04L 65/403; H04M 3/5133; H04N 7/147; H04N 7/15; H04N 7/152; H04N 7/157; H04N 23/58; H04N 23/611; H04N 23/695
See application file for complete search history.

(56) References Cited

U.S. PATENT DOCUMENTS

| | | | | |
|---|---|---|---|---|
| 6,751,340 | B2 * | 6/2004 | Prokoski | A61B 5/418 |
| | | | | 382/125 |
| 6,853,398 | B2 * | 2/2005 | Malzbender | A63F 13/30 |
| | | | | 348/14.09 |
| 6,894,714 | B2 | 5/2005 | Gutta et al. | |
| 7,564,476 | B1 * | 7/2009 | Coughlan | H04N 7/147 |
| | | | | 348/14.08 |
| 7,953,219 | B2 | 5/2011 | Freedman | |
| 8,063,929 | B2 * | 11/2011 | Kurtz | H04N 7/147 |
| | | | | 348/14.09 |
| 8,502,857 | B2 * | 8/2013 | Halavy | H04N 7/147 |
| | | | | 348/14.09 |
| 8,537,196 | B2 * | 9/2013 | Hegde | H04N 7/157 |
| | | | | 348/14.09 |
| 8,754,926 | B1 | 6/2014 | Gossweiler et al. | |
| 8,812,961 | B2 * | 8/2014 | Srinivasaraghavan | |
| | | | | G06Q 10/10 |
| | | | | 709/227 |
| 8,848,068 | B2 * | 9/2014 | Pfister | G06V 40/176 |
| | | | | 382/209 |
| 9,098,737 | B2 * | 8/2015 | Sanaullah | G06V 40/174 |
| 9,210,377 | B2 * | 12/2015 | Oetting | H04N 7/157 |
| 9,270,941 | B1 * | 2/2016 | Lavelle | H04N 23/695 |
| 9,307,200 | B2 * | 4/2016 | Aarrestad | H04N 7/15 |
| 9,426,421 | B2 * | 8/2016 | Balasaygun | H04L 12/1813 |
| 9,609,273 | B2 * | 3/2017 | Sethi | H04N 7/15 |
| 9,646,198 | B2 | 5/2017 | Cunico et al. | |
| 9,648,061 | B2 | 5/2017 | Cunico et al. | |
| 9,710,142 | B1 | 7/2017 | Vendrow et al. | |
| 9,792,716 | B2 * | 10/2017 | Deng | G06V 40/176 |
| 9,848,170 | B2 | 12/2017 | Paradkar et al. | |
| 9,928,406 | B2 * | 3/2018 | Bhanu | G06V 40/176 |
| 10,096,319 | B1 | 10/2018 | Jin | |
| 10,235,562 | B2 | 3/2019 | Shaburov et al. | |
| 10,255,488 | B1 | 4/2019 | Shaburov et al. | |
| 10,257,465 | B2 | 4/2019 | Tangeland et al. | |
| 10,382,722 | B1 | 8/2019 | Peters et al. | |
| 10,440,325 | B1 | 10/2019 | Boxwell | |
| 10,496,947 | B1 | 12/2019 | Shaburov | |
| 10,524,715 | B2 | 1/2020 | Sahin | |
| 10,599,917 | B1 | 3/2020 | Shaburov et al. | |
| 10,757,367 | B1 | 8/2020 | Peters et al. | |
| 11,122,240 | B2 | 9/2021 | Peters et al. | |
| 11,165,991 | B2 | 11/2021 | Peters et al. | |
| 11,290,686 | B2 | 3/2022 | Peters et al. | |
| 11,785,180 | B2 * | 10/2023 | Peters | H04N 7/147 |
| | | | | 348/14.09 |
| 2005/0229508 | A1 | 10/2005 | Cervone | |
| 2006/0244818 | A1 | 11/2006 | Majors et al. | |
| 2009/0015659 | A1 | 1/2009 | Choi | |
| 2009/0147141 | A1 * | 6/2009 | Lee | H04N 23/611 |
| | | | | 348/576 |
| 2009/0204906 | A1 | 8/2009 | Irving | |
| 2010/0306676 | A1 | 12/2010 | Srinivasaraghavan et al. | |
| 2011/0295392 | A1 | 12/2011 | Cunnington et al. | |
| 2012/0002001 | A1 * | 1/2012 | Prentice | H04N 7/147 |
| | | | | 348/14.08 |
| 2012/0147123 | A1 | 6/2012 | Lian et al. | |
| 2012/0218373 | A1 * | 8/2012 | N'guessan | H04N 7/15 |
| | | | | 348/E7.083 |
| 2012/0331387 | A1 | 12/2012 | Lemmey et al. | |
| 2013/0300819 | A1 * | 11/2013 | Halavy | H04N 7/147 |
| | | | | 348/14.05 |
| 2013/0300900 | A1 * | 11/2013 | Pfister | G06V 40/176 |
| | | | | 348/239 |
| 2014/0022370 | A1 | 1/2014 | Sohn et al. | |
| 2014/0112556 | A1 | 4/2014 | Kalinli-Akbacak | |
| 2014/0160224 | A1 * | 6/2014 | Herger | H04L 9/40 |
| | | | | 348/14.06 |
| 2014/0223462 | A1 | 8/2014 | Aimone et al. | |
| 2014/0354759 | A1 * | 12/2014 | Cranfill | G06F 3/0482 |
| | | | | 348/14.1 |
| 2015/0127346 | A1 * | 5/2015 | Gruenstein | G10L 15/08 |
| | | | | 704/254 |
| 2015/0138302 | A1 * | 5/2015 | Sethi | H04N 7/15 |
| | | | | 348/14.07 |
| 2015/0193718 | A1 | 7/2015 | Shaburov et al. | |
| 2015/0195406 | A1 | 7/2015 | Dwyer et al. | |
| 2015/0296178 | A1 * | 10/2015 | Aarrestad | G06V 40/166 |
| | | | | 348/14.16 |
| 2015/0365627 | A1 * | 12/2015 | Deng | G06T 13/80 |
| | | | | 348/14.07 |
| 2016/0073054 | A1 * | 3/2016 | Balasaygun | H04L 12/1822 |
| | | | | 348/14.08 |
| 2016/0080819 | A1 | 3/2016 | Moran et al. | |
| 2016/0300135 | A1 | 10/2016 | Moudy et al. | |
| 2016/0360150 | A1 * | 12/2016 | Onno | H04N 7/15 |
| 2016/0381095 | A1 * | 12/2016 | Louchheim | H04L 65/403 |
| | | | | 370/260 |
| 2016/0381097 | A1 * | 12/2016 | Bank | G06Q 10/10 |
| | | | | 709/204 |
| 2017/0127021 | A1 | 5/2017 | Frank et al. | |
| 2017/0154211 | A1 * | 6/2017 | Shaburov | G06T 7/344 |
| 2017/0161683 | A1 * | 6/2017 | Allan | G06F 16/3329 |
| 2017/0177928 | A1 * | 6/2017 | Cunico | H04L 65/403 |
| 2017/0201717 | A1 | 7/2017 | Paradkar et al. | |
| 2017/0323153 | A1 | 11/2017 | Gil et al. | |
| 2018/0063482 | A1 * | 3/2018 | Goesnar | H04N 23/58 |
| 2018/0077095 | A1 * | 3/2018 | Deyle | G06T 13/205 |
| 2018/0101760 | A1 | 4/2018 | Nelson et al. | |
| 2018/0122368 | A1 * | 5/2018 | Costello | G10L 21/0316 |

(56)        References Cited

U.S. PATENT DOCUMENTS

| | | | | |
|---|---|---|---|---|
| 2018/0124243 | A1* | 5/2018 | Zimmerman | H04M 3/5133 |
| 2018/0144746 | A1* | 5/2018 | Mishra | G06V 40/172 |
| 2018/0176508 | A1* | 6/2018 | Pell | H04L 65/1089 |
| 2018/0192000 | A1 | 7/2018 | Mercredi et al. | |
| 2018/0197425 | A1* | 7/2018 | Lamb | A61B 5/6891 |
| 2018/0303397 | A1* | 10/2018 | Krupat | G16H 50/20 |
| 2018/0351756 | A1 | 12/2018 | Dave et al. | |
| 2019/0156112 | A1 | 5/2019 | Shaburov et al. | |
| 2019/0174068 | A1* | 6/2019 | Wang | H04N 23/611 |
| 2019/0199968 | A1* | 6/2019 | Buford | G11B 27/036 |
| 2019/0251359 | A1 | 8/2019 | Pranger et al. | |
| 2019/0354334 | A1 | 11/2019 | Billinghurst | |
| 2020/0074154 | A1* | 3/2020 | el Kaliouby | G06V 40/171 |
| 2020/0175262 | A1* | 6/2020 | Pitre | G06V 40/172 |
| 2020/0228359 | A1 | 7/2020 | el Kaliouby et al. | |
| 2020/0358627 | A1 | 11/2020 | Vogel et al. | |
| 2021/0076002 | A1 | 3/2021 | Peters et al. | |
| 2021/0120209 | A1 | 4/2021 | Peters et al. | |
| 2021/0176428 | A1 | 6/2021 | Peters et al. | |
| 2021/0176429 | A1 | 6/2021 | Peters et al. | |
| 2021/0185276 | A1 | 6/2021 | Peters et al. | |
| 2022/0086393 | A1* | 3/2022 | Peters | H04N 7/147 |
| 2024/0195939 | A1* | 6/2024 | Peters | G06V 20/41 |

OTHER PUBLICATIONS affectiva.com [online], "Affectiva Media Analytics," Jul. 10, 2017, retrieved on Mar. 9, 2022, retrieved from URL<https://www.affectiva. com/product/affdex-for-market-research>, 2 pages.

affectiva.com [online], "Solutions," Jun. 6, 2017, retrieved on Mar. 9, 2022, retrieved from URL<www.affectiva.com/what/products>, 2 pages.

Al Shaqsi et al., "Estimating the Predominant No. of Clusters in a Dataset," Intelligent Data Analysis, Jun. 19, 2013, 17(4):603-626.

Anaya et al., "A Data Mining Approach to Reveal Representative Collaboration Indicators in Open Collaboration Frameworks," Presented at the International Conference on Educational Data Mining, Cordoba, Spain, Jul. 1-3, 2009, pp. 210-219.

Andres et al., "Team Learning in Technology-Mediated Distributed Teams," Journal of Information Systems Education, Mar. 2010, 21(2):213-221.

*Architekton Resources, LLC* d/b/a Illuminate Technologies, Plaintiff, v. *MoodMe Belgium SPRL*, Defendant, Case No. 3:20-cv-6306, "Complaint for: (1) Patent Infringement (2) Misappropriation of Trade Secrets under the Defend Trade Secrets Act (DTSA) 18 U.S.C. § 1836," U.S. Pat. No. 10,757,367, filed on Sep. 4, 2020, 18 pages.

*Architekton Resources, LLC* d/b/a Illuminate Technologies, Plaintiff, v. *MoodMe Belgium SPRL*, Defendant, Case No. 3:20-cv-6306, "MoodMe Belgium SPRL's Notice of Motion and Motion to Dismiss and Memorandum of Points and Authorities in Support of Motion to Dismiss," U.S. Pat. No. 10,757,367, filed on Dec. 7, 2020, 18 pages.

Ayvaz et al., "Use of Facial Emotion Recognition in E-Learning Systems", Information Technologies and Learning Tools, Sep. 2017, 60(4):95-104.

blog.zoom.us [online], "All You Need to Know About Using Zoom Breakout Rooms," Sep. 29, 2020, retrieved on Mar. 10, 2022, retrieved from URL<https://blog.zoom.us/using-zoom-breakout-rooms/>, 8 pages.

blog.zoom.us [online], "Recording & Recap: Zoom's Dashboard & Reporting, " Jul. 20, 2015, retrieved on Mar. 10, 2022, retrieved from URL<https://blog.zoom.us/zoom-dashboard-reporting/>, 4 pages.

Chickerur et al., "3D Face Model Dataset: Automatic Detection of Facial Expressions and Emotions for Educational Environments," British Journal of Educational Technology, Aug. 13, 2015, 46(5):1028-1037.

D'Mello et al., "AutoTutor Detects and Responds to Learners Affective and Cognitive States", Cognition, Affect, and Learning, Jan. 2008, 13 pages.

forbes.com [online], "10 Simple and Powerful Body Language Tips for 2013," Jan. 7, 2013, retrieved on Mar. 9, 2022, retrieved from URL<https://www.forbes.com/sites/carolkinseygoman/2013/01/07/10-simple-and-powerful-body-language-tips-for-2013/?sh=70b66cde3547>, 4 pages.

Hara et al., "An Emerging View of Scientific Collaboration: Scientists' Perspectives on Collaboration and Factors that Impact Collaboration," Journal of the American Society for Information Science and Technology, Aug. 2003, 54(10):952-965.

huffpost.com [online], "Zoom Can Track Who's Not Paying Attention In Your Video Call. Here's How.," Mar. 25, 2020, retrieved on Mar. 9, 2022, retrieved from URL<https://www.huffpost.com/entry/zoom-tracks-not-paying-attention-video-call_1_5e7b96b5c5b6b7d80959ea96>, 4 pages.

imotions.com [online], "Facial Expression Analysis," May 14, 2020, retrieved on Mar. 9, 2022, retrieved from URL<https://imotions.com/biosensor/fea-facial-expression-analysis>, 10 pages.

International Search Report and Written Opinion in International Appln. No. PCT/US2021/019940, dated Oct. 21, 2021, 24 pages.

Invitation to Pay Additional Fees and, Where Applicable, Protest Fee in International Appln. No. PCT/US2021/019940, dated Aug. 31, 2021, 18 pages.

it.lhric.org [online], "Zoom Breakout Rooms," Apr. 30, 2020, retrieved on Mar. 10, 2022, retrieved from URL<https://it.lhric.org/zoom_breakout_rooms>, 4 pages.

Kallipolitis et al., "Emotion Analysis in Hospital Bedside Infotainment Platforms Using Speeded up Robust Features," Artificial Intelligence Applications and Innovations, May 15, 2019, pp. 127-138.

Lonchamp, "Supporting Synchronous Collaborative Learning: A Generic, Multi-Dimensional Model," International Journal of Computer-Supported Collaborative Learning, Jun. 26, 2006, pp. 247-276.

Meier et al., "A Rating Scheme for Assessing the Quality of Computer-Supported Collaboration Processes," International Journal of Computer-Supported Collaborative Learning, Feb. 7, 2007, 2(1):63-86.

Meilǎ et al., "An Experimental Comparison of Model-Based Clustering Methods," Machine Learning, Jan. 2001, 42:9-29.

Menychtas et al., "Real-time integration of emotion analysis into homecare platforms," Presented at 2019 41st Annual International Conference of the IEEE Engineering in Medicine and Biology Society (EMBC), Berlin, Germany, Jul. 23-27, 2019, pp. 3468-3471.

Miller et al., "4 Keys to Accelerating Collaboration," OD Practitioner, Feb. 2014, 46(1):6-11.

Notice of Allowance in U.S. Appl. No. 16/993,010, dated Jun. 30, 2021, 18 pages.

Notice of Allowance in U.S. Appl. No. 17/037,324, dated Jun. 28, 2021, 17 pages.

Notice of Allowance in U.S. Appl. No. 17/037,324, dated May 13, 2021, 7 pages.

Notice of Allowance in U.S. Appl. No. 17/186,977, dated Nov. 23, 2021, 4 pages.

Office Action in U.S. Appl. No. 16/950,888, dated Jan. 26, 2021, 28 pages.

Office Action in U.S. Appl. No. 16/993,010, dated Feb. 23, 2021, 30 pages.

Office Action in U.S. Appl. No. 17/037,324, dated Mar. 18, 2021, 27 pages.

Office Action in U.S. Appl. No. 17/136,607, dated Feb. 4, 2021, 22 pages.

Office Action in U.S. Appl. No. 17/186,977, dated May 13, 2021, 24 pages.

Porcaro et al., "Ten Guiding Principles for Designing Online Modules that Involve International Collaborations," International Journal of Education and Development Using Information and Communication Technology (IJEDICT), Jun. 14, 2014, 10(2):142-150.

Richardson, "Affective computing in the modern workplace", Business Information Review, Jun. 2020, 37(2):78-85.

Schneider et al., "Real-Time Mutual Gaze Perception Enhances Collaborative Learning and Collaboration Quality," Computer-Supported Collaborative Learning, Dec. 2013, 8:375-397.

(56) References Cited

OTHER PUBLICATIONS vice.com [online], "Working From Home? Zoom Tells Your Boss If
You're Not Paying Attention," Mar. 16, 2020, retrieved on Mar. 9,
2022, retrieved from URL<https://www.vice.com/en/article/qjdnmm/
working-from-home-zoom-tells-your-boss-if-youre-not-paying-
attention>, 6 pages.
White, "Student Participation in Math Discourse with Networked
Handhelds," Computer-Supported Collaborative Learning, Aug. 19,
2006, 1:359-382.
Wikipedia.com [online], "Facial Action Coding System," May 3,
2005, retrieved on Mar. 9, 2022, retrieved from URL<https://en.
wikipedia.org/wiki/Facial_Action_Coding_System>, 10 pages.

* cited by examiner

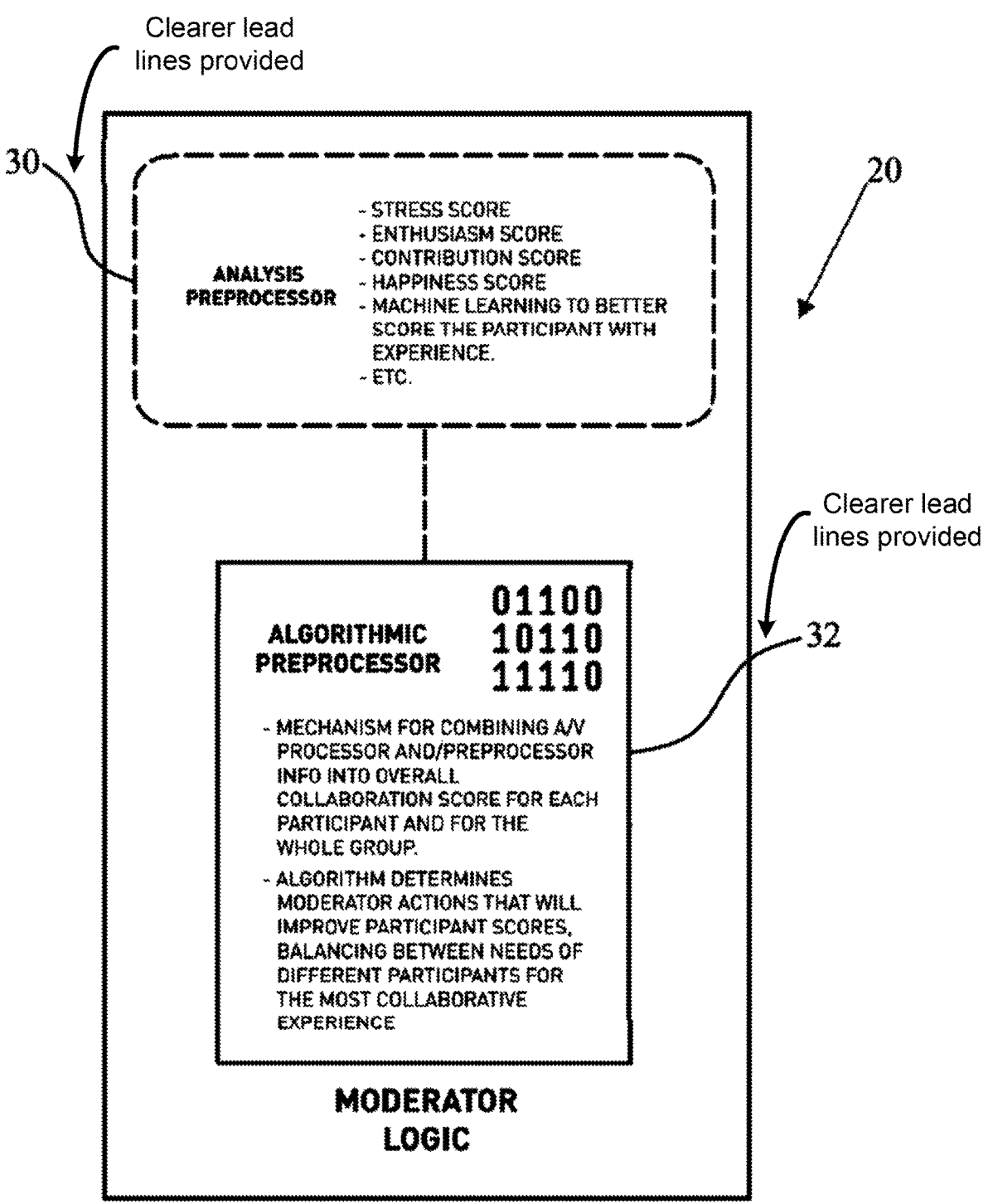

Clearer lead
lines provided

30

20

ANALYSIS
PREPROCESSOR

- STRESS SCORE
- ENTHUSIASM SCORE
- CONTRIBUTION SCORE
- HAPPINESS SCORE
- MACHINE LEARNING TO BETTER
  SCORE THE PARTICIPANT WITH
  EXPERIENCE.
- ETC.

Clearer lead
lines provided

32

ALGORITHMIC
PREPROCESSOR 01100
10110
11110

- MECHANISM FOR COMBINING A/V
  PROCESSOR AND/PREPROCESSOR
  INFO INTO OVERALL
  COLLABORATION SCORE FOR EACH
  PARTICIPANT AND FOR THE
  WHOLE GROUP.

- ALGORITHM DETERMINES
  MODERATOR ACTIONS THAT WILL
  IMPROVE PARTICIPANT SCORES,
  BALANCING BETWEEN NEEDS OF
  DIFFERENT PARTICIPANTS FOR
  THE MOST COLLABORATIVE
  EXPERIENCE

MODERATOR
LOGIC

Pie-Chart Speaking Time Meter

Figure 18:
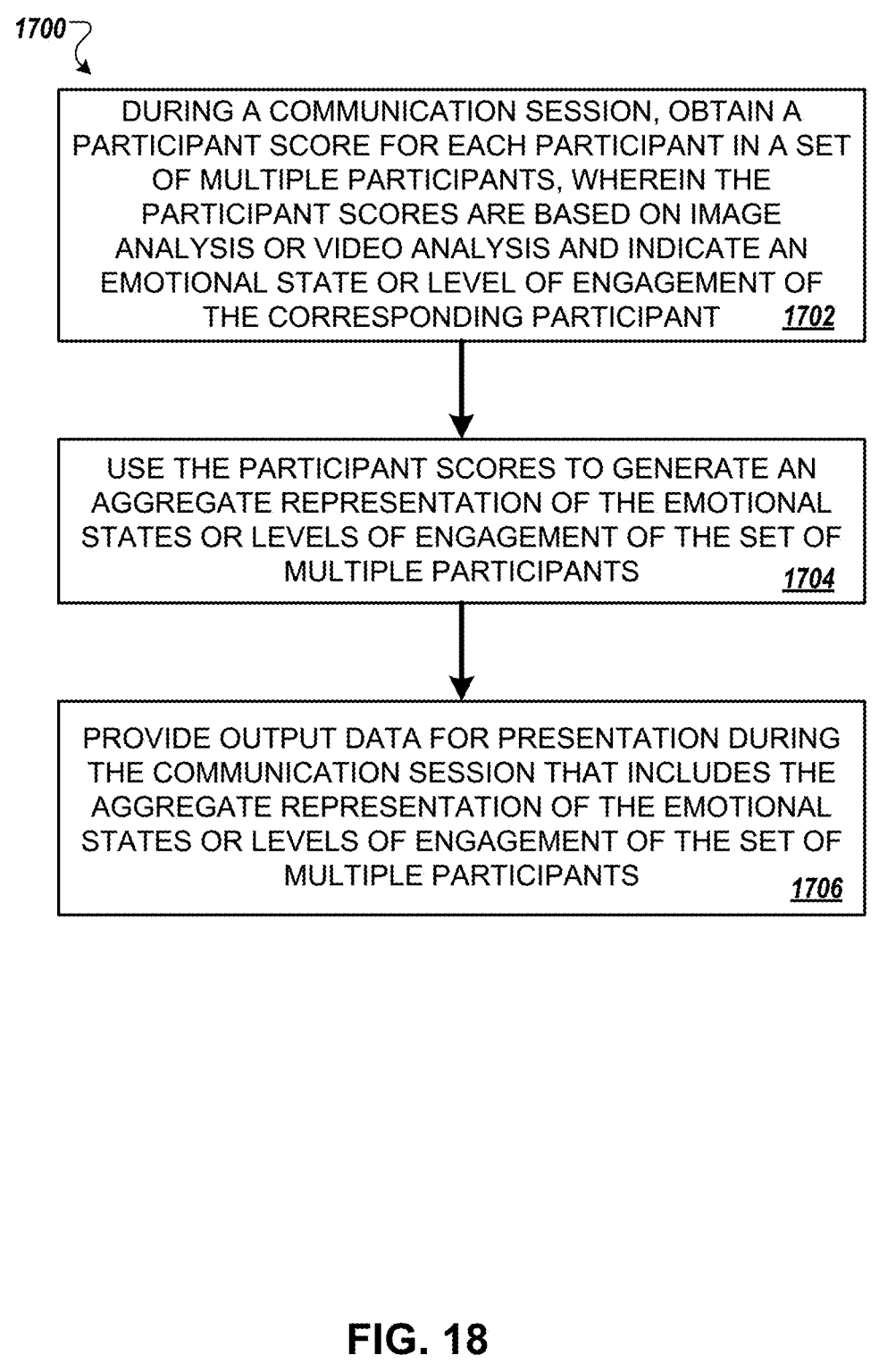

DURING A COMMUNICATION SESSION, OBTAIN A PARTICIPANT SCORE FOR EACH PARTICIPANT IN A SET OF MULTIPLE PARTICIPANTS, WHEREIN THE PARTICIPANT SCORES ARE BASED ON IMAGE ANALYSIS OR VIDEO ANALYSIS AND INDICATE AN EMOTIONAL STATE OR LEVEL OF ENGAGEMENT OF THE CORRESPONDING PARTICIPANT    *1702*

USE THE PARTICIPANT SCORES TO GENERATE AN AGGREGATE REPRESENTATION OF THE EMOTIONAL STATES OR LEVELS OF ENGAGEMENT OF THE SET OF MULTIPLE PARTICIPANTS    *1704*

PROVIDE OUTPUT DATA FOR PRESENTATION DURING THE COMMUNICATION SESSION THAT INCLUDES THE AGGREGATE REPRESENTATION OF THE EMOTIONAL STATES OR LEVELS OF ENGAGEMENT OF THE SET OF MULTIPLE PARTICIPANTS    *1706*

ANALYSIS OF COGNITIVE & EMOTIONAL STATES AND OUTCOMES

| Outcomes | Emotions | | | | Cognitive Attributes | | | | Reactions/Expressions | | |
|---|---|---|---|---|---|---|---|---|---|---|---|
| | Happiness | Sadness | Anger | ... | Attention | Enthusiasm | Stress | ... | Surprise | Micro-Expression 1 | ... |
| Test Scores | +5 | -4 | -3 | ... | +7 | +5 | -3 | ... | 0 | 0 | ... |
| Complete Task 1 | +2 | 0 | -2 | ... | +5 | +2 | +6 | ... | +1 | +5 | ... |
| Complete Task 2 | +3 | -1 | +1 | ... | +4 | +5 | +5 | ... | -1 | -5 | ... |
| Purchase Item 1 | +5 | -5 | -2 | ... | +1 | +3 | -3 | ... | +2 | -1 | ... |
| Purchase Item 2 | -2 | 0 | +3 | ... | +2 | +1 | +5 | ... | +3 | +4 | ... |
| Participate in meeting | +7 | -5 | +8 | ... | +3 | +8 | -4 | ... | +4 | +3 | ... |
| Attend Subsequent meeting | +6 | -4 | -5 | ... | +2 | +8 | -6 | ... | +1 | -2 | ... |
| High Satisfaction Rating | +8 | -4 | -7 | ... | +4 | +2 | -5 | ... | +1 | 0 | ... |
| ... | ... | ... | ... | ... | ... | ... | ... | ... | ... | ... | ... |

| ANALYSIS OF COMMUNICATION SESSION FACTORS AND COGNITIVE & EMOTIONAL STATES | | | | | | | | | | |
| --- | --- | --- | --- | --- | --- | --- | --- | --- | --- | --- |
| Emotional & Cognitive Attributes | 5 min break | <10 participants | 10-50 participants | >50 participants | Lecture | Group Discussion | Photo Presented | Film Clip Presented | Fast Speaking Cadence | ... |
| Happiness | +3 | +2 | +1 | -1 | -2 | +2 | +2 | +3 | -2 | ... |
| Sadness | 0 | 0 | +1 | +2 | +1 | -1 | -1 | -2 | +2 | ... |
| Anger | -2 | -4 | -2 | +1 | +3 | +5 | -1 | -2 | +1 | ... |
| ... | ... | ... | ... | ... | ... | ... | ... | ... | ... | ... |
| Attention | +4 | +4 | +3 | 0 | -4 | +2 | +5 | +5 | -1 | ... |
| Enthusiasm | -2 | +1 | -1 | -2 | -1 | +6 | +2 | +3 | +2 | ... |
| Stress | -2 | +1 | 0 | -2 | +2 | +2 | -2 | -4 | +4 | ... |
| ... | ... | ... | ... | ... | ... | ... | ... | ... | ... | ... |
| Surprise | -3 | 0 | 0 | 0 | -1 | +3 | +1 | +1 | +1 | ... |
| Micro-Expression 1 | -2 | 0 | +1 | 0 | +2 | +1 | -1 | -1 | +2 | ... |
| ... | ... | ... | ... | ... | ... | ... | ... | ... | ... | ... |

PRESENTATION TECHNIQUE ANALYSIS

| | Engagement | Quiz Score | ... |
|---|---|---|---|
| Soft voice | +1 | 0 | ... |
| Loud voice | +2 | +1 | ... |
| Speaking Fast | -1 | -3 | ... |
| Speaking Slow | -1 | +4 | ... |
| Group Discussion | +3 | +6 | ... |
| Presentation only | -1 | -2 | ... |
| Presenter Happiness Score > 60 | +2 | +3 | ... |

2056

CONTEXT ANALYSIS

| | Engagement | Quiz Score | ... |
|---|---|---|---|
| Morning | +1 | +3 | ... |
| Afternoon | -1 | -2 | ... |
| Front of Room | +2 | +2 | ... |
| Back of Room | -2 | -3 | ... |
| >10 Participants | -2 | -3 | ... |
| Remote / Virtual | -2 | +1 | ... |
| Low Bkg. Noise | +3 | +5 | ... |
| ... | | | |

2053

CONTENT TYPE ANALYSIS

| | Emotional & Cognitive State Attributes | | | Outcomes | | |
|---|---|---|---|---|---|---|
| | Engagement | Participation | Emotion | Quiz Score | Task Completion | ... |
| Images | +2 | +3 | +2 | +5 | +2 | ... |
| Video Clips | +6 | 0 | +5 | -2 | -1 | ... |
| Text | 0 | 0 | +1 | +2 | +3 | ... |
| ... | | | | | | |

2055

CONTENT ANALYSIS

| | Emotional & Cognitive State Attributes | | | Outcomes | | |
|---|---|---|---|---|---|---|
| | Engagement | Participation | Emotion | Test Result | Subject Matter Proficiency Level | ... |
| Slide 1 | +1 | 0 | +1 | 0 | +1 | ... |
| Slide 2 | +3 | +2 | +2 | +2 | +1 | ... |
| Topic 1 | 0 | +1 | +1 | +1 | +1 | ... |
| Keyword 1 | -1 | -2 | -1 | 0 | 0 | ... |
| ... | | | | | | |

2057

PRESENTER ANALYSIS

| | Avg. Engagement Level | Avg. Quiz Score | ... |
|---|---|---|---|
| Presenter 1 | 65 | 85 | ... |
| Presenter 2 | 62 | 86 | ... |
| Presenter 3 | 45 | 81 | ... |
| ... | ... | ... | |
| Overall | 55 | 83 | ... |

FIG. 19D

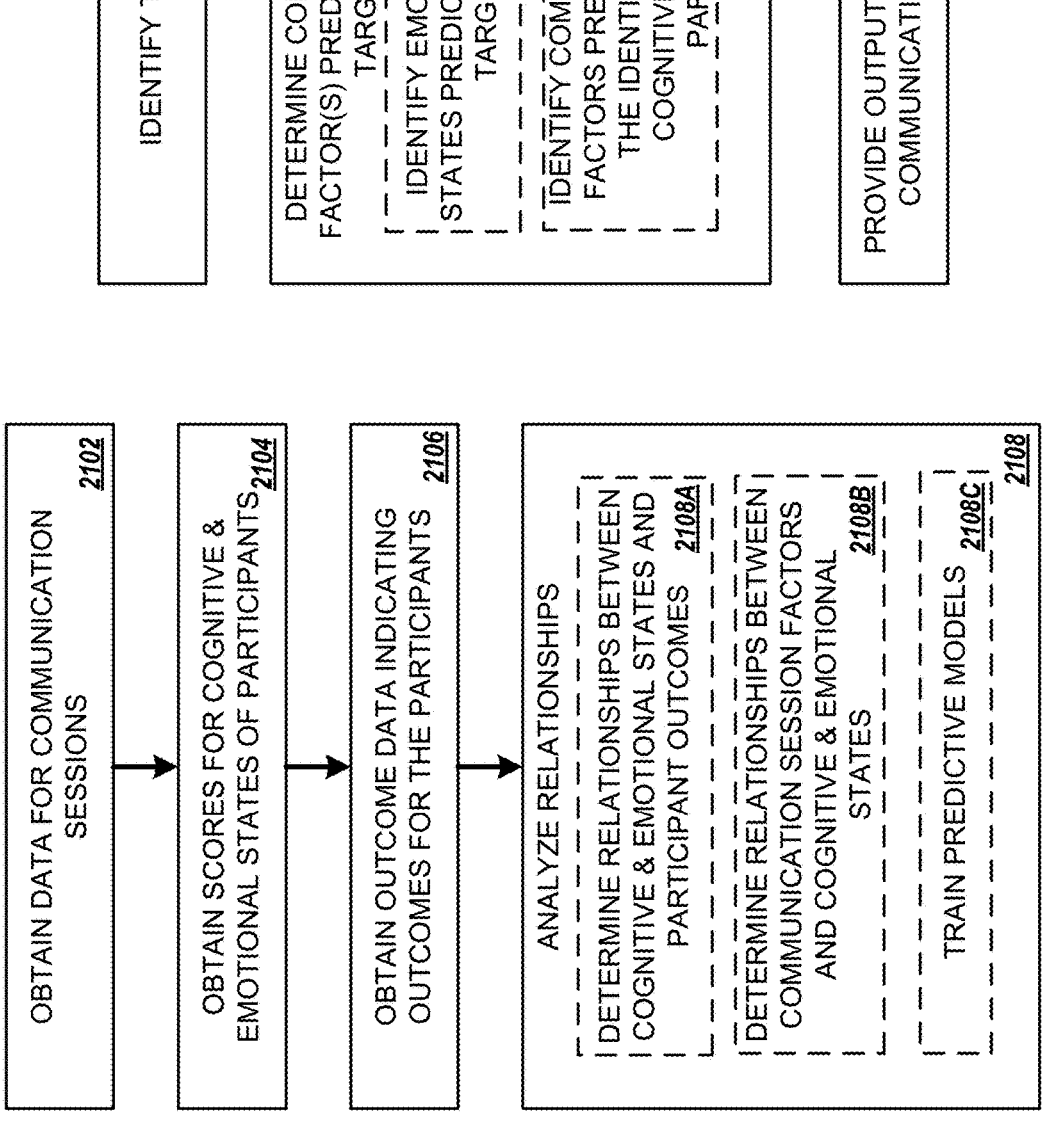

IDENTIFY TARGET OUTCOME    2152

DETERMINE COMMUNICATION SESSION FACTOR(S) PREDICTED TO PROMOTE THE TARGET OUTCOME    2154

IDENTIFY EMOTIONAL & COGNITIVE STATES PREDICTED TO PROMOTE THE TARGET OUTCOME    2154A

IDENTIFY COMMUNICATION SESSION FACTORS PREDICTED TO PROMOTE THE IDENTIFIED EMOTIONAL & COGNITIVE STATES AMONG PARTICIPANTS    2154B

PROVIDE OUTPUT INDICATING DETERMINED COMMUNICATION SESSION FACTORS    2156

OBTAIN DATA FOR COMMUNICATION SESSIONS    2102

OBTAIN SCORES FOR COGNITIVE & EMOTIONAL STATES OF PARTICIPANTS    2104

OBTAIN OUTCOME DATA INDICATING OUTCOMES FOR THE PARTICIPANTS    2106

ANALYZE RELATIONSHIPS

DETERMINE RELATIONSHIPS BETWEEN COGNITIVE & EMOTIONAL STATES AND PARTICIPANT OUTCOMES    2108A

DETERMINE RELATIONSHIPS BETWEEN COMMUNICATION SESSION FACTORS AND COGNITIVE & EMOTIONAL STATES    2108B

TRAIN PREDICTIVE MODELS    2108C

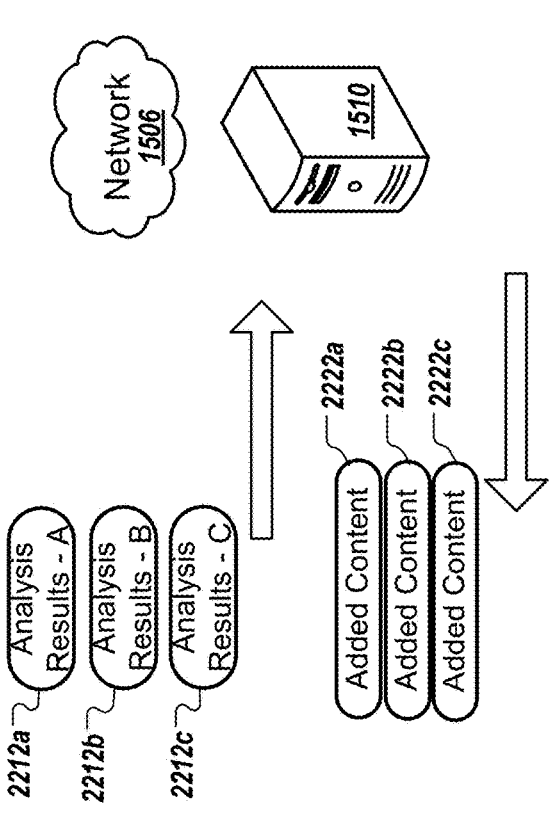

SERVER PROCESSING

- Aggregating, to generate composite measures for the group (e.g., engagement, collaboration, etc.)
- Aligning or synchronizing results from endpoints
- Applying rules to detect conditions or states present across the session as a whole (e.g., for multiple endpoints)
- Tracking cumulative measures / rolling measures over time
- Micro-expression detection
- Voice stress analysis
- Speech recognition & spoken keyword detection
- Non-linear transformations
- Comparisons among analysis results of different parties
- Filtering data
- Categorizing participants
- Generating recommendations
- Queuing and prioritizing recommendations when multiple rules are triggered at the same time (e.g., using hierarchies or decision trees)
- ...

2260

2200D

Network 1506

1510

Analysis Results - A   2212a
Analysis Results - B   2212b
Analysis Results - C   2212c Added Content   2222a
Added Content   2222b
Added Content   2222c

ENDPOINT ANALYSIS RESULTS

- Emotion vector (e.g., scores for each of the basic emotions/attributes)
- Detected states, gestures, expressions, etc.
- Eye position
- Head position
- Presence of a user
- Pattern matching results
- Results of time-series analysis & filtering
- Results of application of rules
- Detected of events and conditions
- Frame-level features
- Segment-level features
- ...

Endpoint Identifier

Timestamp

Communication Session Identifier

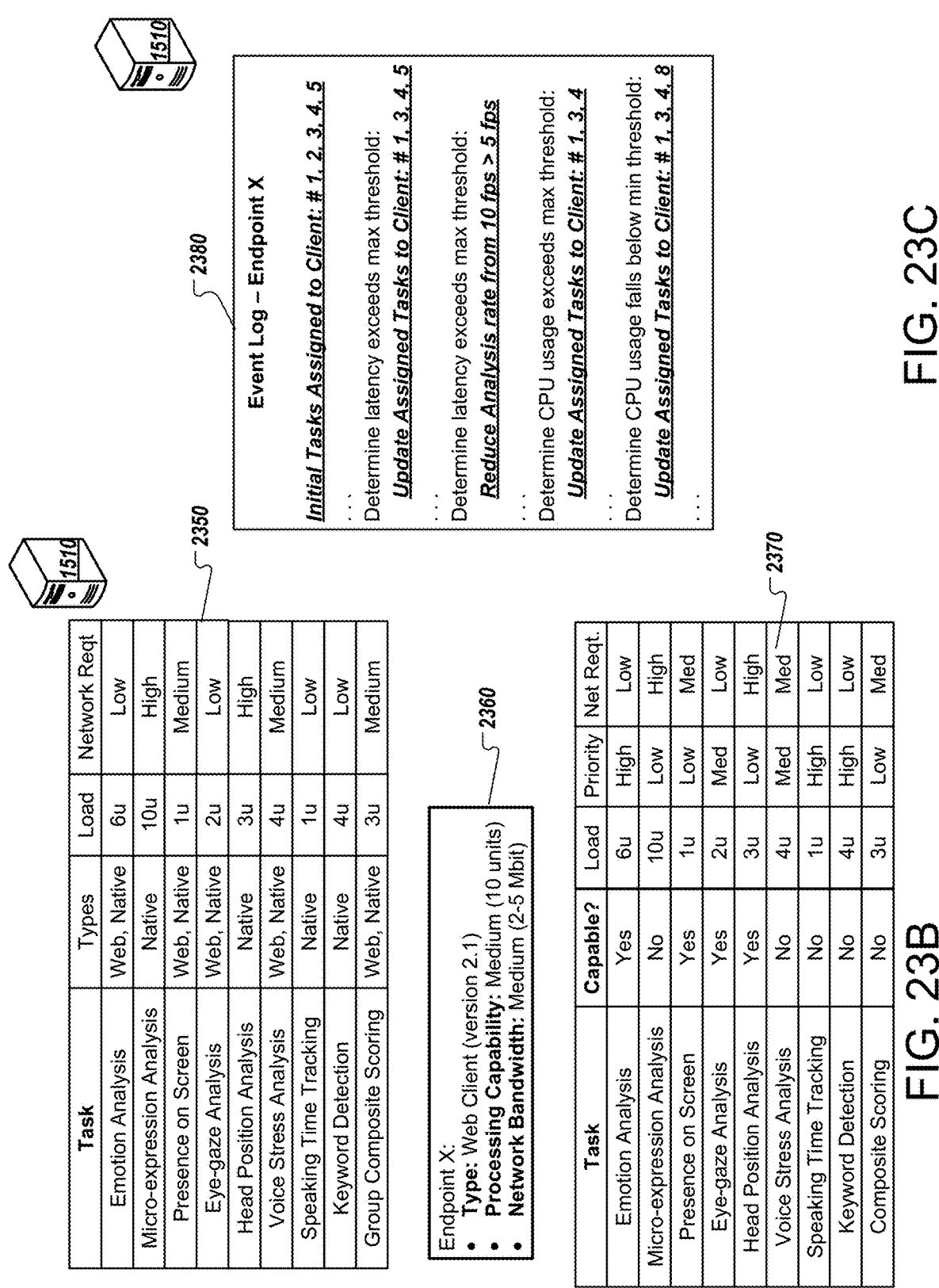

2350

| Task | Types | Load | Network Reqt |
|---|---|---|---|
| Emotion Analysis | Web, Native | 6u | Low |
| Micro-expression Analysis | Native | 10u | High |
| Presence on Screen | Web, Native | 1u | Medium |
| Eye-gaze Analysis | Web, Native | 2u | Low |
| Head Position Analysis | Native | 3u | High |
| Voice Stress Analysis | Web, Native | 4u | Medium |
| Speaking Time Tracking | Native | 1u | Low |
| Keyword Detection | Native | 4u | Low |
| Group Composite Scoring | Web, Native | 3u | Medium |

2360

Endpoint X:
- Type: Web Client (version 2.1)
- Processing Capability: Medium (10 units)
- Network Bandwidth: Medium (2-5 Mbit)

| Task | Capable? | Load | Priority | Net Reqt. |
|---|---|---|---|---|
| Emotion Analysis | Yes | 6u | High | Low |
| Micro-expression Analysis | No | 10u | Low | High |
| Presence on Screen | Yes | 1u | Low | Med |
| Eye-gaze Analysis | Yes | 2u | Med | Low |
| Head Position Analysis | Yes | 3u | Low | High |
| Voice Stress Analysis | No | 4u | Med | Med |
| Speaking Time Tracking | No | 1u | High | Low |
| Keyword Detection | No | 4u | High | Low |
| Composite Scoring | No | 3u | Low | Med |

2380

Event Log -- Endpoint X

_Initial Tasks Assigned to Client: # 1, 2, 3, 4, 5_

. . .

Determine latency exceeds max threshold:
_Update Assigned Tasks to Client: # 1, 3, 4, 5_

. . .

Determine latency exceeds max threshold:
_Reduce Analysis rate from 10 fps > 5 fps_

. . .

Determine CPU usage exceeds max threshold:
_Update Assigned Tasks to Client: # 1, 3, 4_

. . .

Determine CPU usage falls below min threshold:
_Update Assigned Tasks to Client: # 1, 3, 4, 8_

MANAGEMENT AND ANALYSIS OF RELATED CONCURRENT COMMUNICATION SESSIONS

CROSS-REFERENCE TO RELATED APPLICATIONS

This application is a continuation of U.S. patent application Ser. No. 17/531,636, filed on Nov. 19, 2021, which is a continuation-in-part of U.S. patent application Ser. No. 17/186,977, filed on Feb. 26, 2021, now U.S. Pat. No. 11,290,686, issued on Mar. 29, 2022, which claims the benefit of U.S. Provisional Patent Application No. 63/088,449, filed on Oct. 6, 2020, U.S. Provisional Patent Application No. 63/075,809, filed on Sep. 8, 2020, and U.S. Provisional Patent Application No. 63/072,936, filed on Aug. 31, 2020. U.S. patent application Ser. No. 17/186,977, filed on Feb. 26, 2021, now U.S. Pat. No. 11,290,686, issued on Mar. 29, 2022, is a continuation-in-part of U.S. patent application Ser. No. 17/037,324, filed on Sep. 29, 2020, now U.S. Pat. No. 11,122,240, issued on Sep. 14, 2021, which is a continuation-in-part of U.S. patent application Ser. No. 16/993,010, filed Aug. 13, 2020, now U.S. Pat. No. 11,165,991, issued on Nov. 2, 2021, which is a continuation of U.S. patent application Ser. No. 16/516,731, filed Jul. 19, 2019, now U.S. Pat. No. 10,757,367, issued on Aug. 25, 2020, which is a continuation of U.S. patent application Ser. No. 16/128,137, filed Sep. 11, 2018, now U.S. Pat. No. 10,382,722, issued Aug. 13, 2019, which claims the benefit of U.S. Provisional Patent Application Ser. No. 62/556,672, filed Sep. 11, 2017. U.S. patent application Ser. No. 17/186,977, filed on Feb. 26, 2021, now U.S. Pat. No. 11,290,686, issued on Mar. 29, 2022, is also a continuation-in-part of U.S. patent application Ser. No. 16/950,888, filed Nov. 17, 2020, which is a continuation-in part of U.S. patent application Ser. No. 16/993,010, filed Aug. 13, 2020, now U.S. Pat. No. 11,165,991, issued on Nov. 2, 2021, which is a continuation of U.S. patent application Ser. No. 16/516,731, filed Jul. 19, 2019, now U.S. Pat. No. 10,757,367, issued on Aug. 25, 2020, which is a continuation of U.S. patent application Ser. No. 16/128,137, filed Sep. 11, 2018, now U.S. Pat. No. 10,382,722, issued Aug. 13, 2019, which claims the benefit of U.S. Provisional Patent Application Ser. No. 62/556,672, filed Sep. 11, 2017. U.S. patent application Ser. No. 17/037, 324, filed Sep. 29, 2020, now U.S. Pat. No. 11,122,240, issued on Sep. 14, 2021, also claims the benefit of U.S. Provisional Patent Application Ser. No. 63/072,936, filed on Aug. 31, 2020, and U.S. Provisional Patent Application Ser. No. 63/075,809, filed on Sep. 8, 2020. U.S. patent application Ser. No. 16/950,888, filed Nov. 17, 2020, also claims the benefit of U.S. Provisional Patent Application Ser. No. 63/088,449, filed on Oct. 6, 2020, U.S. Provisional Patent Application Ser. No. 63/072,936, filed on Aug. 31, 2020, and U.S. Provisional Patent Application Ser. No. 63/075,809, filed on Sep. 8, 2020. This application also claims the benefit of U.S. Provisional Patent Application Ser. No. 63/116,797, filed Nov. 20, 2020. The entire contents of the prior applications are incorporated by reference.

BACKGROUND

The present specification relates to managing video conferences and other communication sessions. As communications networks have become more reliable, video conferences and other remote interactions have become increasingly popular.

SUMMARY

Various techniques for providing video conferences and other communication sessions among networked devices are discussed herein. In some implementations, a computer system provides enhancements to video conferences and other communication sessions. The system can process media streams and use the results to alter and enrich the communication session, including by results of real-time analysis that can be integrated with content of the communication session (e.g., audio, video, presented content, etc.). The analysis results can characterize the state of the communication session and its participants, as well provide recommendations or recommendations to improve the efficiency and effectiveness of the communication session. The techniques described herein can provide various improvements to traditional video conferences, webinars, telephone conferences, and other network-based interactions as discussed below.

Although video conferences and other communication sessions are intended facilitate communication between users, technical limitations often restrict their effectiveness. The limitations of the video conferencing platforms can, in effect, filter out much of the visual, non-verbal communication that video conferencing is intended to convey. For example, endpoint devices have limited screen space, and the approaches that video conference platforms take to utilize the screen can also limit the effectiveness of the communication channel. For example, some video conference platforms may attempt to show each participant's video in a "gallery" view. However, the more participants are involved in the conference, the smaller each participant's resulting video is shown on screen. Often, this results in many video streams each being shown in a very small size, often as a thumbnail-type image. On mobile devices, such as smartphones where much of communication now occurs, individual video feeds in a conference may be shown in only the area of roughly a postage stamp. This small display size of video streams makes it difficult or impossible for a viewer to accurately judge many of the reactions, expressions, and non-verbal communication of other participants. Nevertheless, very small images is very common in video conferences, especially where additional content is shared (e.g., presentation slides, a document, screen share image or video, etc.) and the additional content occupies the majority of the conference interface. Whatever the reason for small video stream display sizes, the effectiveness of visual communication among participants diminishes drastically when shown at small resolution and small screen size.

Screen space limitations and other user interface limitations make it so usually only a very limited number of participants in a communication session can have their video feeds shown at an endpoint device at a time, perhaps 6 to 10 concurrent video streams in typical implementations. As a practical matter, at any given time during a conference, an endpoint device may altogether omit the video streams of a significant number of participants or even most participants from the user interface. By keeping some or most participants "off screen," during conferences, video conferencing platforms fail to deliver a full video-based experience for all participants. In this situation, participants have no way of determining the reactions and state of the off-screen participants. Meeting hosts and presenters have no way of effectively monitoring the reactions and response across the audience as a whole, as the interface for the conference fails to display any visual feedback for many or most of the participants. Consider common types of network-based meetings, such as webinars, virtual education classes (e.g., distance learning, online education, etc.), college seminars, and corporate conferences that commonly involve 10, 20, 50, 100, or more participants. If a web-based seminar or college class has 200 participants, but the presenter's endpoint can only display 5-10 participant video streams as is often the case, then the majority of the visual, non-verbal content contributed by the participants is entirely lost to the presenter. An endpoint device typically does not have the screen space to display concurrent video streams for all of the participants, and even if it could, the resulting video streams would be shown at the endpoint so small as to be unintelligible, and further the viewer would lack the ability to even consider such an array of small concurrent video streams.

The problems are compounded further due to the network bandwidth limitations of the endpoint devices involved. When many participants are involved in a communication session, video conferencing platforms often need to significantly reduce the resolution and frame rate of each video stream provided for display by endpoints, often by a factor of 5× to 10×, to stay within the network bandwidth constraints of involved devices. Typically, the size reduction and frame rate reduction on participant video streams needs to be greater the more video streams are provided concurrently. Thus, in a conference with many participants, limitations on screen space and network bandwidth force video conferencing platforms to choose from two options that both block much of the visual, non-verbal content that video conferencing was intended to provide. As a first option, video conferencing platforms may show video streams for only a few participants, but this entirely prevents endpoint devices from displaying information about many other participants. As a second option, video conferencing platforms may show many small, low-quality video streams, but the necessary reductions in size and quality filter out much of the visual information (e.g., gestures, facial expressions, etc.) from source video feeds and make it imperceptible at the interface of the destination endpoint. Neither option allows a user interface to effectively convey the state of the other participants and in particular the reactions and non-verbal communications that video conferencing was created to transmit.

The present technology addresses these technical problems and limitations and improves video conferencing systems by incorporating into video conferences significant portions of the information in video streams that would otherwise be lost. For example, during the conference, the system can automatically detect elements in the video streams of participants, such as gestures, facial expressions, and the participants' cognitive and emotional state. Although much of this information would conventionally be lost due to small-sized video areas or omitted video feeds, the present system can incorporate the information into the video conference interface with compact, screen-space-efficient user interface elements. These elements can take many forms, including information panels, overlays, charts, and other elements that convey the information extracted from the participant video streams much more efficiently and compactly than showing the video streams themselves. For example, the system can provide elements that summarize the current state of the video conference and its participants. The interface can show, in real time or substantially real time, how participants are engaging and responding in the conference, without consuming the screen space or network bandwidth that would be needed to provide all of the participant video streams at the endpoints. As a result, the system can enrich a video conference with detected reactions, engagement measures, and other results of analysis of participant video feeds provided concurrently with and integrated with the video conference.

Many video conference systems repeatedly change which participant's video stream is most prominent during a conference, cycling through video streams for different participants as they each take turns speaking. While it is often helpful to focus on the current speaker, this comes at the significant expense of hindering participants from seeing the responses and reactions of the majority of participants that are not currently speaking. It also destroy continuity over time as participants' video streams are intermittently displayed and removed. Conventional video conferencing platforms simply do not provide the data that would allow participants to track the responses and reactions of participants over time when, during most of the conference, the video feeds for most participants are very small or are not provided to endpoints at all. The present system, however, solves this problem by continuing to track the engagement and reactions of participants based on the video streams of the participants, even if those video streams are not being displayed at endpoints. Regardless of whether a video conference server transmits a particular participant's video stream to the other endpoints, the system can still consistently track the visual events and conditions revealed by the video stream over the course of the conference. The system can therefore maintain an accurate record of the engagement, reactions, and participant state for each participant throughout the conference, and provide user interface elements based on this record consistently throughout the conference.

The present disclosure also describes various system architectures that enable the scalable and efficient processing of the video streams from participants. The more participants are added to a communication session, the more media streams the endpoints and video conferencing servers are required to process. This often results in a high demand for processing capability and network bandwidth among the devices that are involved in the communication session. Further, analysis of video streams to enhance a video conference is also computationally intensive. For example, processing to detect facial expressions, gestures, eye-gaze direction, head position, emotion, voice stress, and other properties can be highly demanding. The challenge can become rather intractable as the number of participants, and thus the number of media streams to process concurrently, becomes large, such as 10, 20, 50, 100, 500, or 1000 or more different video streams for different participants.

The architectures of the present disclosure provide highly efficient techniques for managing the concurrent processing of video streams with innovative options for distributing processing. One architecture leverages the processing capabilities of the endpoint devices so that each performs analysis on the video stream it captures and contributes to the conference. In other words, each endpoint device can transmit the video stream it captures of its user and also the analysis results that the endpoint device generated for its video stream. This relieves the video conference servers from performing significant portions of the video analysis, allowing the servers to then aggregate and distribute the analysis results with the video conference data to be displayed. The endpoint devices can each store machine learning models, software modules, algorithms, processing rules, and other elements to facilitate the performance of various tasks at the endpoint devices.

The arrangement of performing at least some of the video processing at the video source (e.g., endpoint) minimizes the marginal cost of adding additional participants to the conference. This improves scalability by allowing each new entrant's device to handle analysis of its own outgoing video stream. Because much of the video analysis is performed by the endpoint, the addition of another endpoint to the conference adds a relatively small amount of additional processing for the server, much less than if the server were performing the full video analysis. This technique can enable video conference servers to support large conferences, e.g., with 50, 100, 250, 500, 1000, or more different video streams, while providing to the participants results of concurrent, real-time analysis of the video streams (e.g., gesture detection, facial expression analysis, engagement scoring, and more).

Architectures that enable analysis of video data at the video source also provide enhanced quality of analysis, resulting in more accurate detection of expression, gestures, and other events and conditions. At the source of the video stream, the full quality video is available, e.g., full resolution, full frame rate, full color bit-depth, etc. and minimal compression or no compression. By contrast, to use network bandwidth efficiently, the video streams sent to the server are often of reduced quality, e.g., reduced size, reduced frame rate, reduced color bit-depth, with significant compression applied, and so on. Many types of video analysis are much more accurate using the original source-quality video at the endpoint (e.g., facial analysis, emotion detection, gesture detection, micro-expression detection, eye-gaze detection, etc.), especially if the size of a participant's face is relatively small in the overall area of the video frames.

Also, by performing the analysis at the video-source endpoints, each device can perform the analysis on the unencrypted source video. This enables the system to obtain analysis results even when the video streams will be transported over the network in encrypted form. Some implementations may enable a server to receive encrypted video feeds and decrypt the video feeds for analysis, but this adds an additional layer of complexity to the encryption scheme and additional computational cost for decryption at the server. By contrast, local video analysis by the video source endpoint and transmission of the encrypted video stream can enable both end-to-end encryption of the video content without requiring decryption by the server, as well as the various video conference enhancements discussed herein.

Performing video analysis at the video source endpoints allows the system to support new options for communicating in networked communication sessions. For example, the system can capture and share information about the state of participants in a communication session even when video data is not transferred to the server or to any other endpoint devices. For example, in a video conference, a participant may choose to block other participants from seeing his video feed but permit the system to capture video data and provide engagement and reaction data for the participant. Although the video feed is not transmitted to the server, the endpoint can continue to capture video with the camera and can analyze the captured video locally. The endpoint can then repeatedly transfer analysis results describing the state of the participant to the server in lieu of the video stream. This allows the participant's privacy to be preserved, as no video is shared, while still allowing the server to receive information about the participant, to gauge the engagement and state of the participant. This technique can be particularly useful in online classes or web-based seminars, where the reactions and engagement levels of participants can be determined locally and then aggregated by a server, thus allowing an accurate assessment of the state of a large distributed audience to be determined while avoiding the network bandwidth costs of sending and receiving the video streams.

Another technique that the present system can use to perform efficient processing is to balance processing between video source endpoints and the servers. The system can identify an appropriate assignment of tasks between the server and the different endpoints to perform the desired video analysis while respecting the limits of the various devices for power consumption, network bandwidth, processing capabilities, heat generation, and other parameters. The assignments can be made differently for different types of devices, such as a greater share of processing performed locally for laptop computers and a lesser share of processing performed locally for smartphones. More specifically, the current state and context of each individual device can be used to determine the proper breakdown in processing tasks between each device and the server. The devices and the server can monitor performance during the communication session and can dynamically change the share of processing performed by the devices.

The ability of the server system to support different levels of shared processing with endpoints can increase compatibility with a wide variety of endpoints. The server can operate in various different modes, with video analysis being performed entirely locally at the video source, with video analysis being performed entirely by the server, and with one or more additional modes of shared processing by video source endpoint and server. The server can operate a conference while using different modes for different endpoints, greatly increasing the compatibility for the enhanced video conferencing system. For example, performing video analysis locally at an endpoint device may often require the installation or use of certain software at the endpoint. For some device types, like laptops, this may be simple and effective. However, for other types of devices, such as corporate video conferencing appliances, it may not be possible to install add-on software modules to perform the analysis. Similarly, some endpoints may not have the processing capability to support the local analysis, may run an operating system or other software that is not compatible with the analysis module, or simply may be currently experiencing a high load that does not leave spare processing capacity for the local analysis. The server can therefore assess the capabilities of each endpoint device and select the appropriate mode to use for the device, potentially negotiating the precise split of processing tasks for each endpoint and the server as needed.

In one general aspect, a method performed by one or more computers includes: identifying, by the one or more computers, multiple sub-sessions of a network-based communication session in which multiple remote endpoint devices each provide media streams over a communication network, wherein the sub-sessions occur concurrently and include different subsets of the endpoint devices, and wherein each sub-session involves sharing media streams among the subset of endpoint devices included in the sub-session; for each of the sub-sessions, identifying, by the one or more computers, the endpoint devices included in the sub-session; obtaining, by the one or more computers, user state data for each of the endpoint devices, the user state data for each endpoint device being generated based on analysis of face images of the user of the endpoint device captured by the endpoint device during the communication session; aggregating, by the one or more computers, the user state data to determine a sub-session state for each of the sub-sessions, wherein the sub-session state for each sub-session is determined based on the user state data for the subset of endpoint devices identified as being included in the sub-session; and during the communication session, communicating, by the one or more computers, over the communication network with a remote device associated with the communication session to cause a user interface of the remote device to indicate the sub-session states determined for one or more of the multiple sub-sessions.

In some implementations, the sub-session states are scores or classifications assigned for the sub-sessions.

In some implementations, the user state data for the endpoint devices comprises one or more measures of emotional or cognitive attributes of the users of the endpoint devices, the one or more measures of emotional or cognitive attributes being derived based on properties of the face images of the users.

In some implementations, the user state data is further based on characteristics of speech of users of the endpoint devices during the communication session.

In some implementations, the method includes: evaluating the sub-session states determined for the sub-sessions; determining, based on the evaluation, that a predetermined condition has occurred for a particular sub-session based on the sub-session state for the particular sub-session; and causing a notification for the predetermined condition to be provided on the user interface of the remote device in response to the determination.

In some implementations, the method includes: ranking or filtering the sub-sessions based on the determined sub-session states; and sending data to the remote device that causes the user interface to present user interface elements corresponding to the sub-sessions arranged based on the ranking or filtering.

In some implementations, the user interface comprises a plurality of areas each corresponding to a different sub-session of the multiple sub-sessions. The method includes: selecting one or more actions to adjust or interact with a particular sub-session based on the sub-session state for the sub-session; and causing interactive user interface elements configured to initiate the one or more actions to be provided in the area of the user interface corresponding to the particular sub-session.

In some implementations, the sub-sessions are virtual breakout rooms that endpoint devices join or are assigned to after joining the communication session.

In some implementations, the network-based communication session is a primary video conference session, and the sub-sessions are secondary video conference sessions that occur concurrently with each other are each associated with the primary video conference session.

In some implementations, the user state data is generated by the respective endpoint devices each processing video data that the respective endpoint devices captured during the communication session.

In another general aspect, a method performed by one or more computers includes: identifying, by the one or more computers, multiple sub-sessions of a network-based communication session in which multiple remote endpoint devices each provide media streams over a communication network, wherein the sub-sessions occur concurrently and include different subsets of the endpoint devices, and wherein each sub-session involves sharing media streams among the subset of endpoint devices included in the sub-session; for each of the sub-sessions, identifying, by the one or more computers, the endpoint devices included in the sub-session; obtaining, by the one or more computers, user state data for each of the endpoint devices, the user state data for each endpoint device being generated based on analysis of face images of the user of the endpoint device captured by the endpoint device during the communication session; aggregating, by the one or more computers, the user state data to determine a sub-session state for each of the sub-sessions, wherein the sub-session state for each sub-session is determined based on the user state data for the subset of endpoint devices identified as being included in the sub-session; based on the sub-session state determined for a particular sub-session, selecting, by the one or more computers, an action to adjust or interact with the particular sub-session; generating, by the one or more computers, user interface data configured to cause a user interface of a remote device to present an interactive control configured to initiate the selected action for the particular sub-session in response to interaction with the interactive control; and during the communication session, communicating, by the one or more computers, over the communication network with a remote device associated with the communication session to cause a user interface of the remote device to (i) indicate the sub-session states determined one or more of the multiple sub-sessions and (ii) present the interactive control configured to initiate the selected action for the particular sub-session that was determined based on the sub-session state determined for the particular sub-session.

In some implementations, the action selected comprises at least one of: removing a participant from the particular sub-session; muting audio for a participant in the particular sub-session; pausing the particular sub-session; ending the particular sub-session; playing a pre-recorded media segment in the particular sub-session; sending an alert to one or more participants in the particular sub-session; introducing the user of the remote device into the particular sub-session; or setting or altering a speaking time limit for one or more participants in the particular sub-session.

In some implementations, the method includes: storing (i) rules or thresholds defining different conditions to be detected in the sub-sessions, and (ii) mapping data identifying different actions corresponding to the different conditions; and determining, based on the sub-session state determined for the particular sub-session, that a particular condition of the different conditions has occurred. Selecting the action to adjust or interact with the particular sub-session comprises selecting a particular action that the mapping data identifies as corresponding to the particular condition that is determined to occur.

In some implementations, the different conditions comprise conditions defined to be present when corresponding values or ranges of values for cognitive or emotional attributes of participants in a sub-session are detected.

In some implementations, the different conditions comprise conditions defined to be present when a predetermined combination, predetermined pattern, or predetermined trend of cognitive or emotional attributes are detected.

In some implementations, the user interface is configured to present media content from one or more of the endpoint devices in the communication concurrently with a monitoring region that indicates the sub-session states for multiple sub-sessions and the interactive control, wherein the monitoring region is periodically updated in response to changes in the sub-session states to (i) alter the set of interactive controls provided in the monitoring region or (ii) change a ranking or prioritization of sub-session state information for multiple sub-sessions.

In another general aspect, a method performed by an electronic device includes: displaying, by the electronic device, one or more media streams of a videoconference involving multiple endpoints, the one or more media streams being provided over a communication network by one or more servers associated with the videoconference; while displaying the one or more media streams of the videoconference: capturing, by the electronic device, video data using a camera, the video data including video of a face of a user of the electronic device; performing, by the electronic device, video analysis on the video data to determine attribute scores for one or more cognitive or emotional attributes of the user of the electronic device; and providing, by the electronic device, the results of the facial analysis over the communication network to the one or more servers associated with the videoconference.

In another general aspect, a method performed by one or more computers includes: distributing, by the one or more computers, media streams received from different endpoint devices to other endpoint devices during a videoconference; receiving, by the one or more computers, attribute scores generated by the respective endpoints, the attribute scores for an endpoint indicating one or more cognitive or emotional attributes of the user of the endpoint determined through video analysis of the media stream performed by the endpoint; aggregating, by the one or more computers, the attribute scores indicating the cognitive or emotional attributes to determine an aggregate measure for the videoconference; and distributing, by the one or more computers, the aggregated measure for presentation in the videoconference with the media streams.

In one general aspect, a method of providing enhanced video communication over a network includes: capturing, by a first endpoint device, video data during a network-based communication session using a camera of the first endpoint device to generate a video data stream, wherein the network-based communication session involves the first endpoint device and one or more other endpoint devices; processing, by the first endpoint device, the captured video data to generate a stream of user state data indicating attributes of a user of the first endpoint device at different times during the network-based communication session, the processing including performing facial analysis on the captured video data to evaluate images of a face of the user of the first endpoint device; transmitting, by the first endpoint device, the stream of user state data indicating the determined attributes over a communication network to a server system configured to aggregate and distribute, during the network-based communication session, user state data generated by the respective endpoint devices each processing video data that the respective endpoint devices captured during the network-based communication session; receiving, by the first endpoint device over the communication network, (i) content of the network-based communication session and (ii) additional content based on user state data generated by the respective endpoint devices each processing video data that the respective endpoint devices captured during the network-based communication session; and presenting, by the client device and during the network-based communication session, a user interface providing the received content of the network-based communication session concurrent with the received additional content based on the user state data generated by the respective endpoint devices.

In some implementations, processing the captured video data comprises using a trained machine learning model at the first endpoint device to process images of a face of the user of the first endpoint device, wherein the output of the trained machine learning model comprises scores for each of multiple emotions.

In some implementations, receiving the content of the network-based communication session comprises video data from by one or more of the other endpoint devices.

In some implementations, the determined user state data comprises cognitive or emotional attributes of the user of the first endpoint device.

In some implementations, the method includes comprising applying a time-series transformation to a sequence of scores generated by the first endpoint device for attributes of the user of the first endpoint device at different times during the network-based communication session. The results of the time-series transformation can be provided in the user state data transmitted by the endpoint device.

In some implementations, the time-series transformation includes determining at least one of a minimum, maximum, mean, mode, range, or variance for a sequence of scores generated by the first endpoint device.

In some implementations, the stream of user state data comprises a series of analysis results each determined based on different overlapping windows of the video data stream captured by the first endpoint device.

In some implementations, the method includes transmitting the video data stream to the server system over the communication network. For example, the video data, in full form or compressed form, can be provided to a server and then forwarded on to other endpoint devices for display.

In some implementations, the server system is a first server system, wherein the first endpoint device receives the additional content from the first server system, and wherein the endpoint device receives the content of the network-based communication session from a second server system that is different from the first server system.

In some implementations, the received additional content comprises a measure of participation, engagement, or collaboration for a group of multiple participants in the communication session, the measure being based on aggregated user state data for the multiple participants.

In some implementations, the first endpoint device receives the additional content and the content of the network-based communication session from the same server system.

In some implementations, the network-based communication is a video conference, a seminar, a webinar, a telephone conference, a phone call, a telemedicine interaction, a virtual education session.

In some implementations, the stream of user state data comprises a series of sets of emotion scores, each set of emotion scores being determined based on facial analysis of a different frame or set of frames of the video data, each set of emotion scores including multiple scores that respectively a presence of or a level of different emotions of the user of the first endpoint device.

In some implementations, the emotion scores include scores indicating a presence of or a level of at least one of anger, fear, disgust, happiness, sadness, surprise, contempt, collaboration, engagement, attention, enthusiasm, curiosity, interest, stress, anxiety, annoyance, boredom, dominance, deception, confusion, jealousy, frustration, shock, or contentment.

In some implementations, at least some of the emotion scores are determined by processing image data or features derived from the image data using a neural network stored by the first endpoint device, the neural network being trained to output values indicating levels of one or more emotions based on the image data or features derived from the image data.

In some implementations, a method performed by one or more computing devices comprises: obtaining, by the one or more computing devices, participant data indicative of emotional or cognitive states of participants during communication sessions; obtaining, by the one or more computing devices, result data indicating outcomes occurring during or after the respective communication sessions; analyzing, by the one or more computing devices, the participant data and the result data to generate analysis results indicating relationships among emotional or cognitive states of the participants and the outcomes indicated by the result data; identifying, by the one or more computing devices, an emotional or cognitive state that is predicted, based on the analysis results, to promote or discourage the occurrence of a particular target outcome; and providing, by the one or more computing devices, output data indicating at least one of (i) the identified emotional or cognitive state predicted to promote or discourage occurrence of the particular target outcome, or (ii) a recommended action predicted to encourage or discourage the identified emotional or cognitive state in a communication session.

In some implementations, obtaining the participant data comprises obtaining participant scores for the participants, wherein the participant scores are based on at least one of facial image analysis or facial video analysis performed using image data or video data captured for the corresponding participant during the communication session.

In some implementations, the participant data comprises, for each of the communication sessions, a series of participant scores for the participants indicating emotional or cognitive states of the participants at different times during the one or more communication sessions.

In some implementations, obtaining the participant data comprises obtaining participant scores for the participants, wherein the participant scores are based on at least one of audio analysis performed using audio data captured for the corresponding participant during the communication session.

In some implementations, the method includes receiving metadata indicating context information that describes context characteristics of the communication sessions; wherein the analyzing comprises determining relationships among the context characteristics and at least one of (i) the emotional or cognitive states of the participants or (ii) the outcomes indicated by the result data.

In some implementations, the method comprises: analyzing relationships among elements of the communication sessions and resulting emotional or cognitive states of the participants in the communication sessions; and based on results of analyzing relationships among the elements and the resulting emotional or cognitive states, selecting an element to encourage or discourage the identified emotional or cognitive state that is predicted to promote or discourage the occurrence of the particular target outcome. Providing the output data comprises providing a recommended action to include the selected element in a communication session.

In some implementations, the elements of the communication sessions comprise at least one of events occurring during the communication sessions, conditions occurring during the communication sessions, or characteristics of the communication sessions.

In some implementations, the elements of the communication sessions comprise at least one of topics, keywords, content, media types, speech characteristics, presentation style characteristics, amounts of participants, duration, or speaking time distribution.

In some implementations, obtaining the participant data indicative of emotional or cognitive states comprises obtaining scores indicating a presence of or a level of at least one of anger, fear, disgust, happiness, sadness, surprise, contempt, collaboration, engagement, attention, enthusiasm, curiosity, interest, stress, anxiety, annoyance, boredom, dominance, deception, confusion, jealousy, frustration, shock, or contentment.

In some implementations, the outcomes include at least one of: actions of the participants during the communication sessions; or actions of the participants that are performed after the corresponding communication sessions.

In some implementations, the outcomes include at least one of: whether a task is completed following the communication sessions; or a level of ability or skill demonstrated by the participants.

In some implementations, providing the output data comprises providing data indicating the identified emotional or cognitive state predicted to promote or discourage occurrence of the particular target outcome.

In some implementations, providing the output data comprises providing data indicating at least one of: a recommended action that is predicted to encourage the identified emotional or cognitive state in one or more participants in a communication session, wherein the identified emotional or cognitive state is predicted to promote the particular target outcome; or a recommended action that is predicted to discourage the identified emotional or cognitive state in one or more participants in a communication session, wherein the identified emotional or cognitive state is predicted to discourage the particular target outcome.

In some implementations, the output data indicating the recommended action is provided, during the communication session, to a participant in the communication session.

In some implementations, analyzing the participant data and the result data comprises determining scores indicating effects of different emotional or cognitive states on likelihood of occurrence of or magnitude of the outcomes.

In some implementations, analyzing the participant data and the result data comprises training a machine learning model based on the participant data and the result data.

In some implementations, the participants include students; the communication sessions include instructional sessions; the outcomes comprise educational outcomes including a least one of completion status of assigned task, a grade for an assigned task, an assessment result, or a skill level achieved; the analysis comprises analyzing influence of different emotional or cognitive states of the students during the instructional sessions on the educational outcomes; and the identified emotional or cognitive state is an emotional or cognitive state that is predicted, based on results of the analysis, to increase a rate or likelihood of successful educational outcomes when present in an instructional session.

In some implementations, the participants include vendors and customers; the outcomes comprise whether or not a transaction occurred involving participants and characteristics of transactions that occurred; the analysis comprises analyzing influence of different emotional or cognitive states of at least one of the vendors or customers during the communication sessions on the educational outcomes; and the identified emotional or cognitive state is an emotional or cognitive state that is predicted, based on results of the analysis, to increase a rate or likelihood of a transaction occurring or to improve characteristics of transactions when present in a communication session.

In some implementations, the participants include healthcare providers and patients; the communication sessions include telemedicine or telehealth sessions; the outcomes include one or more medical outcomes including at least one of high patient satisfaction, a desirable state of health for patients, accurate diagnosis by the healthcare providers, accurate selection of a therapy for the patients, or accurate information being provided by the patients; the analysis comprises analyzing influence of different emotional or cognitive states of at least one of the healthcare providers and patients during the communication sessions on the outcomes; and the identified emotional or cognitive state is an emotional or cognitive state that is predicted, based on results of the analysis, to promote occurrence of the one or more medical outcomes when present in a communication session.

In one general aspect, a method of managing a video conference session involving multiple endpoint devices, the method comprising: receiving, by one or more computers, a media stream from each of multiple endpoint devices over a communication network; managing, by the one or more computers, a video conference session among the endpoint devices such that at least one or more of the media streams are transmitted over the communication network for display by the endpoint devices; measuring, by the one or more computers, a plurality of audio and/or video characteristics from the media stream from a particular endpoint device of the multiple endpoint devices; determining, by the one or more computers, based on the audio and/or video characteristics, a collaboration factor score for the particular endpoint device for each of a plurality of collaboration factors; selecting, by the one or more computers, from among a plurality of video conference management actions based on the collaboration factor scores for the media stream for the particular endpoint; and altering, by the one or more computers, the video conference of the multiple endpoints by performing the selected video conference management action.

In some implementations, the selected video conference management action comprises changing a size or resolution for the media stream for the particular endpoint; and wherein altering the management of the video conference session comprises changing a size or resolution at which the media stream for the particular endpoint is transmitted, or changing a size or resolution at which the media stream for the particular endpoint is presented by one or more of the multiple endpoints.

In some implementations, the selected video conference management action comprises reducing bandwidth of transmission of the media stream for the particular endpoint; and altering the management of the video conference session comprises reducing bandwidth of transmission of the media stream for the particular endpoint by increasing a compression level, changing a compression codec, reducing a frame rate, or stopping transmission of the media stream for the particular endpoint to one or more other endpoints.

In some implementations, the selected video conference management action comprises altering an audio volume level for the media stream for the particular endpoint; and altering the management of the video conference session comprises altering an audio volume level for the media stream for the particular endpoint by instructing a different volume level for the audio, muting the audio, or omitting the audio from the media stream for the particular endpoint transmitted to one or more other endpoints.

In some implementations, the method includes classifying, by the one or more computers, the media stream for the particular endpoint device based on the collaboration factor scores. The video conference management action is selected based on the classification of the media stream for the particular endpoint device.

In some implementations, classifying the media stream for the particular endpoint device comprises providing, to a trained machine learning classifier, the collaboration factor scores as inputs and receiving, as output of the trained machine learning classifier, one or more outputs indicative of likelihoods for one or more of a plurality of predetermined classifications, wherein the trained machine learning classifier comprises at least one of a neural network, a decision tree, a support vector machine, a logistic regression model, or a maximum entropy classifier.

In some implementations, classifying the media stream comprises assigning a classification from among a plurality of predetermined classifications each having an associated combination of collaboration factor scores or ranges, wherein the collaboration factors are indicative of different neurological and/or emotional attributes.

In some implementations, classifying the media stream comprises: determining a distance between (i) a set of collaboration factor scores for the particular endpoint, and (ii) each of multiple different combinations of collaboration factor scores or ranges that are each associated with a different classification; and selecting, as a classification for the media stream of the particular endpoint, the classification associated with the combination of collaboration factor scores or ranges having the lowest distance from the set of collaboration factor scores for the particular endpoint.

In some implementations, determining the scores for the plurality of collaboration factors comprises determining a score for each of a plurality of different neurological and/or emotional dimensions.

In some implementations, measuring the plurality of audio and/or video characteristics from the media stream from the particular endpoint device comprises identifying characteristics using speech recognition, facial expression recognition, gesture recognition, intonation analysis, eye gaze position analysis, head position analysis, and/or pattern analysis.

In some implementations, the method includes combining the scores for the collaboration factors into a composite score; and outputting, during the video conference session to one or more of the endpoint devices, data providing a representation of a participant corresponding to the particular endpoint, a representation of the composite score, and an output media stream from at least one of the endpoint devices.

In some implementations, the representation of the composite score comprises a symbol that changes in color according to a degree of quality and level of participation of a participant whose voice or image is indicated by the media stream for the particular endpoint, wherein the degree of quality and level of participation is indicated relative to degrees of quality and level of participation determined for participants corresponding to other endpoints involved in the video conference.

In some implementations, the method includes accessing data indicating multiple predetermined thresholds for the degree of quality and level of participation; and setting the color of the symbol based on the degree of quality and level of participation relative to the multiple predetermined thresholds, the one or more computers being configured to indicate a shade of red if the degree of quality and level of participation is determined to be in excess of a first predetermined threshold, a shade of orange if the measurement is determined to be between the first predetermined threshold and a second predetermined threshold, and a shade of green if the measurement is determined be below the second predetermined threshold.

In some implementations, the method includes: determining a group composite score based on collaboration factor scores determined from each of the media streams of the endpoint devices, the group composite score being indicative of a current level of collaboration and participation among participants in the video conference; and providing the group composite score to one or more of the endpoints over the communication network or using the group composite score to select the video conference management action.

In some implementations, measuring the plurality of audio and/or video characteristics from the media stream from the particular endpoint device comprises using facial expression recognition to determine estimate levels of at least one of attention, enthusiasm, happiness, sadness, stress, boredom, dominance, fear, anger, or deception.

In some implementations, measuring the plurality of audio and/or video characteristics from the media stream from the particular endpoint device comprises at least one of: determining a duration of speaking or participation time; detecting utterance of one or more keywords from a set of predetermined keywords; or identifying an intonation pattern.

In some implementations, the method includes: determining a composite score for each of the multiple endpoints based on the respective media streams for the endpoints, the composite scores indicating respective levels of participation or collaboration in the video conference; determining and outputting, in real-time during the video conference session, a representation of instructions to improve one or more of the composite scores indicating the lowest levels of participation or collaboration in the video conference; and periodically recalculating the composite scores for the multiple endpoints and altering the instructions based on the recalculated composite scores.

In some implementations, the one or more computers are configured to switch between enhancing the video conference in multiple different modes. The modes can include a passive public mode in which the one or more computers provide an output media stream display indicator for each of the multiple endpoints to each endpoint in the video conference. The modes can include a passive private mode in which the one or more computers (i) provide feedback based on composite scores for individual endpoints and/or for the overall collection of endpoints to a limited set of one or more devices having a predetermined permission level, and (ii) provide suggestions of moderator actions only to the limited set of one or more devices having a predetermined permission level. The modes can include an active mode in which the one or more computers introduce direct integrated audio and visual indicators and messages through the output media stream of one or more conference participants.

In another general aspect, a method of indicating in real-time the level and quality of participation of one or more participants within a multi-party video conference session by monitoring one or more party characteristics by way of audio and facial recognition is provided. Generally, the method comprises: in a preprocessor phase, measuring, with a processor, at least one facial and/or audio characteristic of an input media stream received from at least one conference party participant of a plurality of conference participants; (b) calculating, with the processor, a raw trait score from the at least one characteristic of the input media stream relating to neuro-emotional collaboration factors such as: stress, enthusiasm, contribution, and/or happiness, etc.; (c) in a moderator phase, combining the raw trait scores into an overall participant composite score and/or an overall group composite score; and (d) outputting in real-time, with the processor, an integrated representation of the at least one conference participant and the overall participant composite score and/or an overall group composite score, in combination, with an output media stream for at least one of the conference participants and/or a meeting organizer.

In some implementations, the preprocessor phase further comprises: the level and quality of participation of the conference participant is measured, by the processor, by way of facial recognition, by selecting or selecting in combination from the group of characteristics related to eye contact and facial expression indicating levels of attention, stress, boredom, dominance, fear, anger, and/or deception.

In some implementations, the preprocessor phase further comprises: the level and quality of participation of the conference participant is measured, by the process, by way of audio recognition, by selecting or in selecting in combination from the group of characteristics related to speaking/participation time, keyword recognition, and intonation.

In some implementations, the integrated representation includes a symbol indicative of the conference participant that changes in color according to the relative degree of quality and level of participation based on the measurement value as compared to the other plurality of participants.

In some implementations of the application, the symbol would indicate a shade of the color red if the measurement is determined to be in excess of a predetermined threshold, a shade of the color orange if the measurement is determined to be within an average predetermined threshold, or a shade of the color green if the measurement is determined be below a predetermined threshold.

In some implementations, a method performed by one or more computing devices comprises: during a communication session, obtaining, by the one or more computing devices, a participant score for each participant in a set of multiple participants in the communication session, wherein each of the participant scores is based on at least one of facial image analysis or facial video analysis performed using image data or video data captured for the corresponding participant during the communication session, wherein each of the participant scores is indicative of an emotional or cognitive state of the corresponding participant; using, by the one or more computing devices, the participant scores to generate an aggregate representation of the emotional or cognitive states of the set of multiple participants; and providing, by the one or more computing devices, output data during the communication session for display, the output data comprising the aggregate representation of the emotional or cognitive states of the set of multiple participants.

In some implementations, the one or more computing devices comprise a server system. At least some of the multiple participants participate in the communication session using respective endpoint devices, the endpoint devices each providing image data or video data over a communication network to the server system. The server system obtains the participant scores by performing at least one of image facial image analysis or facial video analysis on the image data or video data received from the endpoint devices over the communication network.

In some implementations, at least some of the multiple participants participate in the communication session using respective endpoint devices. Obtaining the participant scores comprises receiving, over a communication network, participant scores that the respective endpoint devices determined by each end point device performing at least one of facial image analysis or facial video analysis using image data or video data captured by the endpoint device.

In some implementations, the one or more computing devices comprise an endpoint device for a person participating in the communication session. Obtaining the participant score, using the participant scores to generate the aggregate representation, and providing the output data for display are performed by the endpoint device, the aggregate representation being displayed at the endpoint device.

In some implementations, the aggregate representation characterizes or indicates the emotional states or levels of engagement among the set of multiple participants using at least one of a score, a graph, a chart, a table, an animation, a symbol, or text.

In some implementations, the method comprises, during the communication session, repeatedly (i) obtaining updated participant scores for the participants as additional image data or video data captured for the respective participants during the communication session, (ii) generating an updated aggregate representation of the emotional states or levels of engagement of the set of multiple participants based on the updated participant scores, and (iii) providing updated output data indicative of the updated aggregate representation.

In some implementations, the participant scores are varied during the communication session based on captured image data or video data such that the aggregate representation provides a substantially real-time indicator of current emotion or engagement among the set of multiple participants.

In some implementations, the output data is provided for display by an endpoint device of a speaker or presenter for the communication session.

In some implementations, the output data is provided for display by an endpoint device of a teacher, and wherein the set of multiple participants is a set of students.

In some implementations, the set of participants comprises remote participants that are located remotely from each other during the communication session, each of the remote participants having image data or video data captured by a corresponding endpoint device.

In some implementations, the set of participants comprises local participants that are located in a same room as each other during the communication session.

In some implementations, the aggregate representation indicates a level of emotion or engagement determined based on participant scores for at least ten different participants in the communication session.

In some implementations, the aggregate representation indicates a level of emotion or engagement determined based on participant scores for at least one hundred different participants in the communication session.

In some implementations, the aggregate representation indicates a level of emotion or engagement determined based on participant scores for at least one thousand different participants in the communication session.

In some implementations, generating the aggregate representation comprises generating an overall measure of engagement for the set of multiple participants.

In some implementations, the method includes: tracking changes in emotion or engagement of the set of multiple participants over time during the communication session; and providing during the communication session an indication of a change in the emotion or engagement of the set of multiple participants over time.

In some implementations, the method includes: determining that a condition has occurred based on the participant scores or the aggregate representation; and providing, for display, an indication that the condition has occurred.

In some implementations, the method includes grouping the participants in the set of multiple participants into different groups based on the participant scores. The aggregate representation comprises an indication of characteristics of the different groups.

In some implementations, the method includes: determining, based on the participant scores or the aggregate representation, a recommendation for improving a level of engagement or emotion of the participants in the set of multiple participants; and providing data causing an indication of the determined recommendation to be presentation.

Other embodiments of these and other aspects disclosed herein include corresponding systems, apparatus, and computer programs encoded on computer storage devices, configured to perform the actions of the methods. A system of one or more computers can be so configured by virtue of software, firmware, hardware, or a combination of them installed on the system that, in operation, cause the system to perform the actions. One or more computer programs can be so configured by virtue having instructions that, when executed by data processing apparatus, cause the apparatus to perform the actions.

The details of one or more embodiments of the invention are set forth in the accompanying drawings and the description below. Other features and advantages of the invention will become apparent from the description, the drawings, and the claims.

BRIEF DESCRIPTION OF THE DRAWINGS

FIG. 2A is a block diagram illustrating an example moderator module.

Figure 6:
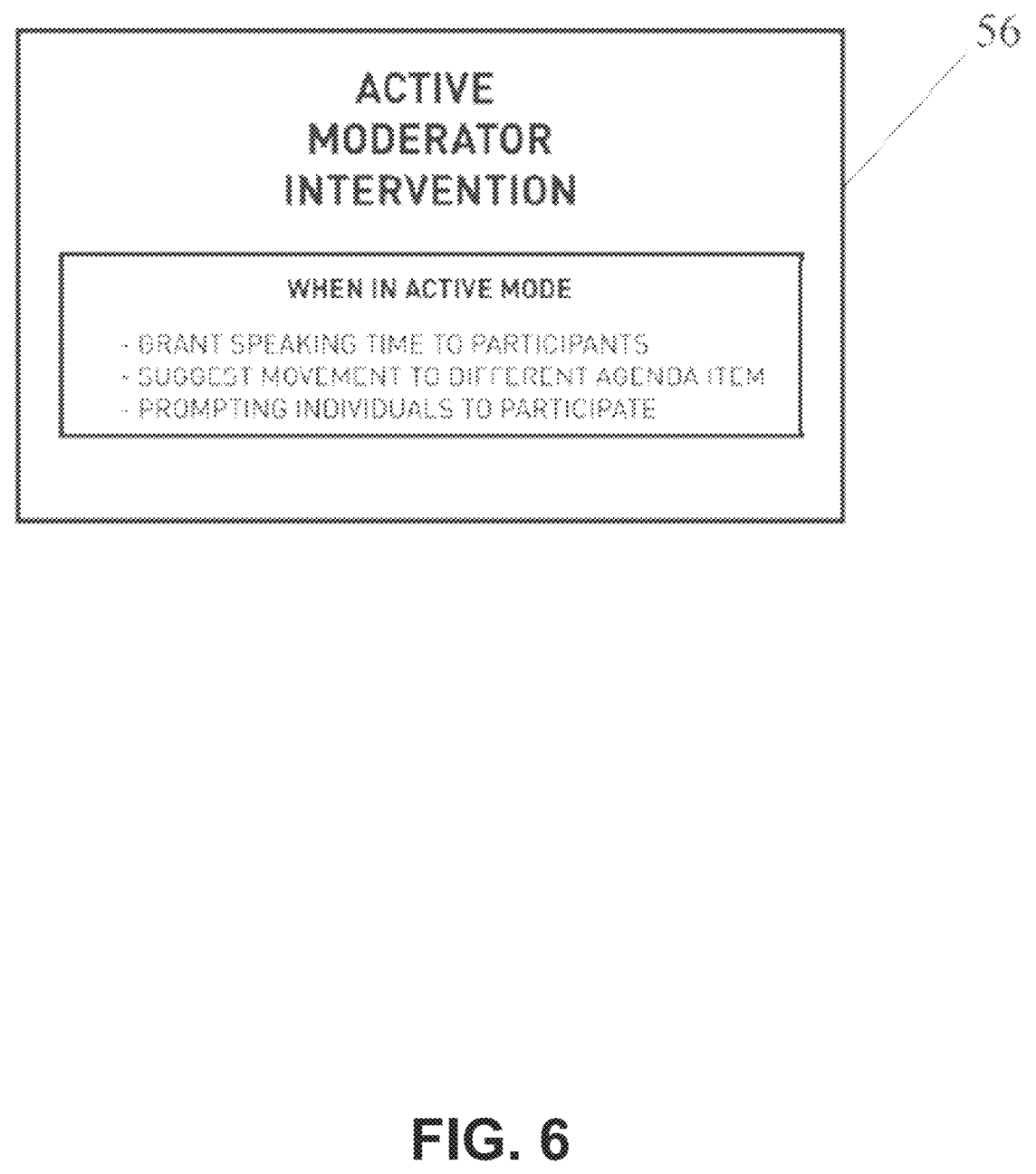

FIG. 6 is a block diagram illustrating the active moderator mode of the implementation of FIG. 5.

FIGS. 12A-12C illustrate example user interfaces showing insights and recommendations for video conferences.

FIG. 18 is a flow diagram describing a process of providing aggregate information about the emotional or cognitive states of participants in a communication session.

FIG. 19B is a table illustrating example scores reflecting results of analysis of cognitive and emotional states and outcomes.

FIG. 19C is a table illustrating example scores reflecting results of analysis of communication session factors and cognitive and emotional states of participants in the communication sessions.

FIG. 19D is a table illustrating example scores reflecting results of analysis of various other factors.

FIG. 20 is a flow diagram showing an example of a process for analyzing communication sessions.

FIG. 21 is a flow diagram showing an example of a process for providing recommendations for improving a communication session and promoting a target outcome.

FIGS. 22A-22D are diagrams illustrating examples of systems showing architectures for scalable video conferencing management.

FIGS. 23A-23C are diagrams showing examples of assigning processing tasks to endpoint devices and servers.

FIG. 26 shows an example of a system in which participants may use multiple cameras and/or may use holographic projections or other techniques to provide three-dimensional representations during remote interactions.

FIG. 27 shows an example of a system in which facial feature matrices are provided rather than video data streams, and the facial feature matrices can be used to provide animated or rendered representations of participants.

Like reference numbers and designations in the various drawings indicate like elements.

DETAILED DESCRIPTION

Figure 1:
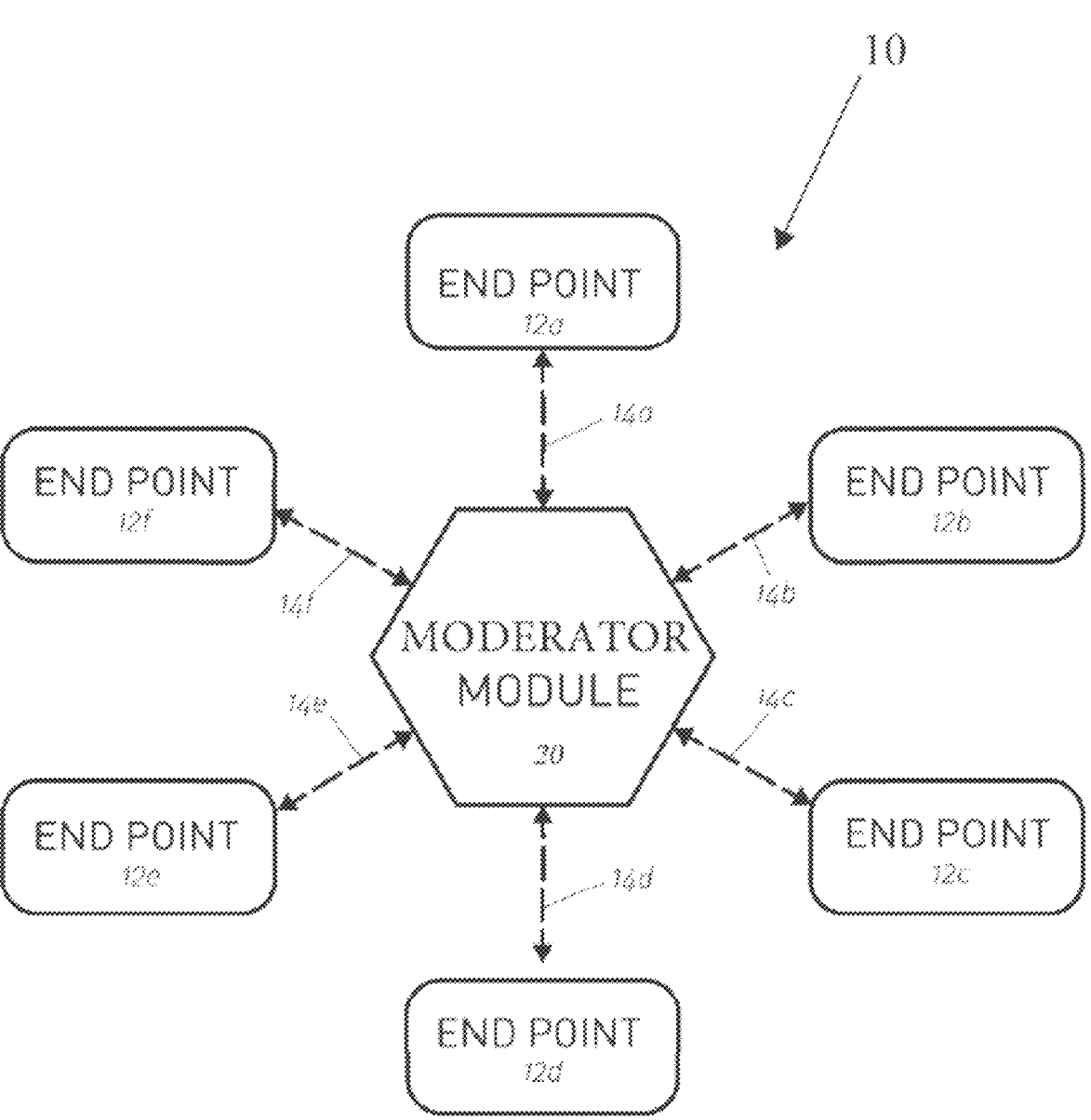
FIG. 1 is an example of a video conference moderator in communication with multiple endpoint media streams.

In some implementations, a computer system can detect the emotional or cognitive states of participants in a communication session and provide feedback about participants during the communication session. The communication session can be a class, a lecture, a web-based seminar, a video conference, or other type of communication session. The communication session can involve participants located remotely from each other, participants located in a same shared space, or may include both types of participants. Using image data or video data showing the participants, the system can measure different emotions (e.g., happiness, sadness, anger, etc.) as well as cognitive attributes (e.g., engagement, attention, stress, etc.) for the participants. The system then aggregates the information about the emotional or cognitive states of the participants and provides the information to show how a group of participants are feeling and interacting during the communication session.

The computer system can capture information about various different communication sessions and the emotional and cognitive states of participants during the communication sessions. The system can then perform analysis to determine how various factors affect the emotional and cognitive states of participants, and also how the emotional and cognitive states influence various different outcomes. Through this analysis, the system can learn how to recommend actions or carry out actions to facilitate desired outcomes, e.g., high satisfaction rates for meetings, completing tasks after meetings, developing a skill, scoring well on a test, etc.

The system's ability to gauge and indicate the emotional and cognitive state of the participants as a group can be very valuable to a teacher, lecturer, entertainer, or other type of presenter. The system can provide measures that show how an audience overall is reacting to or responding in a communication session. Many communication sessions include dozens or even hundreds of participants. With a large audience, the presenter cannot reasonable read the emotional cues from each member of the audience. Detecting these cues is even more difficult with remote, device-based, interactions rather than in-person interactions. To assist a presenter and enhance the communication session, the system can provide tools with emotional intelligence, reading verbal and non-verbal signals to inform the presenter of the state of the audience. By aggregating the information about the emotions, engagement, and other attributes of members of the audience, the system can provide a presenter or other user with information about the overall state of the audience which the presenter otherwise would not have. For example, the system can be used to assist teachers, especially as distance learning and remote educational interactions become more common. The system can provide feedback, during instruction, about the current emotions and engagement of the students in the class, allowing the teacher determine how well the instruction is being received and to better customize and tailor the instruction to meet students' needs.

In some implementations, a system can manage and enhance multi-party video conferences to improve performance of the conference and increase collaboration. The techniques can be implemented using one or more computers, e.g., server systems, and/or application(s) operating on various devices in a conference. In general, the system can monitor media streams from different endpoint devices connected to the conference, and enhance the video conference in various ways. As discussed further below, the enhancements can alter the manner in which media streams are transferred over a network, which can reduce bandwidth usage and increase efficiency of the conference. The manner in which the various endpoints in a conference present the conference can also be adjusted. For example, the system can provide an automated moderator module that can actively make changes to the way media streams are transmitted and presented, based on collaboration factor scores determined through real-time analysis of the video streams. The system can also provide feedback regarding participation based on principles of neuroscience, and can adjust parameters of the video conference session based on those factors. The moderator system can operate in different modes to actively alter or enhance a video conference session directly, or to provide recommendations to one or more devices so that another device or a user can make changes.

Video conferencing comprises the technologies for the reception and transmission of audio and video signals by devices (e.g., endpoints) of users at different locations, for communication in real-time, simulating a collaborative, proximate setting. The principal drive behind the evolution of video conferencing technology has been the need to facilitate collaboration of two or more people or organizations to work together to realize shared goals and to achieve objectives. Teams that work collaboratively can obtain greater resources, recognition and reward when facing competition for finite resources.

For example, mobile collaboration systems combine the use of video, audio, and on-screen drawing capabilities using the latest generation hand-held electronic devices broadcasting over secure networks, enabling multi-party conferencing in real-time, independent of location. Mobile collaboration systems are frequently being used in industries such as manufacturing, energy, healthcare, insurance, government and public safety. Live, visual interaction removes traditional restrictions of distance and time, often in locations previously unreachable, such as a manufacturing plant floor a continent away.

Video conferencing has also been called "visual collaboration" and is a type of groupware or collaborative software which is designed to help people involved in a common task to achieve their goals. The use of collaborative software in the school or workspace creates a collaborative working environment. Collaborative software or groupware can to transform the way participants share information, documents, rich media, etc. in order to enable more effective team collaboration. Video conferencing technology can be used in conjunction with mobile devices, desktop web cams, and other systems to enable low-cost face-to-face business meetings without leaving the desk, especially for businesses with widespread offices.

Although video conferencing has frequently proven immensely valuable, research has shown that participants must work harder to actively participate as well as accurately interpret information delivered during a conference than they would if they attended face-to-face, particularly due to misunderstandings and miscommunication that are unintentionally interjected in the depersonalized video conference setting.

When collaborative groups are formed in order to achieve an objective by way of video conferencing, participants within the group may tend to be uncomfortable, uneasy, even have anxiety from the outset and particularly throughout the meeting due to misunderstandings and feelings stemming from barriers influenced and created by negative neurological hormones. Moreover, remote video conferencing is plagued by obstacles of disinterest, fatigue, domineering people, and distractions and each person's remote environment and personal distractions and feelings. Whereas, in a venue where everyone is physically present, the tendencies to be distracted, mute the audio for separate conversations, use other electronic devices, or to dominate the conversation or hide are greatly reduced due to physical presence of other participants.

To address the challenges presented by typical video conferencing systems, the systems discussed herein include capabilities to detect different conditions during a video conference and take a variety of video conference management actions to improve the video conference session. Some of the conditions that are detected can be attributes of participants as observed through the media streams in the conference. For example, the system can use image recognition and gesture recognition to identify different facial expressions. The system can also evaluate audio, for example assessing intonation, recognizing speech, and detecting keywords that correspond to different moods. Other factors, such as level of engagement or participation, can be inferred from measuring duration and frequency of speaking, as well as eye gaze direction and head position analysis. These and other elements can be used to determine scores for different collaboration factors, which the video conferencing system can then use to alter the way the video conference is managed.

The system can perform a number of video conference management actions based on the collaboration factors determined from media streams. For example, the system can alter the way media streams are transmitted, for example, to add or remove media streams or to mute or unmute audio. In some instances, the size or resolution of video data is changed. In other instances, bandwidth of the conference is reduced by increasing a compression level, changing a compression codec, reducing a frame rate, or stopping transmission a media stream. The system can change various other parameters, including the number of media streams presented to different endpoints, changing an arrangement or layout with which media streams are presented, addition of or updating of status indicators, and so on. These changes can improve efficiency of the video conferencing system and improve collaboration among the participants.

As discussed herein, the video conferencing platform can use utilizes facial expression recognition technology, audio analysis technology, and timing systems, as well as neuroscience predictions, in order to facilitate the release of positive hormones, encouraging positive behavior in order to overcome barriers to successful collaboration. As a result, the technology can help create a collaborative environment where users can encourage one another to greater participation by users generally and less domination by specific users that detract from collaboration.

Various embodiments will be described in detail with reference to the drawings, wherein like reference numerals represent similar steps throughout the several views. Reference to various embodiments does not limit the scope of the claims attached hereto. Additionally, any examples set forth in this specification are not intended to be limiting and merely set forth some of the many possible implementations for the appended claims.

The present disclosure focuses on a video conference management system, including a moderator system indicating in real-time the level and quality of participation of one or more participants within a multi-party video conference session by monitoring one or more characteristics observable through a media stream in order to stimulate collaboration and active engagement during the video conference. The moderator emphasizes mitigating and overcoming barriers created by providing feedback and/or interjecting actions which facilitate group collaboration.

Moreover, the present application platform utilizes facial expression recognition and audio analysis technology as well as inferences based in neuroscience to prompt for efficient collaboration in a video conference setting. Beneficially, the techniques may facilitate the release of positive hormones, promoting positive behavior of each participant in order to overcome negative hormone barriers to successful collaboration.

In an example implementation, the participation of each endpoint conference participant is actively reviewed in real time by way of facial and audio recognition technology. A moderator module calculates a measurement value based on at least one characteristic evaluated by facial and audio recognition of at least one of the endpoint conference participants. The measurement value(s) can be used to represent-in real time—the quality and extent the participants have participated. Therefore, providing active feedback of the level and quality of the one or more conference participants, based on one or more monitored characteristics. Optionally, if certain thresholds are achieved or maintained, the system may trigger certain actions in order to facilitate engagement among the conference participants.

In some implementations, the video conference moderator system monitors, processes, and determines the level and quality of participation of each participant based on factors such as speaking time and the emotional elements of the participants based on facial expression recognition and audio feature recognition. In addition to monitoring speaking time of each participant, the video conference moderator may utilize facial recognition and other technology to dynamically monitor and track the emotional status and response of each participant in order to help measure and determine the level and quality of participation, which is output, in real time, as a representation (e.g., symbol, score, or other indicator) to a meeting organizer or person of authority and/or one or more of the conference participants. The representation may integrated with (e.g., overlaid on or inserted into) a media stream or a representation of an endpoint or the corresponding participant (e.g., a name, icon, image, etc. for the participant).

In some implementations, a system can manage and enhance multi-party video conferences to improve performance of the conference and increase collaboration. The techniques can be implemented using one or more computers, e.g., server systems, and/or application(s) operating on various devices in a conference. In general, the system can monitor media streams from different endpoint devices connected to the conference, and enhance the video conference in various ways. As discussed further below, the enhancements can alter the manner in which media streams are transferred over a network, which can reduce bandwidth usage and increase efficiency of the conference. The manner in which the various endpoints in a conference present the conference can also be adjusted. For example, the system can provide an automated moderator module that can actively make changes to the way media streams are transmitted and presented, based on collaboration factor scores determined through real-time analysis of the video streams. The system can also provide feedback regarding participation based on principles of neuroscience, and can adjust parameters of the video conference session based on those factors. The moderator system can operate in different modes to actively alter or enhance a video conference session directly, or to provide recommendations to one or more devices so that another device or a user can make changes.

Video conferencing comprises the technologies for the reception and transmission of audio and video signals by devices (e.g., endpoints) of users at different locations, for communication in real-time, simulating a collaborative, proximate setting. The principal drive behind the evolution of video conferencing technology has been the need to facilitate collaboration of two or more people or organizations to work together to realize shared goals and to achieve objectives. Teams that work collaboratively can obtain greater resources, recognition and reward when facing competition for finite resources.

For example, mobile collaboration systems combine the use of video, audio, and on-screen drawing capabilities using the latest generation hand-held electronic devices broadcasting over secure networks, enabling multi-party conferencing in real-time, independent of location. Mobile collaboration systems are frequently being used in industries such as manufacturing, energy, healthcare, insurance, government and public safety. Live, visual interaction removes traditional restrictions of distance and time, often in locations previously unreachable, such as a manufacturing plant floor a continent away.

Video conferencing has also been called "visual collaboration" and is a type of groupware or collaborative software which is designed to help people involved in a common task to achieve their goals. The use of collaborative software in the school or workspace creates a collaborative working environment. Collaborative software or groupware can to transform the way participants share information, documents, rich media, etc. in order to enable more effective team collaboration. Video conferencing technology can be used in conjunction with mobile devices, desktop web cams, and other systems to enable low-cost face-to-face business meetings without leaving the desk, especially for businesses with widespread offices.

Although video conferencing has frequently proven immensely valuable, research has shown that participants must work harder to actively participate as well as accurately interpret information delivered during a conference than they would if they attended face-to-face, particularly due to misunderstandings and miscommunication that are unintentionally interjected in the depersonalized video conference setting.

When collaborative groups are formed in order to achieve an objective by way of video conferencing, participants within the group may tend to be uncomfortable, uneasy, even have anxiety from the outset and particularly throughout the meeting due to misunderstandings and feelings stemming from barriers influenced and created by negative neurological hormones. Moreover, remote video conferencing is plagued by obstacles of disinterest, fatigue, domineering people, and distractions and each person's remote environment and personal distractions and feelings. Whereas, in a venue where everyone is physically present, the tendencies to be distracted, mute the audio for separate conversations, use other electronic devices, or to dominate the conversation or hide are greatly reduced due to physical presence of other participants.

To address the challenges presented by typical video conferencing systems, the systems discussed herein include capabilities to detect different conditions during a video conference and take a variety of video conference management actions to improve the video conference session. Some of the conditions that are detected can be attributes of participants as observed through the media streams in the conference. For example, the system can use image recognition and gesture recognition to identify different facial expressions. The system can also evaluate audio, for example assessing intonation, recognizing speech, and detecting keywords that correspond to different moods. Other factors, such as level of engagement or participation, can be inferred from measuring duration and frequency of speaking, as well as eye gaze direction and head position analysis. These and other elements can be used to determine scores for different collaboration factors, which the video conferencing system can then use to alter the way the video conference is managed.

The system can perform a number of video conference management actions based on the collaboration factors determined from media streams. For example, the system can alter the way media streams are transmitted, for example, to add or remove media streams or to mute or unmute audio. In some instances, the size or resolution of video data is changed. In other instances, bandwidth of the conference is reduced by increasing a compression level, changing a compression codec, reducing a frame rate, or stopping transmission a media stream. The system can change various other parameters, including the number of media streams presented to different endpoints, changing an arrangement or layout with which media streams are presented, addition of or updating of status indicators, and so on. These changes can improve efficiency of the video conferencing system and improve collaboration among the participants.

As discussed herein, the video conferencing platform can use utilizes facial expression recognition technology, audio analysis technology, and timing systems, as well as neuroscience predictions, in order to facilitate the release of positive hormones, encouraging positive behavior in order to overcome barriers to successful collaboration. As a result, the technology can help create a collaborative environment where users can encourage one another to greater participation by users generally and less domination by specific users that detract from collaboration.

FIG. 1 illustrates an example of a video conference moderator system 10 incorporating a dynamic integrated representation of each participant. The moderator system 10 includes a moderator module 20 in communication with multiple conference participant endpoints 12a-12f communications path 14a-14f. Each of the endpoints 12a-12f communicates a source of audio and/or video and transmits a resulting media stream to the moderator module 20. The moderator module 20 receives the media stream from each of the endpoints 12a-12f and outputs a combined and/or selected media stream output to the endpoints 12a-12f. The endpoints 12a-12f can be any appropriate type of communication device, such as a phone, a tablet computer, a laptop computer, a desktop computer, a navigation system, a media player, an entertainment device, and so on.

In an example implementation shown in FIG. 2A, the moderator module 20 includes (i) an analysis preprocessor 30 which receives, analyzes, and determines raw scores (e.g., collaboration factor scores) based on monitored characteristics, and (ii) moderator logic 32 for combining raw scores into an overall collaborative or composite score and/or determine what action should take place to improve conference participant scores, balancing between needs of different participants for the most collaborative experience.

Figure 3:
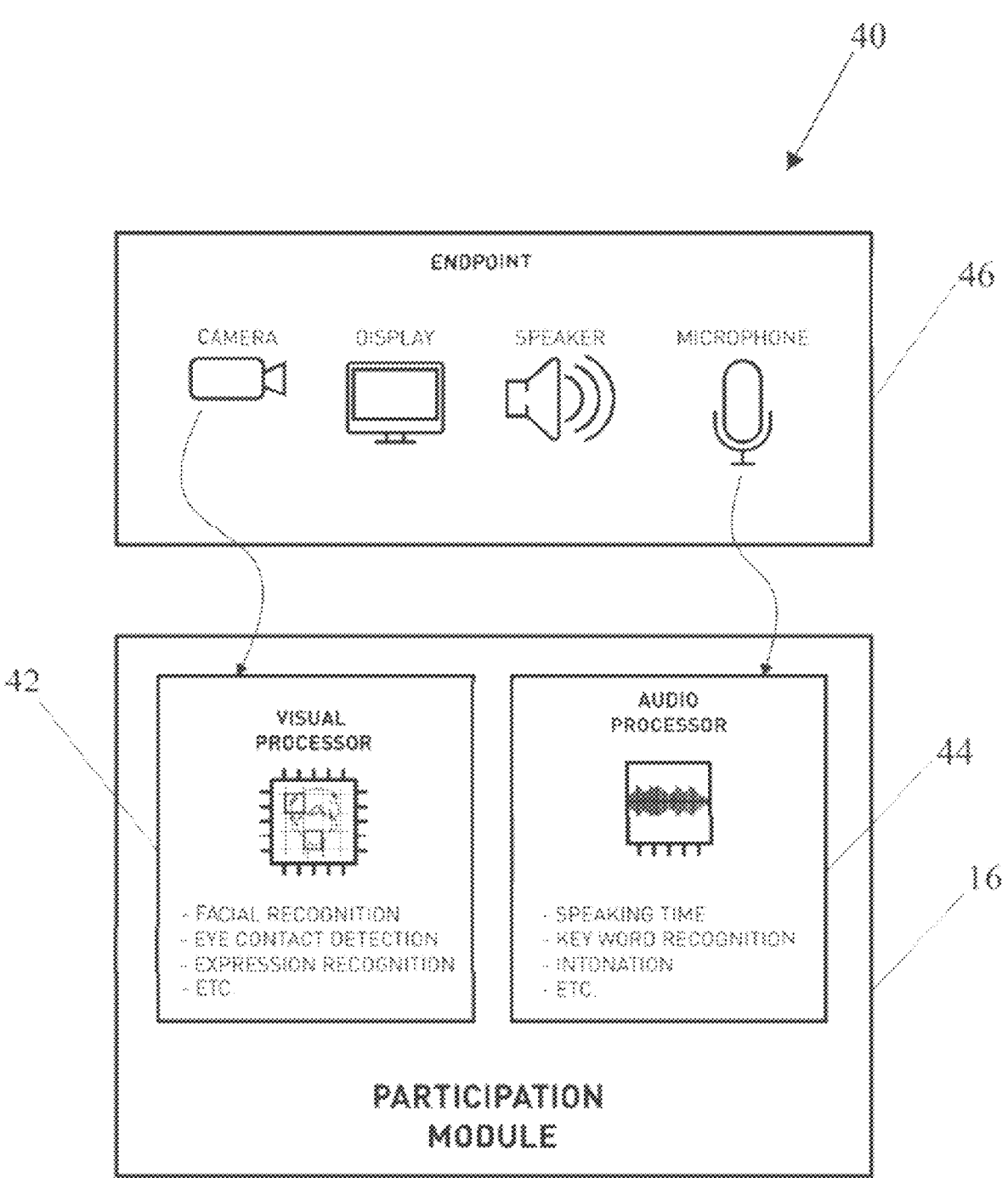
FIG. 3 is a block diagram illustrating an example participation module.

In some implementations of the video conference moderator system 10, the analysis preprocessor 30 can be separate from the moderator module 20, and the functions can be performed by one or more participation modules 40 (see FIG. 3). The participation modules 40 are configured to carry out the functions of the analysis preprocessor 30 utilizing one or more processors 42, 44. For example, the functions of image recognition, audio analysis, pattern recognition, and other functions may be distributed among the endpoints 12a-12f so that each endpoint generates scores for its own video feed. This may provide for more accurate analysis, as each endpoint may have access to a richer dataset, greater historical information, and more device-specific and user-specific information than the moderator module 20.

Figure 2B:
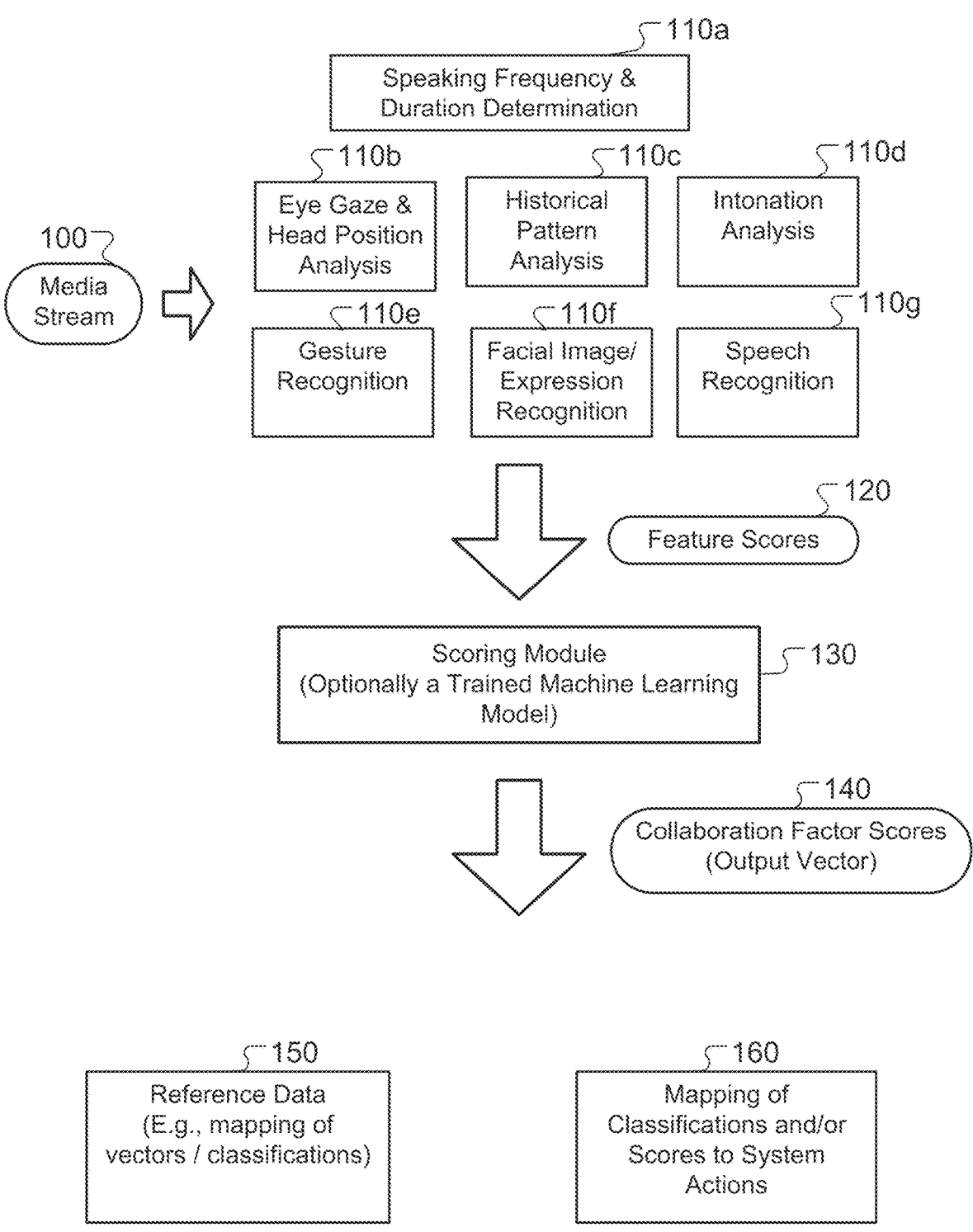
FIG. 2B is a block diagram illustrating an example of operations of the moderator module.

FIG. 2B illustrates an example of processing that can be performed by the moderator module 20. The moderator module 20 receives a media stream 100, which may include audio and/or video data, from a particular endpoint (e.g., representing audio and/or video uploaded by the endpoint, including the speech and/or image of the participant at the endpoint). The moderator module 20 then processes the video stream 100 using a number of different analysis techniques to assess the conditions of collaboration in the video conference and determine what management actions to take.

The moderator module 20 can use a number of analysis modules 110a-110g to determine characteristics of the media stream. For example, these modules 110a-110g can each determine feature scores 120 that reflect different attributes describing the media stream. For example, module 110a can determine a frequency and duration that the participant is speaking. Similarly, the module 110a can determine a frequency and duration that the participant is listening. The module 110b determines eye gaze direction of the participant and head position of the participant, allowing the module to determine a level of engagement of the participant at different times during the video conference. This information, with the information about when the user is speaking, can be used by the modules 110a, 110b to determine periods when the participant is actively listening (e.g., while looking toward the display showing the conference) and periods when the user is distracted and looking elsewhere. The module 110c performs pattern analysis to compare patterns of user speech and movement with prior patterns. The patterns used for comparison can be those of other participants in the current conference, patterns of the same participant in the same conference (e.g., to show whether and to what extent a user's attention and mood are changing), or general reference patterns known to represent certain attributes. The module 110d assesses intonation of speech of the participant, which can be indicative of different emotional states. The module 110a recognizes gestures and indicates when certain predetermined gestures are detected. The module 110f performs facial image or expression recognition, for example, indicating when a certain expression (such as a smile, frown, eyebrow raise, etc.) is detected. The module 110g performs speech recognition to determine words spoken by the participant. Optionally, the module 110g can determine whether any of a predetermined set of keywords have been spoken, and indicate the occurrence of those words as feature scores.

The feature scores 120 indicate the various temporal, acoustic, and image-based properties that the modules 110a-110g detect. The feature scores 120 are then used by one or more scoring modules 130 to determine collaboration factor scores 140 for each of multiple collaboration factors representing how well the participant has been participating or is disposed to participate in the future. In some implementations, the collaboration factors may represent how well a media stream is being transmitted or presented, such as an amount of network bandwidth used, a frequency or duration that a participant is speaking, a background noise level for audio or video data, a percentage of time a participant is looking toward the displayed video conference, etc. In some implementations, the collaboration factors may represent different emotional attributes, e.g., with a different score for levels of each of attention, enthusiasm, happiness, sadness, stress, boredom, dominance, fear, anger, or deception.

In some implementations, a single scoring module 130 determines each of the collaboration factor scores 140. In other implementations, multiple scoring modules 130 are used, for example, with each scoring module 130 determining a collaboration factor score for a different aspect or dimension of collaboration. The collaboration factor scores 140 may be expressed in a variety of ways, but one option is to for each score to be a value between 0 and 1 representing a level for a different aspect being assessed. The combination of scores can be expressed as a vector of values, e.g., [0.2, 0.4, 0.8, 0.5, 0.9, . . . ]. For example, one value may represent the degree to which the participant pictured in the media stream is inferred to be angry, another value may represent the degree to which the participant is inferred to be happy, and so on.

The scoring module 130 can optionally be a trained machine learning model which has been trained, based on a set of training data examples, to predict collaboration factor scores from feature score inputs. For example, the scoring module may include a neural network, a decision tree, a support vector machine, a logistic regression model, or other machine learning model.

As described above, the different collaboration factor scores 140 can be combined into a composite score representing an overall level of participation, engagement, and collaborative potential for the participant. This may be done using a function, a weighted average, a trained machine learning model, or another appropriate technique.

The collaboration factor scores 140 output by the scoring module 130, optionally expressed as a vector, can be compared with reference data (e.g., reference vectors) representing combinations of collaboration factor scores (or combinations of ranges of collaboration factor scores) that are associated with different classifications. For example, one combination of scores may represent a condition that promotes collaboration, while another combination of scores may represent a condition that detracts from collaboration. The moderator module 20 can store and then later access reference data 150 that sets forth predetermined combinations of collaboration factor scores or ranges and corresponding classifications. The moderator module 20 can also determine the similarity between the vector of collaboration factor scores 140 for the current participant at the current time relative to the different reference vectors, e.g., by determining cosine distances between the current vector and each reference vector. The moderator module 20 may then determine the reference vector that is closest to the current vector of collaboration factor scores 140, and select the classification associated with that reference vector in the reference data 150 as a classification for the current participant.

The moderator module 20 can also store and access mapping data 160 that indicates video conference management actions to be performed, either directly by the moderator module 20 or suggested for a user (e.g., a meeting organizer) to perform. For example, the mapping data 160 can indicate classifications and corresponding actions that the moderator module 20 can take to improve the video conference session when the corresponding classification is present. The actions may affect the current endpoint and the corresponding participant. In addition, or as an alternative, the actions may affect and may be based on the scores and classifications of other participants in the video conference. Thus, an action that affects one endpoint or participant may be taken in response to evaluating the various scores or classifications for one or more, or even all, of the other endpoints and participants.

The moderator module 20 can perform a number of actions to alter the transmission and/or presentation of the video conference at the various endpoints 12a-12f. The actions can enhance the quality of the conference and provide a variety of improvements to the functioning of the system. For example, the moderator module 20 can adjust audio properties for the different endpoints 12a-12f Depending on the collaboration factor scores and/or classification determined, the moderator module 20 can alter the transmission of data and/or presentation of the video conference at the endpoints 12a-12f. For example, the moderator module 20 can add or remove a media stream from being provided, change a number or layout of media streams presented, change a size or resolution of a video stream, change a volume level or mute audio of one or more participants, designate a particular participant as speaker or presenter, set period or time limits that a particular participant can be a speaker or presenter to the group, and so on. The moderator module 20 can also improve efficiency of conferencing by, for example, reducing a bit rate of a media stream, changing a codec of a media stream, changing a frame rate of a media stream, and so on. As discussed further below, the moderator module 20 can additionally or alternatively add a score, indicator, symbol, or other visible or audible feature that represents the composite collaboration score for individual participants or for the group of participants as a whole.

In some implementations, the functions shown for FIG. 2B are performed for each endpoint 12a-12f in the videoconference. The functions discussed can also be performed repeatedly, for example, on an ongoing basis at a particular interval, such as every second, every 5 seconds, every minute, etc. This can allow the moderator module 20 to adapt to changing circumstances in the videoconference. The moderator module 20 can re-classify different endpoints 12a-12f and their video streams to take different actions, thus dynamically altering how video and audio information is transmitted and presented for the endpoints 12a-12f.

As shown in FIG. 3, each participation module 40 is configured to provide at least an input interface 46 configured to receive media by way of video and/or audio of each requisite one or more conference participants endpoints 12a-12f Typically, the participation modules 40 are configured to operate on each participant endpoints 12a-12f existing computer hardware and/or processing means including the utilization of input and output interfaces, for example a video camera or webcam, video displays, microphones, and/or audio speakers.

Figure 4:
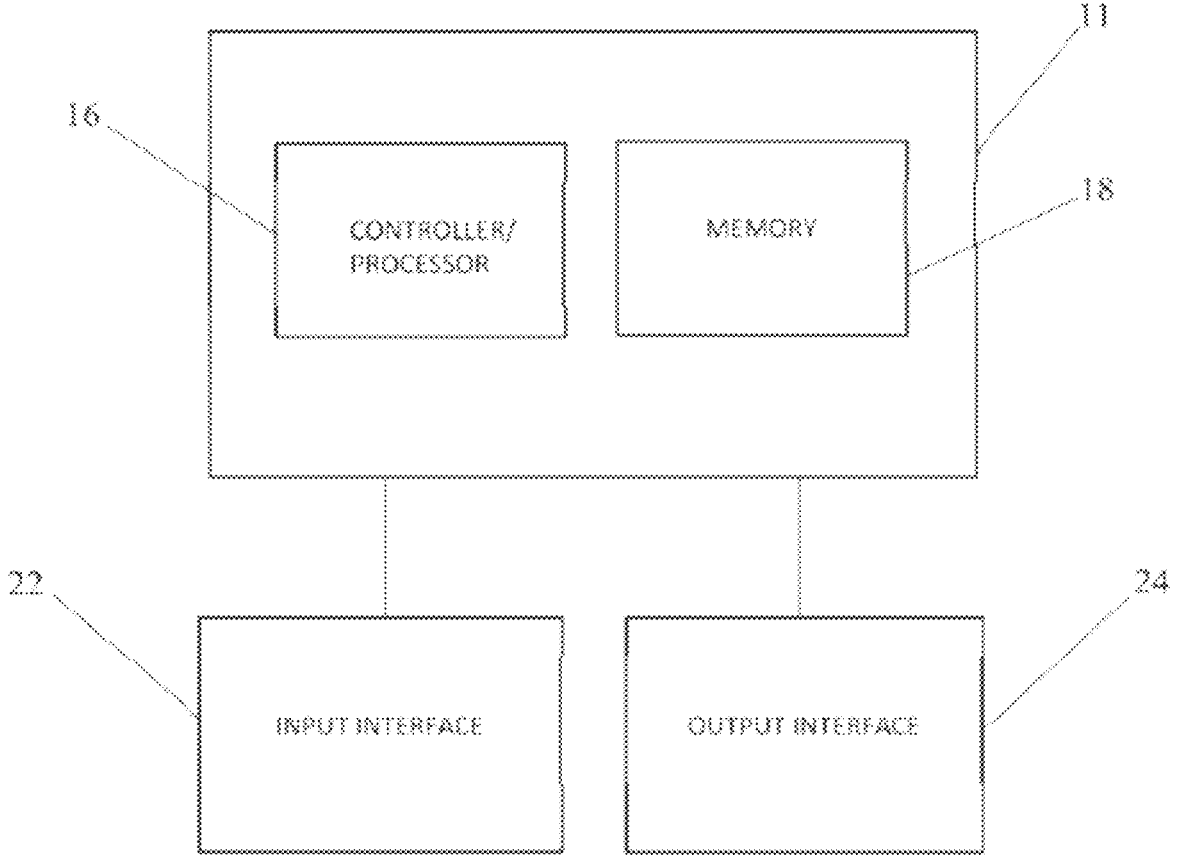
FIG. 4 is a block diagram illustrating a computer processing system.

FIG. 4 is an example computer hardware and processing means that may be utilized for supporting operation of the processing of one or more of the calculations throughout the video conference moderator system 10 such as the moderator module 20 and/or each of the one or more independent participation modules in components. Generally, the processing components may comprise one or more processors 16, a memory 18, and a communication interface, including an input interface 22 and an output interface 24. The input interface 22 configured to receive one or more media stream content comprised of audio and/or visual characteristics from one or more conference participant endpoints 12a-12f. The one or more processors 16 are generally configured to calculate at least one measurement value indicative of a participation level based on one or more characteristics from the media stream at any given moment or over a period of time. The output interface 24 transmits at least one integrated representation of the measurement value to one or more conference participant endpoints 12a-12f, which will be described in more detail below.

Referring to FIG. 2 and FIG. 3, the analysis preprocessor 30 is operably configured to receive and measure raw scores (e.g., collaboration factor scores) of monitored characteristics throughout a video/audio conference call via the input media streams. The score value indicative of a level of participation or other characteristic may be calculated by the processor 16 or other processing means for each of the conference participant endpoints 12a-12f.

In some implementations of the video conference moderator system 10, the analysis processor 30 is configured to derive a raw score for each participant endpoint 12a-12f for each displayed characteristic relating to each participant's visual and audio media stream input 46. Specifically, a score is derived for one or more of the following traits: stress, enthusiasm, contribution, and/or happiness among others based on visual and audio cues detected throughout the media stream input 46 at any given time or over time. The raw measurement scores for each characteristic of each conference participant are detected by way of facial expression recognition and/or audio recognition technology based on principles of neuroscience.

For example, throughout the analysis processor 30, the audio input media stream is analyzed by audio recognition technology in order to detect individual speaking/participation time, keyword recognition, and intonation and tone which indicate certain characteristics of each participants collaborative status. Moreover, individually or in aggregate with the audio recognition technology, the facial recognition technology is configured to monitor and detect varying facial expression at any given moment or over a period of time, which indicate participant's emotional status relating to attentiveness, contentment, patience, stress, boredom, dominance, fear, anger, and/or deception throughout the duration of the conference call. These characteristics are analyzed to provide one or more of the raw trait scores relating to the participants traits: stress level, enthusiasm, contribution, and happiness, among others.

In some implementations, the monitored characteristics may either negatively or positively impact the trait scores of each participant. For example, a negative impact of one or more of the raw trait score may be based on an endpoint conference participant who is exhibiting negative emotions such as stress, boredom, dominance, fear, deception, and/or even anger. Oppositely, a positive impact of one or more of the raw trait score may be based on a conference participant who is exhibiting positive, collaborative emotions such as facial expression related to characteristics of attentiveness, genuine, contentment, pleasure, and patience when others are speaking.

The time period utilized in the above calculations may be any predetermined amount of time, a percentage of the total conference time, or the total conference time. Moreover, derivation of the raw score traits may be a measure of the relative raw score traits of a particular conference participant compared with the other conference participant endpoints.

The analysis processor 30 may be configured to actively and intelligently learn how to best and most effectively score each participant throughout the conference call and over a series of conference calls with the same participants.

Figure 7:
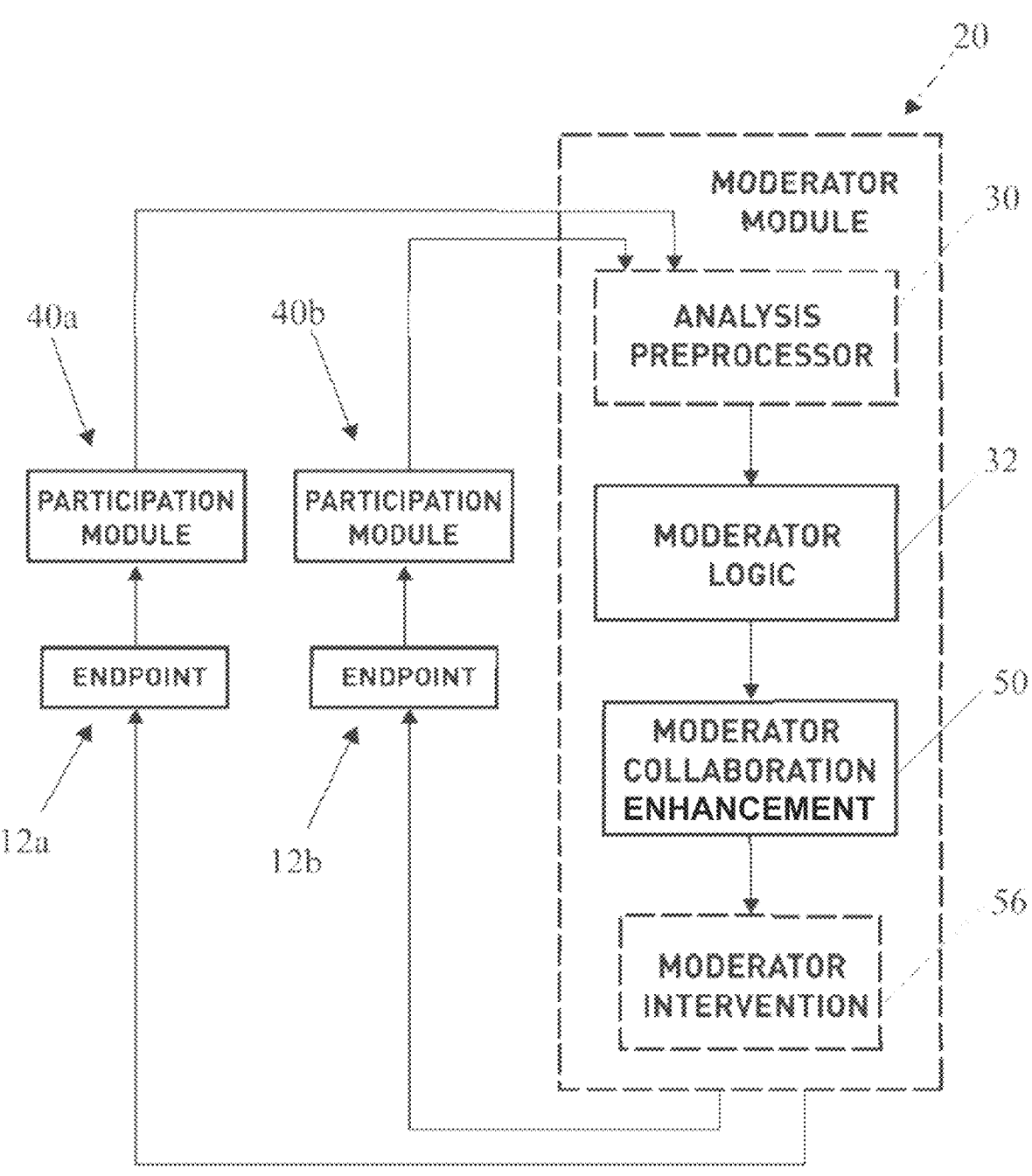
FIG. 7 illustrates a flow chart of one implementation of a method employed by the application.
Figure 8:
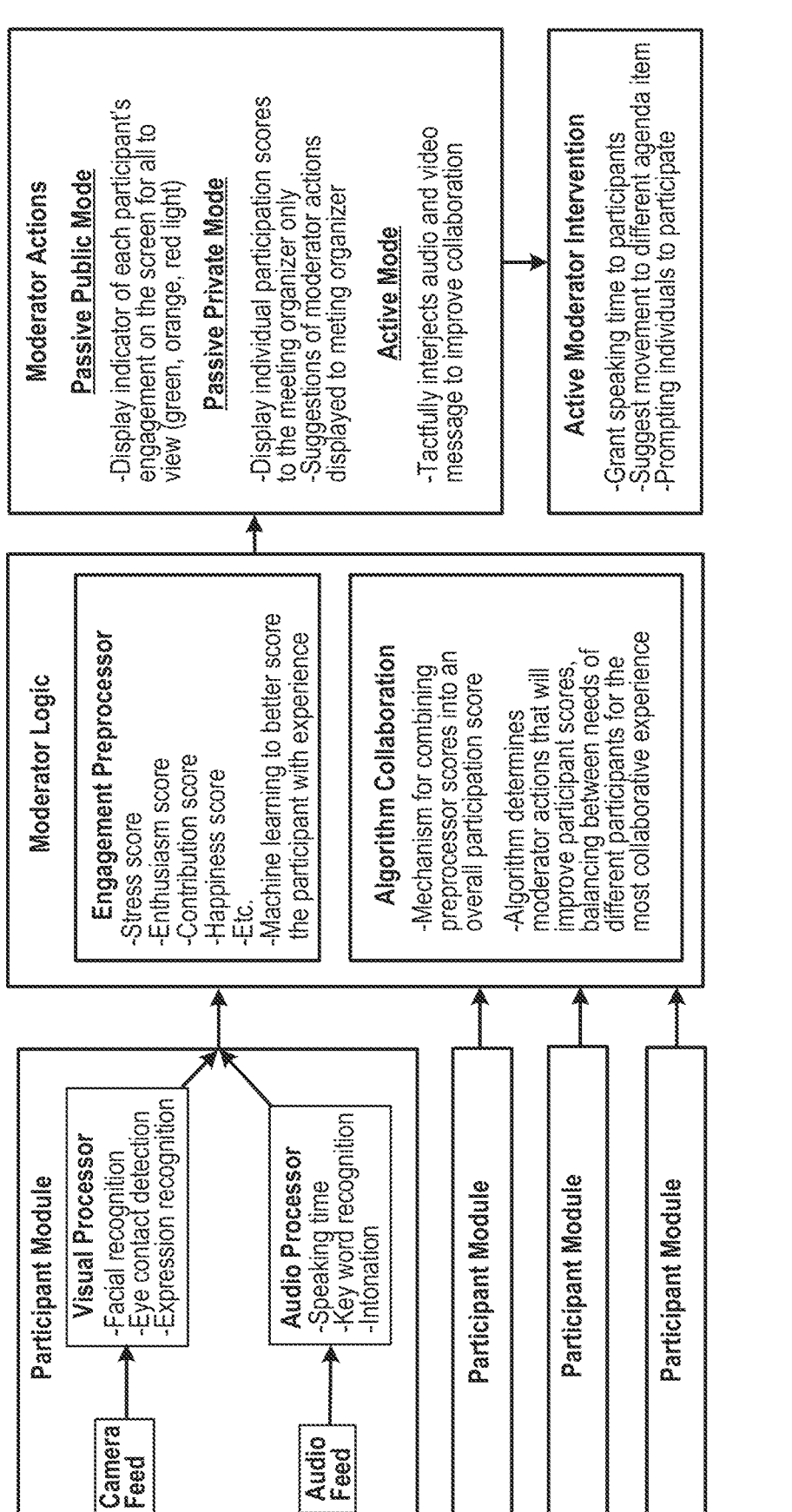
FIG. 8 illustrates an overview flowchart of another implementation of a method employed by the current application.

Now referring to FIG. 2, FIG. 7, and FIG. 8, the moderator logic 32 is operably configured to combine the raw scores derived in the analysis preprocessor 30 into an overall participant composite score and/or an overall group composite score. Moreover, the moderator logic 32 may be configured to determine and provide instructions on what action should take place to improve the conference participant composite scores, balancing between the needs of different participants for the most collaborative experience.

In some implementations, the moderator logic 32 combines the raw trait scores derived in the analysis processor 32 above relating to stress, enthusiasm, contribution, and happiness of each participant into an overall participant composite score and group composite score. The composite score may be a selective combination of one or more of the raw trait scores. Each raw trait score may be equally or differently weighted depending on the overall group composite score and/or scenario. Varying equations/algorithms calculating the outcome value of the one or more composite scores can be envisioned, including but not limited to clustering, neural networks, and nonlinear models. Rather than an equation, the score may also be implemented as a direct sum quantity for each individual participant.

Figure 5:
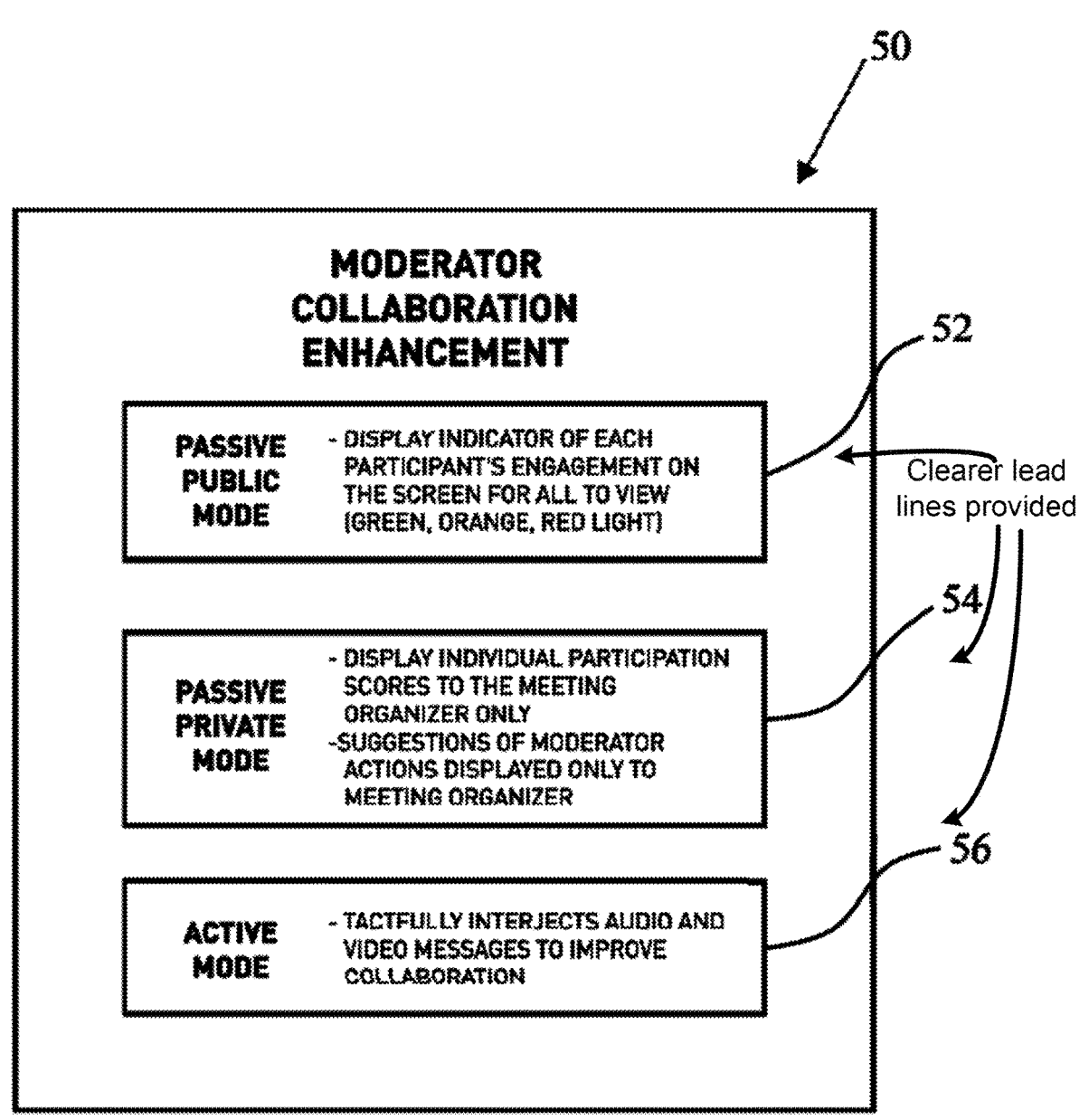
FIG. 5 is a block diagram illustrating a plurality of example moderator modes for enhancing collaboration.

The moderator logic 32 may also include the function of determining and providing instructions regarding what action or course of action should take place in order to improve the conference participant composite scores, with emphasis on balancing the needs between the different participants in order to facilitate the most collaborative experience. Referring to FIG. 5, FIG. 7, and FIG. 8. In some implementations of the invention, the moderator logic 32 may provide one or more moderator collaboration enhancement modes 50 ('MCE modes'), each designed to interact with conference participant endpoints 12a-/ in order to encourage proactive collaboration amongst the participants based off the participant composite scores and/or the overall group composite score. The MCE modes may be selected from the following group: Passive Public Mode 52, Passive Private Mode 54, and/or Active Mode 56. Each mode actively provides the group organizer different ways of providing direct feedback and/or actions to prompt and facilitate collaboration.

More specifically, the Passive Public Mode 52 provides an integrated output media stream display indicator of each participant's engagement publishing to the group each participants composite score and/or the group's overall composite score. In some implementations of the invention, the indicator is an integrated representation using a multi-color coded dynamic participation level and quality indicator of each conference participant endpoint 12a-12f. The indicator conveys the participation level of the participant endpoints 12a-12f through the output video stream of the respective participant endpoints 12a-12f. In the illustrated implementation, the integrated representation dynamic participation level and quality indicator changes in color according to the relative degree of the quality and level of participation based on the participant composite score as compared to the other plurality of participants or compared with a predetermined quantity or threshold. For example, the indicator may indicate a shade of the color red if the composite score is determined to be in excess of a predetermined threshold based on the quality and level of participation, a shade of the color orange if the composite score is determined to be within an average predetermined threshold, or a shade of the color green if the composite score is determined be below a predetermined threshold. Thus, providing each of the conference participant endpoints 12a-12f with a dynamic indicator exposing each participant's quality and level of participation. Therefore, individually, collectively, and via social influence/pressure encouraging the group to efficiently collaborate.

The MCE modes 50 may also include a Passive Private Mode 54 which limits feedback based on the participant composite scores and/or overall group composite scores only to the group/meeting organizers who have permission. Moreover, the Passive Private Mode 54 may also provide suggestions of moderator actions directed and displayed only to the group/meeting organizer in order to introduce actions that promote a positive outcome towards group collaboration-improving individual participant composite scores and overall group composite scores.

The MCE modes 50 may also further comprise an Active Mode 56 which tactfully interjects and/or subtly introduces direct integrated audio and visual indicators and messages through the output video stream of one or more conference participants, which are configured to improve collaboration individually and as a group.

The operations of the moderator module 20 can enhance collaboration by recognizing and signaling negative conditions or states that hinder collaboration. In many cases, these conditions are conditions of the participants of the video conference that can be detected in the media streams provided to the moderator module 20. Collaborative group members typically come from different backgrounds, embrace alternative beliefs, and view the world much differently from one another; namely, have different views and interests on how or even if an objective should be effected or achieved. Collectively, this provides a diverse and sometimes hostile collaborative video conferencing environment, which is not ideal for an efficient group analysis and resolution of an objective that everyone can cooperatively agree on.

In many situations, stress hormones such as norepinephrine, cortisol, and adrenaline inhibit group members from participating and successfully collaborating towards a common objective. Stress hormones increase blood flow to skeletal muscles, intensifies breathing and heart rate, dilates pupils, and elevates blood pressure. The moderator module 20 may detect these physiological changes, for example, though analysis of video data provided during the video conference. There are positive implications of these hormones in protecting and energizing humans. But as they relate to resolving issues with regard to collaboration, these are generally chemicals that will hinder the positive outcomes. These hormones create resistance to resolving difficulties, making decision, compromising, and arriving at mutually productive conclusions, or even building relationship bonds.

On the other hand, dopamine, oxytocin, serotonin, endorphins, and anandamide are major hormones associated with success, contentment, pleasure, and bonding. These can encourage group participation, individual buy in, and collaboration, which promotes efficiently working as a group to achieve a common objective. The brain and glands are very resistant in releasing these potent drugs, since the reward system would not be functional or effective if "rewards" were granted arbitrarily or continually.

Current video conference platforms do not facilitate the release of positive hormones while mitigating the release of negative hormones. The techniques employed by the moderator module 20 can manage a video conference to encourage a collaborative, efficient work setting, for example, by improving the efficiency of collaborating, overcoming resistance towards participation and collaboration, and overcoming barriers created by the release of negative neurological hormones.

The video conference moderator module 20 utilizes both tangible technology and the science of neurology to secure necessary chemical assistance of oxytocin, dopamine, and serotonin, while subduing adrenaline, cortisol, and other negative neurological hormones throughout a video conference call. The platform is configured to promote positive thought patterns and outcomes, to help overcome negative emotional states among the video conference group collaborators by mitigating and overcoming barriers created by negative neurological hormones while encouraging the release of positive hormones throughout the meeting.

FIG. 7 illustrates a flow chart of an implementation of the video conferencing moderator system 10. The participation module 40 monitors, measures and analyzes one or more characteristic of an input media stream by way of facial and audio recognition technology from at least one conference participant endpoint of a plurality of conference participants endpoints 12*a*. The analysis preprocessor 30 calculates/derives a raw trait score from the characteristic of the media stream including but not limited to one or more of the following traits: stress, enthusiasm, contribution, and happiness. The moderator logic 32 combines the raw trait scores derived in the analysis processor 30 relating to stress, enthusiasm, contribution, and happiness of each participant into an overall participant composite score and group composite score. Thereafter, the moderator logic 32 outputs an integrated moderator collaboration enhancement action 50 based on at least one of the conference participant endpoints 12 composite score via the output media stream.

The integrated moderator collaboration enhancement action 50 may be displayed by one or more of the endpoints 12*a*-12*f*. The moderator module 10 may be a video conferencing bridge or an audio conferencing bridge, either of which may be referred to as a multipoint conferencing unit (MCUs).

The memory 18 may be any known type of volatile memory or non-volatile memory. The memory 18 may store computer executable instructions. The processor 16 may execute computer executable instructions. The computer executable instructions may be included in the computer code. The computer code may be stored in the memory 18. The computer code may be logic encoded in one or more tangible media or one or more non-transitory tangible media for execution by the processor 16.

The computer code may be logic encoded in one or more tangible media or one or more non-transitory tangible media for execution by the processor 16. Logic encoded in one or more tangible media for execution may be defined as instructions that are executable by the processor 16 and that are provided on the computer-readable storage media, memories, or a combination thereof.

Instructions for instructing a network device may be stored on any logic. As used herein, "logic" includes but is not limited to hardware, firmware, software in execution on a machine, and/or combinations of each to perform a function(s) or an action(s), and/or to cause a function or action from another logic, method, and/or system. Logic may include, for example, a software controlled microprocessor, an ASIC, an analog circuit, a digital circuit, a programmed logic device, and a memory device containing instructions.

The instructions may be stored on any computer readable medium. A computer readable medium may include, but is not limited to, a hard disk, an application-specific integrated circuit (ASIC), a compact disk CD, other optical medium, a random access memory (RAM), a read-only memory (ROM), a memory chip or card, a memory stick, and other media from which a computer, a processor or other electronic device can read.

The one or more processors 16 may include a general processor, digital signal processor, application-specific integrated circuit, field programmable gate array, analog circuit, digital circuit, server processor, combinations thereof, or other now known or later developed processors. The processor 16 may be a single device or combinations of devices, such as associated with a network or distributed processing. Any of various processing strategies may be used, such as multi-processing, multi-tasking, parallel processing, remote processing, centralized processing or the like. The processor 16 may be responsive to or operable to execute instructions stored as part of software, hardware, integrated circuits, firmware, microcode or the like. The functions, acts, methods or tasks illustrated in the figures or described herein may be performed by the processor 16 executing instructions stored in the memory 18. The functions, acts, methods or tasks are independent of the particular type of instructions set, storage media, processor or processing strategy and may be performed by software, hardware, integrated circuits, firmware, micro-code and the like, operating alone or in combination. The instructions are for implementing the processes, techniques, methods, or acts described herein.

The input/output interface(s) may include any operable connection. An operable connection may be one in which signals, physical communications, and/or logical communications may be sent and/or received. An operable connection may include a physical interface, an electrical interface, and/or a data interface. An operable connection may include differing combinations of interfaces and/or connections sufficient to allow operable control. For example, two entities can be operably connected to communicate signals to each other or through one or more intermediate entities (e.g., processor, operating system, logic, software). Logical and/or physical communication channels may be used to create an operable connection.

The communication paths 14a-14f may be any protocol or physical connection that is used to couple a server to a computer. The communication paths 14a-/ may utilize Ethernet, wireless, transmission control protocol (TCP), internet protocol (IP), or multiprotocol label switching (MPLS) technologies.

The endpoints 12a-12f may include a processor, a memory, and a communication interface according to the examples discussed above. In addition, the endpoints 12a-12f include a display and at least one input device. The display may be a cathode ray tube (CRT) monitor, a liquid crystal display (LCD) panel, or another type of display. The input device may include a camera, a microphone, a keyboard, and/or a mouse. The endpoints 12a-12f are capable of producing a media stream, including video and/or audio, that originates with the camera and/or microphone and is compressed and encoded by the processor or codecs. The endpoints 12a-12f may also include one or more speakers.

In addition to or instead of the techniques discussed above, an embodiment of the system can include endpoints or participant devices that communicate with one or more servers to perform analysis of participants' emotions, engagement, participation, attention, and so on, and deliver indications of the analysis results, e.g., in real-time along with video conference data or other communication session data and/or through other channels, such as in reports, dashboards, visualizations (e.g., charts, graphs, etc.). The system can include various different topologies or arrangements as discussed further below.

The system provides many versatile tools for emotion analysis and feedback in a variety of communication sessions, involving remote interactions (e.g., video conferences), local interactions (e.g., meetings in a single room, instruction in a classroom, etc.), and hybrid interactions (e.g., a lecture with some participants in a lecture hall and other participants participating remotely by video). The system can use emotion to assess many conditions beyond collaboration among participants. For example, in the a classroom setting, the video analysis and emotion processing can be used to determine who is paying attention or is engaged with the lesson material.

The system can be used in many different settings, including in videoconferences, meetings, classrooms, telehealth interactions, and much more. The system can provide many different types of insights about the emotions and unspoken state of participants in a communication session. For example, the system can assist users to know if they are dominating the time in a communication session or if others aren't participating as they could. The system can provide on-screen mood feedback about participants, which can be especially helpful in settings such as classroom instruction or in meetings. For example, the system can detect and indicate to users conditions such as: a person having an unspoken question; a person feeling confused; a level of enthusiasm not expressed verbally; distraction; boredom; contentment, and so on. Many of these conditions are possible for a person to recognize in other people in a live environment but are extremely difficult for a person to detect in a remote-interaction environment such as a videoconference. This is especially true if there are too many people on the call for all of their video streams to fit on the same screen.

The system provides many features and outputs to evaluate and improve interactions. For example, the system can provide feedback to a meeting host about the level of interest among participants, so the host can know if she is hosting the meeting in an interesting way. This includes the ability to score the audience response to different portions of a communication session, to determine which techniques, content, topics, etc. provide the best engagement, attention, and other results. As another example, the system can be used to assess an instructor's performance, e.g., with respect to objective measures of audience response or later outcomes, or relative to other instructors. This can help identify and provide evidence for identifying who is a top-notch engager and what techniques or characteristics they employ make them effective. Similarly, the analysis performed by the system can be used to evaluate content and topics, such as to indicate if a presenter's topic is exciting, aggravating, or too complex. The system can provide information about a wide range of basic and complex emotions, so a presenter can be informed if, for example, a participant is concerned or appreciative. These and other features help make remote interactions feel real, providing feedback about non-verbal signals that many people would not recognize themselves through the limited information provided through video conferences and other remote interactions. In general, feedback about emotion, engagement, attention, participation, and other analyzed aspects can be provided to a person in a certain role (e.g., such as a teacher, presenter, or moderator) or to some or all participants (e.g., to all participants in a video conference, or to participants that have elected to enable the emotional monitoring feature).

As discussed above, a system can evaluate media showing individuals to estimate the emotions and other characteristics of the individuals over time during a communication session. The communication session can involve a two-way or multi-way communication, such as a video conference among participants. The communication session can involve primarily one-way communication session, such as a presentation by a teacher, professor, or other speaker to an audience, where a single speaker dominates the communication. In either situation, video feeds for participants can be received and analyzed by the system. In the case of a presentation by a teacher or other presenter, video feed(s) showing the audience during a session can be provided using devices for individual audience members (e.g., a phone, laptop, desk-mounted camera, etc.) or using devices that can capture video for multiple members of a group (e.g., cameras mounted in a classroom, conference room, theater, or other space). Thus, the system can be used whether a video feed is provided for each individual in an audience or whether a video feed shows some or all of the audience as a group.

The monitoring of emotion and feedback about emotion can be performed during remote interactions, shared-space interactions, or hybrid interactions having both local and remote participants (e.g., a presentation to local audience with additional participants joining remotely). Examples of remote interactions include various forms of video conferencing, such as video calls, video meetings, remote meetings, streamed lectures, online events (e.g., a webcast, a web seminar or webinar, etc.), and so on. Examples of shared-space interactions include in-class instruction in school, meetings in a conference room, meetings. Other examples interactions are described further below.

Once the system determines the emotional states and emotional reactions of participants in a communication session, the system can provide feedback during the communication session or later. For example, the system can be used in videoconferencing to provide real-time indicators of the current emotional states, reactions, and other characteristics of participants in a video conference. In some cases, the indicators can be icons, symbols, messages, scores (e.g., numbers, ratings, level along a scale, etc.), user interface characteristics (e.g., changes to formatting or layout, sizes or coloring of user interface elements, etc.), charts, graphs, etc. An indicator can be provided in association with a user interface (UI) element representing a person (e.g., the person's name, image or icon, and/or video feed), for example, by overlaying the indicator onto the UI element or placing the indicator adjacent to the UI element or within an area corresponding to the UI element. The indicators can be provided automatically by the system, for example, provided all the time whenever the feature is active, or provided selectively in response to the system detecting a certain condition (e.g., an emotion score indicating at least a threshold level of intensity, or a confidence score for the emotion being above a threshold). The indicators may also be provided on-demand, for example, in response to a request from a user for one or more indicators to be provided.

The indicators can indicate a person's emotion(s) or another characteristic (e.g., engagement, participation, interest, collaboration, etc.). The indicators can indicate levels of different emotions, e.g., anger, fear, disgust, happiness, sadness, surprise, and/or contempt. These basic emotions are often expressed in a similar manner for many different people and can often be determined from individual face images or a few different face images (e.g., a short video segment). The system can use combinations of basic emotions, and the progression of detected emotions over time, to detect and indicate more complex emotions, mental or psychological states, and moods. Different combinations of emotions can be indicative of feelings such as boredom, confusion, jealousy, anxiety, annoyance, stress, and so on. Additional examples include surprise, shock, interest, and curiosity. For example, a single instance of a facial expression may signal a moderate level of fear and a moderate level of surprise. By repeatedly (e.g., periodically or continually) monitoring the emotion levels as the communication session proceeds, the system can determine how the user's emotions progresses. Changes in the emotion levels or maintaining certain emotion levels over time can signal various different psychological or emotional conditions. The system can also detect micro-expressions, such as brief facial movements that signal a person's reactions, and use these to identify the state of the person. In addition, it is important to be able to apply and report on aggregations of this data. These could be simple aggregations such as averages, or more complex aggregations (or heuristics) based on percentiles or other statistical methods (e.g. if the variance of emotions across the group gets too wide, this can be important or useful information used by the system and indicated to a user). Considering the multi-dimensional nature of the data being collected, the aggregation itself may be done using a neural network or some other non-deterministic, non-heuristic methodology.

The system can provide many outputs to users that provide measures of emotion and engagement, whether done during a communication session (e.g., with real-time, on-screen feedback) or afterward (e.g., in a report, provided after the session has ended, describing emotional states and reactions in a communication session). In some cases, the system can be used to analyze recordings of at least portions of video conferences (e.g., with recorded video from one or more participants) to analyze one or more recording(s) of the session in an "offline" or delayed manner and to provide analysis results.

The system can maintain profiles that represent different complex emotions or mental states, where each profile indicates a corresponding combination of emotion scores and potentially a pattern in which the scores change are maintained over time. The system compares the series of emotion data (e.g., a time series of emotion score vectors, occurrence or sequence of micro-expressions detected, etc.) with the profiles to determine whether and to what degree each person matches the profile. The system can then provide output to the members of a video conference or other communication session based on the results. For example, a person in a video conference may be provided a user interface that includes indicators showing the emotional states or engagement (e.g., collaboration score, participation score, etc.) of one or more of the other participants. The system may provide a persistent indicator on a user interface, such as a user element that remains in view with a user's video feed and shows changes in a participants emotional state as it changes throughout a video conference. In some cases, one or more indicators may be provides selectively, for example, showing emotion feedback data only when certain conditions occur, such as detection of a certain micro-expression, an emotion score reaching a threshold, a combination of emotional attribute scores reaching corresponding thresholds, detecting when a certain condition occurs (e.g., a participant becomes bored, angry, has low engagement, becomes confused, etc.), and so on. Conditions could be determined in a complex manner using statistical methods or machine learning techniques such as neural networks. In the future, collaboration may be defined based on non-linear, non-deterministic criteria as may be defined by a neural network or other advanced methodology. In general, methodologies enabling a system to collect, store, and learn from emotional data collected, e.g., across many participants and many different remote interactions (e.g., meetings, lectures, class sessions, video conferences, etc.) can have tremendous value.

As more and more communication is done remotely through video calls and other remote interactions, assisting others to determine the emotional state of others also becomes more important. According to some estimates, around 70% of human communication is non-verbal, such as in the form of body language and facial expressions. Non-verbal communication can be difficult or impossible to detect through many remote communication platforms. For example, if a presentation is being shown, in many cases the presentation slides are shown often without a view of other participants. Also, video conference platforms often show most participants in small, thumbnail-size views, with only the current speaker shown in a larger view. The thumbnail views are not always shown on screen at the same time, perhaps showing only 5 out of 20 different participants at a time. Naturally, participants will not be able to gauge the facial expressions and body language of others that they cannot see. Even when video of others is shown, the small size of common thumbnail views makes it difficult for users to gauge emotions. In addition, the complexity of multiple-person "gallery" views (e.g., showing a grid or row of views of different participants, often 5, 10, or more) also makes it difficult for people to accurately gauge emotions from them, as a person often cannot focus on many people at once. Screen size is also a limiting factor, and video feeds are limited to the size of the person's display. This is can be very problematic as the number of participants increases, as there is only a limited amount of screen space with which to display video of participants. As the number of participants increases, the screen space needs to be shared among a greater number of views, resulting in smaller and smaller sizes of participant's video feeds or the need to omit some video feeds entirely. In cases where a video feed includes multiple people, the size of faces within the video feed is often quite small, resulting in even smaller viewing sizes for participants' faces, especially when multi-person video feeds are shown in thumbnail views.

For presenters, such a system could have the ability to dynamically segment the audience into key groups that are responding similarly. This segmentation can be done in a variety of ways using statistical and/or machine learning techniques. Instead of displaying to the presenter a sea of tiny faces, or a few larger images at random, the software could pick key representatives from each audience segment and display a small number of faces (2-5) for the presenter to focus on as representatives of the entire audience. These would be the video streams that the presenter sees on her screen.

The software may also pick a few highly attentive, highly engaged, audience members. These "model listeners" can be displayed on the screens of all audience members, in addition to the presentation materials and the speaker's video. The advantage of this is that audience members often rely on the "social proof" of how others in the audience are responding to the speaker in order to determine how engaged they should be responding. "Seeding" the audience with good examples of engaged listeners or positively responding people is likely to increase the attentiveness of the rest of the group. Adjusting the set of people or categories of responses shown to participants is one of the ways that the system can act to adjust a video conference or other remote interactions. In some cases, the system can also change which sets of participants are shown to different participants, to help improve the participation and emotional and cognitive state of the participants. For example, people who are detected as angry can be shown people who are detected as calm; people who are disengaged can be shown a range of people that is more enthusiastic or engaged; and so on.

For these and other reasons, much of the non-verbal communication that would be available in shared-setting, in-person communication is lost in remote communications, even with video feeds being provided between participants. Nevertheless, the techniques discussed herein provide ways to restore a significant amount of the information to participants in a video conference or other remote interaction. In addition, the analysis of the system can often provide feedback and insights that improves the quality of in-person interactions (e.g., classroom instruction, in-person meetings, doctor-patient interactions, and so on).

The system provides many insights into the engagement and collaboration of individuals, which is particularly important as teleworking and distance learning have become commonplace. Remote interactions through video conferencing are now common for companies, governments, schools, healthcare delivery (e.g., telehealth/telemedicine), and more. The analysis tools of the system can indicate how well students, colleagues, and other types of participants are engaged and how they are responding during a meeting.

Example Applications

The system can be used to provide feedback about emotion, engagement, collaboration, attention, participation, and many other aspects of communication. The system can provide these in many different areas, including education, business, healthcare/telehealth, government, and more.

The system can be used to provide emotional feedback during calls to assist in collaboration. As a call progresses, the system evaluates the emotions of the participants during the call. Although the term emotion is used, emotions are of course not directly knowable by a system, and the systems work using proxy indicators, such as mouth shape, eyebrow position, etc. As discussed herein, the emotion analysis or facial analysis encompasses systems that assign scores or assign classifications based on facial features that are indicative of emotion, e.g., position of the eyebrows, shape of the mouth, and other facial features that indicate emotion, even if emotion levels are not specifically measured or output. For example, a system can detect a smile, a brow raise, a brow furrow, a frown, etc. as indicators of emotions and need not label the resulting detection as indicating happiness, surprise, confusion, sadness, etc.

As discussed herein, facial analysis is only one of the various analysis techniques that can be used to determine or infer the state of a person. Others include voice analysis, eye gaze detection, head position detection (e.g., with the head tilted, rotated away from the camera, pointed down, etc.), micro-expression detection, etc. There are other indicators that could also be used, for example, the presence or absence of a video feed could be an important indicator (70% of participants aren't sharing video). Voice feed or microphone activity could also be important. For example, even if a participant is muted and their microphone feed is not being transmitted, it is possible that the video-conference software could still detect and report the average noise level picked up by the microphone. Participants listening in an environment with high ambient noise levels will likely be less attentive.

1 The system can then provide indicators of the current states of the different participants (e.g., emotional state, cognitive state, etc.) at the current point in the call, as well as potentially measures of emotional states for groups within the call or for the entire group of participants as a whole. This can include providing scores, symbols, charts, graphs, and other indicators of one or more emotional attributes, overall mood, and so on, as well as cognitive or behavioral attributes, including engagement, attention, collaboration. The system can also provide indicators of levels of engagement, participation, collaboration, and other factors for individuals, groups, or for the entire set of participants.

The indicators provided by the system can often show emotion levels and patterns that show which individual(s) need to be drawn into the conversation for better collaboration, which individuals need to speak less (e.g., because they dominate the speaking time or are having a negative effect on the emotions and collaboration of others), which individuals have unspoken feelings or concerns and needs to air their feelings, or which individuals currently have an unspoken question that is not being shared. In many cases, indicating emotion levels for one or more emotions, or indicating overall emotion levels, can allow participants to identify these conditions. In some implementations, the system may detect patterns that are representative of these conditions and the system can provide output to the participants in a video conference of the condition detected. For example, the system may provide a message for output on a video conference user interface next to a person's name, image, or video feed that indicates a condition detected based on the emotion and collaboration analysis, e.g., "Alice should have a larger role in the conversation," "Joe needs to speak less, he has twice as much speaking time as anyone else," "John has concerns he to discuss," "Sarah has a question," and so on.

The system can detect conditions in a conference, for individuals or the conference as a whole, by classifying patterns. These patterns can include factors such as emotion displayed by participants, actions performed by participants, conference statistics (e.g., speaking time distribution, length of speaking segments, etc.), and more.

Pattern detection can be used, along with various other techniques, to identify micro expressions or "micro-tells" that can signal emotional states and complex conditions beyond basic emotions. People reveal feelings and thoughts through brief, involuntary movements or actions, often without intending or even being aware they are making the expressions. People often flash the signals briefly (e.g., in facial movement that may last for only a fraction of a second) and then hide them. Nevertheless, the detection of these micro-expressions can be strong signals of the person's reaction to the content in the video conference and the person's current state. The micro-expressions can also signal items such as confusion, surprise, curiosity, interest, and other feelings that are more complex than basic emotions. The system can examine audio and video data for each participant, and determine when a profile, pattern, or trigger associated with a particular micro-expression occurs. This can include looking at progressions of facial changes over a series of frames, examining correlation of interjections and uttered responses with the face movements, and so on. When the micro-expression is detected, the system can provide feedback or adjust the communication session. For example, the system can store data that describes patterns or profiles that specify characteristics (e.g., ranges or types of facial expressions, facial movements, eye and head movements and position, body movements, voice inflection, sounds uttered, etc.) that represent the occurrence of a micro-expression or of an emotional state or emotional response. When the incoming data for a participant matches or is sufficiently similar to one of the reference profiles, then the system can take an action corresponding to the reference profile, such as to provide a certain kind of feedback to the user making the expression and/or to others, or to make a change to the conference. This matching or similarity analysis be determined by non-linear neural networks or other statistical or machine learning algorithms. In other words, the "comparison" may be complex or non-linear.

The triggers for feedback or action in adjusting a video conference can be assessed at the individual level (e.g., for individual participants in the conference), or at the group level (e.g., based on the aggregate data collected for the set of all participants). For example, if a decrease in the aggregate or overall engagement is detected, the system can determine that it is time to take a break (e.g., pause the conference) or change topics. The system may cause the determined conditions and associated actions to be displayed, and in some cases may initiate the action (e.g., display to participants, "Conference to be paused for a 5 minute break in 2 minutes," along with a 2-minute countdown timer, and then automatically pause the conference and resume after the break). Suggestions or indications can also be displayed to the moderator or group leader to be acted upon at their discretion.

The system can be used to determine the effects of actions of participants in a communication session. For example, the system can monitor the engagement of participants with respect to who is speaking (and/or other factors such as the specific topic, slides, or content being discussed). The system may determine that when a certain person starts talking, some people lose interest but one particular person pays attention. The system may determine that when voice stress gets to a certain level, people start paying attention, or it may determine that the people involved stop paying attention. This monitoring enables the system to measure a speaker's impact on specific participants, subgroups of participants, and on the group as a whole. This information can be provided to participants, or to a presenter, moderator, or other person, in order to improve business conferences, remote learning, in-person education, and more.

The system can perform various actions based on the emotions and participant responses that it detects. For example, the system can prompt intervention in the meeting, prompt a speaker to change topics or change content, and so on. As another example, in an instructional setting, the system may detect that a person became confused at a certain time (e.g., corresponding to a certain topic, slide, or other portion of the instruction), and this can be indicated to the instructor. The feedback can be provided during the lesson (e.g., so the teacher can address the topic further and even address the specific student's needs) and/or in a summary or report after the session has ended, indicating where the instructor should review and instruct further, either for the specific person that was confused or for the class generally.

As noted above, the techniques for emotional monitoring and feedback are useful in settings that are not pure video conference interactions. For example, the system can be used to monitor video of one or more students in class or one or more participants in a business meeting, whether or not the presenter is local or remote. Even when the presenter and audience are in the same room, cameras set up in the room or cameras from each individual's device (e.g., phone, laptop, etc.) can provide the video data that the system uses to monitor emotion and provide feedback. Thus the system can be used in network-based remote communications, shared-space events, and many other settings.

The system can cross-reference emotion data with tracked speaking time to more fully analyze collaboration. The system can use a timer or log to determine which participants are speaking at different times. This can be done by assessing the speech content and speech energy level in the audio data provided by different participants, and logging the start and stop times for the speech of each participant. Other cues, such as mouth movement indicative of speaking, can be detected by the system and used to indicate the speech times for each user. Data indicating speaking time and speaker identity may be fed directly from the host video-conference platform. With this tracked speech information, the system can determine the cumulative duration of speech for each participant in the communication so far, as well as other measures, such as the proportion that each participant has spoken. With the tracked speech times, the system can determine and analyze the distribution of speaking time duration (e.g., total speaking time over the session for each participant) across the set of participants. The characteristics of the distribution among the participants affects the effectiveness of collaboration. As a result, characteristics of the speaking time distribution may can be indicative of the effectiveness of collaboration that is occurring. In some cases, the system can detect that the distribution is unbalanced or indicative of problematic conditions (e.g., poor collaboration, dysfunctional communication, low engagement, etc.), and the system may detect that changes need to be made to adjust the speaking distribution.

The system can use emotion data in combination with the speaking time data to better determine the level of collaboration and whether intervention is needed. For example, a lopsided distribution with one person dominating the conversation may generally be bad for collaboration. However, if measures of engagement and interest are high, and positive emotion levels are present (e.g., high happiness, low fear and anger), then the system may determine that there is no need for intervention. On the other hand, if the unbalanced distribution occurs in connection with poor emotion scores (e.g., low engagement, or high levels of fear, anger, contempt, or disgust), the system may determine that intervention is needed, or even that earlier or stronger intervention is needed.

At times, the speaking time distribution needs to be controlled through actions by the system. These actions may be to increase or decrease speaking time allotted for a communication session, to encourage certain participants to speak or discourage some from speaking, and so on. In some cases, visual indications are provided to the group or a group leader to indicate who needs to be called on or otherwise be encouraged to speak or be discouraged from speaking.

The speaking time data can be provided to individuals during a communication session to facilitate collaboration in real time during the session. For example, individual participants may be shown their own duration of speaking time in the session or an indication of how much of the session they have been the speaker. Participants may be shown the distribution of speaking times or an indication of relative speaking times of the participants. As another example, participants can be shown a classification for the speaking times in the session, e.g., balanced, unbalanced, etc. Notification to the group leader or meeting host is also an important use. The leader or moderator is notified in many implementations when individuals or sub-groups are detected to be falling behind in the conversation.

Speaking time data can also be used after a communication session has ended to evaluate the performance of one or more people in the communication session or the effectiveness of the session overall. In some cases, records for a communication session can be provided to a party not participating in the communication session, such as a manager who may use the data to evaluate how well an employee performed in a meeting. For example, a worker's interactions with clients in a meeting can have speaking times monitored, and a manager for the worker can be shown the speaking time distribution and/or insights derived from the speaking time distribution (e.g., a measure of the level of collaboration, a classification of the communication session, etc.).

In some implementations, the system can change the amount of time allotted to speakers, or adjust the total meeting time (e.g., when to end the meeting or whether to extend the meeting) based on an algorithm to optimize a particular metric or as triggered by events or conditions detected during the communication session. For example, to allot speaking time to individuals, the system can assess the effects that speaking by an individual has on the engagement and emotion of other people. The system provides dynamic feedback, both showing how a person's actions (e.g., speech in a conference) affect others on the video conference, and showing the speaker how they are affecting others. For example, if one person speaks and engagement scores of others go up (or if positive emotion increases and/or negative emotion decreases), the system can extend the time allocated to that person. If a person speaks and engagement scores go down (or if positive emotion decreases and/or negative emotion increases), the system can decrease the speaking time allocation for that person. The system can also adjust the total meeting time. The system can assess the overall mood and collaboration scores of the participants to cut short meetings with low overall collaboration or to extend meetings that have high collaboration. As a result, the system can end some meetings early or extend others based on how engaged the participants are.

In some implementations, the system can help a presenter by providing emotion and/or engagement feedback in the moment to facilitate better teaching and presentations. The system can monitor the emotions and engagement of participants during a presentation and provide indicators of the emotions and engagement (e.g., attention, interest, etc.) during the presentation. This enables the presenter to see, in real time or substantially in real time, measures of how the audience is responding to the current section of the presentation (e.g., the current topic discussed, the current slide shown, etc.). This helps the presenter to adapt the presentation to improve engagement of the audience.

To provide this feedback, the communication session does not require two-way video communication. This has applications for low-bandwidth scenarios, bandwidth optimization, e.g. mass audiences with millions of participants may make it impossible to give actual video feedback to the presenters, but, light-weight emotional response data could be collected, processed, and given to the presenters in real-time. Improved privacy is also a potential application. Pressure to "dress-up" for video-conference sessions can be a source of stress. If the software could pass humanizing information to other participants without the pressure of having to be "on camera" interactions could be more relaxing while still providing meeting facilitators and participants feedback and non-verbal cues. For example, in a classroom setting, cameras may capture video feeds showing faces of students, and the system can show the teacher indicators for individual students (e.g., their levels of different emotions, engagement, attention, interest, and so on), for groups of students, and/or for the class as a whole. The students do not need to see video of the instructor for their emotional feedback to be useful to the instructor. In addition, the instructor's user interface does not need to show the video feeds of the students, but nevertheless may still show individual emotional feedback (e.g., with scores or indicators next to a student's name or static face image).

The system can give aggregate measures of emotions and other attributes (e.g., engagement, interest, etc.) for an audience as a whole, such as a group of different individuals each remotely participating and/or for a group of individuals that are participating locally in the same room as the presenter. The system can show the proportions of different emotions, for example, showing which states or attributes (e.g., emotional, cognitive, behavioral, etc.) are dominant at different times, emphasizing which states or attributes are most relevant at different times during the presentation, and so on.

The features that facilitate feedback to a presenter are particularly helpful for teachers, especially as distance learning and remote educational interactions become more common. The system can provide feedback, during instruction, about the current emotion and engagement of the students in the class. This allows the teacher to customize and tailor their teaching to meet student needs. The techniques are useful in education at all levels, such as in grade school, middle school, high school, college, and more. The same techniques are also applicable for corporate educators, lecturers, job training, presenters at conferences, entertainers, and many other types of performers, so that they can determine how audiences are affected by and are responding to interaction. Emotion analysis, including micro-expressions, can indicate to teachers the reactions of students, including which students are confused, which students have questions, and so on. This information can be output to a teacher's device, for example, overlaid or incorporated into a video feed showing a class, with the emotional states of different students indicated near their faces. The same information can be provided in remote learning (e.g., electronic learning or e-learning) scenarios, where the emotional states and engagement of individuals are provided in association with each remote participant's video feed. In addition to or instead of providing feedback about emotion, engagement, and reactions of individuals, the system can provide feedback for the class or group of participants. For example, the system can provide an aggregate measure for the group, such as average emotion ratings or an average engagement score. There are many ways to compute indicators (e.g., formulaic, statistical, non-numerical, machine learning, etc.) and many ways to communicate indicators, (e.g., numbers, icons, text, sounds, etc.). These techniques are applicable to remote or virtual communication as well as to in-person settings. For example, for in-person, shared-space interactions, the cameras that capture video of participants can be user devices (e.g., each user's phone, laptop, etc.), or can be cameras mounted in the room. Thus, the system can be configured to receive and process video data from a dedicated camera for each person, or video data from one or multiple room mounted cameras.

In some implementations, a presenter can be assessed based on the participation and responses of their audience. For example, may be scored or graded based on the participation of their classes. This is applicable to both virtual instruction and in-person instruction. Using the emotional analysis of class members at different times, the system analyzes the reactions of participants to assess elements of instruction (e.g., topics, slides or other content, teachers, teaching techniques, etc.) to determine whether they provide good or bad outcomes. The outcomes can be direct responses in the conference, such as increased engagement measured by the system, or reduced stress and fear and increased happiness and interest. In some cases, outcomes after the instruction or conference can be measured also, such as student actions subsequent to the monitored instruction, including test results of the students, work completion rates of the students, students' ability to follow directions, etc.

The analysis of the system can help teachers and others identify elements that are effective and those that are not. This can be used to provide feedback about which teachers are most effective, which content and teaching styles are most effective, and so on. The analysis helps the system identify the combinations of factors that result in effective learning (e.g., according to measures such as knowledge retention, problem solving, building curiosity, or other measures), so the system can profile these and recommend them to others. Similarly, the system can use the responses to identify topics, content, and styles that result in negative outcomes, such as poor learning, and inform teachers and others in order to avoid them. When the system detects that a situation correlated with poor outcomes occurs, the system can provide recommendations in the moment to change the situation (e.g., recommendation to change tone, change topic, use an image rather than text content, etc.) and/or analysis and recommendations after the fact to improve future lessons (e.g., feedback about how to teach the lesson more effectively in the future).

The system provides high potential for gathering metadata from sessions and amassing it for the purpose of machine learning and training the systems. As part of this metadata, a brief survey can be provided by the system, to be completed by each student or participant. The survey could be as simple as "did you enjoy this session?" "did you find this productive?" or could be much more extensive. This data could be used in the training algorithms along with the metadata gathered during the communication session.

In addition to the emotion and engagement measures used, the system can evaluate the impact of other factors such as time of day, when students are engaged and what engages them. The system may determine, for example, that students generally or in a particular class or are 20% more engaged when slide has a photo on it.

To evaluate a lesson or other presentation and to assess whether a portion of the presentation working well or not, the system measures emotion, engagement, participation, and other factors throughout the presentation. In many cases, the main metric is the level of engagement of the participants.

The system can be used to identify negative effects of elements of interactions, e.g., certain topics, instructors, content presented, and so on. The system may identify, for example, that a particular teacher or topic is angering a certain group of people, or that the teacher or topic results in differential engagement among different groups in the class. The system may also identify that some elements (e.g., content, actions, or teaching styles) may prevent one group of participants from learning. System can determine how different groups relate to material. Could also assess contextual factors, such as how students in different part of the room, if there is background noise, motion in a remote participant setting. Often, background noise can be detected by a video-conference system even if the participant is voluntarily or automatically muted.

The system can have various predetermined criteria with which to grade teachers, lectures, specific content or topics, and other elements. For example, a good response from participants, resulting in a high grading, may be one that shows high engagement and high positive emotion. On the other hand, a poor response may be characterized by detection of negative emotions (e.g., disgust, anger, and contempt), and would result in a low grade for the teacher, content, or other element being assessed. Micro-expression analysis can be used in assigning scores or grades to teachers, content, and other elements.

The analysis provided by the system can be used to measure participation and collaboration in meetings, to show how effort and credit for work completed should be apportioned. For example, the system can be used to monitoring group project participation among students at school, whether done using remote interactions or in-person interactions. In many group projects, only a few of the people in the group do most of the work. Using video conference data or a video-enabled conference room, the system measure who is contributing and participating. The system can determine and provide quantitative data about who did the work and who is contributing. Participation and engagement can be part of the grade for the project, rather than the result alone. The system can assess factors such as speaking time, engagement, emotion expressed, effects on others' emotions (e.g., to assess not just whether a person is speaking but how that speech impacts others) and so on.

In some cases, the emotion and engagement analysis results of the system can quantify which students are paying attention during the lectures. This information can be valuable for a university of other school, and can be used to assign scores for class participation.

The system can be used to measuring effectiveness of different sales pitches and techniques in video conference sales calls. In a similar way that the system can measure teaching effectiveness, the system can also measure and provide feedback about sales pitches and other business interactions. This applies to both remote video-conference interactions as well as an in-office setting where video can be captured. The system can assess the reactions of a client or potential client to determine what techniques are engaging them and having a positive effect. In addition, the system can be used for training purposes, to show a person how their emotions are expressed and perceived by others, as well as the effect on others. For example, the system can measure a salesperson's emotion as well as the client's emotions. In many cases, the emotion and presence that the salesperson brings makes a difference in the interactions, and the system gives tools to measure and provide feedback about it. The feedback can show what went well and what needs to be improved.

In some implementations, the emotion, engagement, and reaction data can be linked to outcomes of interest, which may or may not occur during the communication session. For example, in the business setting, the system can correlate the emotion results to actual sales records, to identify which patterns, styles, and emotion profiles lead to the best results. Similarly, in education, emotion data and other analysis results can be correlated with outcomes such as test scores, work completion, and so on, so the system can determine which techniques and instructional elements not only engage students, but lead to good objective outcomes.

In some implementations, the system can used to measure performance of individuals in a communication session. For example, the system can measuring effectiveness of a manager (or meeting facilitator) regarding how well they facilitate participation and collaboration among groups. The system can assess the qualities of good managers or meeting facilitators that result in collaboration from others. In some cases, the system ties the performance of individuals to outcomes beyond effects on participants during the communication session. For example, the actions of managers or facilitators in meetings, and the emotional responses they produce can be correlated with employee performance, sales, task completion, employee retention, and other measures. The system can then inform individuals which aspects (e.g., topics, meeting durations, meeting sizes or participants per meeting, frequency of meetings, type/range/intensity of presenter emotions, speaking time distributions, etc.) lead to the best outcomes. These can be determined in general or more specifically for a particular company or organization, team, or individual, based on the tracked responses and outcomes.

In some implementations, the system can measure employee performance via participation in group sessions, whether virtual or in-person. The emotion analysis of the system can allow tracking of how emotionally and collaboratively individuals are participating. This can help give feedback to individuals, including in performance reviews.

In each of the examples herein, the system can provide reports and summary information about individuals and a session as a whole, allowing individuals and organizations to improve and learn from each interaction. EXAMPLE NETWORK & SYSTEM INFRASTRUCTURE The system can use any of various topologies or arrangements to provide the emotional monitoring and feedback. Examples include (1) performing emotion analysis at the device where the emotion feedback will be displayed (e.g., based on received video streams), (2) performing emotion analysis at a server system, (3) performing emotion analysis at the device that generates video for a participant (e.g., done at the source of video capture, for video being uploaded to a server or other device), or (4) a combination of processing between two or more of the video source, the server, and the video destination. As used herein, "emotion analysis" refers broadly to assessment of basic emotions, detection of complex emotions, detecting micro-expressions indicative of emotions or reactions, scoring engagement (e.g., including collaboration, participation, and so on), and other aspects of a person's cognitive (e.g., mental) or emotional state from face images, facial video, audio (e.g., speech and other utterances), and so on. Indeed, any of the analysis of face images, face video, audio, and other data discussed herein may be performed using any of the different topologies discussed. The system can change which arrangement is used from one session to another, and/or from time to time within a single meeting or session. For example, users may be able to specify one of the different configurations that is preferred. As another example, there can be an option to dynamically distribute the emotion analysis load among the video data sender's device, the server, and the video data recipient's device.

In most remote scenarios, like video conferencing, telehealth, and distance learning, there is generally only one person in the video feed at a time, so only one face to analyze per video stream. In some cases, however, a single video stream may include images of multiple people. In this case, the system can detect, analyze, and track the emotions and reactions of each individual separately based on the different faces in the video stream.

In any of the different arrangements discussed, the system can be used for live analysis during a communication session and post-processing analysis (e.g., based on recorded data after the communication session has ended). Facilitating collaboration in real time is important, and can help signal conditions such as "this person has a question" in the moment, so the presenter or participants can address it before the issue becomes stale. In addition, there may be deeper and better analysis available in post-processing if the video is recorded. In some cases, rather than recording video, data extracted from the video is recorded instead. For example, the system can calculate during the communication session and store, for each participant, data such as: a time series of vectors having scores for emotional or cognitive attributes for the participant over the course of the communication session (e.g., a vector of scores determined at an interval, such as each second, every 5 seconds, every 30 seconds, each minute, etc.); time-stamped data indicating the detected occurrence of gestures, specific facial expressions, micro-expressions, vocal properties, speech recognition results, etc.; extracted features from images or video, such as scores for the facial action coding system; and so on.

As a first example, in some implementations, the emotion analysis takes place at the client device where the analysis results will be displayed. A device receiving video streams showing other participants can perform the analysis to be displayed by the device. For example, a teacher's computer may be provided video information showing different students, and the teacher's computer may locally perform analysis on the incoming video streams of students. This approach generally requires a device with significant computing power, especially as the number of participants (and thus the number of concurrent video streams to process) increases. There are a significant number of operations that a receiver-side analysis system may need to perform, including detecting and locating faces in image data, comparing faces to a face database to determine the participant identity (e.g., name) corresponding to the identified face, and then perform the emotion analysis on the received stream. The receiver-side approach can also be duplicative if multiple recipients are each separately performing analysis on the same sets of feeds.

In addition, the receiving side approach is often dependent on the video conferencing platform to pass along high-quality data for analysis. In some cases, the video conferencing platform may not send the video of all participants, especially if there are many participants. Even if the videoconferencing platform provides many different video feeds showing participants' faces, the broadcast may be in low resolution or may provide only a few faces or video streams at a time. Accordingly, implementing this approach may have features to track and profile individual users and participants, based on face recognition and/or text names or other on-screen identifiers used in the video conference, to accurately track the emotions and reactions of each individual and link the video feeds to the correct participant identities, even if the video feeds are shown intermittently, or in different layouts or placements onscreen at different types.

One advantage of performing emotion analysis at the receiving device or destination endpoint is that it facilitates use in a toolbar, web browser extension, or other third-party add-on software that is platform agnostic. By analyzing received video streams, and even focusing on analyzing video data actually shown on screen, little or no support is required from the video conference platform provider, and the client-side software may be able to operate with video conference data streams and interfaces of many different platform providers. In this cases tracking participant identities becomes particularly important. For example, the video conference platform may not give any advance notice of changes to the on-screen layout of participant video feeds, and the positions of video feeds may switch quickly. The client-side software can be configured to detect this, for example, due to factors such as face recognition, text identifiers, icons other symbols representing users, detecting sudden large changes to background or face characteristics (e.g., indicative of switching one person's video feed for another), etc. Thus, when the screen layout changes, a platform-independent solution can again map out who is represented by which on-screen images or video feeds.

The need for client software to align face images with participant identities is much easier to meet if the software is integrated with or works with data from the videoconference platform provider. The platform has information about which video streams correspond to which participant identities (e.g., as users sign in to use the platform), and the platform can provide this information in a format readable to the client software. Typically, the relationship between video data and the corresponding audio is also important for linking visual and audio analysis. This can be provided by the platform.

In some implementations, the system varies the frequency of facial analysis when analyzing multiple faces in real-time in order to manage processor utilization, e.g., to limit computational demands to the level of processing power available. Ideally, the system would every face for every frame of video. However, this becomes very processor intensive with many people (e.g., a dozen, a hundred, or more) people on a call, with video streamed at 30 fps. One way to address the potentially high processing demand is to check at a reduced frequency that is determined based on processor load, or factors such as available processing capability, number of participant video streams, etc. For example, the system may vary analysis between analyzing a face in a range from every quarter of a second to every 2 seconds. Of course other ranges may be used in different implementations. In a conference with only 3 people, a higher frequency in the range can be used, and as more participants join the call, the frequency is lowered to maintain reasonable processor load (e.g., to a target level of processor utilization, or to not exceed a certain maximum threshold of processor utilization, device temperature, or other metric). In effect, the system monitors the processing load and available capacity and optimizes the performance, varying the analysis frame rate depending on load, which is often directly correlated to the number of participants. In some cases, a user setting can additionally or alternatively be used to set the frequency of video frame analysis. For example, the system can provide a setting that the user can adjust, and the analysis frequency may or may not also be dependent on the hardware capacity of the machine. The user may specify that they want to conserve battery life, or are experiencing problems or slowdowns, or set a processing target, and the system can adjust the processing accordingly. The user may manually set a processing rate or quality level in some cases.

As a second example, participants may provide their video data streams to a server, such as a cloud computing system, and the emotion analysis (e.g., considered broadly to be any analysis of emotional or cognitive state, including determination of participation, collaboration, engagement, and other attributes) can be performed by the server. Performing the analysis at a cloud-computing level can allow better distribution of computing load, especially when powerful computation resources are available at the server. For example, the server system may be a server of a video conferencing platform (e.g., ZOOM, SKYPE, MICROSOFT TEAMS, GOOGLE HANGOUTS MEET, CISCO WEBEX, etc.). The emotion analysis results that the server generates for the various participants' video streams are then aggregated and sent to participants, e.g., as part of or in association with the audio and video data for the video conference. Individual video data can also be sent. This way, each participant can receive the analysis results for the other participants, with the processing-intensive analysis being done by the server.

In many cases, by the time a server receives a video feed, the video has been encrypted. As a result, the server system may need to have appropriate capabilities to decrypt the video feeds for analysis. Server-based or cloud-computing-based analysis provides the highest processing capability, but often the video is compressed and so may provide slightly lower quality video data and thus lower quality analysis results compared to processing of raw uncompressed video.

As a third example, emotion processing (e.g., again referring broadly to any emotional or cognitive state, including assessing attention, participation, engagement, interest, etc.) can be performed in a distributed manner, with individual participants' devices performing the emotion analysis for their outgoing video streams. Essentially, this provides a distributed model of processing, where each endpoint processes its own outgoing video feed for emotion, micro-tells, etc., then the results are sent to a central server or to other endpoints for use. For example, a user logs into a conference on a laptop which captures video of his face and provides the video to the video conferencing platform to be sent to other participants. The user's laptop also performs emotion analysis (e.g., face analysis, micro-expression detection, collaboration and engagement assessment, etc.) and other analysis discussed herein and provides the emotion analysis results along with the uploaded video stream. This has the benefit of allowing emotion analysis based on the highest-quality video data (e.g., uncompressed and full-resolution video data). The server system or video conference platform aggregates the emotion processing results from each of the participants and distributes emotion indicators along with the conference video feeds. Thus, each participant's device provides the video feed and emotion processing results for its own user, and receives the video feed and emotion processing results for each of the other users. It may be useful in this process to have a clocking or synchronization mechanism in order to properly align analysis from different sources with different connection speeds. This implementation likely has the best bandwidth efficiency.

Performing emotion analysis on each participant device, on the outgoing media stream to be sent to the server, can provide a number of advantages. For example, being closest to the video capture, the video source device can use the highest quality video data. By the time data is sent to the server, the video has probably been compressed and detail is lost. For example, video may be smoothed which can diminish the accuracy of signals of various facial expressions. In some cases, the frame rate of transmitted video may also be lower than what is available at the source, and the local high-frame-rate video can allow for more accurate detection of micro-expressions. In short, by performing emotion analysis at the device where video is captured, the software can have access to the highest resolution video feed, before downscaling, compression, frame rate reduction, encryption, and other processes remove information. Local, on-device analysis also preserves privacy, and allows emotion analysis results to be provided even if the video feed itself is not provided. This topology can provide the most secure enforcement of user privacy settings, because the user's video can actually be blocked from transmission, while the emotion analysis results can still be provided. This arrangement also allows for full end-to-end video and audio encryption with no third party (including the platform provider) ever having access to the video and audio information.

Some emotion analysis processing, such as micro-expression detection, is relatively processor intensive. In general, the amount of computational load depends on the desired level of frequency of analysis and accuracy of results. The system can dynamically adjust the processing parameters to account for the processing limits of participant's devices. For example, an endpoint's processing power may be insufficient for the highest-level of analysis, but the system can tune the analysis process so that the process still works with the available level of processing power, even if the analysis is less accurate or assesses a smaller set of emotions or attributes. For example, instead of analyzing video frames at 30 frames per second (fps), the client software can analyze video data at 10 fps (e.g., using only ever third frame for 30 fps capture). As another example the system could forgo the micro-expression analysis on certain device types (e.g., mobile phones), so that either the micro-expression analysis is performed by the server based on compressed video or is omitted altogether.

With the analysis done in the distributed way (with participants' device performing analysis on their own outgoing media streams), the incremental burden of adding another participant to the video conference is minimal. Each new participant's device can perform some or all of the emotion analysis for its own video feed, and that work does not need to be re-done by the other participants who benefit from the results. Each client device runs analysis only one video stream, its own, which limits the amount of computation needed to be done by the client device. Further, the client device does not need to receive video streams of other participants to receive emotion data for those participants. For example, even if a client device receives video for an individual only intermittently (e.g., only when a person is speaking), the system nevertheless has consistent emotion analysis data streamed for the person by the person's device. The server system or video conference platform used can coordinate and aggregate the emotion data as it processes the video streams uploaded by the various devices.

Another benefit is that by providing the emotion scores or other analysis results instead of full video streams, the amount of data transmitted to each client is lowered. A speaker can get real-time audience feedback based on analysis of an audience of 1000 people that doesn't require 1000 video transmissions to the speaker's computer for analysis.

The techniques of using server-based emotion analysis and/or distributed local emotion analysis system allow efficient processing with large numbers of participants, for example, 10, 100, or 1000 people, or more, each of whom have their emotions, engagement, responses, and so on concurrently monitored by the system in an ongoing manner throughout a communication session. To allow scalability and support large numbers of people, the analysis of users' video and audio can be performed in a distributed manner at the source of the video capture, e.g., at phones or laptop devices of individual participants, or at a computer system for a conference room for analysis of video data captured at the conference room.

Other arrangements can also be used. For example, the system can share emotion processing between client devices and the server. In some cases, the system can vary which portions of the processing are done at the server and at the client devices (e.g., at the source where video is captured and/or at the destination where the video is to be displayed)

based on the network characteristics (e.g., bandwidth/throughput, latency, stability, etc.), processing capability, and so on.

The system can analyzing emotional data at the source and transmit that data in lieu of video data in cases where confidentiality or bandwidth prohibit transmission of full video data. This can be done selectively based on processing capacity, bandwidth, etc.

One important feature of the system is the ability to gather engagement and emotional data for people that are not currently visible on a conference call participant's screen. As an example, a class of 100 students may all have their video cameras on. The teacher will only be able to see a few of those faces at a time, but the system can capture the emotion/attention analytics on all 100 students and give that feedback to the teacher, even based on the data for participants that the teacher cannot see she or he can't see. The feedback can be provided for individuals or in aggregate as discussed above.

The system can be used in fully remote interactions, fully local or in-person settings, and for mixed or hybrid settings where there are both local participants in one area and others participating remotely. To capture video feeds of people in a local area, such as a classroom, lecture hall, conference room, etc., cameras can be mounted on walls, ceilings, furniture, etc. to capture individual participants or groups of participants.

The analysis by the system can be shared between participants' devices (e.g., client devices, endpoint devices, or network "edge" devices) and the server system or video conferencing platform that is used. For example, participant's devices may generate certain scores, such as basic emotion scores (e.g., a seven-value vector with a score for each of the 7 basic emotions), while leaving to the server more computationally intensive processes such as micro-expression detection and the analysis of whether sequences of the emotion score vectors and other data represent different conditions, such as complex emotions or reactions, or triggers for action or recommendations by the system. In some cases, the emotion scores and other analysis results may be aggregated by the server system and passed to a destination device, and the destination device can perform further processing or create further scores based on the scores received.

The emotion analysis can be used even when participants' devices do not transmit video to a central server. For example, during a web meeting or other online event, a presentation may be displayed and video of participants may not be shown or even provided to the server system. Nevertheless, participants' devices can capture video of their users and perform local emotion analysis and send the analysis results to a server system, e.g., a central hub facilitating the meeting. In this case, privacy is enhanced because a user's video is never transmitted to any other device, and bandwidth is reduced because the captured video does not need to be uploaded to a server or to other participant devices. Even so, the emotion data can be tracked and provided because each participant's device can generate and provide the analysis results to a server, which in turn distributes the aggregated analysis results for presentation at the one or more devices involved in the communication session.

As a data mining technique for creating anonymity for data collected, emotional data could simply be stripped of any identification or association with the user. As an additional layer of protection, data could be randomly resampled (statistical bootstrapping) in such a way that the statistical integrity of the data is intact, but the origin of the data is no longer known. For example, data resulting from a call with 10 participants could be a starting set. The data could be randomly resampled 1,000 times to create 1,000 random user data sets based on the 10-user seed data set. Of these, 10 of the randomly generated user data sets could be selected at random from the set of 1,000. This second selection of data is what is stored. These data sets are statistically equivalent to the original data, but the order and identity of the users is unknown. This bootstrapped anonymity could be performed along other data dimensions as well.

An example is use of the system in a lecture by a professor, for example, either in an online, e-learning university setting, or in an auditorium, or a combination of both. While the professor is teaching, the system can provide sends just the engagement scores to the professor's device (e.g., aggregated or averaged scores and/or scores for individual participants) to give the teacher a read of the audience. The system can preserve privacy and not transmit or store video from participant devices. The video can be captured at the client and used to determine the engagement score, but may not be transmitted to the server. The professor may want to know how people are responding to the material, and can receive the emotion, engagement, and reaction data that the server provides. Even though the video of participants may not be transmitted to or displayed at the professor's computer, the analysis can still be performed at the individual devices of participants or by the server. The analysis results can show how the participants are responding to the lecture, e.g., overall engagement level, average levels of emotion across the participants, distribution of participants in different classifications or categories (e.g., classifications for high engagement, moderate engagement, and low engagement), how engagement and emotion levels compare to prior lectures involving the same or different people, etc.

In some implementations, the system is configured to perform analysis of emotion, engagement, reactions, and so on of recordings of interactions, e.g., video files of one or more devices involved in a communication session. The system can analyze the video data after the fact, e.g., in an "offline" or delayed manner, and provide reports about the engagement levels, emotion levels, and so on.

The system can be configured to save analysis results and provide reports for monitored communication sessions and/or for analysis of recorded sessions. For example, the system can provide information about patterns detected, such as when the speech of a particular person tended to increase or decrease a particular score (e.g. for a particular emotion, collaboration, engagement, etc.). The system can also provide information about conditions detected over the course of the recorded interaction, such as participant Dave being confused at position 23:12 (e.g., 23 minutes, 12 seconds) into the interaction, and participant Sue appearing to be bored from 32:22 to 35:54. Many other statistics and charts can be provided, such as a speaking time metrics for individuals or groups, a histogram of speaking time, a chart or graph of speaking time among different participants over time, average emotion or engagement metrics for individuals or groups, charts with distributions of different emotions or emotion combinations, graphs showing the progression or change of emotions, engagement, or other measures over time (for individuals and/or for the combined set of participants), and so on. In aggregate, this data can be used to analyze or alter the "culture" of corporate or non-corporate user groups.

Any and all of the different system architectures discussed herein can include features to enforce privacy and user control of the operation of the system. The end user can be provided an override control or setting to turn emotion analysis off. For privacy and control by the user, there may be a user interface control or setting so the participant can turn off emotion analysis, even if processing is being done at a different device (e.g., a server or a remote recipient device).

For example, any data gathering or analysis that the system performs may be disabled or turned off by the user. For example, the system can give the option for a user to authorize different options for processing the user's face or video data, e.g., authorizing none, one, or more than one of transmission, recording, and analysis of the data. For example, users may select from options for video data to be: (i) transmitted, recorded, and analyzed; (ii) transmitted and analyzed, but not recorded; (iii) transmitted and recorded, but not analyzed; (iv) analyzed but not transmitted or recorded; and so on. In some cases, a person running a communication session (e.g., a teacher, employer, etc.) may have to ask participants to turn on or enable emotion analysis when desired, but preserving control and privacy of users is an important step.

In some implementations, facial recognition and emotional analytics are combined to create a coherent analytics record for a particular participant when their image appears intermittently. When there is a large number of participants in a conference, not all are shown at the same time. For example, some people may be shown only when they are speaking, or only up to a maximum number are shown at a time. When video feeds disappear from view and then reappear (whether in thumbnail view or a larger view), the system can match the video feed to an identity to ensure that the system does not treat the video feed as showing a new person. The system can recognized the participant's face in the video stream to determine that it shows the same person as before, allowing the system to continue the scoring and record for that person during the session. The system can also use speech recognition to identify or verify when a person is speaking. As a result, the system can maintain a continuous log of a participant's interactions and emotion. With this data, the system can get each individual's speaking time analytics, and get a collaboration score spanning interactions over the total length of the call. Voice analysis can be used whether a participant joins using video or using audio only.

In some implementations, the system can learn the correspondence of people and their video feeds dynamically, without advance information or predetermined face/identity mappings. For example, a system may generate identities for each video feed for each communication session, even if the system does not recognize user login information or names. The system can create a database of voices and faces as information is gathered during one or more sessions. In some cases, the system can provide a control for a user to enter a name, select a name from a drop down, confirm a name, and so on. The options provided for a user to select can be from the set of people the user has had calls with before. As another example, the system can link to calendar data to identify participants to a call.

In the case where the system is integrated with the video conferencing platform, the system can use data acquired from many meetings involving a participant, even meeting involving different individuals or companies. As a result, the system can develop norms/baselines for individuals, to personalize the system's analysis and customize the behavior of the system and improve accuracy. The system can look for and identify details about a person's reactions, behaviors, expressions, and so on and adjust over time. The results can be stored as a personalization profile for each user, to use the history of interactions for a user to do better analysis for that person.

Example Processing Techniques

As discussed above, emotion analysis can include recognizing the emotions of a person, for example, by looking at the face of the person. Basic emotions can often be derived from a single image of a person, e.g., a single frame, and can indicate whether a person is happy, sad, angry and so on. The system can produce a vector having a score for each of various different emotions. For example, for the seven basic emotions, each can be scored on a scale of 0 to 100 where 100 is the most intense, resulting in a vector with a score of 20 for happiness, 40 for disgust, 15 for anger, and so on. This emotion vector can be determined for each video frame or less frequently as needed to balance processor loading.

Various different techniques can be used to detect emotional or cognitive attributes of an individual from image or video information. In some cases, reference data indicating facial features or characteristics that are indicative of or representative of certain emotions or other attributes are determined and stored for later use. Then, as image or video data comes in for a participant during a communication session, facial images can be compared with the reference data to determine how well the facial expression matches the various reference patterns. In some cases, feature values or characteristics of a facial expression are derived first (such as using scores for the facial action coding system or another framework), and the set of scores determined for a given face image or video snippet is compared with reference score sets for different emotions, engagement levels, attention levels, and so on. The scores for an attribute can be based at least in part on how well the scores for a participant's face image match the reference scores for different characteristics.

As another example, machine learning models can be trained to process feature values for facial characteristics or even raw image data for a face image. To train a machine learning model, the system may acquire various different example images showing different individuals and different emotional or cognitive states. For example, the system can use many examples from video conferences or other interactions to obtain examples of happiness, sadness, high engagement, low engagement, and so on. These can provide a variety of examples of combinations of emotional or cognitive attributes. The examples can then be labeled with scores indicative of the attributes present at the time the face image was captured. For example, a human rater may view the images (and/or video from which they are extracted) to assign scores for different attributes. As another example, a system may ask individuals shown in the images to rate their own emotional or cognitive attributes, potentially even asking them from time to time during video conferences to answer how they are feeling.

With labelled training data, the system can perform supervised learning to train a machine learning model to predict or infer one or more emotional or cognitive attributes based on input data that may include a face image or data that is based on a face image (e.g., feature values derived from an image). The machine learning model may be a neural network, a classifier, a clustering model, a decision tree, a support vector machine, a regression model, or any other appropriate type of machine learning model. Optionally, the model may be trained to use other types of input in addition to or instead of these. Examples of other inputs include voice or speech characteristics, eye position, head position, amount of speaking time in the session, indications of other actions in the communication session (such as the participant submitting a text message or comment in the communication session), and so on.

Machine learning models can be used to perform classification, such as to determine whether a characteristic is present or absent and with what likelihood or confidence, or to determine if a participant has attributes to place them in a certain group or category. As another example, machine learning models can be used to perform regression, such as to provide a numerical score or measure for the intensity, degree, or level of an attribute.

In performing this analysis, video data may be used, e.g., by providing a sequence of image frames or feature values for a sequence of image frames. For example, a machine learning model may receive a series of five image frames to better predict emotional or cognitive states with greater accuracy. As another example, a machine learning model may include a memory or accumulation feature to take into account the progression or changes over time through a series of different input data sets. One way this can be done is with a recurrent neural network, such as one including long short-term memory (LSTM) blocks, which can recognize sequences and patterns in the incoming data and is not limited to inferences based on a single image.

The analysis may be done at any of the devices in the system, as discussed above. For example, the reference data, software code, and trained machine learning models to perform the analysis may be provided to an may be used at a server system or a participant's device. The data, software, and models can be used to generate participant scores at the device where a video stream originates (e.g., the device where the video is captured), at an intermediate device (such as a server system), or at the destination device where a video stream is received or presented (e.g., at a recipient device that receives the video stream over a network from a server system).

As discussed above, the system can be used to detect and identify micro-expressions or micro-tells that indicate a person's reaction or feeling at a certain time. Often these micro-expressions involve a type of action by a participant, such as a facial movement that may last only a fraction of a second. Typically, micro-expressions refer to specific events in the course of a communication session rather than the general state of the person. Micro-expressions can be, but are not required to be, reactions to content of a communication session that the person is participating in.

The system can incorporate micro-expression analysis and use it alongside emotion detection to enhance accuracy. Micro-expressions are much harder for people to fake than simple facial expressions, and the micro-expressions can convey more complex emotions than a single face image. To detect micro expressions, the system can analyze video snippets, e.g., sequences of frames in order to show the progression of face movements and other user movements. This can be done by examining different analysis windows of a video stream, e.g., every half second of a video or each sequence of 15 frames when captured at 30 frames per second. Depending on the implementation, overlapping analysis windows can be used to avoid the analysis window boundaries obscuring an expression, e.g., examining frames 1-10, then examining frames 5-15, then examining frames 15-20, and so on. The system can store profiles or reference data specifying the types of changes that represent different micro-expressions, so that the changes occurring over the frames in each analysis window can be compared to the reference data to see if the characteristics features of the micro-expression are represented in the frames for the analysis window. In some implementations, the system uses a machine learning model, such as an artificial neural network to process video frames (and/or features derived from the frames, such as the measures of differences between successive frames) and classify the sequence as to whether one or more particular micro-expressions are represented in the video frame sequence.

In some implementations, the system uses voice analysis, e.g., loudness, pitch, intonation, speaking speed, prosody, and variation in a person's speaking style to determine emotions and other characteristics, e.g., engagement, interest, etc. In some implementations, the system can detect eye gaze, head position, body position, and other features to better detect emotion, engagement and the other items assessed.

The system can use various machine learning techniques in its processing. For example, trained neural networks can be used in the emotion recognition and micro-expression detection processing. The different use cases herein may additionally have their own machine learning models trained for the particular needs and context of the application. For example, measuring engagement in a university setting is different from measuring employee performance in a business setting, and so different models can be trained to generate the outputs for each of these applications. Types of outputs provided, the types of conditions detected, the types of inputs processed by the models, and more can be different for different use cases.

In general, machine learning is useful whenever there is a need to distinguish data patterns and there are examples to learn from. One particular use is detecting micro-expressions. The system can use a machine learning model that does a kind of time series analysis. For example, a feedforward neural network can be given a quantity of frames (e.g., 15 sequential frames, or 30 frames) to be assessed together, e.g., with the frames and/or feature values derived from the frames stacked into a single input vector. Another approach is to use a recurrent neural network in which the model can be given an incremental series of inputs, for example, with frame data and/or feature values provided frame by frame. The recurrent neural network can process the incoming stream of data and signal once a certain sequence or pattern indicative of a particular micro-expression occurs. For example, whether using a feedforward network or a recurrent network, the model can provide output values that each indicate a likelihood or confidence score for the likelihood of occurrence of a corresponding micro-expression. More generally, models can be configured to detect complex characteristics, slopes, gradients, first-order differences, second-order differences, patterns over time, etc. that correspond to micro-expressions or other features to detect.

In some implementations, the system cross-references emotion data derived from video with voice stress analysis to enhance accuracy. This technique is useful to assess attributes of people who are speaking. If the system detects stress in a speaker's voice, the system gives a way for the user or other participants to respond. Sensing anger and other voice characteristics gives the system a way to respond to help others to facilitate. Voice stress analysis can confirm or corroborate attributes determined from video analysis, as well as to help determine the appropriate level or intensity. For example, video can indicate that face shows disgust, and the tone can indicate that the participant is stressed, which together shows that the current condition or state of the participant is particularly bad. This analysis may be used in or added to any of the scenarios discussed. As an example, voice stress analysis can be particularly useful to determine the state of medical patients and/or medical caregivers (e.g., nurses, doctors, etc.).

The system can look at changes in a person's voice over time. One of the thing that's powerful about micro expressions is consistency across ages and nationalities and gender. There are some commonalities in voice, but there may also be user-specific or location-specific or context-specific nuances. Many other factors like voice do have personal norms, language, regional and other effects. The system can store profile set or database of participant information, which characterizes the typical aspects of an individual's voice, face, expressions, mannerisms, and so on. The system can then recognize that the same person appears again, using the name, reference face data, or the profile itself, and then use the profile to better assess the person's attributes.

Additional Example Applications

In some implementations, the system can be used to monitoring interview to detect lying and gauge sincerity. For example, in a job interview, the system can evaluate a job candidate and score whether are the candidate is telling the truth. The system can give feedback in real time or near real time. In some cases, the system can assess overall demeanor and cultural fit. Typically, this process will use micro-expression detection data. Certain micro expressions, alone or in combination can signal deception, and this can be signaled to the interviewer's device when detected.

The system can be used to coaching public speakers. In many cases, much of a speaker's effectiveness is emotionally driven rather than content driven.

The system can be used to measuring mental health of medical or psychiatric patients. For example a video camera can be used to monitor a patient, either when the patient is alone or during an interaction with medical staff. In some cases, the system may be able to tell better than a human how patients are doing, e.g., whether person is in pain, is a suicide risk, is ready to go home, etc. The system also provides a more objective and standardized measure for assessment, that is more directly comparable across different patients, and for the same patient from one time to another. There is especially value in understanding the emotional state of the medical and psychiatric patients. In some cases, it can be beneficial to monitor the emotional state of the medical personnel as well, to determine if they are stressed or need assistance. The system can provide a tool that a medical worker or social worker could use to aid in detecting the needs and disposition of client.

In some implementations, the system can analyze and record only facial data, not video streams for confidentiality purposes. The system can process video to determine emotions/microtells, but not record the video. The system sees video and analyzes it but only analyzes it and provides the analysis results. This approach may allow monitoring in situations or locations where video data should not be recorded, such as to detect or prevent crimes in restrooms or other private places. The system may indicate that there are frightened or angry people in an area, without needing to reveal or transmit any of the video data.

The system can be used to measuring the effectiveness of call center workers. The system can be used to assess the emotional state of both the caller and the call center worker.

The system can be used to measuring effectiveness of social workers and other caregivers. This can include medical workers—doctors, nurses, etc. Often, they are working with people in stressful situations. This can use a different neural network, with different training data, looking for different types of people or different attributes of people than in other scenarios.

In another example, the system can be used to evaluate prison inmates, measuring their propensity to become violent. In the same manner, the system may be used to monitor and assess prison guards.

In some implementations, the system can be provided as a software application, potentially as a tool independent of the video conference platform being used. The system can enhance videoconferences through neuroscience, emotion detection, micro-expression detection, and other techniques. In some implementations, the application is not be tied to any one videoconference platform, but rather can function as a transparent "pane" that a user can drag over the platform of their choice, and the application can analyze the conversation. The application's insight can focus in two key areas, among others: emotion analysis and participant speaking time management. The software may first locate the faces that are under its window area and proceed to analyze these faces as the conference takes place. The system may provide real-time indicators of the collaboration level, and potentially emotions, of each participant. A user, e.g., a participant in the videoconference, can be able to use this information to effectively moderate the discussion and can be motivated themselves to be a better participant to keep their own collaboration score high. Of course implementation as a client-side application is only one of many potential implementations, and the features and outputs discussed herein can be provided by a server-side implementation, integration with a videoconferencing platform, etc.

In some implementations, upon opening the application, a main resizable pane can appear. The pane can have a minimalistic border and a transparent interior. When resizing the pane, the interior can become translucent so that the user can clearly see the coverage area. As soon as the user is done resizing the pane, the interior can return to being transparent. The application can detect all faces in the application window, e.g., the active speaker as well as thumbnail videos of other participants that are not speaking. The application can process these video streams and perform analysis on the speakers in those video streams, as output for display on the video conference user interface.

The application can start monitoring collaboration by dragging the application window over any region of the screen with faces in it. Data gathering, metrics generation, and data presentation can be designed to function as an overlay to any or all major videoconference systems, e.g., Zoom, Skype for Business, WebEx, GoToMeeting, and so on.

The system can track speaking time and provide the user access to a running total of every participant's speaking and listening time. Clock information can be displayed optionally. The speaking clock may visually, or potentially audibly, alert a participant when the participant has been talking more than m/n minutes, where n is the number of participants, and m is the current conference time, thus showing that they are using more than their fair share of time. No alerts can be given until 10 minutes have elapsed since the beginning of monitoring. Speaking and listening time can be tracked in the application. A visualization of each participant's time can be displayed optionally along-side their collaboration indicator.

The system can show collaboration score, or some indicator of the collaboration score, for each participant being analyzed. The collaboration score can be a statistical function of emotion data and speaking time over a rolling time interval. Emotion data can be retrieved from an emotion recognition SDK. Happy and engaged emotions can contribute to a positive collaboration score, while angry or bored emotions can contribute to a low collaboration score. A speaking-to-listening-time ratio that is too high or too low relative to a predetermined threshold or range can detract from the collaboration score, but a ratio inside the predetermined range can contribute to a favorable score. The system can show a color-coded circular light showing up near each participant's video can indicate the participant's score. For example green can be used for a high collaboration score with a scale of grading down to red for low scores. For example, to quickly communicate the collaborative state of each participant, the application can display a small light to indicate that users collaborative state. A green indicator light can represent a good collaboration score, while a red light can indicate a low score.

Visual indicators can be in a consistent relative position to the face of a participant, or at least the video stream or thumbnail they are associated with. Faces may move as the active speaker changes. Faces may be resized or moved by the underlying videoconferencing software, and the application may track this movement to maintain an ongoing record for each participant. For example, next to each participant's video image the application can place the user's collaboration indicator. These indicators can be close enough to make it clear that they are associated with that user without obstructing any parts of the underlying video conference application. These indicators can also need to follow the conference participant they are attached to if the video thumbnail moves. For example, if the active speaker changes, the underlying videoconference software may change the positions of the participants' thumbnail videos. The system can recognize the change in the underlying application and move the collaboration indicator to follow the image of the correct participant.

The system can track information of participants even if they are not visible at the current time. Participants may speak early in a video conference and then not speak for a significant number of minutes, in which time the underlying video conferencing software may cease showing their thumbnail video. Collaboration scores for participants need to continue being tracked even when their videos are not available. Emotional data may not be available at times when video is not available, but collaboration data can still be inferred from the participant's lack of contribution, by interpolating for the gaps using the video and analysis for periods before and after, etc. Should the hidden participant reappear later, their speaking time and collaboration score can take their previous silence into account. The system can provide the option to show speaking times even for participants whose video thumbnail is not currently visible. One solution is to capture a sample image of each participant at a time when they are visible, and associate speaking time with those sample images when the participant is not visible. Another option is to show a chart, e.g., bar chart, pie chart, etc., showing speaking times for different participants. The system can provide an optional display of speaking time for each participant. One example is a pie chart indicating the ratio of speaking/listening time for each participant. This can be an optional visual that can be turned off. The pie chart follows video as the thumbnails move when the active speaker changes.

Indicators can be positioned and adjusted so that they do not obscure the faces, or even the entire videos, of participants. The indicators should not cover any faces, and indicators may be provided to not dominate or overwhelm the display to dominate or distract from the faces. The system can provide functionality to save and persist call data. The interface can provide functionality to start and stop the analysis, as well as potentially to adjust which indicators are provided. E.g., the system can be customized so a user can adjust how many indicators to show, which metrics to show, the form of the indicators (e.g., numerical value, color-coded indicator, icon, bar chart, pie chart, etc.).

In the case of a client-side-only implementations, the application may not generate any network activity beyond what is used by the video conference platform. The application's resource requirements (CPU, memory), can be tailored to not unnecessarily burden the machine or otherwise detract from the user's experience on a video call.

The application can enhance collaboration by creating a more engaging and productive video conferencing environment. The design can be responsive to changes in the underlying video conference application such as resizing or changing of display modes.

FIGS. 9A-9D illustrate examples of user interfaces for video conferencing and associated indicators. These show examples of ways that indicators of emotion, engagement, participation, behavior, speaking time, and other items can be presented during a video conference. These kinds of indicators and user interfaces can also be provided to a teacher, a presenter in a web-based seminar, or other individual. The indicators of the various user interfaces of FIGS. 9A-9D may optionally be combined in any combination or sub-combination.

Figure 9A:
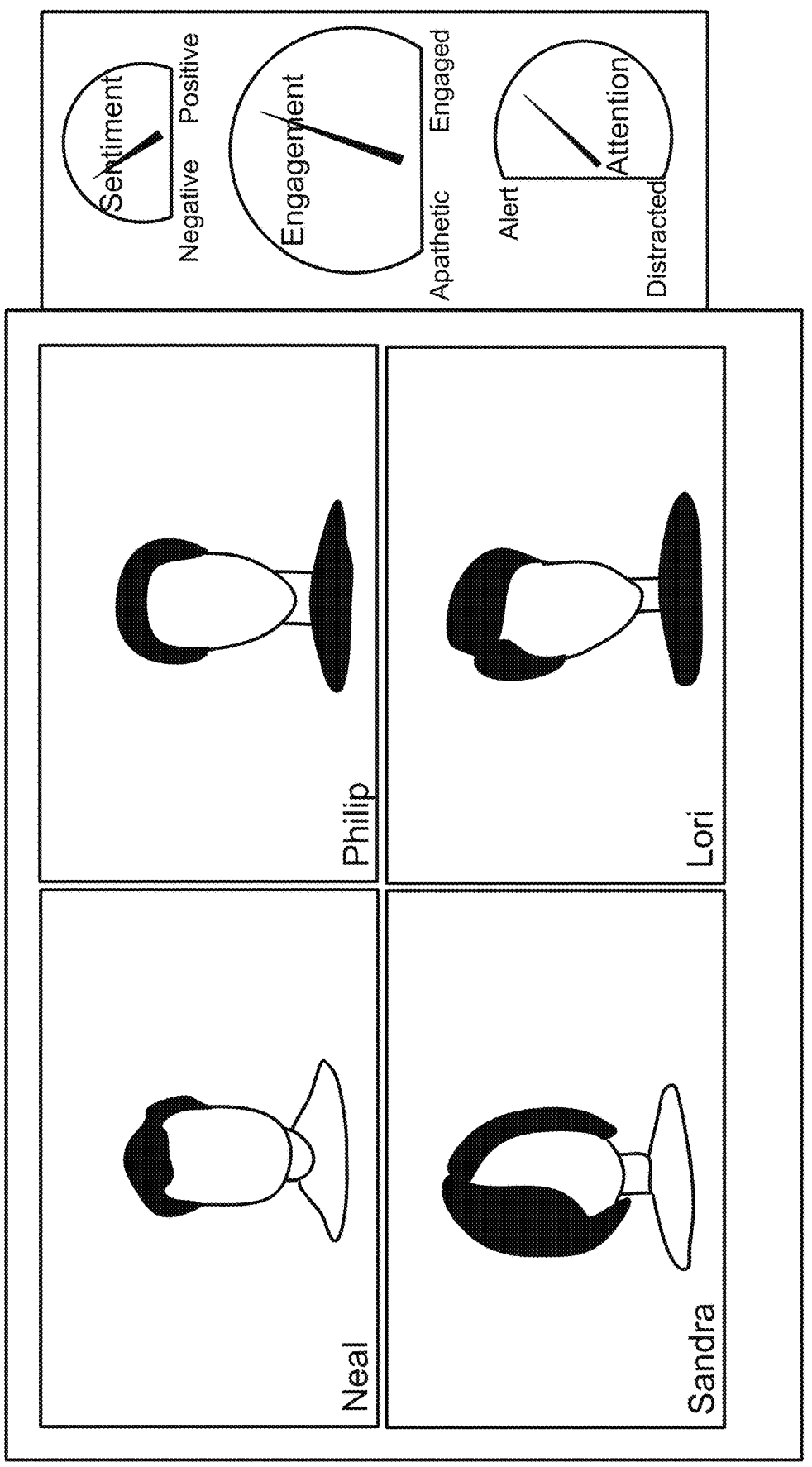
FIGS. 9A-9D illustrate examples of user interfaces for video conferencing and associated indicators.

FIG. 9A shows a basic dashboard view that gives easily readable, real-time feedback to a user about the audience. This can be useful for a presenter, such as a lecturer, a teacher, a presenter at a sales meeting, etc. It can also be useful in group collaboration sessions, e.g., video conferences, meetings, calls, etc. The dashboard gauges show summary metrics in aggregate for all participants, providing quick visual indication of items such as the group's general emotional orientation, their engagement, their sentiment, their alertness, and so on. Participants whose video and/or names are not shown on the screen are still accounted for in the metrics. Metrics may be calculated based on averages, percentiles, or other methodologies. For advanced users, it is possible to place a second shadow needle in each dial, representing a different metric, e.g. the two needles could represent 25th and 75th percentiles of the group.

Figure 9B:
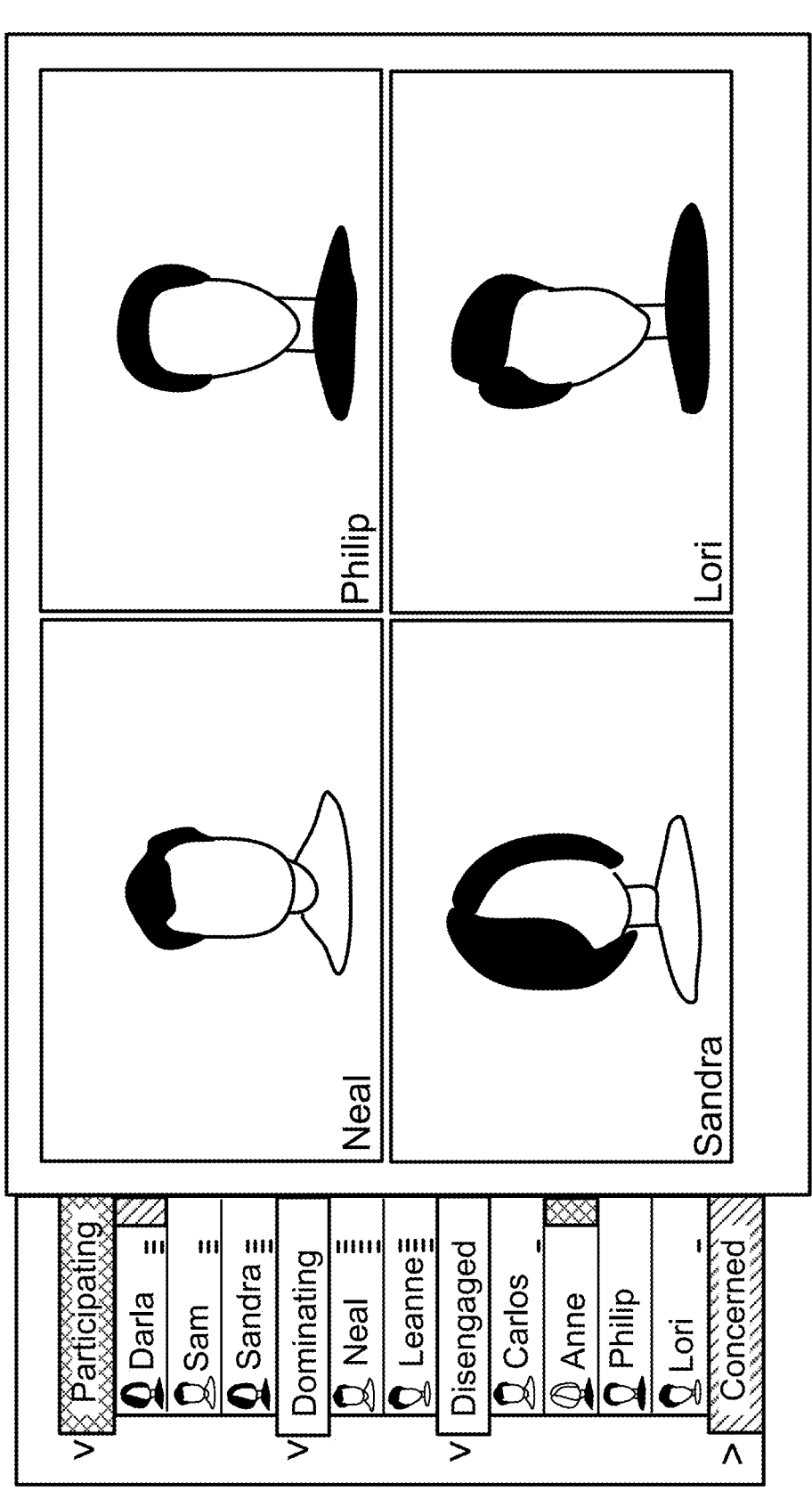

FIG. 9B shows an outline detail view that groups participants into groups or clusters based on the analysis results determined by the system, e.g., emotion, engagement, attention, participation, speaking time, and/or other factors. In this example, the interface provides a collapsible outline showing all participants, grouped by overall level of participation in meeting. Alternate groupings could also be created for other metrics, e.g., speaking time, attention, sentiment level, etc., or combinations of multiple metrics.

Besides the groupings or group assignments for individuals, additional information can be optionally displayed, such as a "volume bar" (e.g., a bar-chart-like indicator that varies over the course of the session) to indicate how much speaking time a participant has used. Optional color indicators can flash by each name if that person should be addressed in the meeting in some way at a particular moment. For example, one color or a message can be shown to indicate that a person has a question, another color or message can show that a person is angry, another if a person is confused, etc. This layout lends itself to being able to display many different kinds of information. However, with more information it may be more difficult for the user to take in the information quickly. The groupings and information pane shown in FIG. 9B can easily be combined with other views. For example, the basic dashboard view of FIG. 9A and the outline view of FIG. 9B may be could be shown simultaneously, together in a single user interface.

Figure 9C:
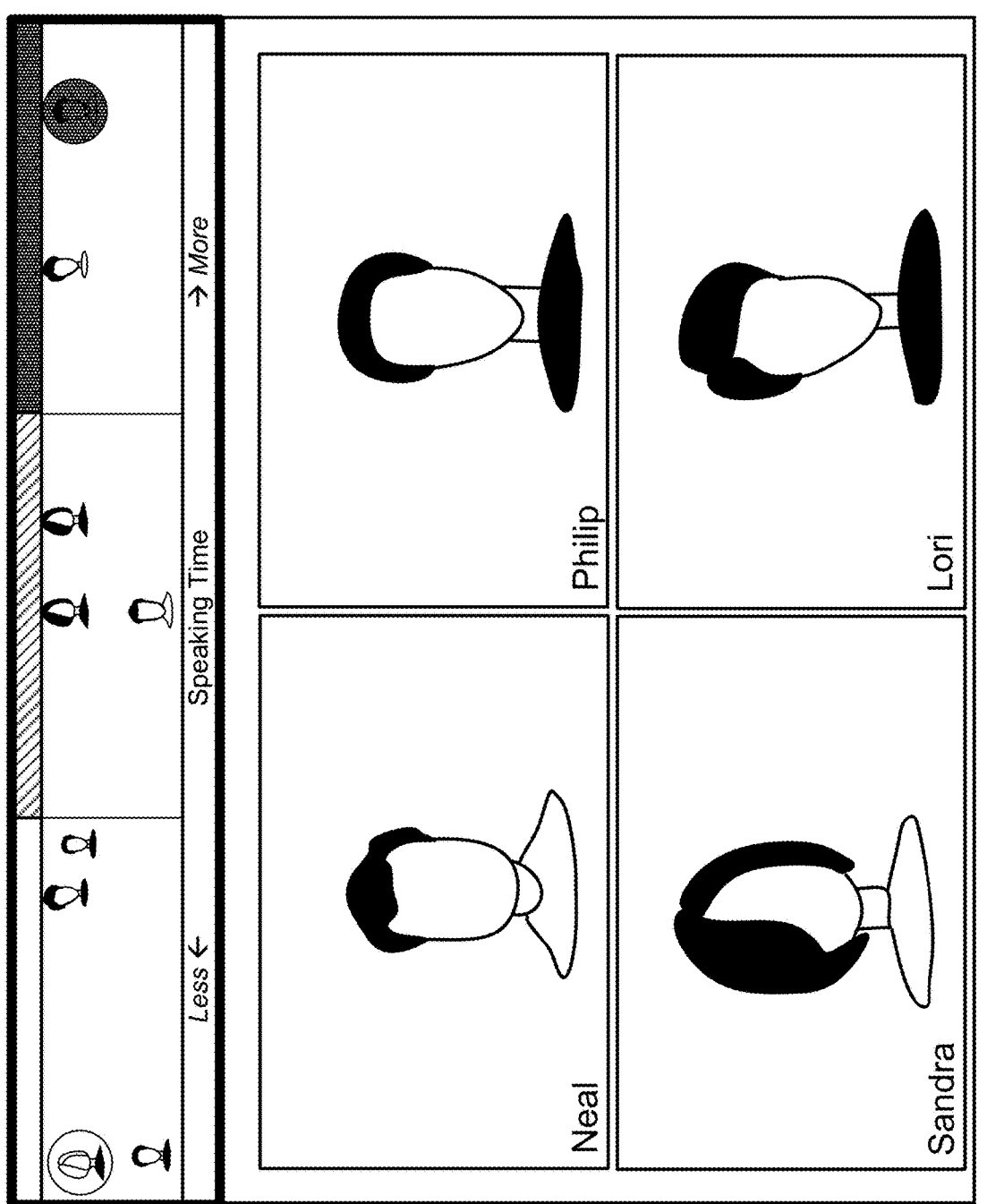

FIG. 9C shows a timeline theme view that arranges indicators of different participants (in this case face images or icons) according to their speaking time. This view, focused on speaking time, shows the relative amounts of time that each participant has used. The vide shows faces or icons ordered along a scale from low speaking time to high speaking time, from right to left. On the left, there is a group of individuals that have spoken very little. Then, moving progressively to the right, there are icons representing users that have spoken more and more. In this case, there are three clusters, one on the left that have spoken very little, a middle cluster that have spoken a moderate amount, and a third group on the right that have spoken the most-potentially more than their allotted share.

The timeline at the top could be minimized, hiding the drop-down gray region and only showing summary information. Other information can be provided. For example, by flashing colored circles over the contact photos of people who need to be addressed, the viewer can also receive hints about how best to facilitate the conversation. The length of the timeline and the coloration of the regions can be dynamic throughout the meeting so that early on in the meeting, no one is shown as too dominant or too disengaged at a point in the meeting when there has only been time for 1-2 speakers.

Figure 9D:
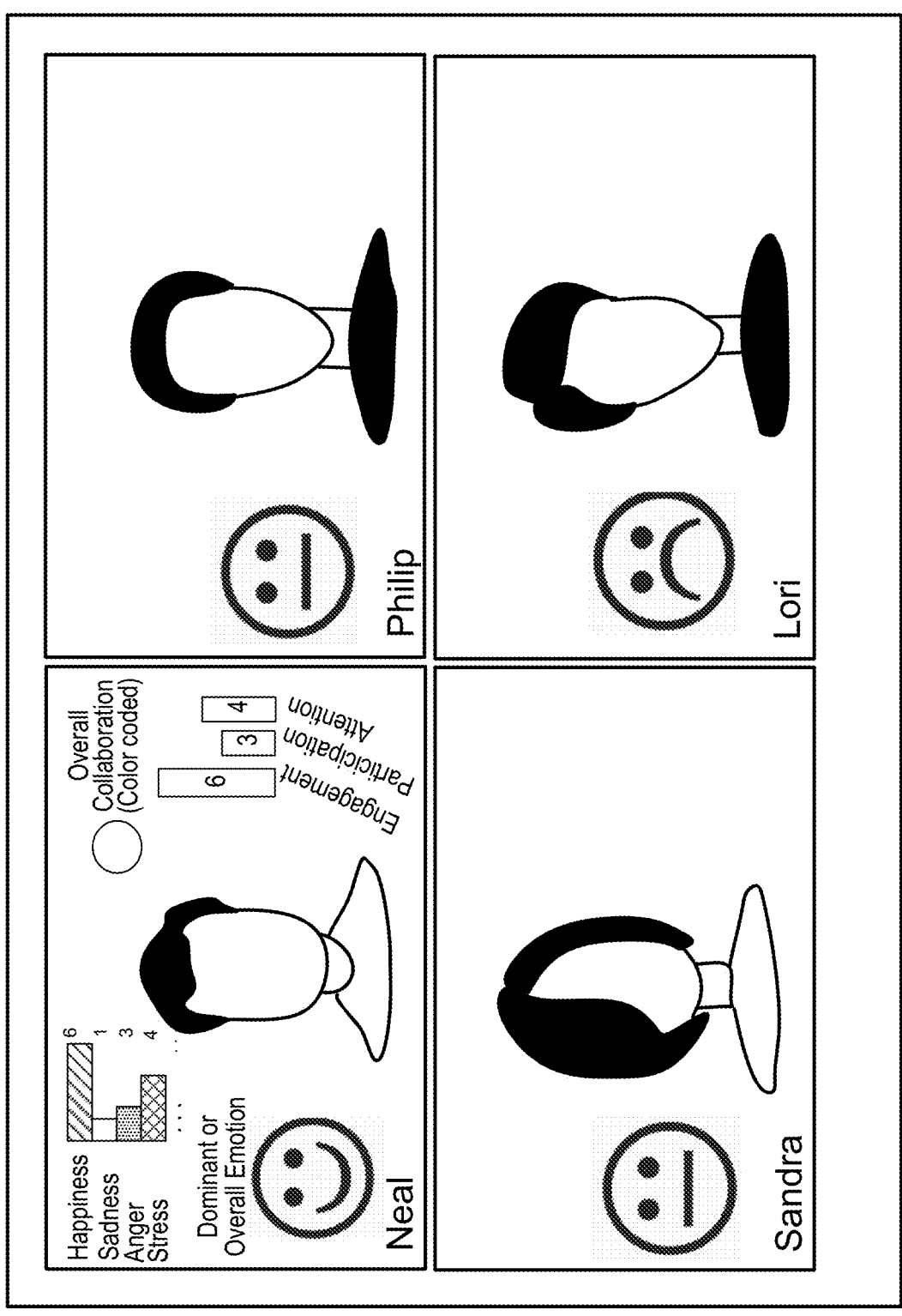

FIG. 9D shows various examples of indicators that may be provided on or near a participant's face image, name, or other representation. For example, indicators of emotions (e.g., happiness, sadness, anger, etc.), mood, more complex feelings (e.g., stress, boredom, excitement, confusion, etc.), engagement, collaboration, participation, attention, and so on may be displayed. The indicators may take any of various forms, such as icons, symbols, numerical values, text descriptions or keywords, charts, graphs, histograms, color-coded elements, outlines or borders, and more.

FIGS. 10A-10D illustrate examples of user interface elements showing heat maps or plots of emotion, engagement, sentiment, or other attributes. These summary plots are useful for getting an "at a glance" summary of the sentiment and engagement level of a large audience and has the added advantage of being able to identify subgroups within the audience. For example, a presenter may be talking to a group of dozens, hundreds, or thousands of people or more. Each individual's position on the engagement/sentiment chart can be plotted to show where the audience is emotionally at the current time. As the presentation continues, the system continues to monitor engagement and sentiment and adjusts the plots dynamically, in real-time. The plot will respond in real-time so that presenters can respond to shifts and splits in the collective response of the audience. This data will be most useful in large group settings such as classrooms or large scale webinars. The size and density of a region indicates a large number of audience members experiencing that combination of sentiment and engagement. Higher engagement is shown in more vivid colors, while apathy is expressed through more muted colors.

Figures 10A, 10B, 10C:
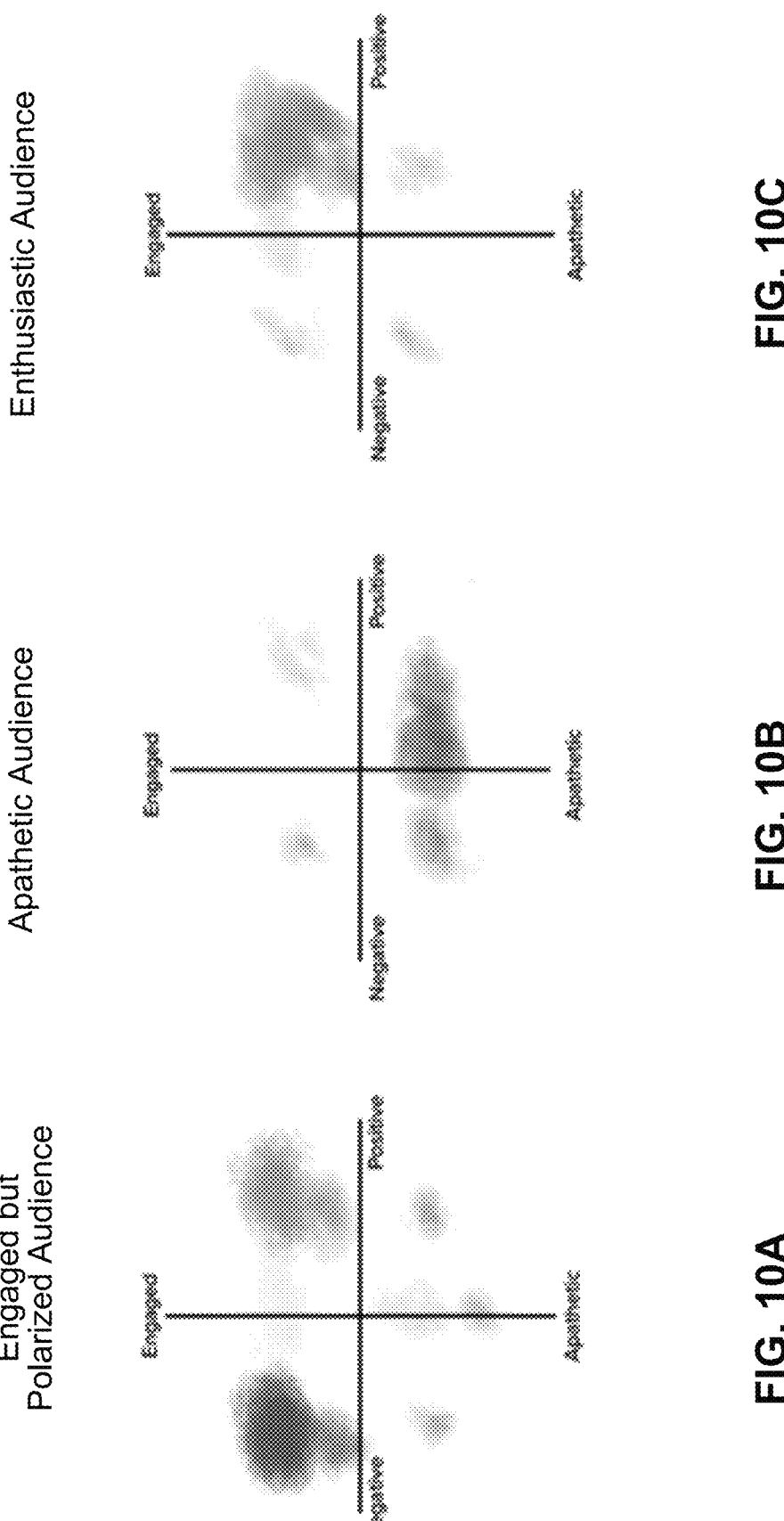
FIGS. 10A-10D illustrate examples of user interface elements showing heat maps or plots of emotion, engagement, sentiment, or other attributes.
Figure 10D:
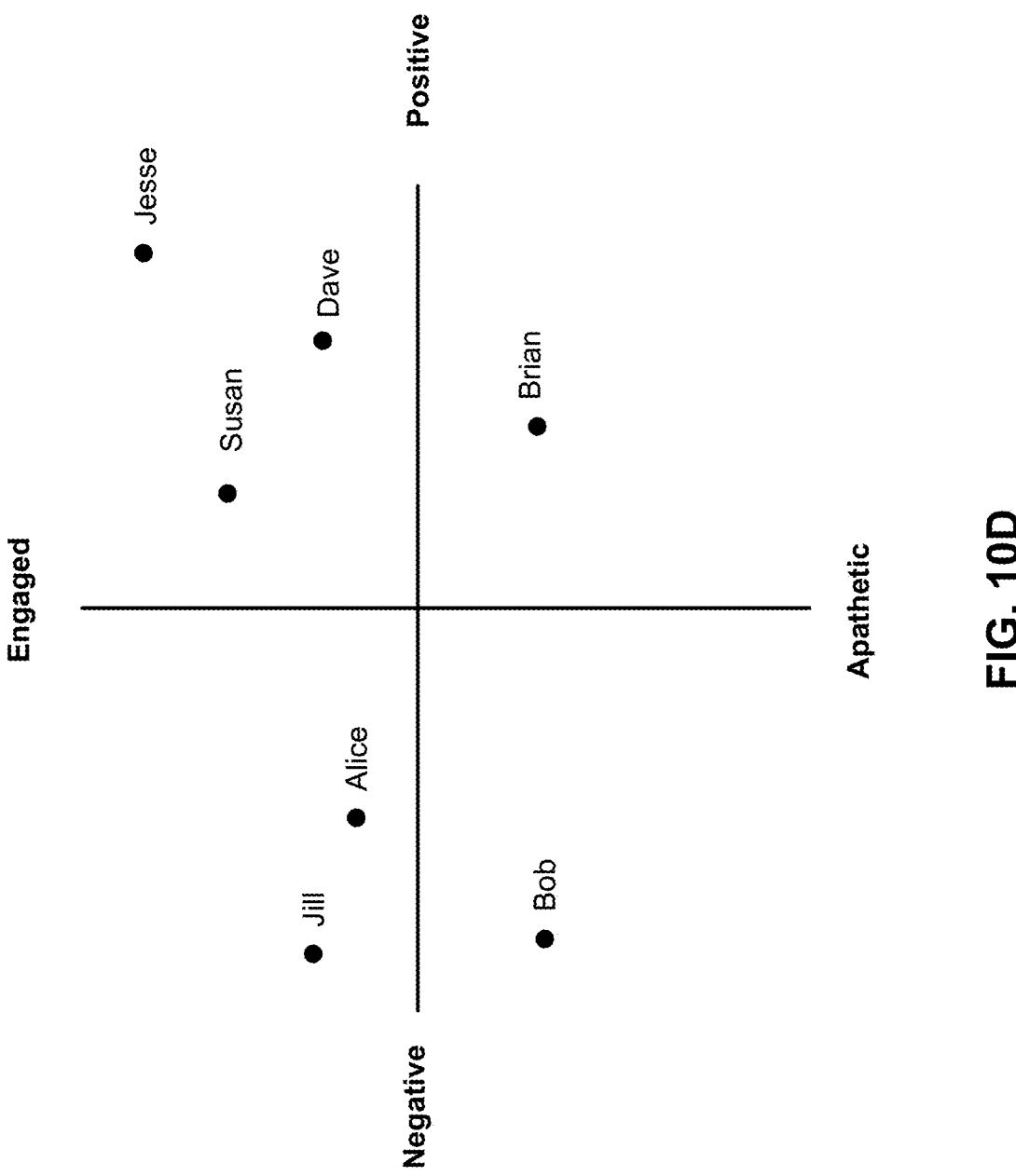

FIG. 10D shows that the same type of plot can also be used in smaller groups, such as a classroom or business meeting, and the names of individual participants can be labeled to show where individuals are in the chart.

Figures 11A, 11B:
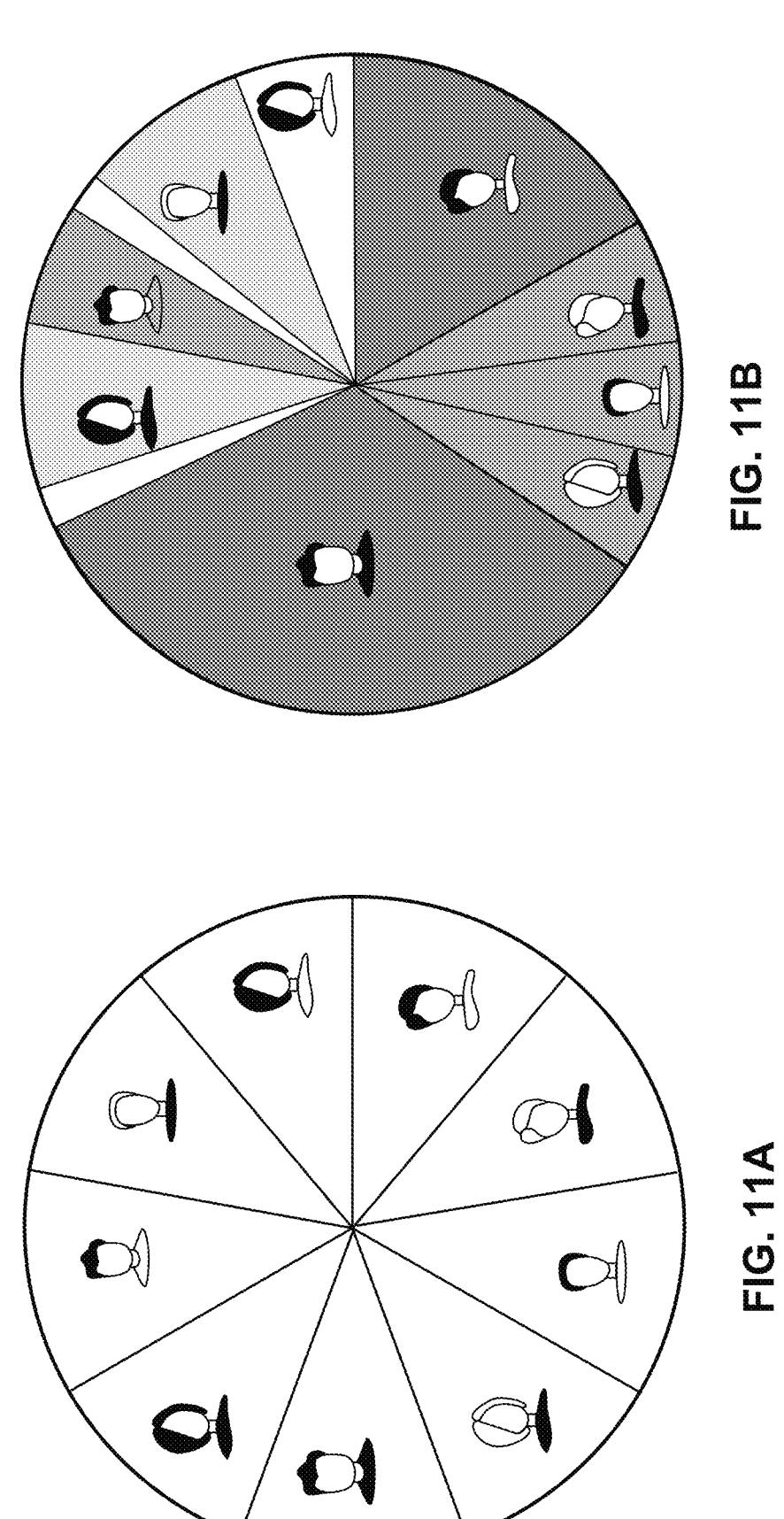
FIGS. 11A-11B illustrate examples of user interface elements showing charts of speaking time.

FIGS. 11A-11B illustrate examples of user interface elements showing charts of speaking time. These charts can be provided during a meeting and can be updated as the meeting progresses. At the beginning of the meeting, all participants have an expected or allotted speaking time. The view in FIG. 11A shows that speaking time is allotted equally to start for this meeting. Any time a speaker start going over their allotted time, their slice of the pie grows. Other members are visibly shows as being "squeezed out." After the meeting has progressed (e.g., 30 minutes later), the view in FIG. 11B shows that two people have dominated the conversation. The names of the people may be provided in the pie chart in addition to or instead of face images or icons. This speaking time graphic gives a clear visual of who may be dominating and who is not participating. In this example, all meeting attendees are given equal time, but they system could be altered to give varying amounts of time to each speaker as their allotted values. If members have not spoken at all during the meeting, their "slices" turn a certain color, e.g. purple, indicating that they have not used any of their allotted time. Attendees who have used part of their allotted time, but have time remaining may have this shown in the interface, such as with slices that are partly green and partly gray, indicating that the green portion of their allotted time that has been used and the gray remains.

Figure 12A:
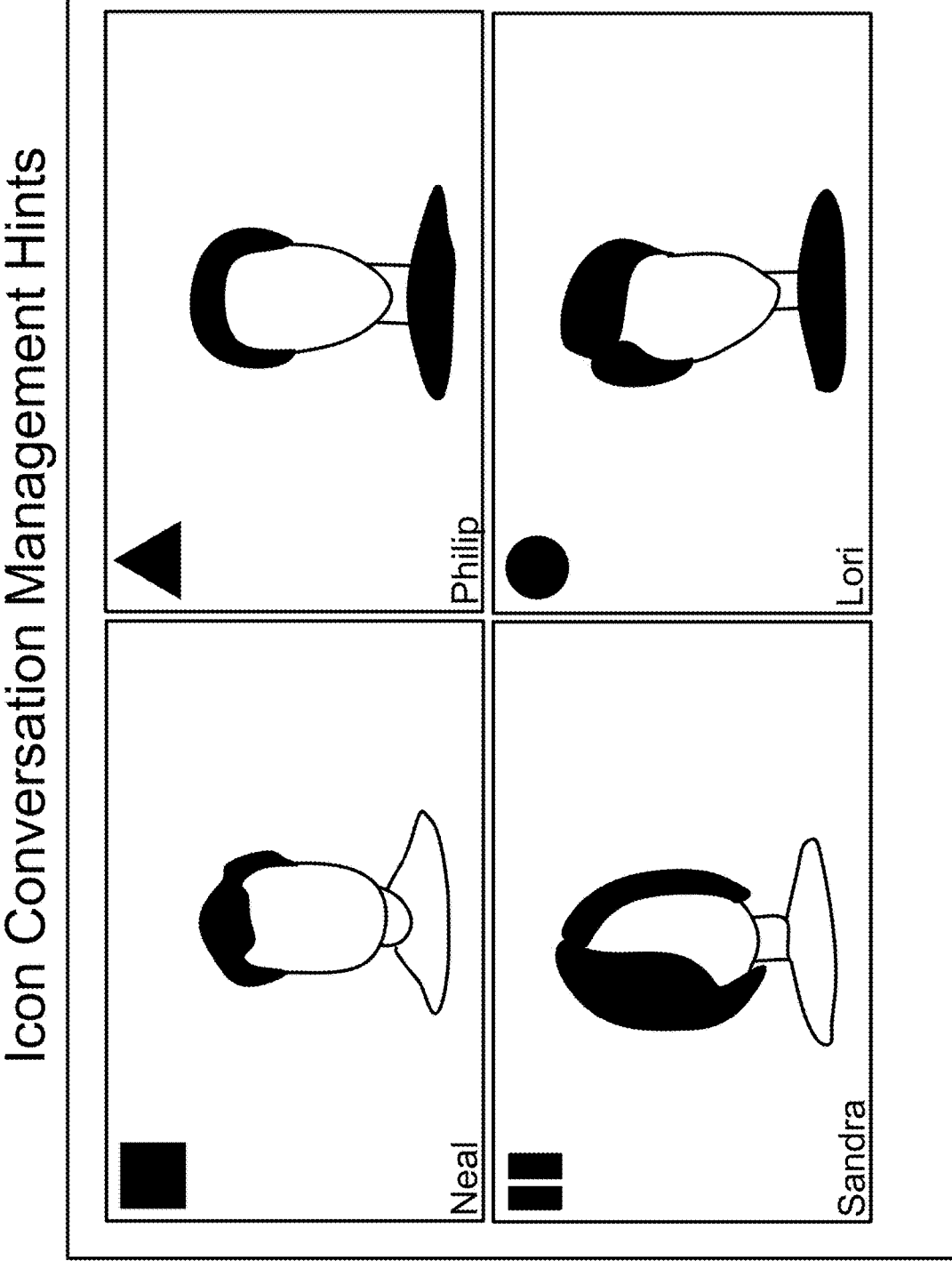
Figure 12B:
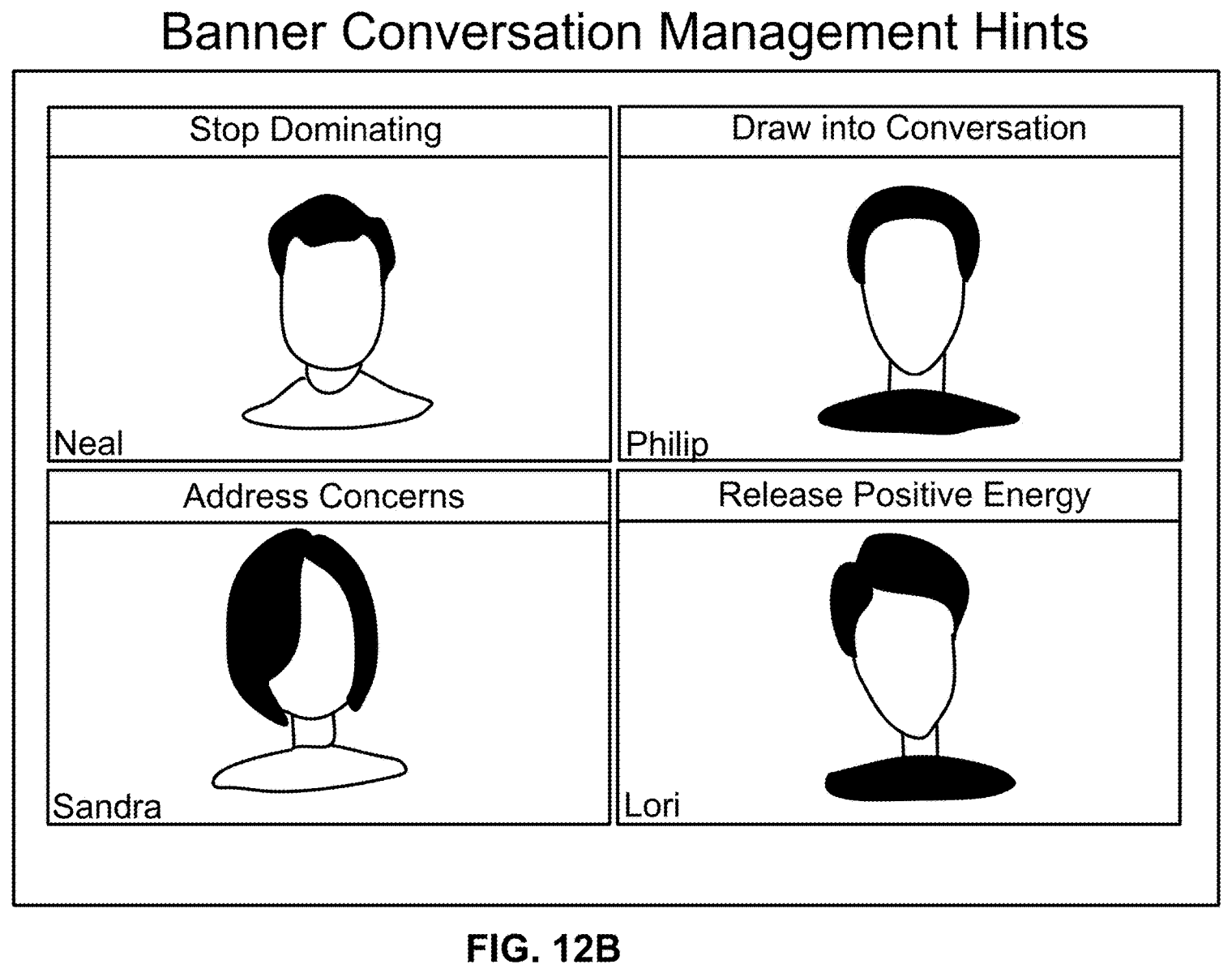
Figure 12C:
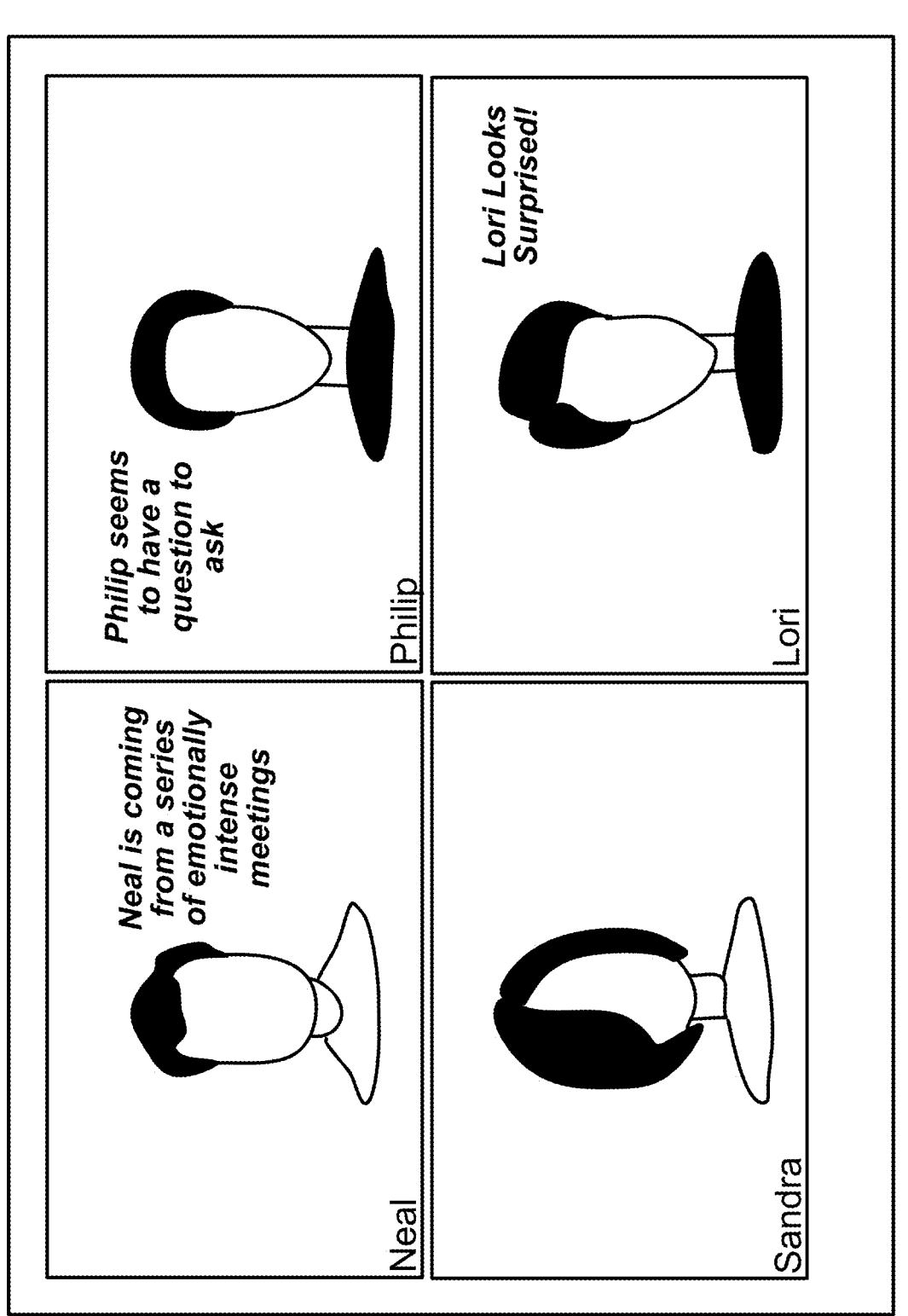

FIGS. 12A-12C illustrate example user interfaces showing insights and recommendations for video conferences. These interfaces show a few examples how the system can prompt a user about how he might better engage specific people or use information about a certain person to enhance collaboration in the meeting.

FIG. 12A shows recommendations for conversation management with icons in the upper left corner. The different shapes and/or colors can signal different needs. This view shows icons associated with actions that should be taken to address the needs of team members or to facilitate overall collaboration. For example, the square may indicate that the person needs to talk less (e.g., they are dominating the conversation or having a negative effect on others), a triangle may indicate that the person needs to be drawn into the conversation, etc. While there may be many more participants than can be comfortably displayed on the screen, the software can choose participants who should be addressed most urgently to be displayed. Participants who are performing well may not need to be displayed at the current moment. The data shown in this view may best be suited to be displayed only to the meeting facilitator. On an individual participant's screen, they would be shown an icon indicating the type of action they should take to maximize the group's success.

FIG. 12B show conversation management recommendations with banners above a person's video feed in the video conference. This view shows colored banners and text based suggestions of actions that should be taken to address the needs of team members or to facilitate overall collaboration. While there may be many more participants than can be comfortably displayed on the screen, the software can choose participants who should be addressed most urgently to be displayed. Participants who are performing well may not need to be displayed at the current moment. The data shown in this view may best be suited to be displayed only to the meeting facilitator. On an individual participant's screen, they would be shown an icon indicating the type of action they should take to maximize the group's success.

FIG. 12C shows a more general approach for facilitating conversations, where indicators from the system are provided and removed in real time with the flow of the conversation and detected events. For example, if the system detects that Philip has a question, the system can indicate "Philip seems to have a question to ask." If the system detects a micro-expression from a user, the system may indicate that and the indication can persists for some time (e.g., 30 seconds, one minute), much longer than the duration of the micro-expression (e.g., less than a second) so the person can address it. In the example detecting a brow raise can cause the system to indicate that the user Lori appears to be surprised.

Figure 13:
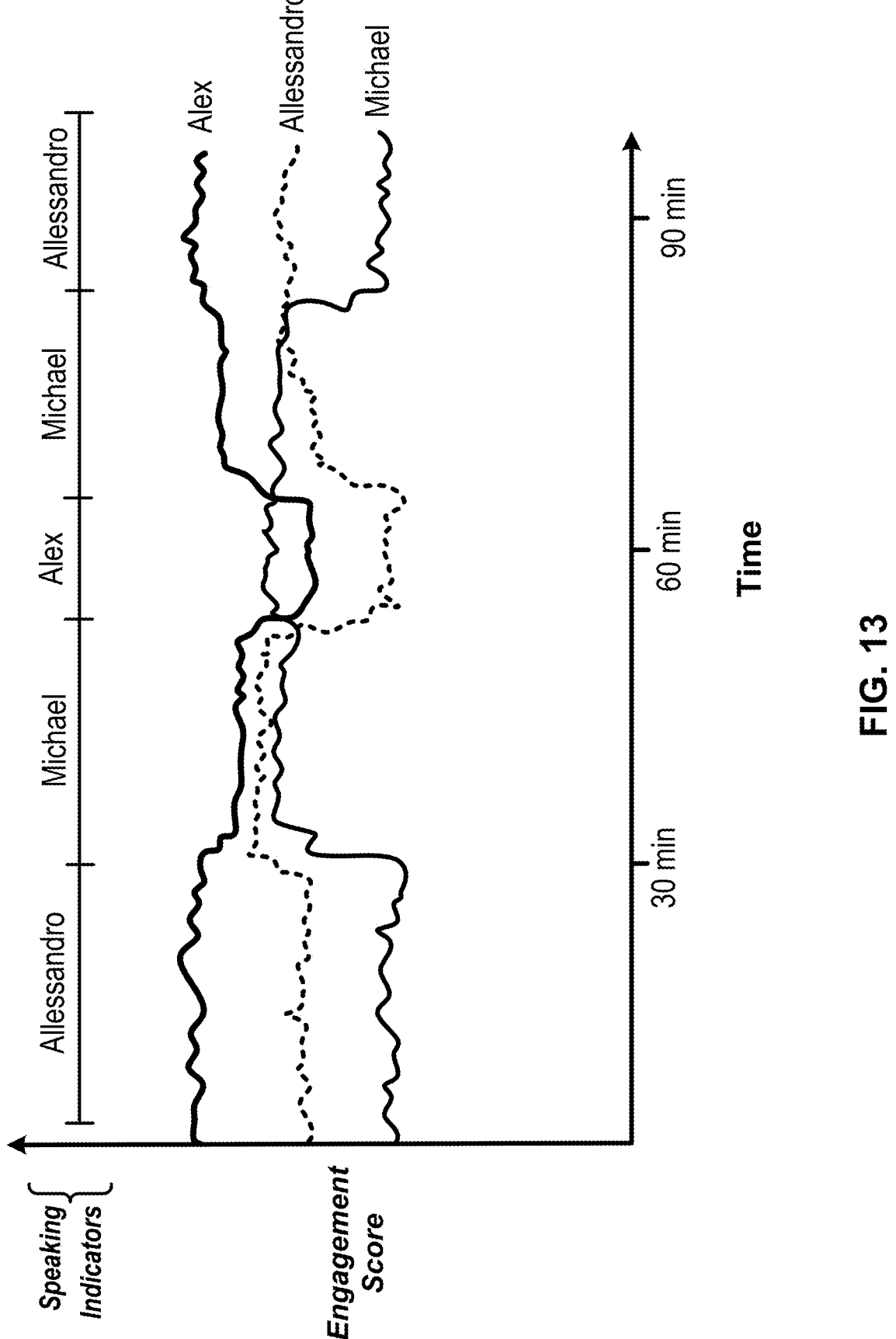
FIG. 13 shows a graph of engagement scores over time during a meeting, along with indicators of the periods of time in which different participants were speaking.

FIG. 13 shows a graph of engagement scores over time during a meeting, along with indicators of the periods of time in which different participants were speaking. This can be a real-time running chart that is shown and updated over the course of a video conference or other communication session. In the example, the horizontal axis shows time since the beginning of the meeting, the vertical axis shows the collaboration score or engagement score (or any other metric or analysis result of interest). Across the top of the graph, or in another chart, there can be an indicator of who was speaking at each time (e.g., the speaking indicators).

FIGS. 14A-14B illustrate examples of charts showing effects of users' participation on other users. Reports about a collaboration session can be provided after the session is over.

One example is a group collaboration report, which provides an overview of the total performance of the group and summary information for each individual. This report can include a final completed version of the real-time report (e.g., FIG. 13) from meeting beginning to meeting end. Another item is a pie chart indicating percentage of speaking time used by each participant (e.g., similar to FIG. 11B) including the data for the number of minutes spoken by each participant. Another item is a group average collaboration score for the entire meeting. Another example item for the report is a listing of individual participants and their average collaboration scores for the session with accompanying bar chart.

Figure 14:
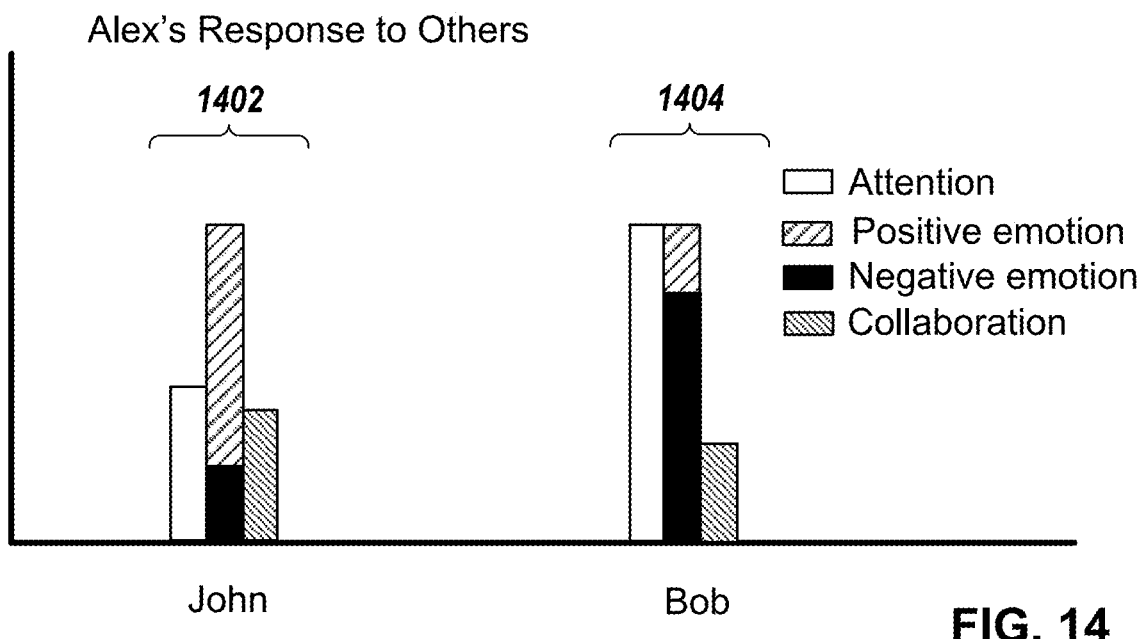
FIGS. 14 and 15 illustrate examples of charts showing effects of users' participation on other users.

An individual detailed report can include how a specific user interacted with other users in a collaboration session. This can include the charts of FIGS. 14A-14B for each participant. The individual report is intended to give additional details on an individual participant's performance. In general, the report for an individual can include: (1) a report similar to the real-time report but with only the collaboration score for the individual user being reported on, (2) total speaking time for the individual, (3) average collaboration score for the individual, and (4) an indication of the individual's response to other participants. This should be expressed as a bar chart including Attention, Positive Emotion, Negative Emotion, and Collaboration. The data shown will be the average data for the participant being analyzed during the times that various other participants were speaking. FIG. 14 shows this type of chart, with indicators for the amount of attention, positive emotion, negative emotion, and collaboration that the individual (e.g., "Alex") expressed when John was speaking (section 1402), and also the levels expressed when a different user, Bob, was speaking (section 1404).

The report for an individual can include information about other participants' responses to the individual. In other words, this can show how other people reacted when the user Alex was speaking. This chart, shown in FIG. 15, has the same format as the chart in FIG. 14, but instead of summarizing data about how the individual being analyzed reacted, it summarizes the data about reactions of the other participants, filtered to reflect the times that the individual being analyzed (e.g., Alex) was speaking.

Figure 16:
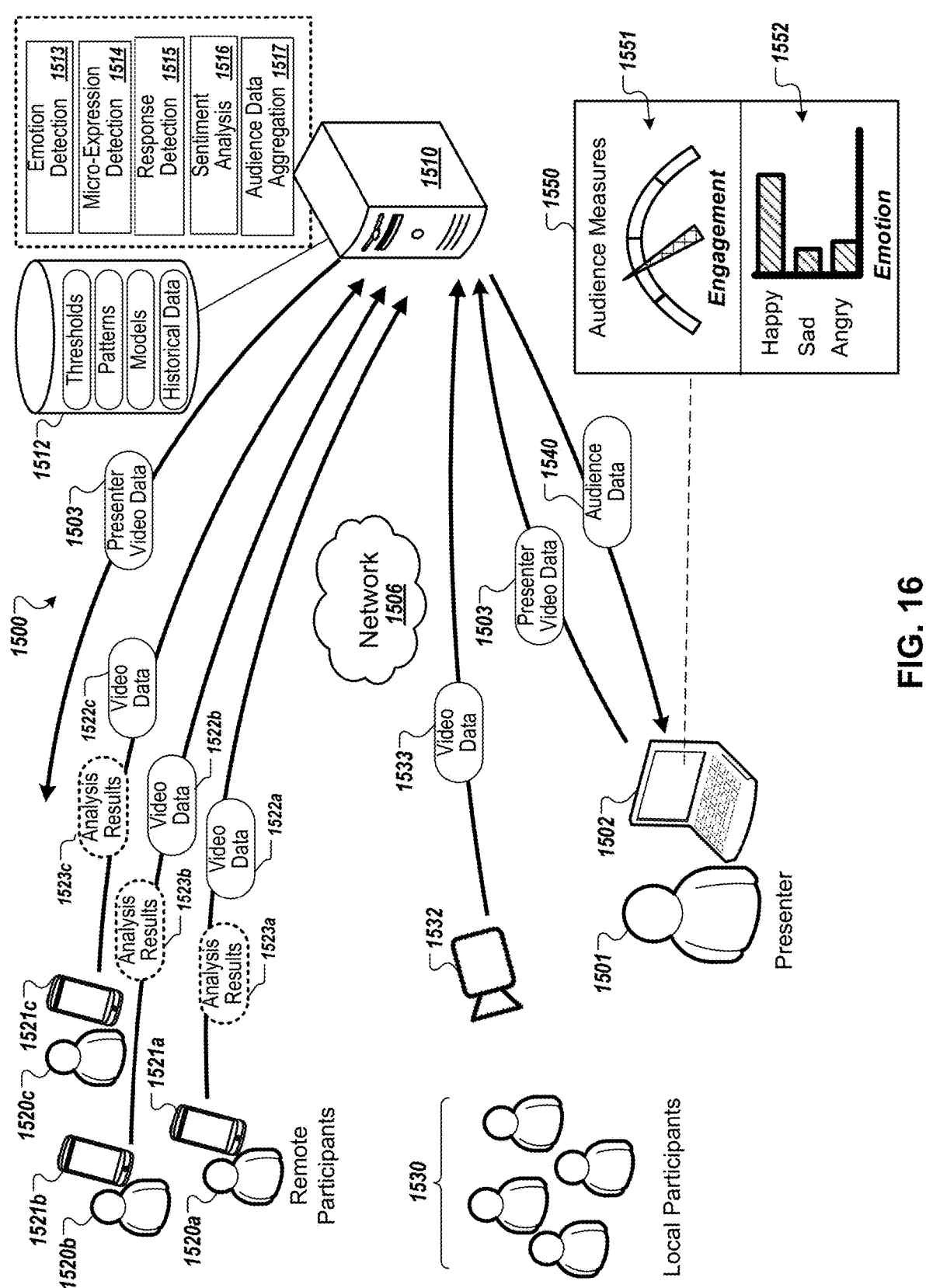
FIG. 16 illustrates a system that can aggregate information about participants in a communication session and provide the information to a presenter during the communication session.

FIG. 16 illustrates a system 1500 that can aggregate information about participants in a communication session and provide the information to a presenter during the communication session. For example, the system 1500 can provide indicators that summarize the engagement, emotions, and responses of participants during the communication session. The system 1500 can determine and provide indicators in a status panel, a dashboard, or another user interface to show the overall status of an audience that includes multiple participants, even dozens, hundreds, thousands of participants, or more. The system 1500 can add emotional intelligence to the communication session, giving a clear indication of the way the audience is currently feeling and experiencing the communication session.

The system's ability to gauge and indicate the state of users, e.g., emotional and/or cognitive state of the participants individually or as a group, can be very valuable to a teacher, lecturer, entertainer, or other type of presenter. The system can provide measures that show how an audience overall is reacting to or responding in a communication session. Many communication sessions include dozens or even hundreds of participants. With a large audience, the presenter cannot reasonable read the emotional cues from each member of the audience. Detecting these cues is even more difficult with remote, device-based, interactions rather than in-person interactions. To assist a presenter and enhance the communication session, the system can provide tools with emotional intelligence, reading verbal and non-verbal signals to inform the presenter of the state of the audience. By aggregating the information about the emotions, engagement, and other attributes of members of the audience, the system can provide a presenter or other user with information about the overall state of the audience which the presenter otherwise would not have. For example, the system can be used to assist teachers, especially as distance learning and remote educational interactions become more common. The system can provide feedback, during instruction, about the current emotions and engagement of the students in the class, allowing the teacher determine how well the instruction is being received and to better customize and tailor the instruction to meet students' needs.

In many cases, it is helpful for a presenter, teacher, speaker, or other member of a communication session to have information to gauge the state of the audience, e.g., the emotions, engagement (e.g., attention, interest, enthusiasm, etc.), and other information. In many situations, including remote interactions in particular, it is difficult for a presenter to understand the engagement and emotional responses of people in the audience. This is the case even for video interactions, where the small size of video thumbnails and large numbers of participants make it difficult for a presenter to read the audience. Even when the presenter and audience are in the same room, the presenter cannot always assess the audience, especially when there are large numbers of people (e.g., dozens of people, hundreds of people, etc.).

The system 1500 provides a presenter 1501 information about the emotional and cognitive state of the audience, aggregated from information about individual participants. During the communication session, a device 1502 of the presenter 1501 provides a user interface 1550 describing the state of the audience (e.g., emotion, engagement, reactions, sentiment, etc.). This provides the presenter 1501 real-time feedback during the communication session to help the presenter 1501 determine the needs of the audience and adjust the presentation accordingly. The information can be provided in a manner that shows indications of key elements such as engagement and sentiment among the audience, so the presenter 1501 can assess these at a glance. The information can also show how the audience is responding to different portions of the presentation. In an educational use, the information can show which topics or portions of a lesson are received. For example, low engagement or high stress may indicate that the material being taught is not being effectively received.

The communication session can be any of various types of interactions which can have local participants 1530, remote participants 1520*a*-1520*c*, or both. Examples of communication sessions include meetings, classes, lectures, conferences, and so on. The system 1500 can be used to support remote interactions such as distance learning or distance education, web-based seminars or webinars, video conferences among individuals, video conferences among different rooms or groups of participants, and so on. The system 1500 can also be used for local meetings, such as interactions in a conference room, a classroom, a lecture hall, or another shared-space setting. The system 1500 can also be used for hybrid communication sessions where some participants are in a room together, potentially with the presenter 1501 (e.g., in a conference room, classroom, lecture hall or other space), while other participants are involved remotely over a communication network 1506.

The system 1500 includes the endpoint device 1502 of the presenter 1501, a server system 1510, a communication network 1506, endpoint devices 1521*a*-1521*c* of the remote participants 1520*a*-1520*c*, and one or more cameras 1532 to capture images or video of local participants 1530. In the example, the presenter 1501 is in the same room with the local participants 1530 and additional remote participants 1520*a*-1520*c* each participate remotely from separate locations with their own respective devices 1521*a*-1521*c*.

In the example of FIG. 16, the presenter 1501 has an endpoint device 1502. The endpoint device 1502 may be, for example, a desktop computer, a laptop computer, a tablet computer, a mobile phone, a video conference unit, or other device. The presenter 1501 can provide any a variety of types of content to participants in the communication session, such as video data showing the presenter 1501, audio data that includes speech of the presenter 1501, image or video content, or other content to be distributed to participants. For example, the presenter may use the device 1502 to share presentation slides, video clips, screen-share content (e.g., some or all of the content on screen on the device 1502), or other content.

In some implementations, the presenter 1501 is an individual that has a role in the communication session that is different from other participants. In some implementations, the presenter 1501 is shown a different user interface for the communication session than other participants who do not have the presenter role. For example, the presenter 1501 may be provided a user interface 1550 that gives information about the emotional and cognitive state of the audience or group of participants as a whole, while this information is not provided to other participants 120*a*-120*c*, 130.

The presenter 1501 may be a person who is designated to present content to the rest of the participants in the communication session. The presenter 1501 may be, but is not required to be, an organizer, host, or moderator of the communication session, or may be someone who temporarily receives presenter status. The presenter 1501 may be a teacher or a lecturer who has responsibility for the session or has a primary role to deliver information during the session.

The presenter role may shift from one person to another through the session, with different people taking over the presenter role for different time periods or sections of the session. In some implementations, a moderator or other user can designate or change who has the presenter role, or the presenter role may be automatically assigned by the system to a user that is speaking, sharing their screen, or otherwise acting in a presenter role.

The device 1502 captures audio and video of the presenter 1501 and can send this audio and video data to the server system 1510, which can distribute the presenter video data 1503 to endpoint devices 1521*a*-1521*c* of the remote participants 1520*a*-1520*c* where the data 1503 is presented. The presenter video data 1503 can include audio data (such as speech of the presenter 1501). In addition to, or instead of, audio and video of the presenter 1501 captured by the device 1502, other content can be provided, such as images, videos, audio, screen-share content, presentation slide, or other content to be distributed (e.g., broadcast) to devices of participants in the communication session.

As the communication session proceeds, the system 1500 obtains information characterizing the user state, e.g., emotional and cognitive states, of the participants 1530, 1520*a*-1520*c* as well as reactions and actions of the participants. For example, one or more devices in the system 1500 perform facial expression analysis on video data or image data captured for the various participants.

The endpoint devices 1521*a*-1521*c* of the remote participants 1528-1520*c* can each capture images and/or video data of the face of the corresponding participant. The devices 1521*a*-1521*c* can provide respective video data streams 1522*a*-1522*c* to the server system 1510, which can perform facial image analysis and facial video analysis on the received video data 1522*a*-1522*c*. For example, the analysis can include emotion detection, micro-expression detection, eye gaze and head position analysis, gesture recognition, or other analysis on the video.

In some implementations, the endpoint devices 1521*a*-1521*c* may each locally perform at least some analysis on the video data they respectively generate. For example, each device 1521*a*-1521*c* may perform emotion detection, micro-expression detection, eye gaze and head position analysis, gesture recognition, or other analysis on the video it captures. The devices 1521*a*-1521*c* can then provide the analysis results 1523*a*-1523*c* to the server system 1510 in addition to or instead of the video data 1522*a*-1522*c*. For example, in some cases, such as a web-based seminar with many participants, video of participants may not be distributed and shared among participants or even to the presenter 1501. Nevertheless, each of the devices 1521*a*-1521*c* can locally process its own captured video and provide scores indicative of the user state, e.g., emotional or cognitive state, of the corresponding participant to the server system 1510, without needing to provide the video data 15221-1522*c*.

The local participants 1530 are located together in a space such as a room. In the example, they are located in the same room (such as a classroom or lecture hall) with the presenter 1501. One or more cameras 1532 can capture images and/or video of the local participants 1530 during the communication session. Optionally, a computing device associated with the camera(s) 1532 can perform local analysis of the video data 1533, and may provide analysis results in addition to or instead of video data 1533 to the server system 1510.

The server system 1510 receives the video data 1522*a*-1522*c*, 1533 from the participants, and/or analysis results 1523*a*-1523*c*. The server system 1510 can perform various types of analysis on the video data received. For each video stream, the server system 1510 may use techniques such as emotion detection 1513, micro expression detection 1514, response detection 1515, sentiment analysis 1516, and more.

The server system 1510 has access to a data repository 1512 which can store thresholds, patterns for comparison, models, historical data, and other data that can be used to assess the incoming video data to generate user state data. For example, the server system 1510 may compare characteristics identified in the video to thresholds that represent whether certain emotions or cognitive attributes are present, and to what degree they are present. As another example, sequences of expressions or patterns of movement can be determined from the video and compared with reference patterns stored in the data storage 1512. As another example, machine learning models can receive image data directly or feature data extracted from images in order to process that input and generate output indicative of cognitive and emotional attributes. The historical data can show previous patterns for the presenter, the participants, for other communication sessions, and so on, which can personalize the analysis for individuals and groups.

The results of the analysis can provide participant scores for each of the participants 1520a-1520c, 1530. The participant scores can be, but are not required to be, collaboration factor scores 140 as discussed above. The participant scores can measure (e.g., quantify) emotional or cognitive attributes, such as indicating the detected presence of different emotions, behaviors, reactions, mental states, and so on. In addition, or as an alternative, the participant scores can indicate the degree, level, or intensity of attributes, such as a score along a scale that indicates how happy a participant is, how angry a participant is, how engaged a participant is, the level of attention of a participant, and so on. The system 1500 can be used to measure individual attributes or multiple different attributes. The analysis discussed here may be performed by the devices of the respective participants 1520a-1520c or by the endpoint device 1502 for the presenter 1501 in some implementations. For example, the analysis data 1523a-1523c may include the participant scores so that the server system 1510 does not need to determine them, or at least determines only some of the participant scores.

The participant scores provide information about the emotional or cognitive state of each participant 1520a-1520c, 1530. The server system 1510 uses an audience data aggregation process 1517 to aggregate the information from these scores to generate an aggregate representation for the group of participants (e.g., for the audience as a whole, or for groups within the audience). This aggregate representation may combine the information from participant scores for many different participants. The aggregate representation may be a score, such as an average of the participant scores for an emotional or cognitive attribute. One example is an average engagement score across the set of participants 1520a-1520c, 1530. similar scores can be determined for other attributes, to obtain and aggregate score or overall measure across multiple participants for happiness, for sadness, for anger, for attention, for boredom, or for any other attributes measured. In general, the emotional or cognitive state of a participant can include the combination of emotional and cognitive attributes present for that participant at a given time, although the participant scores may describe only one or more aspects or attributes for the overall state.

The server system 1510 may determine other forms of aggregate representations. For example, the server system may determine scores or measures for subjects within the audience, such as groups were clusters having similar characteristics. For example, the server system 1510 can use the participant scores for different emotional and cognitive attributes to determine groups of participants having similar overall emotional or cognitive states. As another example, the server system 1510 may determine a representation of the states of local participants 1530 and another representation for the states of remote participants 1520a-1520c.

The aggregate representation can include data for a visualization such as a chart, graph, plot, animation, or other visualization. In some cases, the aggregate representation may provide more than a simple summary across the entire audience, and may instead show the characteristics of groups within the audience, such as to show the number of people in each of different emotional or cognitive state categories. As a simple example, the aggregate representation may indicate the number of participants in each of three categories respectively representing high engagement, moderate engagement, and low engagement. In another example, the representation may include indications of the individuals in different groups or states, such as by grouping names, face images, video thumbnails, or other identifying information for participants in a group.

When the server system 1510 has aggregated the data for the participants, the server system 1510 provides audience data 1540 that includes the aggregated information to the presenter's device 1502. This audience data 1540 can include a score to be indicated, such an engagement score for the audience, a sentiment score for the audience, a happiness score, etc. The audience data 1540 may include other forms of an aggregate representation, such as data for charts, graphs, animations, user interface elements, and other displayable items that describe or indicate the emotional or cognitive states of participants, whether for individual emotional or cognitive attributes or for a combination of attributes. The presenter's device 1502 uses the audience data 1540 to present a user interface 1550 that displays the aggregate representation to indicate the state of the audience.

The user interface 1550 can provide various indications of the state of the audience. For example, one element 1551 shows a dial indicating the level of engagement for the audience as a whole. Another user interface element 1552 shows a chart including indicators of the average levels of different emotions across the set of participants in the communication session. The user interface elements 1551 and 1552 are based on aggregate information for the participants in the communication session. As a result, the user interface 1550 shows overall measures of the state of the participants and their overall current response to the presentation. The system 1500 adjusts the measures indicated in the user interface 1550 over the course of the presentation, so that the user interface 1550 is updated during the communication session, substantially in real time, to provide an indication of the current state of the audience.

While the example of FIG. 16 shows current measures of emotional or cognitive states of participants, the system can be used to additionally or alternatively provide indicators of prior or predicted future emotional or cognitive states. For example, the system can track the levels of different emotional or cognitive attributes and show a chart, graph, animation, or other indication of the attributes previously during the communication session, allowing the presenter 1501 to see if and how the attributes have changed. Similarly, the system can use information about how the communication session is progressing, e.g., the patterns or trends in emotional and cognitive attributes, to give a prediction regarding the emotional or cognitive states in the future. For example, the system may detect a progression of the distribution of emotional or cognitive states from balanced among various categories toward a large cluster of low-engagement states, and can provide an alert or warning that the audience may reach an undesirable distribution or engagement level in the next 5 minutes if the trend continues. More advanced predictive techniques can use machine learning models trained based on examples of other communication sessions. The models can process audience characteristics, current emotional and cognitive states, progressions of the emotional and cognitive states during the communication session, and other information to predict the likely outcomes, such as the predicted aggregate scores for the audience, for upcoming time periods, e.g., 5 minutes or 10 minutes in the future.

Many other types of interfaces can be used to provide information about the current state of the audience. For example, the interfaces of FIG. 9A-9C and FIGS. 10A-10D each provide information about aggregate emotional and cognitive states of the participants, e.g., with indicators showing: attribute levels for the audience as a whole (FIG. 9A); groups of participants organized by their cognitive or emotional states (FIG. 9B); showing ranking or ordering of participants, or assigning them to categories, according to a measure (FIG. 9C), which may be based on the detected cognitive or emotional states; and charting or graphing one or more emotional or cognitive attributes of participants, potentially showing clusters of participants (FIGS. 10A-10D). Other types of user interface elements to provide aggregate representations for an audience are also shown in FIG. 17.

Figure 17:
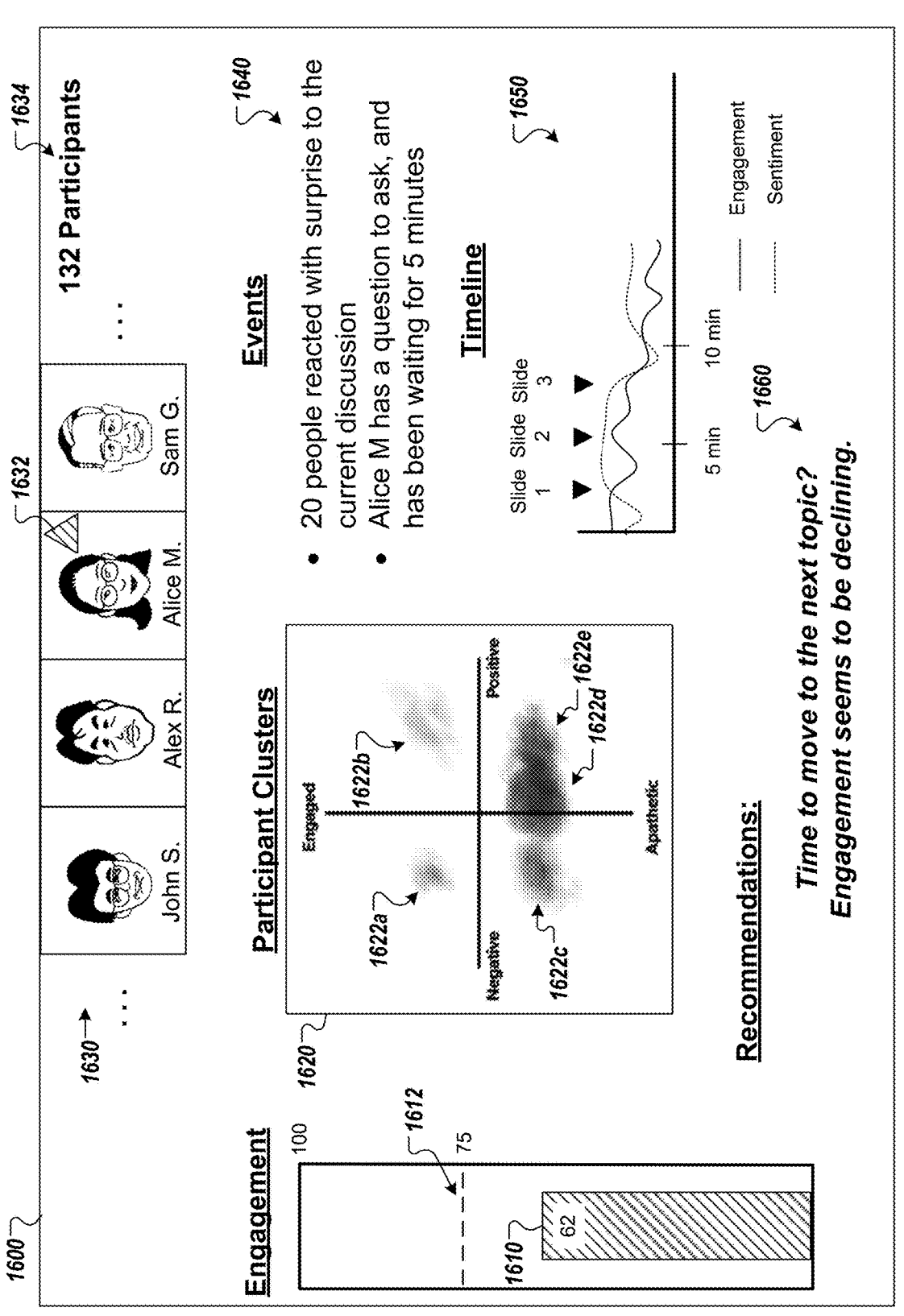
FIG. 17 shows an example of a user interface that displays information for various aggregate representations of emotional and cognitive states of participants in a communication session.

FIG. 17 shows an example of a user interface 1600 that displays information for various aggregate representations of user states, e.g., emotional and cognitive states, of participants in a communication session, such as a lecture, class, web-based seminar, video conference, or other interaction. The information in the user interface 1600 can provide information about the audience as a whole, for subsets or groups within the audience, and/or for individual participants.

The user interface 1600 includes an engagement indicator 1610, which shows a level of engagement determined for the set of participants in the communication session as a whole. In the example, the indicator 1610 is a bar chart with the height of the rectangle indicating the level of engagement on a scale from 0 to 100. The system may also set the color of the indicator 1610 to indicate the level of engagement. In this case, the engagement score for the set of participants as a whole has a value of 62, and so the height of the indicator 1610 is set to indicate this level of engagement. In addition, the value of the engagement score for the audience, e.g., 62, is displayed.

The indicator 1610 is also provided with a corresponding reference 1612 for comparison. The reference 1612 can be, for example, a target level of engagement that is desired, a recommended level of engagement, a goal to reach, an average value or recent value of the engagement score for the current communication session, an average for a prior communication session (such as for the presenter or class), a high-water mark level of engagement for the current communication session showing the highest level achieved so far, and so on. The reference level 1612 provides an easy-to-see reference for how the engagement level compares to an objective measure. This can inform a presenter whether engagement is at or near a target level, if engagement has declined, or if another condition is present.

Another type of aggregate representation can provide information about clusters of participants. For example, an example graph 1620 plots the positions of many different participants with respect to axes respectfully representing engagement and sentiment (e.g., emotional valance). In this case, the chart 1620 shows various clusters 1622a-1622e of participants, where each cluster represents a group of participants having a generally similar emotional or cognitive state. In this case, the clusters are naturally occurring results of plotting the states of participants in the chart 1620. In other implementations, the system may actively group or cluster the participants according to their states, such as by determining which states are most common and defining clusters based on certain combinations of characteristics or ranges of scores.

Region 1630 shows identifying information, such as images, video streams, names, etc., for a subset of the participants in the communication session. In some cases, the set of participants shown can be selected to be representative of the emotional and cognitive states present among the audience. As a result, the information identifying participants in region 1630 can itself be an aggregate representation of the state of the audience. For example, if there are 100 participants and 80 of them are happy and engaged while 20 are bored and disengaged, the region 1630 may show 4 video streams of participants in the "happy and engaged" category along with one video stream selected from the "board and disengaged" category. As a result, the region 1630 can show a group of people that provides a representative sampling of emotional or cognitive states from among the participants.

The region 1630 maybe used to show other types of information. For example, the system may choose the participants to show based on the reactions of participants, such as showing examples of faces that the system determines to show surprise, delight, anger, or another response. Responses can be determined by, for example, detection of the occurrence of a gesture, such as a micro-expression, or a change in emotional or cognitive state of at least a minimum magnitude over a period of time. As another example the system may show people that the system determines may need attention of the presenter, such as people that the system determines are likely to have a question to ask, people who are confused, people who are ready to contribute to the discussion if called on, and so on. In some cases, indicators such as the indicator 1632 may be provided along with identifying information for a participant to signal to the presenter (e.g., the viewer of the user interface 1600) the condition of that participant.

The indicator 1634 indicates the number of participants currently in the communication session.

An events region 1640 shows actions or conditions that the system determined to have occurred during the communication session. For example, in this case the events region 1640 shows that a group of people reacted with surprise to a recent statement, and that a person has a question to ask and has been waiting for 5 minutes. The events region 1640, as well as the other indicators and information presented in the user interface 1600, is updated in an ongoing manner during the communication session.

A region 1650 shows a how certain characteristics are states of the audience have progressed over time during the communication session. For example, the region 1650 shows a timeline graph with two curves, one showing engagement for the audience as a whole and another showing sentiment for the audience as a whole. As the communication session proceeds, those curves are extended, allowing the presenter to see the changes over time and the trends in emotional or cognitive states among the audience. In the example, the graph also includes indicators of content or topics provided are shown on the graph, e.g., with indicators marking the times that different presentation slides (e.g., "slide one," "slide two," and "slide three") were initially displayed. As a result, the user interface 1600 can show how the audience is responding to, and has responded to, different content of the communication session, whether spoken, as presenter video, media, broadcasted text or images, and so on.

Other types of charts, graphs, animations, and other visualizations may be provided. For example, a bar chart showing the number of participants in each of different groups may be presented. The groups may represent participants grouped by certain participant characteristics (e.g., being from different organizations; being in different offices or geographical areas; different ages, different genders, or other demographic attributes, etc.). As another example, a line graph may show the changes in and progression in one or more emotional or cognitive attributes among different groups or clusters in the audience. The grouping of clustering of participants may be done based on the participation or emotional or cognitive state in the communication session or may be based on other factors, such as demographics, academic performance, etc. For example, one line may show engagement among men in the audience and another line may show engagement and among women in the audience. As another example, a chart may show the average level of engagement of students in a high-performing group of students and the average level of engagement of students in a low-performing group.

The region 1660 shows recommendations that the system makes based on the emotional or cognitive state of the participants. In this case, the system determines that engagement is low and/or declining (which can be seen from the low-engagement clusters 1622c-1622e of element 1620, engagement indicator 1610, and the chart in region 1650), based on the distribution of emotional or cognitive states among the participants, and potentially on other factors such as the pattern of change in emotional or cognitive attributes and the composition of the audience, the system selects a recommendation. In this case, the recommendation is for the presenter to move to another topic. The recommendation can be based on results of analysis of prior communication sessions, output of a machine learning model trained based on prior sessions, or other data that can help the system recommend actions that have achieved a target result. The recommendation can be based on results of analysis of prior communication sessions, output of a machine learning model trained based on prior sessions, or other data that can help the system recommend actions that have achieved a target result, such as increasing and overall level of engagement, in similar situations or contexts (e.g., similar types and sizes of participant clusters, similar emotional or cognitive state distributions, similar progressions of one or more attributes over time, etc.) for other communication sessions. The recommendations are another example of the way that the system enhances the emotional intelligence of the presenter. The system, through the user interface 1600, inform the presenter of the emotional context and state of the audience. The system can also provide recommendations for specific actions, customized or selected for the particular emotional context and state of the audience, that allow the presenter to act in an emotionally intelligent way. In other words, the system guides the presenter to appropriately respond to and address the needs of the audience due to the emotions and experience at the current time, even if the presenter does not have the information or capability perceive and address those needs.

While various of the indicators in the user interface 1600 show aggregate information for the entire audience as a whole, her user interface may optionally show information for subsets or even individual participants.

FIG. 18 is a flow diagram describing a process 1700 of providing aggregate information about the emotional or cognitive states of participants in a communication session. The method can be performed by one or more computing devices. For example, the process 1700 can be performed by a server system, which can combine information about multiple participants and generate and send an aggregate representation of the state of the participants to an endpoint device for presentation. As another example, the process 1700 can be performed by an endpoint device, which can combine information about multiple participants and generate and present an aggregate representation of the state of the participants. In some implementations, the operations are split among a server system and a client device.

The process 1700 includes obtaining a participant score for each participant in a set of multiple participants in a communication session (1702). The participant scores can be determined during the communication session based on image data and/or video data of the participants captured during the communication session. The participant scores can each be based on facial image analysis or facial video analysis performed using image data or video data captured for the corresponding participant.

The participant scores can each indicate characteristics of an emotional or cognitive state of the corresponding participant. In general, the term emotional or cognitive state is used broadly to encompass the feelings, experience, and mental state of a person, whether or not consciously recognized by the person. The participant score can be indicative of emotions, affective states, and other characteristics of the person's perception and experience, such as valence (e.g., positive vs. negative, pleasantness vs. unpleasantness, etc.), arousal (e.g., energy, alertness, activity, stimulation, etc.). For example, the participant score can indicate the presence of, or a level or degree of, a particular emotion, such as anger, fear, happiness, sadness, disgust, or surprise. A participant score may indicate the presence of, or a level or degree of, a more complex emotion such as boredom, confusion, frustration, annoyance, anxiety, shock, contempt, contentment, curiosity, or jealousy. A participant score may similarly indicate the presence of, or a level or degree of, cognitive or neurological attributes such as engagement, attention, distraction, interest, enthusiasm, and stress. Some aspects of the state of the person, such as participation and collaboration, may include emotional, cognitive, and behavioral aspects.

Depending on the implementation, a participant score may be obtained to describe a single aspect of a participant's emotional or cognitive state, or multiple participant scores may be determined for multiple aspects of the participant's emotional or cognitive state. For example, a vector can be determined that provides a score for each of various different emotions. In addition, or as an alternative, a score for each of engagement, attention, and stress can be determined.

The participant scores can be determined through analysis of individual face images and/or a series of face images in video segment (e.g., showing facial movements, expressions, and progression over time). The participant scores can be determined by providing face image data and/or feature values derived from face image data to trained machine learning models. The model can be trained to classify or score aspects of the emotional or cognitive state of a person from one or more face images, and can output a score for each of one or more aspects of the state of the person (e.g., a score for happiness, fear, anger, engagement, etc.). The models may also receive information input information such as an eye gaze direction, a head position, and other information about the participant.

The scores may be expressed in any appropriate way. Examples of types of scores include (1) a binary score (e.g., indicating whether or not an attribute is present with at least a threshold level); (2) a classification (e.g., indicating that an attribute is in a certain range, such as low happiness, medium happiness, or high happiness); (3) a numerical value indicating a level or degree of an attribute (e.g., a numerical value along a range, such as a score for happiness of 62 on a scale from 0 to 100). Other examples include probability scores or confidence scores (e.g., indicating a likelihood of an attribute being present or being present with at least a threshold level of intensity or degree), relative measures, ratios, and so on.

The participant scores can be determined by any of various computing devices in a system. In some implementations, the device that captures the video of a participant may generate and provide the scores, which are then received and used by a server system or the endpoint device of a presenter. In other implementations, devices of participants provide image data or video data to the server system, and the server system generates the participant scores. In other implementations, video data may be provided to the endpoint device of the presenter, and the presenter's device may generate the participant scores. As discussed above, the techniques for generating the participant scores include pattern matching, processing image or video data (or features derived therefrom) using one or more machine learning models, and so on The process 1700 includes using the participant scores to generate an aggregate representation of the emotional or cognitive states of the set of multiple participants (1704). In other words, the representation can combine information about the emotional or cognitive states of a group of multiple people, such as to summarize or condense the information into a form that describes one or more emotional or cognitive characteristics for the group. For example, the representation can provide an overall description of the state of an audience (e.g., the set of participants), whether the audience is local, remote, or both. The representation can indicate a combined measure across the set of participants. As another example, the representation can indicate a representative state (e.g., a typical or most common state) present among the participants. The representation may describe a single aspect of the emotional or cognitive states of the participants (e.g., a measure of enthusiasm, attention, happiness, etc.) or may reflect multiple aspects of the emotional or cognitive states.

The representation can be a score, such as an average of the participant scores for an attribute (e.g., an average engagement score, and average happiness score, etc.). The score can be a binary score, a classification label, a numerical value, etc. An aggregate score may be determined in any of various ways, such as through an equation or function, a look-up table, a machine learning model (e.g., that receives the participant scores or data about the set of participant scores and outputs a score as a result), and so on.

The representation may be another type of information based on the participant scores, such as a measure of central tendency (e.g., mean, median, mode, etc.), a minimum, a maximum, a range, a variance, a standard deviation or another statistical measure for the set of participant scores. As another example, the aggregate score can be a measure of participant scores that meet certain criteria, such as a count, ratio, percentage, or other indication of the amount of the participant scores that satisfy a threshold or fall within a range. The representation can indicate a distribution of the participant scores, such as with percentiles, quartiles, a curve, or a histogram. The representation can be a score (e.g., a value or classification) of the distribution of the participant scores, such as whether the distribution matches one of various patterns or meets certain criteria. The representation can include a chart, a graph, a table, a plot (e.g., scatterplot), a heatmap, a treemap, an animation, or other data to describe the set of participant scores. In some cases, the representation can be text, a symbol, an icon, or other that describes the set of participant scores.

When providing output data that includes or indicates the aggregate representation, this can be done as providing data that, when rendered or displayed, provides a visual output of the chart, graph, table, or other indicator. The data may be provided in any appropriate form, such as numerical values to adjust a user interface element (e.g., such as a slider, dial, chart, etc.), markup data specifying visual elements to show the aggregate representation, image data for an image showing an aggregate representation, and so on. In some cases, the system can cause the presenter to be notified of the aggregate representation (e.g., when it reaches a predetermined threshold or condition) using an audio notification, a haptic notification, or other output.

The aggregate representation can include a ranking or grouping of the participants. For example, the participants may be ranked or ordered according to the participant scores. In addition or as an alternative, the participants can be grouped or clustered together according to their participant scores into groups of people having similar or shared emotional or cognitive attributes. A group of 100 participants may have 20 in a low engagement group, 53 in a medium engagement group, and 27 in a high engagement group. An aggregate representation may indicate the absolute or relative sizes of these groups (e.g., a count of participants for each group, a ratio for the sizes of the groups, a list of names of people for each group, etc.). The groups or clusters that are indicated may be determined from the emotional or cognitive states indicated by the participant scores rather than simply showing measures for each of various predetermined classifications. For example, analysis of the set of participant scores may indicate that there is a first cluster of participants having high engagement and moderate happiness levels, a second cluster of participants having moderate engagement and low fear levels, and a third cluster with low engagement and low anger levels. The representation can describe these clusters, e.g., their size, composition, relationships and differences among the groups, etc., as a way to demonstrate the overall emotional and cognitive characteristics of the set of participants.

The technology can be used with communication sessions of various different sizes, e.g., just a few participants, or 10 or more, or 100 or more, or 1000 or more. As a result, the aggregate representation can be based on any number of participants (e.g., 10 or more, 100 or more, 1000 or more, etc.).

Various features of the technology discussed herein facilitate the data of large and even potentially unlimited numbers of participants being aggregated and provided. For example, when participants send their video feeds to a server system such as the server system 1510, the server system 1510 can use processes to examine the video streams in parallel to detect and measure emotion, engagement and other attributes of the state of each participant. The server system 1510 may use many different processors or computers to do this, including using scalable cloud-computing computing resources to dynamically expand the number of computers or central processing units (CPUs) tasked for processing the video streams, as may be needed. Similarly, the server system 1510 may coordinate the video streams to be sent to different servers or network addresses to increase the total bandwidth to receive incoming video streams. Other techniques can be used to reduce the bandwidth and computation used for large communication sessions. For example, participant devices can send compressed and/or downscaled video streams to reduce bandwidth use. In addition, or as an alternative, the emotion detection does not need to process every frame of each video stream, and may instead analyze a sampling of frames from each video stream (e.g., analyzing one out of every 5 frames, or one out of every 30 frames, etc.) or cycle through different video streams (e.g., in a round robin fashion) to reduce the computational demands of the detection and measurement of emotional or cognitive states from the video streams.

As another example, the use of distributed processing also allows data for large numbers of participants to be monitored and aggregated with low computational and bandwidth requirements for the server system 1510 and the presenter's device 1502. As shown in FIG. 16, the devices 1521*a*-1521*c* of remote participants 1520*a*-1520*c* can each perform analysis locally on the video streams of their respective remote participants, and the analysis results 1523*a*-1523*c* can include participant scores indicating detected levels of emotion, engagement, attention, stress, and other attributes or components of a participant's emotional or cognitive state. Because the video analysis is distributed and handled by each participant's own device, the marginal computational cost to add another participant's data to the data aggregation is small or even negligible. The server system 1510, or even a presenter's device 1502, may aggregate hundreds, thousands, or even millions of scores without being overburdened, especially if done periodically (e.g., once every second, every 5 seconds, every 10 seconds, etc.). For example, determining an average of a hundred, a thousand, or a million integer scores for an emotional or cognitive attribute (e.g., happiness, sadness, engagement, attention, etc.) is very feasible in this scenario.

As a result, whether the number of participants being monitored is in the range of 2-9 participants, 10-99 participants, 100-999 participants, or 1000-9,999 participants, or 10,000+ participants, the techniques herein can be effectively used to generate, aggregate, and provide indications of the emotional or cognitive states for individuals, groups, and the audience as a whole.

The process 1700 includes providing, during the communication session, output data for display that includes the aggregate representation of the emotional or cognitive states of the set of multiple participants (1706). For example, a server system can provide output data for the aggregate representation to be sent over a communication network, such as the Internet, to an endpoint device. As another example, if the aggregate representation is generated at an endpoint device, that device may provide the data to be displayed at a screen or other display device. The output data can be provided for display by an endpoint device of a speaker or presenter for the communication session. As another example, the output data can be provided for display by an endpoint device of a teacher, and the set of multiple participants can be a set of students.

The aggregate representation can be provided and presented in various different ways. For example, if the representation is a score, such as an overall level of engagement among the set of participants (e.g., an average of participant scores indicating engagement levels), the score itself (e.g., a numerical value) may be provided, or an indicator of the level of engagement the score represents can be provided, e.g., a symbol or icon, text (e.g., "high," "medium," "low," etc.), a graphical element (e.g., a needle on a dial, a marked position along a range or scale, etc.), a color for a color-coded indicator, a chart, a graph, an animation, etc.

A few examples include indicators for sentiment, engagement, and attention as shown in FIG. 9A. Another example includes grouping the participants into categories or classifications (e.g., participating, dominating, disengaged, concerned, etc.) and showing the membership or sizes of each group as shown in FIG. 9B. Another example is the ranking of participants along a scale or showing groupings of them as shown in FIG. 9C. Additional examples are shown in FIGS. 10A-10D, where a scatterplot shows the positions of different participants with respect to different emotional or cognitive attributes, allowing multiple dimensions of attributes to be indicated as well as showing clusters of users having similar emotional or cognitive states.

During the communication session, the representation of the emotional or cognitive states of the audience (e.g., for the set of participants a whole or for different subsets of the audience) can be updated in an ongoing basis. For example, as additional image data or video data captured for the respective participants during the communication session, one or more computing devices can repeatedly (i) obtain updated participant scores for the participants, (ii) generate an updated aggregate representation of the emotional states or levels of engagement of the set of multiple participants based on the updated participant scores, and (iii) provide updated output data indicative of the updated aggregate representation. The participant scores are recalculated during the communication session based on captured image data or video data so that the aggregate representation provides a substantially real-time indicator of current emotion or engagement among the set of multiple participants. For example, depending on the implementation, the representation can be based on data captured within the last minute, or more recently such as within 30 seconds, 10 seconds, 5 seconds, or 1 second. Different measures may be refreshed with different frequency.

In some cases, the process 1700 can include tracking changes in emotional or cognitive attributes among the set of multiple participants over time during the communication session. For example, the aggregate representation can include scores for emotional or cognitive attributes, and a computing device can store these scores. This can provide a time series of scores, for example, with a new score for the set of participants being determined periodically (e.g., every 30 seconds, every 10 seconds, etc.). During the communication session, the computing device can provide an indication of a change in emotional or cognitive attributes of the set of multiple participants over time. This can be provided as, for example, a graph showing the a level of emotion or engagement over time. As another example, the computing device can determine a trend in emotional or cognitive attributes among the participants and indicate the trend (e.g., increasing, decreasing, stable, etc.). Similarly, the computing device can determine when the change in emotional or cognitive attributes meets predetermined criteria, such as at least one of reaching a threshold, falling inside or outside a range, changing by at least a minimum amount, changing in a certain direction, and so on.

A computing device can assess the participant scores or the aggregate representation to determine when a condition has occurred. For example, a device can evaluate the participant scores or the aggregate representation with respect to criteria (e.g., thresholds, ranges, etc.) and determine when the average level of an emotional or cognitive attribute satisfies a threshold, when a number of participants showing an emotional or cognitive attribute satisfies a threshold, and so on. The conditions can relate to different situations or conditions of the conference, such as most of the people being engaged in the communication session, overall engagement falling by 25%, at least 10 people appearing confused, and so on. As a result, the computing device can inform a presenter when the audience appears to gain or lose interest, to have a particular emotional response, of to have other responses to the presentation. An indication that the detected condition has occurred may then be provided for display during the communication session.

In some implementations, recommendations are provided based on the participant scores, the aggregate representation, or other data. One example is a for improving a level of engagement or emotion of the participants in the set of multiple participants. For example, if engagement has declined, the system can cause a recommendation to change topic, take a break, use media content, or to vary a speaking style. The specific recommendation can be selected based on the various of emotional and cognitive attributes indicated by the participant scores. For example, different patterns or distributions of attributes may correspond to different situations or general states of audiences, which in turn may have different corresponding recommendations in order to reach a target state (e.g., high engagement and overall positive emotion).

For example, the chart of FIG. 10A shows an engaged but polarized audience, and based on the scores represented by the plot in the chart, the system may recommend a less divisive topic or trying to find common ground. The chart of FIG. 10B shows an apathetic audience, and so the system may recommend asking questions to encourage participation, showing media content, telling a story to provide more emotional resonance, and so on. For FIG. 10C, the audience is engaged and with a positive overall sentiment, and so the system may recommend continuing the current technique or may decide no recommendation is necessary.

The appropriate recommendation(s) for a given pattern or distribution of participant scores and/or aggregate representation may be determined through analysis of various different communication sessions. For different communication sessions, the scores at different points in time can be determined and stored, along with time-stamped information about the content of the communication session, e.g., presentation style (e.g., fast, slow, loud, soft, whether slides are shown or not, etc.), topics presented (e.g., from keywords from presented slides, speech recognition results for speech in the session, etc.), media (e.g., video, images, text, etc.), and so on. Audience characteristics (e.g., demographic characteristics, local vs. remote participation, number of participants, etc.) can also be captured and stored. This data about how participants' emotional and cognitive states correlate with and change in response to different presentation aspects can show, for example, which actions are likely to lead to different changes in emotional or cognitive states. A computer system can perform statistical analysis to identify, for each of multiple different situations (e.g., different profiles or distributions of participant scores), which actions lead to desired outcomes such as increase in engagement, increase in positive emotions, or reduction of negative emotions. As another example, the data can be used as training data to train a machine learning model to predict which of a set of potential actions to recommend is likely to achieve a target result or change in the emotional or cognitive states of the audience.

In some implementations, the recommendations can be context-dependent, varying the recommendations according to which techniques work best at different times during a session (e.g., the beginning of a session vs. the end of a session), with sessions of different sizes (e.g., many participants vs. few participants), for audiences of different ages or backgrounds, and so on. For example, the examples of communication sessions may show that taking a 5-minute break and resuming afterward does not increase engagement in the first 20 minutes, has a moderate benefit from 20-40 minutes, and has a large benefit for sessions that have gone on for 40 minutes or longer. The system can use the current duration of the communication session, along with other factors, to select the recommendation most appropriate for the current situation. Thus, the recommendations provided can help guide the presenter to techniques that are predicted, based on observed prior communication sessions, to improve emotional or cognitive states given context of, e.g., the current emotional or cognitive profile or distribution of the audience, the makeup of the audience (e.g., size, demographics), the type or purpose of the communication session (e.g., online class, lecture, videoconference, etc.), and so on.

The process 1700 can be used to determine and provide feedback about reactions to particular events or content in the communication session. In response to detecting changes in the participant scores or the aggregate representation, a computing system can determine that the change is responsive to an event or condition in the communication session, such as a comment made by a participant, a statement of the presenter, content presented, etc. Reactions during the communication session can also be detected thorough microexpression detection based on video segments of participants. Information about reactions of individual participants can be provided for display to the presenter (e.g., "John and Sarah were surprised by the last statement"). Similarly, information about reactions collectively in the group can be provided (e.g., "20 people became confused viewing the current slide" or "overall engagement decreased 20% after showing the current slide").

The process 1700, as with other discussions above, may take actions to adjust the delivery of data based on the aggregate representation for the participants. For example, just as the description above describes video conference management actions that can be taken for collaboration factors determined from media streams, the same or similar actions can be taken in the communication session. For example, the system can alter the way media streams are transmitted, for example, to add or remove media streams or to mute or unmute audio. In some instances, the size or resolution of video data is changed. In other instances, bandwidth of the conference is reduced by increasing a compression level, changing a compression codec, reducing a frame rate, or stopping transmission a media stream. The system can change various other parameters, including the number of media streams presented to different endpoints, changing an arrangement or layout with which media streams are presented, addition of or updating of status indicators, and so on. These changes can be done for individuals, groups of participants, or for all participants, and can help address situations such as low engagement due to technical limitations, such as jerky video, network delays and so on. For example, if the system detects that undesirable emotional or cognitive attributes or patterns coincide with indicators of technical issues (such as delays, high participant device processor usage, etc.), then the system can adjust the configuration settings for the communication session to attempt to improve engagement and emotion among the participants and facilitate more effective communication.

Figure 19A:
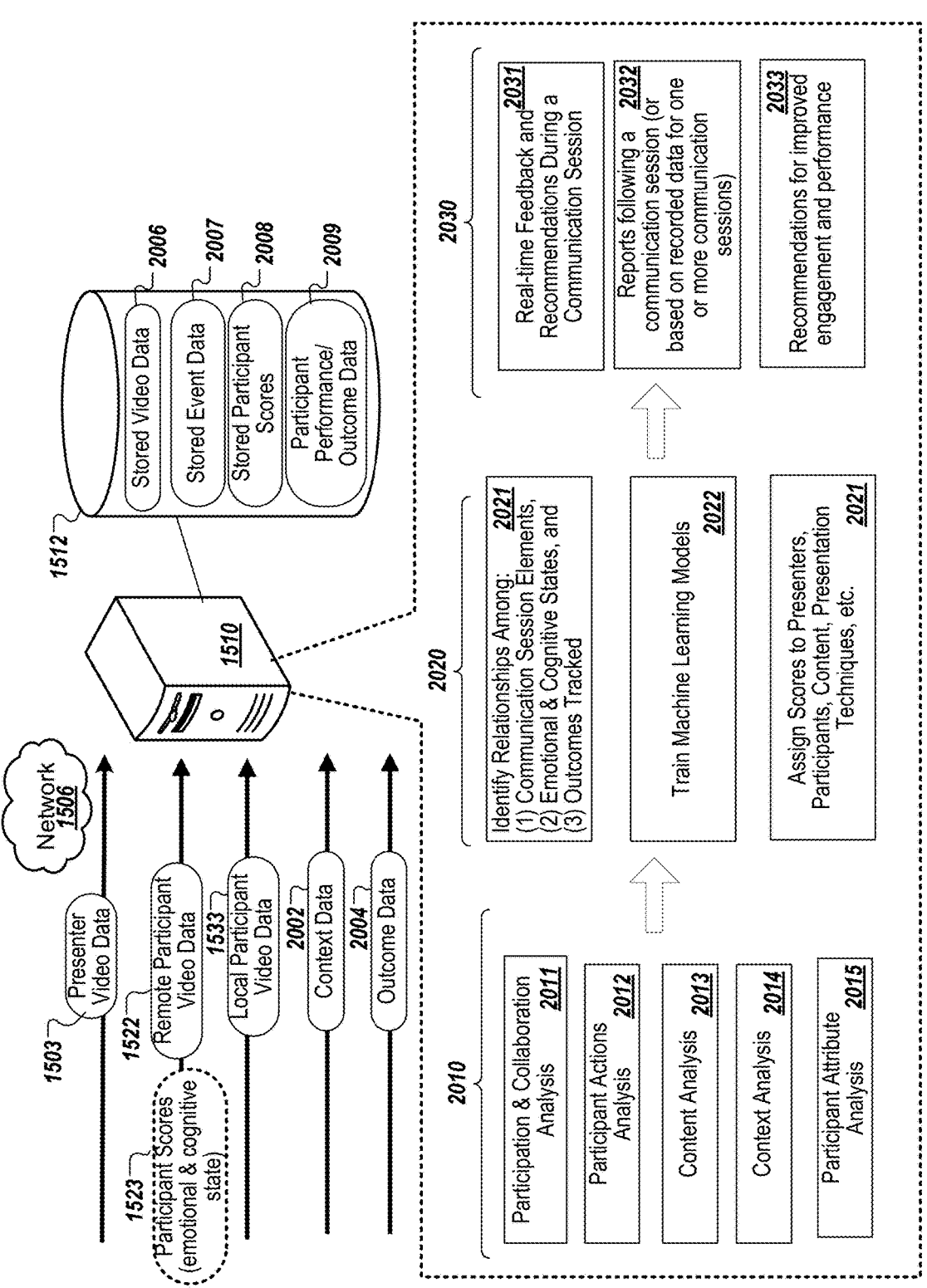
FIG. 19A illustrates an example of a system for analyzing meetings and other communication sessions.

FIG. 19A illustrates an example of a system 2000 for analyzing meetings and other communication sessions. In the system 2000, the computer system 1510 can capture information about various different communication sessions and the emotional and cognitive states of participants during the communication sessions. The system 1510 can then perform analysis to determine how various factors affect the emotional and cognitive states of participants, and also how the emotional and cognitive states influence various different outcomes.

The system 1510 can capture information about various different communication sessions and the emotional and cognitive states of participants during the communication sessions. The system 1510 can then perform analysis to determine how various factors affect the emotional and cognitive states of participants, and also how the emotional and cognitive states influence various different outcomes. Through this analysis, the system 1510 can learn how to recommend actions or carry out actions to facilitate desired outcomes, e.g., high satisfaction rates for meetings, completing tasks after meetings, developing a skill, scoring well on a test, etc.

The system 1510 uses the analysis to determine recommendations or actions to facilitate desired outcomes and avoid undesired outcomes. For example, the system can recommend communication session elements that promote emotional or cognitive states that training data shows as increasing the likelihood of desired outcomes, as well as recommending communication session elements that help avoid emotional or cognitive states that decrease the likelihood of desired outcomes.

The system can be used to promote any of various different outcomes. Examples include, but are not limited to, participants completing a task, participants completing a communication session, achieving a certain speaking time distribution or other communication session characteristics, participants achieving certain target levels for emotions or cognitive attributes (e.g., attention, participation, collaboration, etc. during a communication session), high scores for participant satisfaction for a communication session (e.g., in a post-meeting survey), acquisition of a skill by participants, retention of information from the communication session by participants, high scores for participants on an assessment (e.g., a test or quiz for material taught or discussed in a communication session, such as a class or training meeting), participants returning to a subsequent communication session, a participant making purchase (e.g., during or following a sales meeting), a participant establishing a behavior (e.g., starting or maintaining a good habit, or reducing or ending a bad habit), high or improved measures of employee performance (e.g., following one or more business meetings), good or improved health (e.g., improved diet, sleep, exercise, etc., or good surgical recovery outcomes).

As an example, the system 1510 can analyze classroom interactions and distance learning interactions to determine which combinations or patterns of emotions tend to increase student learning, as seen in homework submission, test scores, or other measures of outcomes. The analysis may be performed with filtered different data sets to customize the analysis for different geographic areas, student ages, types or backgrounds of students, educational subjects, and so on, or even for specific schools, teachers, classes, or individual students. Additional analysis by the system 1510 can be performed to determine which elements of instructional sessions lead to students developing different emotional or cognitive states in students that are most conducive to learning. With these results, the system 1510 can provide recommendations of techniques and actions predicted to help students reach the emotional or cognitive states that that are most conducive to learning. These recommendations can be provided in a general manner, e.g., in a report, or be provided "just-in-time" to a teacher during instructional sessions.

As another example, the system 1510 can analyze business meetings and records of subsequent sales to determine which combinations or patterns of emotions during meetings lead to higher likelihood of sales, higher volumes of sales, and so on. The system 1510 can perform the analysis for different industries, vendors, customers, sales teams or individuals, products, geographical areas, and so on to identify which emotional or cognitive states lead to the best results for different situations. The system 1510 can also analyze which elements of communication sessions lead to vendors or customers developing different emotional or cognitive states. The system 1510 can identify an emotional or cognitive state that the analysis results indicate is likely to increase a likelihood of a desired outcome, such as making a sale, and then provide a recommendation of an action or technique to encourage that emotional or cognitive state.

As another example, the system 1510 can analyze telemedicine or telehealth sessions and records of subsequent medical outcomes to determine which combinations or patterns of emotions during the sessions produce desirable outcomes or avoid negative outcomes (e.g., side effects, decreased health, etc.). Examples of positive outcomes include high patient satisfaction, a desirable state of health for patients (e.g., management of or recovery from disease, physiological or mental health measures within normal ranges, improvements to health and fitness, etc.), accurate diagnosis by the healthcare providers, accurate selection of a therapy for the patients, medication adherence or compliance with a treatment regimen by patients, and accurate information being provided by the patients. As another example, the medical outcomes may relate to improvement to mental health or maintenance of a healthy mental health state. For example, the system can use mental health metrics (determined in or outside the telehealth sessions), such as self-reported information, to determine whether patients have improved and to what extent the patients have improved following a telemedicine or telehealth session (e.g., if a person reports feeling depressed two days a week rather than a five days a week).

In the telemedicine or telehealth sessions, the participants can include healthcare providers and patients. In other words, the examples sessions analyzed can each include a healthcare provider (e.g., doctor, nurse, counselor, etc.) and a patient, where the healthcare provider and patient communicate remotely over a network-based communication link, e.g., video conference, telephone call, etc. This can include analyzing the influence of different emotional or cognitive states of at least one of the healthcare providers and patients during the communication sessions on the medical outcomes achieved at the end of the session or potentially much later (e.g., hours, days, weeks, months, or years later).

The system 1510 can perform analysis for various examples of interactions, including with many different healthcare providers, patients, locations, appointment types, medical conditions addressed, and so on to identify which emotional or cognitive states lead to the best results for different situations. The system 1510 can analyze which elements of communication sessions lead to healthcare providers and patients developing different emotional or cognitive states. The system 1510 can identify an emotional or cognitive state that the analysis results indicate is likely to increase a likelihood of a desired outcome (e.g., accurate diagnosis, improved health, etc.) or decrease a likelihood of an undesired outcome (e.g., inaccurate diagnosis, impaired health, etc.). For example, the system 1510 can identify an emotional or cognitive state that is predicted, based on results of the analysis, to promote occurrence of one or more desirable medical outcomes when emotional or cognitive state is present in a communication session.

In some implementations, the system 1510 can also perform analysis and provide recommendations to optimizing interactions for high patient satisfaction, which may be assessed with patient surveys or other tools. The system 1510 can determine the cognitive and emotional states (including patterns or combinations of emotions and other measured factors) that lead to high patient satisfaction, and then select those states as target states to promote. Similarly, the system 1510 can make recommendations or provide content that is expected to promote the occurrence of those target states.

In general, the system can use the data sets it obtains for communication sessions to perform various types of analysis. As discussed below, this can include examining relationships among two or more of (i) elements of communication sessions, (ii) emotional and cognitive states of participants in the communication sessions, and (iii) outcomes such as actions of the participants whether during the communication session or afterward. The analysis process may include machine learning, including training of predictive models to learn relationships among these items. The system then uses the results of the analysis to generate and provide recommendations to participants to improve communication sessions.

The recommendations can be for ways that a participant in a communication session (e.g., a presenter, teacher, moderator, or just a general participant) can act to promote a desired target outcome. That outcome may be an action by other participants, whether during the communication session or afterward. Examples of recommendations include recommendations of cognitive and emotional states to promote or discourage in participants in order to increase the likelihood of achieving a desired target outcome, such as for participants to perform an action. Examples also include recommendations of actions or content that can promote or discourage the cognitive and emotional states that the system predicts to be likely to improve conditions for achieving the target outcome.

The recommendations can be provided in an "offline" format, such as a report or summary outside of a communication session. Additionally or alternatively, they may be provided in an "online" or real-time manner during communication sessions. An example is a just-in-time recommendation during a communication session that is responsive to conditions detected during a communication session, such as characteristics of a speaker's presentation (e.g., tone, speaking speed, topic, content, etc.) or emotional and cognitive states detected for participants. In this manner, the system can guide one or more participants to perform actions that are predicted by the system to help achieve a goal or target outcome, such as to promote learning in a classroom, to encourage subsequent completion of tasks after a business meeting, to promote a purchase by a potential customer, etc.

Referring still to FIG. 19A, a variety of types of information may be generated, stored, and analyzed for communication sessions. For example, as discussed for FIG. 15, a communication session can include the capture of video data from participants, such as presenter video data 1503, remote participant video data 1522, and local participant video data 1533. The system 1510 can receive video streams for communication sessions and may analyze them during the communication sessions. This can allow the system 1510 to store data characterizing the communication sessions (e.g., summary descriptions of the events, conditions, participant scores, and so on) that is derived from the video data, without requiring the storage space to store full communication sessions. Nevertheless, the system 1510 can record communication sessions, and may perform analysis of recorded video of communication sessions from any source to determine participant scores, to identify events or actions during the communication sessions, and so on.

As discussed above, the system 1510 can analyze the facial appearance, speech, micro-expressions, and other aspects of participants shown in the video streams to determine the emotional and cognitive states of each individual involved in the communication session. This can include generating participant scores for the participants, such scores for the level of different emotions (e.g., happiness, sadness, anger, etc.) and cognitive attributes (e.g., engagement, attention, stress, etc.). In some implementations, client devices provide participant scores 1523 based on analysis that the client devices perform locally.

Typically, the participant scores are determined for multiple times during a communication session. For example, a set of scores that indicate a participant's emotional and cognitive state can be generated at an interval, such as every 10 seconds or every minute, etc. This results in a time series of measures of participant emotional and cognitive state, and the participant scores can be aligned with or synchronized to the other events and conditions in the communication session. For example, the different participant scores can be time stamped to indicate the times that they occurred, allowing the system 1510 to determine the relationship in time between participant scores for different participants and with other events occurring during the communication session (e.g., different topics discussed, specific items of content shown, participants joining or leaving, etc.).

The system 1510 can obtain other information related to the communication sessions, such as context data 2002 that indicates contextual factors for the communication session as a whole or for individual participants. For example, the context data 2002 can indicate companies or organizations involved, a purpose or topic of a meeting, the time that the meeting occurred, total number of participants in the meeting, and so on. For individual participants, the context data 2002 may indicate factors such as background noise present, type of device used to participate in the communication session, and so on. The system 1510 can use the context data 2002 to identify context-dependent factors in its analysis. For example, individuals may respond differently in different situations, and communication sessions may show that different actions that are effective for participants in different contexts.

The system 1510 can also obtain outcome data 2004, which describes various outcomes related to the communication sessions. The system 1510 can monitor different outcomes or may receive outcome data from other sources. Some outcomes of interest may occur during the communication session. For example, an outcome of interest may be that the level of participant of the participants or the level of attention of the participants. Other outcomes that are tracked may occur after or separately from the communication session. For a sales meeting, the outcomes may include whether a sale occurred after the meeting, the amount of sales, and so on. For an instructional session, the outcomes may be participation levels, grades on a homework assignment related to topic of instruction, test scores for an assessment related to the topic of instruction, and other indicators of academic performance. The outcome data can be labeled with the organization or participant to which it corresponds, as well as the time that it occurred, to better correlate outcomes with specific communication sessions and specific participants in those communication sessions.

The system 1510 can store the input data and analysis results in the data repository 1512. For example, the system 1510 can store video data 2006 of a communication session and/or event data 2007 indicating the series of events occurring during the communication session (e.g., John joined at 1:02, Slide 3 presented at 1:34, Sarah spoke from 1:45 to 1:57, etc.). The event data 2007 can be extracted from video data and other metadata about a communication session, and can describe characteristics of the way users interact at different times during a communication session. In many cases, storing and using the extracted event data 2007 can reduce storage and facilitate analysis compared to storing and using the video data. The system 1510 also stores the participant scores 2008 indicating emotional and cognitive states of participants, typically indicating a time series or sequences of these scores for each participant to show the progression of emotional and cognitive attributes overtime during the communication session. The system 1510 also stores outcome data 2009, indicating the outcomes tracked such as actions of participants, performance on assessments, whether goals or objectives are met, and so on.

These types of information can be gathered and stored for many different communication sessions, which can involve different sets of participants. This provides examples of different communication sessions, showing how different individuals communicate and interact in different situations, and ultimately how the communication sessions influence outcomes of various types.

The processing of the system 1510 is shown in three major stages, (1) identifying various factors of communication sessions (stage 2010), (2) analyzing relationships among these factors, emotional and cognitive states, and outcomes (stage 2020), and (3) providing output based on the analysis (stage 2030).

In stage 2010, the system 1510 performs analysis to identify elements present in different communication sessions and the timing that the elements occur. For example, the system 1510 can analyze participation and collaboration 2011, to determine which participants were speaking at different times, the total duration of speech of different participants, the distribution of speaking times, the scores for participation and collaboration for different participants at different portions of the communication sessions, and so on. The system 1510 can analyze records of participant actions 2012, and correlate instances of different actions with corresponding communication sessions and participants. The system 1510 can analyze records of content 2013 of communication sessions, such as content presented, words or phrases spoken, topics discussed, media types used, and so on, to determine when different content occurred and how content items relate to other events and conditions in the communication sessions. The system 1510 can also analyze the context 2014 for individual participants or for a communication session generally to identify how contextual factors (e.g., time, location, devices used, noise levels, etc.) correlate with other aspects of the communications sessions that are observed. The system 1510 can also analyze the attributes of participants 2015 to determine how various participant attributes (e.g., age, sex, education level, location, etc.) vary their development of emotional and cognitive states and achievement of different outcomes.

One of the results of the first stage 2010 can be an integrated data set for each communication session, having information from different data sources identified, time-stamped or otherwise aligned. As a result, the timing of events within a communication session, the progression of participant scores for each participant, the timing at which different content presented and discussed during the communication session, and other information can all be arranged or aligned to better determine the relationships among them.

In stage 2020, the system performs further analysis to determine and record how the various communication session elements extracted and processed in stage 2010 affect emotional and cognitive states and outcomes of interest. One type of analysis can be statistical analysis to determine the correlation and causation between different types of data in the data set. For example, the system 1510 can determine the relative level of influence of different communication session elements (e.g., participant actions, content presented, context, etc.) on different emotional and cognitive states, as well as on outcomes tracked. Similarly, the system 1510 can determine the level of influence of emotional and cognitive states on outcomes.

First, the system can analyze how emotional and cognitive states of participants in communication sessions affect outcomes such as actions of the participants. These actions can be actions of the participants in or during a communication session (e.g., participation, discussion, asking questions, ending the meeting on time, achieving positive emotions, etc.) or actions of the participants outside or after the communication session (e.g., performance on a subsequent test, completion of a task, returning to a subsequent communication session, providing a positive rating of the communication session, etc.).

The system can learn how different emotional or cognitive states promote or discourage different desired outcomes or actions by participants. For example, through analysis of many different in-classroom and/or remote instruction sessions, the system may identify emotional and cognitive states that promote learning by students. More specifically, the system may learn how the emotional and cognitive attributes demonstrated in example communication sessions have led to different types of educational outcomes. For example, the system may determine that higher levels of attention and positive emotion in students during a lesson contribute to skill development by the students, and thus correspond to higher scores for math tests. As another example, the system may determine that surprise and high levels of emotion, whether positive or negative, result in higher accuracy of recall of factual information, shown by higher scores for factual question in history tests. Other different emotional or cognitive attributes may contribute to outcomes such as homework completion, participation during a class session, returning on time to the next class session, and so on. The system may learn that the effects of different emotional or cognitive attributes to promote outcomes may vary for different types of students (e.g., those of different locations, ages, backgrounds, etc.), for different types of outcomes (e.g., test results, homework completion, etc.), for different subjects (e.g., math, science, history, literature, etc.), and so on.

As another example, the system can analyze sales meetings to determine (i) emotional and cognitive states present among salespeople that lead to better outcomes (e.g., higher likelihood of sales or a larger amount of sales), and/or (ii) emotional and cognitive states present among potential customers that lead to better outcomes. The states or attributes that promote desired outcomes may be different for different contexts, e.g., for different locations, products, industries, company roles, etc. For example, the system may determine that a level of an emotion or cognitive attribute (e.g., happiness enthusiasm, interest, attention, etc.) leads to improved results in one geographical area but not another. Similarly, the system may determine that feeling happy leads people to purchase one product (e.g., a gift). The system may determine that, in other situations, feeling fear leads people purchase another product (e.g., a security system). The system can assess the relationship of the sales person's emotional and cognitive state to customer outcomes as well. For example, the system can score the enthusiasm, attention, happiness, and other characteristics of salespeople affect the likelihood of positive responses from potential customers. The system can examine the relationships between outcomes and single emotional or cognitive attributes, combinations of emotional or cognitive attributes, as well as patterns or progressions of emotional or cognitive attributes over time during communication sessions.

Second, the system can also determine how different factors during a communication session affect emotional and cognitive states. The factors may be, for example, actions of an individual in the communication session, content of the communication session (e.g., presented media, topics discussed, keywords used, speaking tone and speed, etc.), and/or other conditions in a communication session (e.g., number of participants, ratios of speaking time, etc.). From various examples of communication sessions and the emotional and cognitive states of the participants, the system can determine how these factors contribute to the development of or inhibition of different emotional and cognitive states.

Several different types of analysis can be used. One is example is statistical analysis, which may determine scores indicative of correlation or causation between emotional and cognitive states and outcomes. Another example is machine learning analysis, such as clustering of data examples, reinforcement learning, and other techniques to extract relationships from the data.

In some implementations, the system 1510 trains a machine learning model 2022 using examples of emotional and cognitive states in communication sessions and related outcomes. The relationships can be incorporated into the training state of the predictive machine learning model rather than be determined as explicit scores or defined relationships. For example, based on the various example communication sessions, the system can train a neural network or classifier to receive input indicating one or more target outcomes that are desired for a communication session, and to then provide output indicating the emotional or cognitive states (e.g., attributes or combinations of attributes) that are most likely to promote the target outcomes. The system can also train another neural network or classifier to receive data indicating an emotional or cognitive state and to output data indicating elements of communication sessions (e.g., number of participants, duration, types of content, speaking style, etc.) that the training data set indicates are most likely to result in the emotional or cognitive state indicated at the input. For these and other types of machine learning models, the system can train the models iteratively using examples extracted from one or more communication sessions, using backpropagation of error or other training techniques.

In some implementations, results of the analysis are captured in scores 2021 assigned to different elements of communication sessions. Some scores, such as for content items, presentation techniques, speaking styles, and so on can be scored to indicate their effectiveness at leading to particular emotional or cognitive states or to particular outcomes. Other scores can be assigned to individual presenters and participants to indicate how well the individuals are achieving desired outcomes, whether those outcomes are within the communication session (e.g., maintaining a desired level of engagement, attention, or participation among a class) or separate from the communication session (e.g., the class achieving high test scores on a quiz or test after the communication session ends).

In stage 2030, the system 1510 uses the results of the analysis to provide feedback about communications sessions and to provide recommendations to improve communication sessions. One type of output is real-time feedback 2031 and recommendations during a communication session. For example, from the analysis, the system 1510 can determine the emotional and cognitive states that have led to the most effective learning for students. During an instructional session, the system 1510 can compare the real-time monitored emotional and cognitive states of students in the class with the profile or range of emotional and cognitive states predicted to result in good learning outcomes. When the system determines that the students' emotional and cognitive states are outside a desired range for good results, the system 1510 can generate a recommendation for an action to improve the emotional and cognitive states of the students, and thus better facilitate the desired educational outcomes. The action can be selected by the system 1510 based on scores for outcomes, based on output of a machine learning model, or other technique. The system 1510 then sends the recommendation for presentation on the teacher's client device.

For example, the system 1510 may determine that emotion levels of fear and frustration are rising among a group of students, while attention and engagement are declining. These changes may place the class in a pattern that was determined to correlate with poor learning or there may be at least another emotional or cognitive state that is identified as correlated with higher outcomes. Detecting this condition can cause the system 1510 to select an provide a recommendation calculated by the system to move the students' emotional or cognitive state toward the states that are desirable for high learning performance. The recommended action might be any of various items, such as taking a break, changing topics, shifting to a discussion rather than a lecture, introducing image or video content, etc., depending on what the analysis in stage 2020 determined to be effective in promoting the desired emotional and cognitive state(s).

Another type of output of the system 1510 is a report 2032 at the end of a communication session. The report can provide a summary of emotional or cognitive states observed in the communication session, an indication of desired emotional or cognitive states (e.g., those determined to have the highest correlation with desired outcomes), and recommendations of actions to better achieve the desired emotional or cognitive states. This type of report may be generated based on the analysis of recorded communication sessions, or based on groups of communication sessions. For example, the report may aggregate information about multiple class sessions for a class or teacher, and provide a recommendations for that class or teacher.

Another type of output includes general recommendations 2033 for improving engagement and other outcomes. For example, separate from analysis of a specific communication session or individual, the system can determine the emotional and cognitive states that, on the whole, encourage or increase the likelihood of desirable outcomes. Similarly, the system can determine emotional and cognitive states that discourage or decrease the likelihood of an outcome, so that those states can be avoided so as to not hinder the target outcomes. Without being tied to evaluation of performance of a specific teacher, class, or instructional session, the system 1510 can provide a recommendation that represents best practices or common relationships found for emotional or cognitive states that aid in learning, as well as actions or teaching styles that promote those emotional or cognitive states.

Figure 19E:
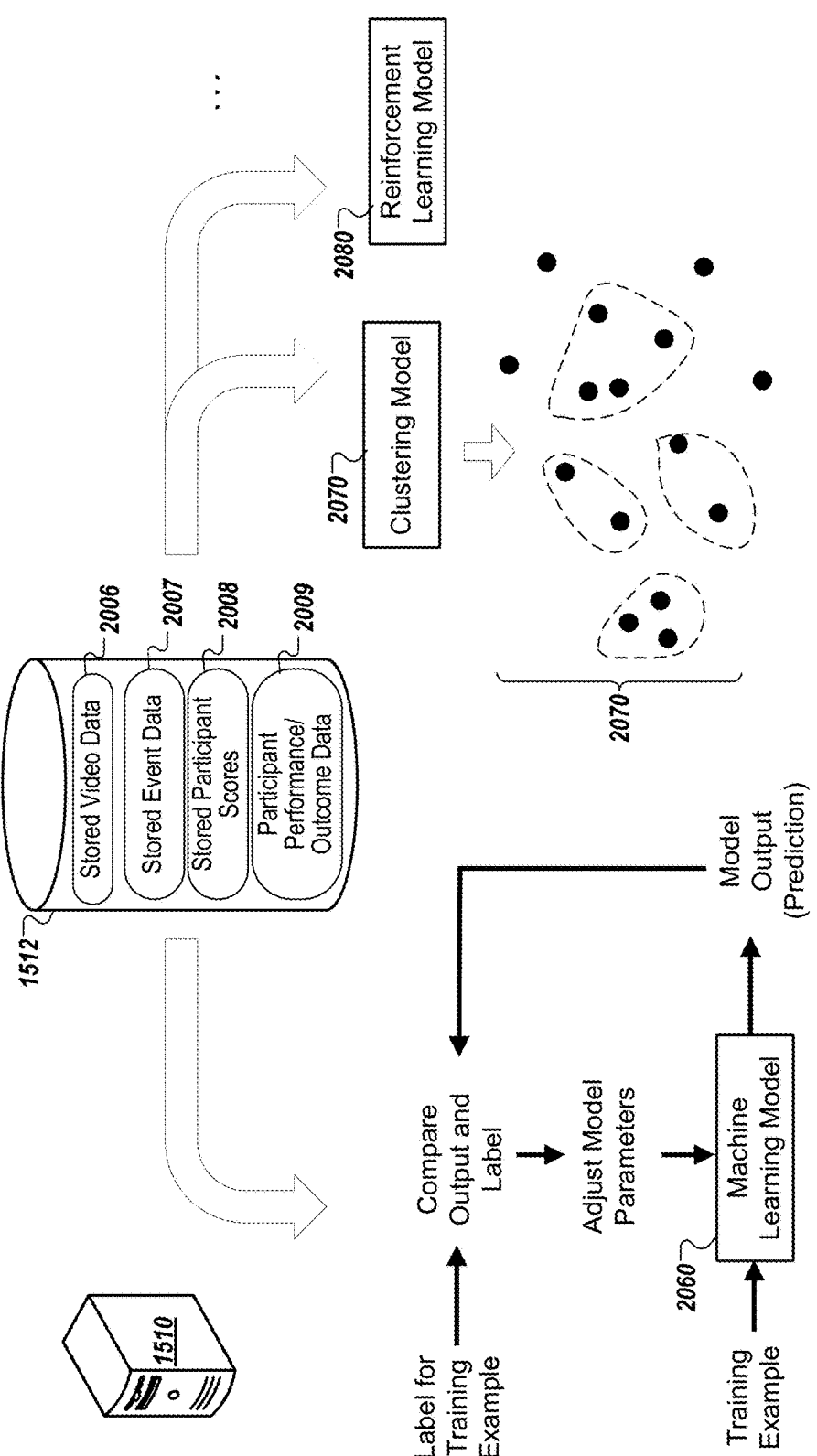
FIG. 19E is an example of machine learning in analysis of communication sessions.

FIGS. 20B-20E illustrate various examples of analysis that the computer system 1510 can perform to determine relationships between, for example, elements of communication sessions, emotional and cognitive states of participants, and outcomes. The analysis can also take into account contextual factors, the characteristics or backgrounds of the participants, and other information to show how the relationships vary in different situations. In some cases, the analysis may include determining explicit scores or records for relationships extracted through the analysis of communication sessions. For example, FIGS. 20B-20D show score values representing levels of correlation between certain factors and later effects (e.g., resulting emotional states, subsequent tracked outcomes, etc.) In addition or as an alternative, the analysis can include machine learning techniques that implicitly learn the relationships. This can include clustering the data using machine learning clustering techniques, training predictive models (e.g., neural networks, classifiers, decision trees, etc.), reinforcement learning, or other machine learning techniques. For example, FIG. 19E shows an example of using machine learning techniques to train models and assess data sets, where the results of machine learning (e.g., data clusters, trained models, etc.) can be used to later predict the emotional and cognitive states that promote or discourage an outcome, and/or the communication session elements and context factors that promote or discourage those emotional and cognitive states.

FIG. 19B is a table 2040 illustrating example scores reflecting results of analysis of cognitive and emotional states and outcomes. Column 2141 shows examples of outcomes to be tracked, e.g., test scores, completing a first task, completing a second task, purchasing a first item, purchasing a second item, participating in a meeting, attending a subsequent meeting, giving a high satisfaction rating, etc. The system 1510 analyzes the examples of communication sessions to determine how different emotions promote these different outcomes. For example, the system analyzes records of different communication sessions, the emotions and reactions present among participants in the sessions, and the occurrence of these outcomes to determine which factors in the other columns of the table 2040 are positively or negatively correlated with the outcomes, and by what magnitude.

The table 2040 shows three sections for emotions 2042, cognitive attributes 2043, and reactions or expressions 2044.

Each column in these sections includes scores indicating how strongly related these emotional and cognitive factors are to the outcomes. In other words, the values in the table indicate a level of impact or influence of an emotional or cognitive attribute on the outcomes on the left-hand column. For example, the table indicates a score of "+5" for happiness with respect to the test score outcome, indicating that participants being happy in a meeting had a significant positive effect in promoting good test scores when test on the subject matter of the meeting. For completing task 1, the score of "+2" for happiness indicates that participants being happy had a positive influence on completing the task, but with lesser influence than happiness had on the test score outcome. Negative scores in the table 2040 show instances where the presence of the attribute decreases the likelihood of achieving the desired outcomes.

Based on scores such as those shown in the table 2040, the system 1510 can identify which emotional attributes to encourage in order to promote or improve a certain type of outcome. For example, in the row for the test scores outcome, the items having the strongest effect are happiness, attention, and enthusiasm. Thus, to improve test scores for a class, the system 1510 can inform a teacher or other person of these attributes that will likely improve learning and the test score results. Similarly, the system 1510 can determine actions that tend to produce or increase these attributes in participants during instructional sessions, and recommend those actions.

FIG. 19C is a table 2050 illustrating example scores reflecting results of analysis of communication session factors and cognitive and emotional states of participants in the communication sessions. This table 2050 shows an example how the system 1510 can determine how different factors in a communication session (e.g., events, conditions, context, environment, content, etc.) encourage or discourage emotional and cognitive attributes in the participants.

Column 2051 lists emotional and cognitive attributes, while the remaining columns 2052 include scores indicating the level of influence of different factors on participants developing or exhibiting the emotional and cognitive attributes. Positive scores indicate that the factor tends to increase or promote the corresponding attribute, while negative scores indicate that the factor tends to decrease or discourage the corresponding attribute. For example, the table 2050 has a score of "+3" for the effect of a 5-minute break on happiness of participants. This indicates that taking a short break during a meeting tends to increase the overall happiness of participants in meetings. Other scores in the column indicate that the short break is calculated to typically reduce anger, enthusiasm, and stress, and also decrease the likelihood of a user exhibiting surprise or a particular micro-expression, "micro-expression 1."

The examples of FIGS. 20B and 20C show basic relationships, such as overall correlation between communication session elements, cognitive and emotional states, and outcomes. The analysis is not limited to assessment of the effect of individual factors alone, however, and can determine more complex and nuanced effects, such as the different impact of different levels of attributes or of different combinations occurring together. This can identify special cases and non-linear effects to show the particular emotional and cognitive states that are most strongly encourage or discourage different outcomes. In addition, the system can analyze patterns of variation in emotional or cognitive attributes over time, and determine sequences of actions that would lead to the different patterns of emotional or cognitive attributes.

For example, in FIG. 19B, in addition to assigning scores for the impact of individual emotions on outcomes, the system can assign scores for different levels of the emotions, e.g., the different ways that participant happiness scores of 10, 20, 30, etc. affect the outcomes. In many cases, there may be a range or level at which an emotion or cognitive attribute becomes more important or impactful, and the analysis can discover and quantify these relationships. For example, happiness may have a small impact on outcomes when the happiness score is in a certain range (e.g., 30-60 on a scale of 0 to 100), but have a much larger impact when it is outside the range, e.g., a participant happiness score of less than 30 having a large negative impact, and a score of greater than 60 having a large positive effect. The different level of impact at different positions on the happiness scale, and/or threshold levels at which the relationship to an outcome changes, can be determined and stored for any or all of the different emotions, cognitive attributes, As another example, with respect to FIG. 19B, the system can evaluate the effects of different combinations of emotional and cognitive attributes and reactions on outcomes. For example, in addition to or instead of assessing the impact of a single emotion on an outcome, the system can assess the different combinations of emotion and cognitive attributes, such as happiness score of 60, anger score of 20, and attention score of 30. The system can determine scores for the impact of other combinations of different values of these attributes (e.g., [50, 20, 40], [40, 10, 30], etc.), as well as for other combinations of attributes. The system can use reference vectors or profiles representing combinations of attributes and/or expressions and determine how their combined presence, or the factors being at certain levels or ranges concurrently, produces different results.

With respect to FIG. 19C, the system can assess how different combinations of communication factors affect emotional and cognitive attributes or combinations of them. For example, in addition to or instead of determining the incremental effects that individual elements of communication sessions have on components of emotional and cognitive states, the system can evaluate how different combinations of elements combine to provide different effects. The system can evaluate different combinations and find that, a 5-minute break contributes more to attention in lecture-style meetings and less in meetings that have presented film clips. Similarly, the system may determine from example communication sessions that a fast speaking cadence is has a higher impact in influencing stress at different times of day, or for meetings with different sizes, or for different meeting styles (e.g., lecture vs, group discussion, etc.). The system can analyze many different combinations of communication session elements and contextual factors and determine which combinations have higher influence than their individual scores would predict, which can be used by the system to later recommend actions or communication session parameters to intensify an effect to lead to a desired emotional or cognitive state or a desired outcome. Similarly, the analysis can identify combinations that result in less than the desired level of influence on emotional and cognitive attributes, which the system may use to mitigate negative effects. For example, large meetings may generally contribute to higher levels of anger or lower levels of attention, but the system may determine that this effect of large meetings is reduced when it occurs with another element (such as a certain presentation style, media type, meeting duration, or other factor). The system can quantify these and other relationships from the analysis with scores, curves, equations, functions, look-up tables, models, and so on to quantify and define the relationships learned from the example communication sessions analyzed. In this manner, the system can find combinations of elements, and even define communication session profiles specifying the elements or characteristics that are most effective, for achieving different emotional and cognitive states (e.g., combinations of emotions, cognitive attributes, reactions, expressions, etc.).

In some implementations, the analysis is made context dependent. For example, although the table 2050 indicates that a break in a meeting increases overall happiness (or likelihood of participants being happy), the magnitude of this effect may vary from none or even negative very early on in a meeting, and then be increasingly higher as the meeting goes on. Thus, the effect can be dependent on the elapsed time in the meeting. The system 1510 can determine which relationships are present for different contexts or situations, allowing the system 1510 tailor the actions recommended for the situation that is present in a communication session, as well as the desired outcomes or desired emotional states to be promoted. Thus the scores for different elements of communication sessions may vary based on factors such as the type of participant, the type of meeting (e.g., a sales pitch, a classroom, a competition, etc.), a size of the meeting, the goal or objective of the meeting, etc.

FIG. 19D illustrates example scores reflecting results of analysis additional types of analysis. As illustrated, the system can analyze the impact on emotional and cognitive states and outcomes that is caused by different content, different content types, different presenters or other participants, presentation techniques, and contextual factors. The system can use analysis results for these factors, as well as for combinations of them and patterns of sequences of their occurrence, to identify the factors that will contribute to or induce the emotional or cognitive states desired in a communication session, and/or to identify the factors that will increase desired outcomes (e.g., increase the likelihood, amount, or frequency) and decrease undesired outcomes. The system can use these and other analysis results to make recommendations of factors to enhance a communication session and promote desired emotional or cognitive states and promote desired outcomes.

The table 2053 includes scores that indicate the different effects that different types of content (e.g., images, video clips, text, etc.) presented during a communication session have on the emotions, cognitive state, and reactions of participants as well as on outcomes of interest (e.g., quiz score for students, task completion following a meeting, etc.). The system can evaluate the presence of these types of presented content and overall emotions and outcomes, or potentially effects in smaller time windows around when the content was presented, e.g., within 30 seconds, 1 minute, or 5 minute from the use of those types of content.

Table 2055 include scores that indicate the different effects of different content items. The type of analysis represented here can be used to determine the effect of specific content items, such as a specific presentation slide, document, topic, keyword, video clip, image, etc. This can be used to show which portions of a lesson or presentation are most impactful, which ones elicit positive responses or negative responses, and so on. As noted above, the time of presentation of the different content items can be tracked and recorded during the communication session, and both participant reactions in the short term (e.g., within 30 seconds, 1 minute, 5 minute) and overall results (e.g., engagement, emotion levels, outcomes, etc. for the entire communication session) can be used in the analysis.

Table 2054 includes scores that indicate the different effects on emotional and cognitive states and outcomes due to different presentation techniques, e.g., different actions or behaviors of the presenter or different conditions or styles of presentation. The data in the table can be different for different types of meetings, meetings of different groups of people, and so on. For example, a business team meeting and a sales pitch meeting may have different outcomes to track and various presentation techniques may have different effects due to the different audiences. Similarly, different presentation techniques may have different levels of effectiveness for different ages of students, different classes, different school subjects, and so on, and the system can use these determined differences to tailor recommendations for different situations.

Table 2056 includes scores that indicate different effects of context factors on emotional and cognitive states and outcomes. Considering these factors can help the system to account for factors such as time of day, day of the week, location, audience size, level of background noise, and so on that may affect emotional and cognitive states and outcomes independent of the interactions in the communication session. In many cases, the source data reflecting these factors can be provided through metadata captured with the communication session data. Analysis of these factors can help the system recommend how to plan and schedule communication sessions of different types for best effectiveness in achieving the desired outcomes, e.g., to determine the best time of day, meeting duration, number of participants, and so on to best promote learning and achieve skill proficiency for a certain subject in a distance learning environment.

Table 2057 includes scores that indicate an example of analysis of the effectiveness of different presenters in promoting different cognitive and emotional states and in promoting desired outcomes. This represents how the system can assess the relative effectiveness of different presenters, moderators, or other users and assign scores. The scores indicating which presenters are most effective can also be helpful in illustrating to end users how the content, presentation techniques, context factors, and other elements assessed by the system are effectively used by some presenters, leading to good results, while others that use different elements do not achieve the same results.

The system can provide reports that describe the effectiveness of different communication sessions or presenters in achieving the desired emotional or cognitive states, as well as scores and rankings for presenters and non-presenter participants. For example, during or after a meeting, the system can create and provide a scorecard, based on all the emotional and cognitive state data for the meeting, to facilitate performance analysis or technique analysis so that future communication sessions can be improved.

Many examples herein emphasize the impact of inducing emotional or cognitive states in general participants, such as audience members, students in a class, potential clients, etc. It can also be helpful or important to assess which cognitive or emotional states in presenters or other participants with special roles (e.g., teachers, salespeople, moderators, etc.) promote or discourage desired outcomes. For example, for a salesperson at a certain company, the system may determine that a particular range of enthusiasm, happiness, sadness, or other attribute leads to improved outcomes, while high scores for another attribute may lead to lower outcomes. The system can thus recommend emotional and cognitive states to be targeted for presenters or other roles, which may be the same as or different from those desired for other participants, as well as communication session elements or context elements that are predicted to promote the desired emotional or cognitive states of the presenters.

FIG. 19E is an example of techniques for using machine learning to analyze communication sessions. The various types of information in the data storage 1512 provide training data for developing various different types of models. Example models that can be used include a neural network, a support vector machine, a classifier, a regression model, a reinforcement learning model, a clustering model, a decision tree, a random forest model, a genetic algorithm, a Bayesian model, or a Gaussian mixture model. The resulting models can then be used to make predictions and recommendations to steer communication sessions toward desirable emotional and cognitive states that promote desirable outcomes or avoid undesirable outcomes. The figure shows (1) a machine learning model 2060 that can be trained to perform any of various different types of predictions, (2) a clustering model 2070 that can be trained to identify factors or commonalities among data sets, and (3) a reinforcement learning model that can be used to gradually learn relationships as patterns and trends are observed in different communication sessions. In general, the models can be trained using supervised learning, unsupervised learning, reinforcement learning, and other techniques The machine learning model 2060 shows an example of supervised learning. The model 2060 can be a neural network, a classifier, a decision tree, or other appropriate model. The model 2060 can be trained to output predictions of different types, such as a prediction of an emotional or cognitive state that will promote a certain outcome, or a prediction of a contextual factor or communication session element that will promote a certain emotional or cognitive state.

To train the model 2060, training examples are derived from the data in the data storage 1512. Training examples can represent, for example, records for different instances of participants in a particular communication session. A communication session with 100 participants can thus represent 100 training examples, with each person's behavior and outcomes (e.g., during and/or after the communication session) contributing to what the model 1060 learns. Other techniques can be used. Training examples may represent small portions of communication sessions, so that a single participant's data may show many examples of responding to different content or situations that arise in a communication session. Similarly, aggregate data for a communication session as a whole can be used in some cases as training examples, such as to use different class sessions to be examples, with averaged or otherwise aggregated outcomes and data used.

To train the model 2060 to predict the emotional or cognitive states that encourage or discourage an outcome, the system can identify training examples that led to the desired outcome, and those training examples can each be assigned a label indicating the emotional and cognitive state that lead to the desirable outcome. For example, the system can identify examples of participants in communication sessions that completed a task, and then identify the emotion scores and cognitive attribute scores of those participants. The system generates an input to the model 2060 that can include values indicating the desired outcome(s) as well as values for factors such as context of the communication session, characteristics of the participant(s), characteristics of the communication session, and so on. Each iteration of training can process the input data for one training example through the model 2060 and obtain a corresponding model output, e.g., an output vector predicting the set of emotional and cognitive attributes that are desirable to achieve the outcome indicated by the input to the model 2060. Negative examples, showing examples that did not achieve desirable outcomes, can also be used for training, to steer the model 2060 away from the ineffective attributes.

The system 1510 then compares the output of the model to the labeled input and uses the comparison to adjust values of parameters of the model 2060 (e.g., weight values for neurons or nodes of a neural network). For example, back-propagation of error can be used to determine a gradient with which to adjust parameter values in the model 2060. Through many training iterations with different examples, the model 2060 can be trained to predict, given input of a type of communication session and type of desired outcome as input, an emotional or cognitive state (e.g., one or more of emotional or cognitive attributes) that are likely to lead to desired outcome. After training, predictions from the trained model 2060 can be used to provide recommendations to users and to select actions for the system to perform in order to encourage development of the emotional and cognitive states that are As another example, the model 2060 may be trained to predict the communication session elements (e.g., content, content types, presentation styles, etc.) and context factors (e.g., time, location, duration, number of participants, etc.) that will lead to the emotional or cognitive states predicted to lead to desired outcomes. In this case, the input to the model 2060 can include (i) an indication of emotional or cognitive states to be encouraged, and (ii) data characterizing the communication session. The labels for training examples can include the communication session elements and context factors present for those examples. Thus, through training, the model 2060 can learn to predict which elements can promote the emotional and cognitive states that in turn increase the likelihood of desired outcomes. In some cases, the model 2060 can be trained to directly predict the communication session elements and context factors that increase the likelihood of a desired outcome, e.g., by inputting the desired outcome rather than the desired emotional or cognitive state.

Many variations are possible. For example, different models may be generated for different types of meetings, which may reduce the amount of data provided as input, but with a larger number of models, and the appropriate model needing to be selected for a given situation.

The clustering model 2070 can be trained through unsupervised learning to cluster training examples (e.g., examples of communication sessions, participants within communication sessions, portions of communication sessions, etc.). For example, the system can cluster training examples, illustrated as data points 2071, according to outcomes, emotional and cognitive states, and other factors. This can show the characteristics of situations that result in positive outcomes, characteristics of situations that result in less desirable outcomes, and so on. From these, the system can recommend the context factors, communication session elements, and emotional and cognitive states that are associated with the best outcomes. Similarly, the model 2070 may further assign cluster boundaries according to different contexts or situations, and the system 1510 can determine context-specific recommendations based on the factors present in the cluster(s) that share the same context that is relevant for the current recommendation being made.

For all of the analysis discussed in FIGS. 20A-20E, the analysis can be performed for different data sets or different scope. For example, the analysis can be performed for a single communication session or for multiple communication sessions. For example, the analysis could be performed for a specific lesson of a teacher to a class, or for portions or segments of the lesson. As another example, the analysis may take into account multiple class sessions involving the teacher and the class, or multiple class sessions of multiple different classes and/or teachers. In general, the results of the analysis may be determined for a single presenter or across multiple presenters; for a single communication session or multiple communication sessions; for effects on a single participant, a group of participants (e.g., a subset of those in the communication sessions), or across all participants; for a single content instance, for multiple content instances, for content instances of a certain category or type, etc. In many cases personalized or customized analysis tailored for a certain company, meeting type, or situation is important. For example, the culture of two different organizations may result in different emotional or cognitive states being needed to achieve good results for the different organizations, and analysis of the communication sessions for the two organizations may reveal that. Similarly, different products being sold, different locations, different market segments, and so on may all respectively have different target outcomes of interest, different emotional and cognitive states that are effective to promote those outcomes, and different communication session elements and context factors that facilitate the different cognitive and emotional states.

For personalized analysis, the system can provide an interface allowing an administrator to specify a range of time, a set of participants, a set of communication sessions, or other parameters to limit or focus the analysis. For example, the system can use information about class sessions of many different classes and teachers to determine how students, in general, respond to different factors in communication sessions. In addition, the analysis may use subsets of data for different teachers to evaluate how different teachers are performing, so their results and techniques can be compared. Similarly, the data may be focused to specific classes, topics, or even individual students to determine how. This could be used to determine, for example, how best to encourage learning for one student in the area of mathematics, and to encourage learning for a second student in the area of history. By using analysis of data for those students and their individual outcomes, the system may identify the context factors, content, content types, teaching styles, emotions, and other factors that contribute to the best outcomes for those students.

FIG. 20 is a flow diagram showing an example of a process 2100 for analyzing communication sessions. The process 2100 includes obtaining data for communication sessions (2102). Scores for cognitive and/or emotional states of participants are determined (2104). Outcome data indicating outcomes for the participants is also obtained (2106). The scores and the outcome data are then analyzed (2108). For example, the analysis can include determining relationships between cognitive and emotional states and outcomes (2108A). The analysis can include determining relationships between communication session factors and cognitive and emotional states (2108B). The analysis can include training predictive models (2108C), such as machine learning models.

FIG. 21 is a flow diagram showing an example of a process 2150 for providing recommendations for improving a communication session and promoting a target outcome. The process 2150 includes identifying a target outcome (2152), which can be an action of a participant in a communication session or result that is separate from the communication session. The system determines one or more communication session factors that are predicted to promote the target outcome (2154). For example, the system can identify emotional and cognitive states of participants that are predicted to promote the target outcome (2154A). The system can identify communication session factors that are predicted to promote the identified emotional and cognitive states among participants in a communication session (2154B). The factors that are determined can include actions of a participant (e.g., a teacher, presenter, moderator, etc.), characteristics of a communication session (e.g., time of day, duration, number of people, etc.), content (e.g., types of media, topics, keywords, specific content items, etc.), and others. The system provides output indicating the communication session factors determined to be likely to promote the target outcome (2156).

A number of variations of these techniques can be used by the system 1510. For example, rather than (1) analyzing and predicting the emotional and cognitive states that increase the likelihood of an outcome and (2) analyzing and predicting the actions or factors that promote those emotional and cognitive states, the system 1510 may perform analysis to directly predict actions or factors that increase the likelihood of different outcomes. For example, statistical analysis or machine learning model training can be used to determine relationships between various elements of communication sessions and outcomes.

FIGS. 22A-22D show different examples of systems for providing enhanced communication sessions. As with other implementations discussed above, the video data and audio data produced by devices in the communication session is analyzed to assess the state of participants using techniques such as facial analysis, emotion detection, gesture detection, micro-expression detection, eye-gaze analysis, head position analysis, voice stress analysis, speaking time tracking, and so on. Various emotional or cognitive attributes of participants can be determined as discussed above. In the systems of FIGS. 22A-22D, the endpoints involved in the communication session perform at least some of the analysis of the video data and/or audio data that they respectively generate.

Figure 22A:
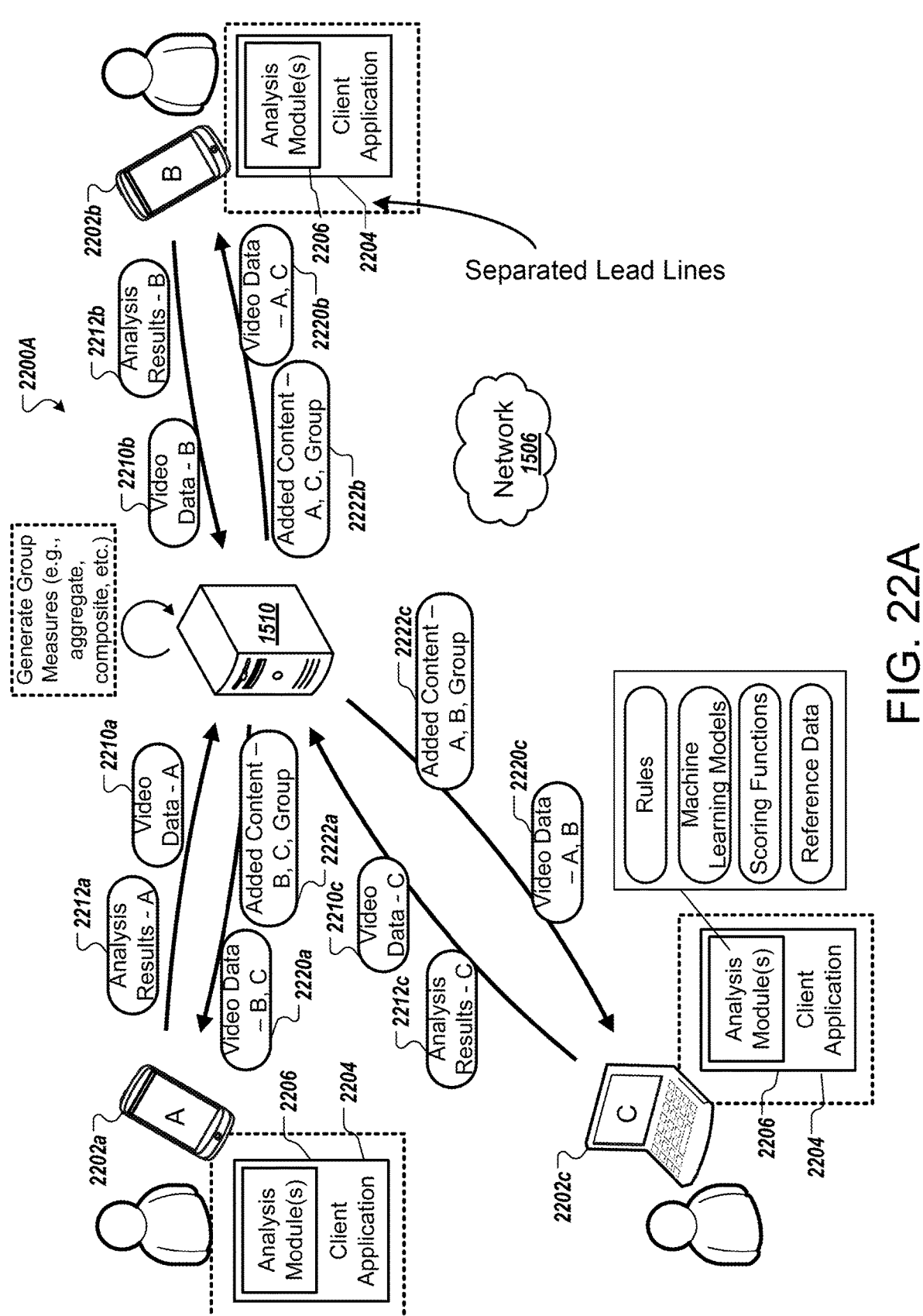
Figure 22B:
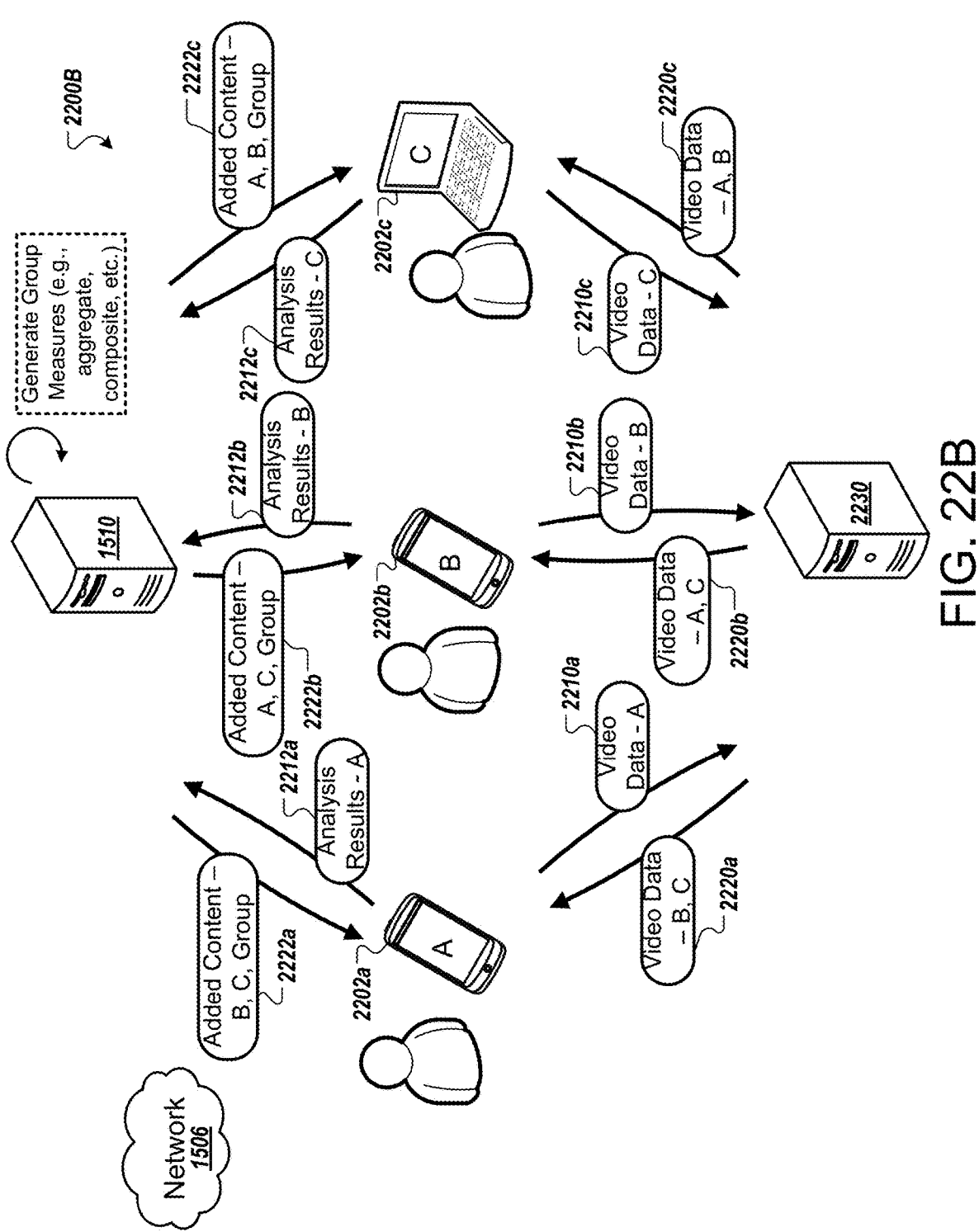
Figure 22C:
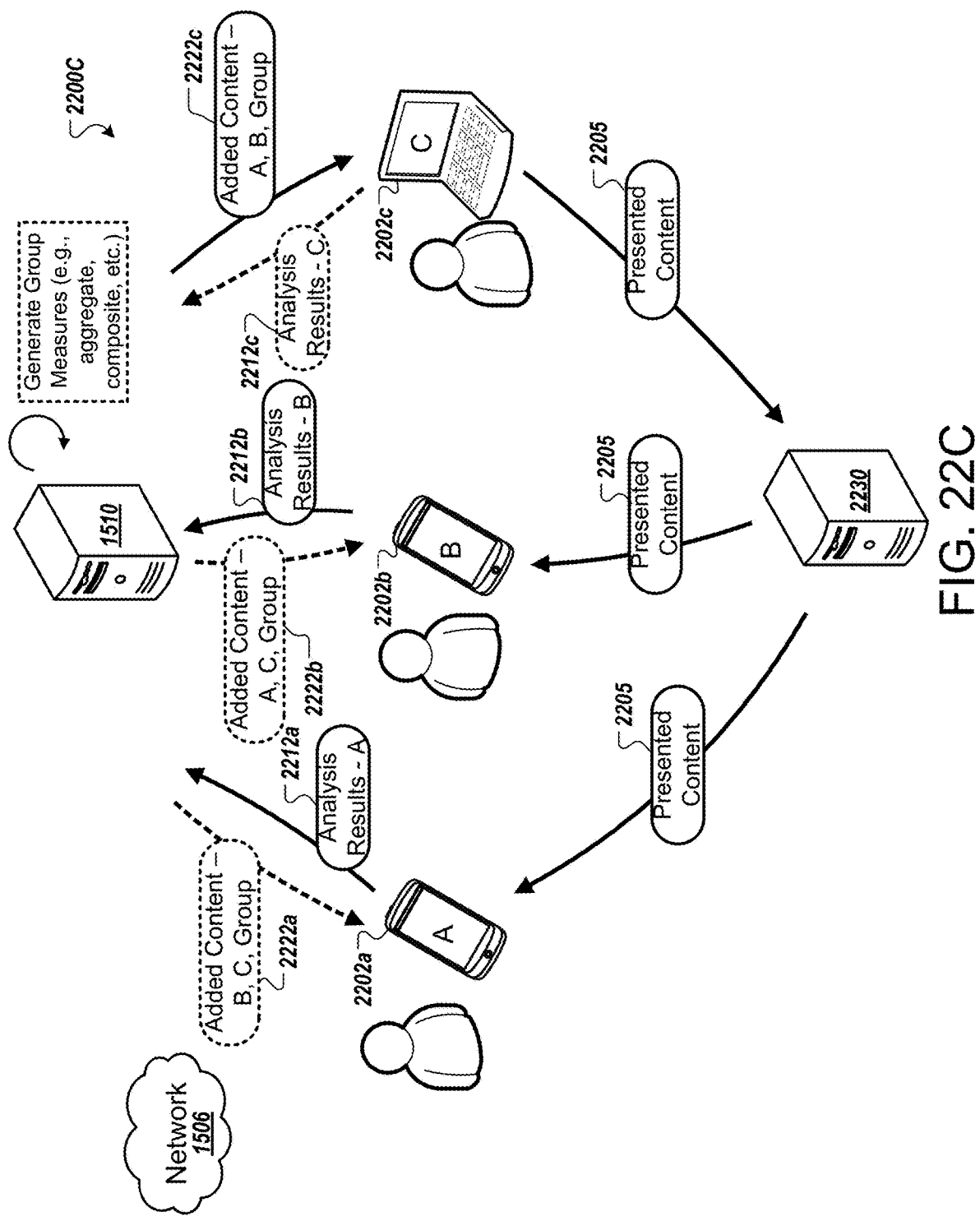

Briefly, in FIG. 22A, individual endpoints each process the media data that they generate, and provide analysis results to the server system 1510. The analysis results can provide user state data for the user of the device that provides the analysis results. For example, the user state data can indicate, e.g., scores indicating levels of emotions estimated for the user, whether the user is present in view of the camera, a direction of eye gaze of the user (e.g., whether the user is looking toward the screen or not, or which portion of the screen the user is looking toward), and so on. The system 1510 then further processes the received results and sends additional content along with media streams on to the other endpoints for display. In FIG. 22B, two separate server systems 1510 and 2230 split the functions of providing the basic video conference and enhanced participant data. Individual endpoint devices again analyze the media data that they generate, but they provide their media streams to one server system 2230 and they provide the analysis results to another server system 1510. The server system 2230 provides the media streams for endpoint devices to present, while the server system 1510 provides additional content to the endpoint devices based on the aggregated analysis results. FIG. 22C provides an example in which the endpoint device 2202*c* of a presenter or host shares content 2205 with the other endpoints, and analysis results for audio or video captured by other endpoints is provided, even if the audio or video itself is not sent to a server or provided to other endpoints. The analysis results for endpoints is aggregated and provided to the device 2202*c* of the presenter to show how the audience is responding to the presented content 2205. FIG. 22D shows some examples of processing that can be performed by the endpoint devices and the server system 1510.

In each instance where a server is mentioned, including for the system 1510, the functions can be performed using a cloud-computing system. The functions of a server need not be done by a dedicated server, but may instead be performed by dynamically allocated computing resources, e.g., for a virtual machine, container-based system, or other computing processes that can be allocated just in time or otherwise started or stopped on demand as communication sessions begin and end. Accordingly, the techniques can be performed using a "serverless" architecture that uses cloud-based, on-demand computing resources allocated as needed instead of relying on a dedicated server.

FIG. 22A is a diagram illustrating an example of a system 2200A showing architecture for scalable video conferencing management. FIG. 22A shows an example where the server 1510 supports a video conference session between three endpoint devices 2202*a*-2202*c*, each of which have a corresponding user who is a participant in the video conference. The system 2200A increases scalability and supports many different devices and users with an architecture in which endpoint devices 2202*a*-2202*c* each perform processing on the media streams that they generate. The endpoint devices 2202*a*-2202*c* each generate video data and audio data during the video conference session using their respective cameras and microphones. In traditional video conferencing systems, the local software of an endpoint device typically does not analyze the content of the audio and video generated, and simply prepares the media streams for transmission to the server, e.g., with functions such as resizing, compressing, etc. In the system 2200A, however, each endpoint device 2202*a*-2202*c* performs analysis of the content of its video stream 2210*a*-2210*c*, such as running emotion detection, facial expression analysis, eye gaze direction analysis, head position analysis, and/or other types of analysis. The analysis results 2212*a*-2212*c* from the respective endpoints 2202*a*-2202*c* are shared with the server 1510, which aggregates and further processes those results to send added content 2222*a*-2222*c* to supplement media streams during the video conference.

In the example, each endpoint device 2202*a*-2202*c* provides video data 2210*a*-2210*c* to the server 1510 over the network 1506. For example, the video data 2210*a*-2210*c* can be streamed on an ongoing basis during a video conference session or other communication session. The video data 2210*a*-2210*c* can also include audio data of a participant corresponding to the video stream.

In addition to sending the video data 2210*a*-2210*c* (which can include corresponding audio data when the users microphone is unmuted), Each endpoint device 2202*a*-2202*c* also sends analysis results 2212*a*-2212*c* which include results of the processing, by each endpoint, of the media stream that the respective endpoint devices 2202*a*-2202*c* captured, e.g., the video data 2210. The analysis results can be streamed to the server 1510 along with the video data 2210. The analysis results 2212*a*-2212*c* can be provided in different forms, such as metadata embedded in or accompanying the video data 2210, in the same data stream as the video data 2210*a*-2210*c* or a separate data stream, in a series of messages, or in another manner. The analysis results 2212*a*-2212*c* can be labelled with timestamps or other indicators that enable different scores to be synchronized with the. For example, each set of analysis result values describing the state of an endpoint and/or its user may be tagged with a time. As a result, the server 1510 can use the time stamps to match the levels of emotion indicated by the scores with the time that those emotions were detected to be present in the conference. The server 1510 can then synchronize the results for all of the participants so that Because the endpoint devices perform analysis on their own media streams, this reduces the load on the server 1510, as the server 1510 no longer needs to perform that part of the analysis. This provides an advantage especially for large conferences with many participants. The incremental additional load adding a new participant is less than it would be if the server 1510 performed the analysis, because each new participant's endpoint will perform at least some of the analysis on the media stream it contributes to the conference.

To facilitate the local processing of generated media streams at the endpoint devices 2202a-2202c, each endpoint device 2202a-2202c can have client application software 2204 that includes one or more analysis modules 2206. The client application 2204 may be a standalone application, such as one that is installed on the endpoint device before the communication session. As another option, the client application 2204 for maybe a web-based application that runs in a web browser of the endpoint device. As another example, when a user joins a communication session through a web browser, code for carrying out the media analysis can be provided dynamically, whether run in a web browser or separately, when setting up the video conference connection or just before. The server 1510, or whichever server manages the core video conference functionality, can store copies of the client software 2204 and/or analysis modules 2206, and can distribute them over the network to any devices that request them or which need the elements to effectively perform local analysis during the conference.

The analysis modules 2206 can include machine learning models 2206a used to assess different aspects of the media stream. For example, one or more neural networks trained to detect emotions from face images can be stored at the endpoint device 2202a-2202c and can then be used to process image data from the media stream that the endpoint device captures of its user. the endpoint device can be configured to periodically process new image data captured by the camera, for example, for each new frame that comes in, for every 10 frames, once per second, or at another interval. As discussed further in FIG. 22D, analysis modules 2206 can determine various scores or properties based on a media stream, including emotion scores, the presence of gestures or facial expressions, eye gaze direction of the user, head position of the user, whether the user is shown in the image frame or not, and other information about the state of the user of the endpoint.

The analysis modules 2206 and the client application 2204 perform other processing, such as applying aggregations and time series transformations to data corresponding to windows of time. For example, the analysis modules 2206 can be configured to determine a vector of emotion scores based on individual frames of captured video. The client application 2204 can then process the time series of these vectors to aggregate or filter the vectors. For example, the application 2204 may take the the sequence of score vectors for a certain period of time (e.g., over a predetermined number of frames, vectors generated, or seconds elapsed), and then perform a function to determine, for example, the minimum values, maximum values, average values (arithmetic mean, geometric mean, mode, etc.), variance, or other composite measures based on the sequence, combining them into a single vector or set of scores for the period of time.

For example, the application 2204 may generate analysis results 2212a-2212c that include a series of messages provided at a first interval (e.g., every second), where each message provides an aggregate of generated scores for a period of time of a predetermined duration (e.g., the previous five seconds). In other words, the results 2212a-2212c can be a successive stream of analysis results, each generated based on the media data captured over a different sliding window of time and the scores (e.g., emotion scores based on facial analysis results for individual frames) for that window of time. Consider an example in which a set of emotion scores are generated once per second on an ongoing basis from the audio and/or video of a media stream captured by the microphone and/or camera of the endpoint. A first result may be based on the five sets of scores generated for a window of video captured over a time range 0-5 seconds. The first result, based on the time series of the first five sets of scores, can be provided as the analysis results for the 5-second mark in the conference. The second result may be based on the five sets of scores generated for video captured during a 5-second window from time range 1-6 seconds, and the second result can be provided as the analysis result for the 6-second mark. Similarly, a third result may be based on the five sets of scores generated for video captured during a window from time range 2-7 seconds, and so on.

Aggregating or transforming the scores generated for different portions of data through time series analysis can significantly improve accuracy and reliability of the system. For example, with this technique the endpoint devices 2202a-2202c can filter out the effects of many of the transient disturbances and low-confidence analysis results. For example, during video conferencing changes in lighting, changes in camera focus, processing bottlenecks, and other issues can reduce the captured video quality at least temporarily. In addition, due to the challenging nature of emotion detection and facial analysis, even the best models are not 100% accurate and under different conditions may produce incorrect results. Nevertheless, the analysis of the time series data can indicate when momentary or short-lived conditions are detected, allowing unusual or highly variable results to be filtered out or otherwise moderated. The time series analysis can also reduce variability from one measurement to the next and improve the smoothness and stability of the values indicated in the analysis results 2212. Whether the initial scores are based on individual video frames or a series of video frames, the application of time series analysis to the sequence of scores can increase the accuracy and reliability.

The analysis modules 2206 can include other elements for generating analysis results such as rules for detecting different conditions, scoring functions for generating output, thresholds and other parameters, and so on. For example, the analysis modules may be configured to detect various different events or conditions. In some cases, dozens of different conditions or events may be detected, each with corresponding rules, thresholds, and other parameters. The rules to detect different conditions or events may use different any of various types of inputs, such as frame-level scores, and then detect conditions or events as sequences or combinations of the scores. For example, for each frame analyzed, the analysis modules 2206 can determine features or properties determined from the frame. The features may include values indicating, for example, whether the participant is shown in the video frame, whether the participant is speaking, whether the participant's eye gaze is directed toward the screen of the endpoint device, levels of different emotions estimated, and so on.

For example, although the analysis modules 2206 may determine for each analyzed frame whether a person is shown in the frame, the endpoint device 2202a-2202c may not indicate to the server 1510 that the person is not present based on the analysis of a single frame. Rather, the rule for detecting the condition of a person is not being present may specify that the "person absent" feature score remain asserted for at least a minimum amount of time, such as 10 seconds. Once the analysis results for different frames indicate that a person is absent over at least the minimum amount of time (e.g., a minimum number of analyzed frames), the condition of a person being absent is detected and indicated to the server 1510 in the analysis results 2212.

The rules used by the endpoints for analysis of media streams may indicate that certain conditions are present once particular combinations of features occur together, when one or more scores are within predetermined ranges or satisfy predetermined threshold, when features persist over a certain number of frames, and/or when the features progress according to a predetermined pattern. To facilitate this analysis, the analysis modules may include reference data such as example patterns or combinations of scores that are representative of different conditions. An endpoint, upon determining that generated scores or sequences of scores match or have at least a minimum level of similarity with a reference (e.g., a pattern or combination of scores), can identify that the condition corresponding to the reference is present.

One of the additional advantages of processing video frame data at the endpoint is the ability of the endpoints to use the full resolution, uncompressed source video generated at the endpoints 2202. Each endpoint 2202a-2202c has very high quality video data from its associated camera, while the media streams transmitted to the server 1510 are often resized, compressed, filtered, or otherwise have information removed to limit the network bandwidth used. By analyzing the video at the source, with the highest quality video available, the analysis of participants' faces, gestures, expressions, emotions, and so on can be done very accurately, without needing to transfer the full quality video to the server 1510. This can have a very large impact on the quality of emotion detection and other analysis, especially where a participant's face covers a relatively small area of the frame, and so reducing the size of the video frame would leave relatively few pixels showing the face. This is often the case when a video stream includes faces for multiple people, such as students in a classroom, participants in a corporate meeting room, and other situations with multiple participants and a single camera.

Other variations are possible and in some implementations some of the processing is done by the server 1510. In some cases, endpoint devices may provide the basic feature scores, e.g., scores or estimates for individual frames, to the server 1510 in the streamed analysis results 2212, and the server system 1510 may apply the rules to detect different events and conditions that are present.

During the video conference, each of the endpoints 2202a-2202c analyze media streams that they generate, and provide both media streams 2210a-2210c and the corresponding analysis results 2212a-2212c to the server 1510. The server 1510 receives and processes the media streams 2210a-2210c from the various endpoints 2202a-2202c, sending appropriate media streams to the respective endpoints 2202a-2202c for presentation. The server 1510 receives and aggregates the various analysis results 2212a-2212c from each of the endpoints 2202. The server 1510 then generates added content, based on the analysis results 2212a-2212c and potentially further processing by the server 1510 of the media streams. The server provides the added content to the endpoints 2202a-2202c for presentation concurrent with the media streams of the video conference.

The server 1510 distributes media streams of the various endpoints 2202a-2202c to the other endpoints 2202a-2202c for display. For example, the server 1510 sends device A (endpoint 2202a) the media streams add devices B and C (endpoints 2202b and 2202c). Similarly, the server 1510 sends device B (endpoint 2202b) the media streams of devices A and C (endpoints 2202a and 2202c). In this manner, the server 1510 the media streams for the conference to the respective endpoints 2202a-2202c that are ready to display those streams. This process may include selectively providing only a subset of the media streams generated for the video conference. For example, the server 1510 May identify a media stream including speech, and provide the video that shows the speaker, while sending lower resolution video or in some cases omitting video of other participants. Similarly, each endpoint 2202a-2202c may have its user interface adjusted to view different subsets of the media streams. The server 1510 may send only the media streams for participants currently displayed by an endpoint 2202a-2202c, in order to limit processing and bandwidth consumption.

The server 1510 provides another level of analysis of the participants in the conference and their participation in the conference (e.g., engagement, collaboration, etc.). With ongoing streams of analysis results 2212a-2212c received from the various endpoints 2202a-2202c, the server 1510 has a substantially real-time indication of how the various participants are interacting and responding during the conference. From the information about individual participants, the server 1510 can generate measures for the group of participants as a whole. For example, the server 1510 can determine overall measures of emotion, sentiment, collaboration, and other attributes across the entire set of participants. The server 1510 can have its own set of machine learning models, rules, algorithms, and so on for evaluating the set of participants and the overall state of the conference (e.g., classifying the conference based on the emotion, participation, and engagement of the participants). The server 1510 can perform the same analysis over groups or clusters of participants (e.g., subsets of the participants) within the conference. Various examples of the types of information that the server 1510 can generate and provide as added content are shown in FIGS. 9A-16. The server 1510 can provide data, for display in user interfaces of the endpoints 2202a-2202c, to for items such as engagement levels, sentiment levels, attention levels, collaboration levels, cognitive or emotional states or classifications for participants, speaking time information (e.g., distribution among participants, trends over time, etc.), clusters of participants, timelines or charts of attributes over time, recommendations, events detected, classifications determined for individual participants, and any of the other types of analysis results discussed herein. In addition, the server 1510 can provide information about individual participants based on those participants' endpoint-generated analysis results 2212, media streams, and trends over time.

The server 1510 also performs various other analysis and tracking functions for the video conference. For example, the server 1510 can track the progression of measures for individuals, groups, and the set of participants as a whole. Among other items, the server 1510 can track speaking time of each participant to determine the cumulative amount of speaking time. For each of the items measured (e.g., emotion levels, sentiment, attention, engagement, collaboration, detected gestures, and so on), the server 1510 can store the progression of values over time, with the scores for different endpoints 2202a-2202c or participants aligned and synchronized by timestamps. This allows the server 1510 to generate charts and graphs of the progression and trends in these measures during the conference, both during the conference and also at the end of the conference to provide a report or summary of the manner in which participants engaged in the conference.

As an example, in FIG. 22A, the server 1510 sends added content 2222a-2222c, to each endpoint device 2202a-2202c, indicating attributes of the other individuals and of the group of participants. For example, the device A (endpoint 2202a) is sent added content 2222a indicating the detected emotions, participation, engagement, etc. for participants using devices B and C (endpoints 2202b and 2202c) and for the group of participants as a whole. Similarly, device B (endpoint 2202b) is sent added content 2222b indicating the information for the participants using devices A and C (endpoints 2202a and 2202c) and for the group as a whole. Device C (endpoint 2202c) is sent added content 2222c indicating the information for the participants using devices A and B (endpoints 2202a and 2202b) and for the group as a whole.

The endpoints 2202a-2202c each display the video streams of the conference, and as shown in the various examples of FIGS. 9A-16, the added content 2222a-2222c, can be displayed concurrently or at least during the conference. This added content 2222a-2222c, provides information about the state of the conference and the other participants that, in many cases, a participant could not obtain any other way. As discussed above, in many cases, the number of participants in a conference is so high that not all of the video streams for participants can be displayed at the same time given the limited screen space at an endpoint. The data for the charts, graphs, symbols, scores, and other content that the server 1510 provides to enhance the video conference allows the endpoint 2202a-2202c to signal the emotional and cognitive states of other participants, and their reactions and needs, in a very space-efficient manner-in particular, in much less space than would be required to show the video streams of all of the participants. In addition, the added content 2222a-2222c, can indicate the state of the participants individually and as a group, even when the video streams provided to an endpoint are of such low resolution or low quality that the engagement and emotion may be difficult or impossible for a participant to detect.

The added content 2222a-2222c, allows information describing the state of participants and the ongoing trends and changes occurring over the course of the conference, even when the participants' video streams are not all provided to an endpoint 2202a-2202c and are not displayed by the endpoint 2202a-2202c, and so information about those participants would be entirely unavailable to the participant. This is particularly important in situations where there are many participants, e.g., 20, 50, 100, 500, 1000 or more, and it is not feasible for any endpoint 2202a-2202c to display all of the video streams concurrently, nor for the system to transfer all of the media streams over the network 1506, much less for a person to be able to interpret and understand all of the video streams even if they could be provided. For example, as discussed in FIGS. 15 and 16, providing aggregate measures of the states and behaviors of group can provide a valuable connection of a participant to the rest of the participants, conveying the reactions and other nonverbal communication that would otherwise be missing from traditional video conferences due to screen space limitations, network bandwidth constraints, and other limitations.

FIG. 22B is a diagram illustrating an example of a system 2200B for enhanced video conferencing. FIG. 22B, like FIG. 22A, shows an example in which endpoint devices 2202a-2202c that generate and send media data streams 2210a-2210c as well as analysis results 2212a-2212c based on local analysis by each endpoint 2202a-2202c of the media stream captured for its own local user. However, unlike FIG. 22A, the two different servers 1510, 2230 are used to perform different functions in the system. In the system 2200B, the endpoint devices 2202a-2202c send media streams 2210a-2210c to the server 2230 and send analysis results 2212a-2212c to the server 1510. The servers 2230, 1510 provide different components of the video conference for display by the endpoints and can operate independently of each other. This arrangement can enable the enhancements to video conferencing discussed herein to be added to any video conferencing platform. The arrangement also allows the processing load for server functions to be distributed between multiple servers, which can facilitate supporting larger conferences (e.g., with larger numbers of participants) and a larger number of concurrent conferences.

The server 2230 performs the functions of a conventional video conference server. The server 2230 receives the various media streams 2210a-2210c generated by the endpoints 2202. The server 2230 manages the distribution of those media streams among the endpoints 2202a-2202c for the video conference, e.g., as media data 2220.

The server 1510 performs the processing to generate the added content 2222a-2222c to provide alongside the media of the videoconference. The server 1510 may not provide communication services to communicate between devices, but instead may perform the analysis functions such as engagement analysis, content labelling, and context detection. The server 1510 receives the analysis results 2212a-2212c from each endpoint device 2202a-2202c and combines the results to generate aggregate measures for the full set of participants in the conference, as discussed above. The server 1510 can provide information for the full set of participants in the conference, for one or more groups or subsets of participants in the conference, and/or for individuals (e.g., including, in some cases, forwarding on analysis results that individual endpoints provide). In some implementations, the server 1510 also performs analysis on media data, such as on video streams, and so the media streams 2210a-2210c may be transmitted to and processed by the server 1510.

Because the server 1510 generates the added content 2222a-2222c separately and independently from the server 2230, it can be used to supplement video conferences of any video conference platform or provider. The combination of the added content 2222a-2222c into the video conference interface (e.g., overlay or combination with the video streams and other user interface elements displayed) can be done by the software running on the endpoints 2202. This provides a platform-independent solution that can add real-time tracking and analysis of video conference participants to the video conference of any provider, often without any coordination or change to the functionality of the third-party video conference server (e.g., server 2230).

Although the two servers 1510, 2230 are shown to be separate and independent in FIG. 22B, in some implementations they can optionally communicate or coordinate to provide video conference information. For example, in some cases the server 1510 may provide the added content 2222a-2222c to the server 2230, and the server 2230 can incorporate the added content 2222a-2222c with the media stream data of the video stream conference.

FIG. 22C is a diagram illustrating an example of a system 2200C for enhanced video conferencing. FIG. 22C shows a variation of the system shown in FIG. 22B, in which the communication session is primarily a one-way presentation from one participant to the others. For example, in a web-based seminar (e.g., a "webinar") or a lecture in an educational setting, one endpoint 2202c may provide presented content 2205, often visual content different from a media stream of the presenter (e.g., a presentation slide deck, a video, a document, a screen share, etc.). The presented content 2205 can also include audio content, such as speech of the presenter captured by a microphone of the endpoint 2202c. The presented content 2205 can be distributed by the server 2230 to the other endpoints 2202a, 2202b for display. Video content of the presenter, e.g., the user of endpoint 2202c, can optionally be captured, provided to the server 2230, and provided to the other endpoints 2202a, 2202b.

In many seminars, lectures, and similar types of communication sessions, video content (and even visual content altogether) often is not transmitted by participants other than the host or presenter. Reflecting this, the endpoints 2202a, 2202b do not send generated video streams to the server 2230 that is managing the communication session. Nevertheless, the endpoint devices 2202a-2202c can still capture video of their users during the communication session, and the local client software 2204 and local analysis modules 2206 can be used by each endpoint 2202a-2202c to analyze the state of the participant (e.g., emotional and/or cognitive state, such as emotion, attention, engagement, etc., reactions, gestures, and so on) based on the audio and/or video captured. The locally-captured media stream for each endpoint 2202a-2202c may not be provided to any server, and indeed this helps reduce the network bandwidth requirements for the system 2200C. However, the analysis results 2212a-2212c may still be provided to a server, e.g., server 1510, to indicate, in substantially real time during the communication session, the varying levels of engagement and other attributes of the participants and the participants' reactions to the presented content 2205.

The server 1510 uses the analysis results 2212a, 2212b of the members of the audience for the presentation to generate the added content 2222c for the presenter's endpoint 2202c aggregate measures for the audience. The server 1510 can perform any of the other tracking and analysis discussed herein. Optionally, captured media stream data can be provided to the server 1510 (and not distributed to any other endpoints) for further processing to generate added content. In other words, the server 1510 may also analyze media stream data to provide additional analysis results for the participants.

Optionally, information about the engagement or state of other participants and the audience as a whole can be provided to the individual participants (e.g., other than the host or presenter), shown by the added content 2222a, 2222b shown in dotted lines. Similarly, the analysis results 2212c for the presenter can optionally be generated and provided to the server 1510 and then used in generating the added content for the group.

While the illustrated example shows a video conference session, the same techniques can be used for in-person attendance event, where devices are not sending video or audio communication remotely (e.g., no communication with the server 2230) but endpoints 2202a-2202c are still doing analysis and communicating with the server 1510. This can be used to monitor the state and effectiveness of in-person events using these techniques. FIG. 22A shows that the analysis of the server 1510 can be integrated with and delivered through a communication platform such as a videoconference system. However, as indicated in FIG. 22C, the server 1510 can be part of a totally separate system, such as an engagement analysis system independent from the communication platform. The server 1510 may not provide any communication services, just context analysis and content labelling to analyze the state of the conference and its participants. In addition, for all of FIGS. 22A-22C, the communication session may be an audio conference (e.g., where video data is not transmitted).

FIG. 22C shows the generating of added content 2222c performed by a different server 1510 than the server 2230 used to distribute the presented content 2205. However, in other implementations, the functions of the servers 1510, 2230 can be performed by a single server in the manner shown in FIG. 22A.

FIG. 22D is a diagram illustrating an example of a system 2200D for enhanced video conferencing. FIG. 22D illustrates examples of processing that may be done by endpoints 2222a-2222c and the server 1510. The example shows only one possible breakdown of tasks among the endpoints 2222a-2222c and the server 1510. The types of analysis that can be used are only examples, and different types of analysis (more or fewer than those shown) and a different distribution of the analysis tasks may be used. The types of processing and analysis results represented in the example can be used with any of the topologies discussed herein, including each of FIGS. 22A-22C.

As discussed above, endpoints 2202a-2202c each provide a corresponding stream of analysis results 2212a-2212c, which can provide user state data describing the state of the user of the endpoint 2202a-2202c that provides the analysis results. Each stream of results or user state data can be provided as, for example, a series of messages sent periodically (e.g., at a regular interval), as metadata or annotation data accompanying or embedded with media data 2210, as data sent in periodic batches, or in another manner. Each message or set of analysis results that an endpoint sends can include various scores, and the element 2250 shows a list of various types of scores or analysis results that may be included. If an endpoint performs analysis of every fifth frame, the endpoint may generate analysis results for frame 5, frame 10, frame 15, frame 20, etc. in an ongoing manner as the video conference proceeds. The analysis results for each of the analyzed frames (e.g., 5, 10, 15, 20, etc.) may include values for any or all of the types of information indicated in element 2250, so there is a first message with the set of analysis results corresponding to frame 5, a second message with the set of analysis results corresponding to frame 10, a third message with the set of analysis results corresponding to claim 15, and so on.

While the endpoints may regularly provide analysis results corresponding to a certain frame, e.g., timestamped to a particular portion of the communication session, the values within one message of analysis results are not necessarily based on a single frame of video data. For example, some scores or measures may be based on the analysis of a single frame, while others may be based on analysis of data captured over a window of time (e.g., the last 30 frames captured, or the last 5 frames analyzed, etc.). Different values in the provided data may be based on windows of different sizes, e.g., with some based on a window of the previous 5 seconds, others based on a window of the previous 1 second, and so on. The sizes of the windows of video data or of analysis scores used may vary in length.

Depending on the implementation, each endpoint may perform analysis on every video frame that is received or may skip frames by analyzing a frame every N frames, where N is a predetermined integer (e.g., analyze every 5 frames, or every 10 frames, etc.). In some implementations, client devices may vary the rate at which captured video frames are analyzed based on the processing capability and load of the endpoint device. For example, the endpoint may analyze every fifth frame when CPU utilization is below a threshold such as 80%. If CPU utilization exceeds the threshold, then the endpoint can fall back to analyzing fewer frames, e.g., one every 15 frames or one every 30 frames, Until the CPU utilization falls below the threshold or a limit on spacing between analyzed frames (e.g., minimum of 1 frame analyzed per 60 frames captured or minimum one frame every two seconds) is reached.

Each message or set of analysis results provided in the streams of analysis results 2212a-2212c can include values for any or all of the items listed in element 2250. These include: an emotion vector (e.g., scores for each of the basic emotions or other emotional or cognitive attributes or states); scores indicating detected states, gestures, expressions, etc.; a determined eye gaze direction for a participant; a determined head position of the participant; a score indicating whether a user is present (e.g., shown in the video feed); results of pattern matching; results of time-series analysis, transformations, and filtering; results of application of rules (e.g., to frame-level features); detected of events and conditions; frame-level features (e.g., information extracted based on a single frame); and segment-level features (e.g., information extracted from a sequence of multiple frames, such as the past 10 frames of video, or the last second of video). As noted above, the values can be based on time-series data, e.g., maximum, minimum, mode, variance, moving average, etc., across scores generated for each frame in a sequence of single-frame scores for analyzed previous frames. The values can also include values derived from local processing of audio data, such as background audio level, whether speech of the endpoint's user is detected, and so on.

In some implementations, the data in each message or set of analysis results provided in the streams of analysis results 2212a-2212c can be relatively simple, such as an emotion vector indicating emotion scores estimated based on a single image frame or for image frames for a single analysis window of captured video data. This can be an emotion vector of basic emotions as discussed above (e.g., numerical scores for levels of each of basic emotions such as, happiness, sadness, anger, etc.) or can include scores for other emotional or cognitive attributes. As noted above, other feature values, such as whether a person is shown in the frame and a gaze direction can also be added. The server 1510, not the endpoints 2202a-2202c, can then perform the processing to apply time-series transformations, apply rules, compare to reference thresholds and ranges, etc. and do any of the other processing discussed for the endpoints 2202a-2202c. In other words, the analysis results 2212a-2212c can represent a stream of user-state "heartbeats," regularly providing pulses or data points indicating user emotion and cognitive state at different points in time during the communication session on an ongoing basis. With endpoints 2202a-2202c providing a streams of raw or unfiltered scores, e.g., frame-level feature values or small-window-level feature values, the server 1510 can implement and change rules, and even select different sets of rules to apply for different contexts or communication session types, without any need to change the operations at the endpoints 2202a-2202c. For example, to change the size of window used to aggregate data or to apply time-series filters, a single change can be made at the server 1510, and no change need be made to the generation and transmission of the analysis results 2212a-2212c at the endpoint devices 2202a-2202c.

The generation of the analysis results 2212a-2212c still relieves a significant processing burden for the server 1510. For example, the emotion analysis may involve inference processing using a neural network every 10 video frames captured in a 30 frame-per-second video capture. In a large conference of involving 100 different endpoints, if the server 1510 were to do all of the analysis, the server 1510 would need to run 300 neural network inference operations every second in addition to the other management of the video conference. The computational load increases further when the analysis rate increases (e.g., every 5 frames) and for conferences with more endpoints. By distributing the processing to the endpoint devices 2202a-2202c, the server 1510 is relieved of a significant processing burden which can free up resources to handle more simultaneous calls, allow the maximum number of endpoints to be higher, and provide other efficiency benefits.

As shown in element 2250, each message or set of analysis results generated can include other identifiers and values that the server 1510 can use for tracking and processing the results. Examples include a communication session identifier (e.g., to indicate the particular video conference session), a device identifier (e.g., to indicate the particular endpoint and/or participant for which data is being provided), and a timestamp indicating the point in time in the communication session that the analysis results correspond to.

As discussed above the server 1510 receives the various streams of analysis results 2212a-2212c and then performs further processing to generate the added content 2222a-2222c. Element 2260 shows examples of various types of analysis that the server can perform as the communication session proceeds. The various functions can be performed repeatedly or continually during the communication session, as well as at the end of a communication session to generate a summary or report. The server 1510 can store various software elements and data items to facilitate the analysis, including machine learning models (e.g., for gesture detection, emotion detection, voice stress analysis, micro-expression detection, etc.), sets of rules (e.g., that indicate conditions or criteria for detecting conditions or determining applicability of different recommendations), reference data (e.g., thresholds, ranges, patterns, etc.) for comparison, speech recognition models or keyword detection models, and so on.

In general, the server 1510 can perform processing that involves aggregating data from multiple endpoints 2202a-2202c. In most cases, each endpoint 2202a-2202c will not have the analysis result streams 2212a-2212c of all of the other endpoints 2202a-2202c. Further, it generally is not an efficient use of processing capability or communication bandwidth to transmit the streams 2212a-2212c to all devices 2222a-2222c and redundantly process the streams 2212a-2212c separately at each endpoint device 2202, although this can be done. The server 1510, however, can efficiently compile the information from the various streams 2212, and then provide aggregate information about the various endpoint devices 2222a-2222c and their participants to the endpoint devices 2202a-2202c. Another function that the server 1510 performs is to monitor and store the analysis results over time, for example, tracking the history, changes, trends, and patterns that occurred during the conference as they developed. While the analysis at each endpoint is typically focused on that endpoint's own media stream and analysis is typically short-term (e.g., the last 10-30 seconds), the analysis by the server 1510 can focus on conditions across multiple endpoints and the set of participants as a whole as well as for longer time periods (e.g., tracking progression of scores and conditions and determining cumulative measures for the entire communication session). In addition, in some implementations, the server 1510 can perform some or all of the analysis discussed as being performed by endpoint devices in element 2250 and above.

The server 1510 can aggregate analysis results from multiple endpoints, for example to generate composite measures for the group for various properties (e.g., engagement, collaboration, etc.). The server 1510 can align or synchronize results received from endpoints 2222a-2222c using the timestamps, identifiers, and other data in the analysis result streams 2212. The server 1510 can apply rules to detect conditions or states present across the session as a whole (e.g., for multiple endpoints). The server 1510 can generate cumulative measures or rolling measures over time for various properties of individuals, subsets of participants, and for the full set of participants. The server 1510 can also perform analysis on media streams, e.g., on individual image frames, on video segments, on audio data, and so on. This can include performing micro-expression detection, gesture detection, emotion detection, voice stress analysis, and other processing. The server 1510 can perform speech recognition and spoken keyword detection, potentially leveraging third-party servers to perform these tasks. The server 1510 can apply various non-linear transformations to the streams of analysis results 2212, including performing time-series analysis and time-series transformation as discussed above for endpoint devices. The server 1510, however, can apply these types of transformations and pattern matching to detect conditions that are indicated by more than a single endpoint's analysis results. For example, the server 1510 can determine whether a condition is present, where the rule for detecting the condition may involve having multiple participants each having a certain attribute or state at the same time or within a time range of each other. This facilitates detection of conditions such as a drop in positive emotion across at least a minimum number of participants or minimum percentage of participants, detection that a cluster for a certain sentiment level exceeds a minimum threshold size, and so on.

The server 1510 can perform various comparisons among analysis results of different parties, comparing the analysis results (e.g., emotion, attention, engagement, and other properties) to reference levels or to each other. For many types of communications, such as telemedicine sessions, sales meetings, and so on, important analysis factors include the relationships among participants' engagement and emotion, and the timing with which different attributes occur among different participants. The server 1510 can use the streams of analysis results 2212, showing how scores indicating levels of emotions, engagement, and other attributes of different participants vary over time relative to each other to detect conditions and assign scores. For example, in telemedicine, the server 1510 can determine and track an empathy score based on how a caregiver responds to the emotions of a patient. The empathy score can measure, for example, the extent that the caregiver's expressions and emotions mirror those of the patient. Other scores can indicate the responsiveness of a participant to the emotions or to the overall engagement and emotion in the communication session.

The server 1510 can filter the media streams and/or analysis results received. The server 1510 can categorize participants based on their results, and can generate recommendations to the participants for facilitating collaboration in the communication session or adjusting operating parameters for the communication session itself. In some implementations, the server 1510 performs queuing and prioritizing of recommendations when multiple rules are triggered, using hierarchies or decision trees. For example, the server 1510 may determine that three rules each have their criteria satisfied, and each rule has a corresponding recommendation. The server 1510 can select a single recommendation to provide to an endpoint, for example, by assigning priority scores, ranking the different recommendations, and selecting the highest-scoring recommendation, or by determining which recommendation is indicated to be the highest priority in a decision tree or hierarchy. The results of the various types of analysis shown in element 2260 are used to generate and provide the added content 2222a-2222c that is provided to the endpoint devices 2202a-2202c.

The server 1510 can accumulate or integrate observations from the endpoint devices 2202a-2202c over time. This can involve tracking cumulative measures, such as each participant's speaking time, or otherwise counting or tracking occurrences. The server 1510 can perform functions such as state matching for individuals state matching for groups. For example, the server 1510 can use rules to identify combinations of scores or progressions of scores over time that satisfy predetermined thresholds or ranges, and classify a particular state as occurring when these are detected. For some events and conditions, a state may need to persist for at least a minimum duration of time for the event or condition to be considered present. In general, the server 1510 can look for the occurrence of complex conditions that involve changes time and/or multiple participants. The events and conditions detected may involve combinations of various different scores. For example, the event or signal for the server 1510 to inform a user that they have been talking too long can be conditioned on the engagement score for the total group of participants. If the engagement in the communication session is below a predetermined threshold when a participant exceeds their allowed time, the notice can be provided. By contrast, if the engagement is above the threshold, the notice can be suppressed, since the overall state of the communication session is favorable. In some cases, a metric may be required to drop below a certain threshold for at least a minimum time before a corresponding event or condition is detected. In addition, rules can vary the sets of participants used to generate different measures for the communication session. For example, the server 1510 can exclude certain participants from the analysis if the participants are in the classification of being off camera. These participants can be shown as having a status of "off camera" or "away," but their emotion data (or rather lack thereof) can be excluded from the overall group measures to avoid skewing the results.

The server 1510 can determine various types of added content 2222a-2222c to provide, as discussed above. In some implementations, the added content 2222a-2222c can forward on some or all of the data from the analysis results 2212a-2212c of other endpoints, for example, providing a subset of or a filtered or processed version of the analysis results 2212a-2212c. For example, in some implementations, the server 1510 may provide scores determined by the server 1510 from processing (e.g., aggregating, filtering, clustering, classifying, applying rules, etc.) the various analysis results 2212a-2212c. Depending on the implementation, the server 1510 can forward on all the analysis results 2212a-2212c, portions of the analysis results 2212a-2212c (e.g., a subset of the types of data or types of values), or other values or results derived by the analysis done by the server 1510. All of the endpoints 2202a-2202c can receive consistent updates of certain kinds of data, such as data indicating speaking time of the participants (e.g., totals for individuals or classifications for individuals). In most cases, there is no need for the endpoints 2202a-2202c to receive all of the raw or frame-level emotion scores of other endpoints.

As another example, the server 1510 can provide scores or classifications for different endpoints for a chart, graph, heatmap, histogram, or other visualization regarding the emotional or cognitive states of participants. The individual data items can be deidentified, so that specific participant identities are not indicated, but the additional data 2222a-2222c nevertheless indicates the distribution or statistics for different participants for the communication session. In some implementations, k-means clustering of participant scores (e.g., the analysis results 2212a-2212c or scores derived from them) to create clusters to display can be done by the server 1510 and results sent to the endpoints 2202a-2202c. Alternatively, the scores to be clustered can be sent to the respective endpoints 2202a-2202c which can perform the clustering.

In some implementations, the server 1510 sends the same added content 2222a-2222c to each endpoint 2202a-2202c. The respective endpoints 2202a-2202c can then filter the information or customize their user interfaces according to the preferences, views, and mode selected at the particular endpoint. For example, the server 1510 can send a set of scores to each endpoint 2202a-2202c, and then the respective client software at the endpoints 2202a-2202c can process and format the received data so that (1) a first endpoint with software operating in a host mode (e.g., as host or presenter of the communication session) shows a first view with a first subset of the added content 2222a-2222c, and (2) other endpoints with software operating in a non-host mode show a different, second view with a different, second subset of the added content 2222a-2222c. By selectively adjusting the presentation at each endpoint, the server 1510 does not need to determine which device(s) are in the host or presenter mode at any given time, nor which portions or views of the user interface are being used, and each client can still take from the added content 2222a-2222c the appropriate data to generate its user interface. Endpoint devices may store data, or have incorporated into their software, functions or modules for converting received added content 2222a-2222c into displayable representations, e.g., charts, graphs, gauges, symbols, interactive user interface elements, user interface formatting, and so on.

In some implementations, the server 1510 sends the added content 2222a-2222c in a stream or series of updates, for example, with updated scores for individual participants, groups of participants, and/or the communication session as a whole multiple times a second. Nevertheless, the refresh rate by the user interface of the endpoints 2202a-2202c can be slower to save power, for example, once every two seconds. Each endpoint 2202a-2202c can accumulate data received over a period, e.g., two-second periods, and apply functions to the data received for the period to update the user interface.

In the examples of FIGS. 22A-22D, each of the endpoint devices 2202a-2202c are indicated to perform analysis of their video and to send analysis results 2212. However, this is not always the case. The systems discussed can operate in different modes, some of which may involve client-side analysis of image and video data (e.g., emotion processing and other user state determination) and others may not. For example, the server 1510 may use client-side generation and transmission of analysis results 2212 for some network-based sessions and not others. Similarly, even for the endpoints 2202a-2202c of a single communication session, some may generate and provide analysis results 2212 while others may not and the server 1510 may instead perform the analysis with models, rules, and other items stored at the server 1510. Endpoint devices 2202a-2202c may also dynamically switch between modes of providing analysis results 2212 from one communication session to another, or within a communication session, for example, in response to changes in processing utilization (e.g., performing the analysis when processing load is low and discontinuing the analysis when processing load is high). The server 1510 may negotiate with each of the endpoints 2202a-2202c, at the beginning of a connection and/or at various points during the communication session, about which analysis tasks the endpoints 2202a-2202c will perform and which data will be provided in the analysis results 2212, as well as other parameters such as the format for the analysis results 2212, the frequency at which messages or batches of analysis results 2212 are sent, and so on.

This versatility also enables the server 1510 to accommodate a wide variety of different types of endpoint devices 2202a-2202c. Some endpoint devices 2202a-2202c may not have the hardware capability (e.g., processing speed) to add the local analysis, others may not have the appropriate software or analysis modules to perform the analysis, some may run an operating system or otherwise have a configuration that is incompatible with receiving and running the software or analysis modules. For example, some types of endpoint devices 2202a-2202c, such as videoconference appliances running proprietary software, may not allow third-party software to be received and run, and so may disallow use of the software for local endpoint analysis of generated media data. In these cases, the server 1510 can perform the analysis itself based on a received video stream, allowing data determined from video for even endpoints that cannot run the analysis software to be included in generating the additional content for all of the endpoints in the conference.

FIG. 23 illustrates an example of an enhanced video conference system that performs dynamic assignment 2330 of video analysis tasks to endpoint devices 2202a. While standard video conferencing systems share audio and video data obtained from endpoint devices 2202a, an enhanced video conference system augments a standard videoconference's video and audio data by providing supplemental user state data. This supplemental user state data can indicate, for example, emotions, micro-expressions, voice stress and other information derived by analyzing voice and/or video data from the video conference. Video analysis tasks, performed by some combination of the server 1510 and endpoint device 2202a, produce the supplemental user state data.

The need to assign some video analysis tasks to endpoint devices 2202a in an enhanced video conference system arises from the technical challenges encountered by enhanced video conference systems, including supporting a large number endpoint devices simultaneously and ensuring responsiveness to the endpoint devices. Enhanced video conferencing systems must ensure timely delivery to users of both the video and audio data from the other participants, and the supplemental user state data generated by the video analysis tasks. If the enhanced video conferencing system is late delivering any such information, the user experience is degraded. In some cases, delays can render the enhanced video conferencing system unusable. In addition, as the number of endpoint devices participating in the enhanced video conference increases, the computing workload required for a server to complete video analysis tasks will also increase, impairing the server's ability to be responsive, especially as the number of users grows large.

These challenges can be addressed by performing some video analysis tasks at an endpoint device 2202*a*. By assigning some video analysis tasks to the endpoint device 2202*a*, the load on the server 1510 or network 1506 can be reduced. This improves the scalability and responsiveness of an enhanced video conferencing system. For example, if micro-expression analysis is performed at an endpoint device 2202*a*, it might not be necessary to transmit high-resolution from the endpoint device 2202*a* to the server 1510. As a result, less data is transmitted, so the burden on the network 1506 is reduced, and the server need not perform the micro-expression analysis for that endpoint device 2202*a*, so the computing burden on the server 1510 is also reduced.

However, since the capabilities of the endpoint devices will differ, how the video analysis tasks are shared between the server and the various endpoint devices can also differ. More capable endpoint devices can perform more of the video analysis tasks, requiring less computational support from the server. Conversely, less capable endpoint devices will perform fewer video analysis tasks, requiring a higher level of computational support from the server. Similarly, some endpoint devices might lack hardware or software necessary to execute a particular video analysis tasks, requiring the server to complete those tasks.

Even among endpoint devices with the same capabilities, the resources available to support the video conference can vary. For example, one endpoint device might solely be supporting the video conference, while another device of similar capability might be executing other resource-intensive tasks, such as processing information from a social network. In such cases, the former device can execute relatively more of the video analysis tasks than the latter device.

In addition, the resources available at an endpoint device 2202*a* can also vary during the enhanced video conferencing session. Returning to our prior example, the endpoint device executing the resource-intensive tasks unrelated to the enhanced video conference might complete some of all of those tasks, freeing resources on that endpoint device that can be used to execute additional tasks from the enhanced video conference.

In summary, to determine the assignment of video analysis tasks to an endpoint device 2202*a*, the server 1510 can consider both the endpoint device's capabilities and the resources available at an endpoint device at a particular time during the enhanced video conferencing session. If resource availability at an endpoint device 2202*a* varies during the video conferencing session, the server 1510 can assign a different set of video analysis tasks.

Figure 23A:
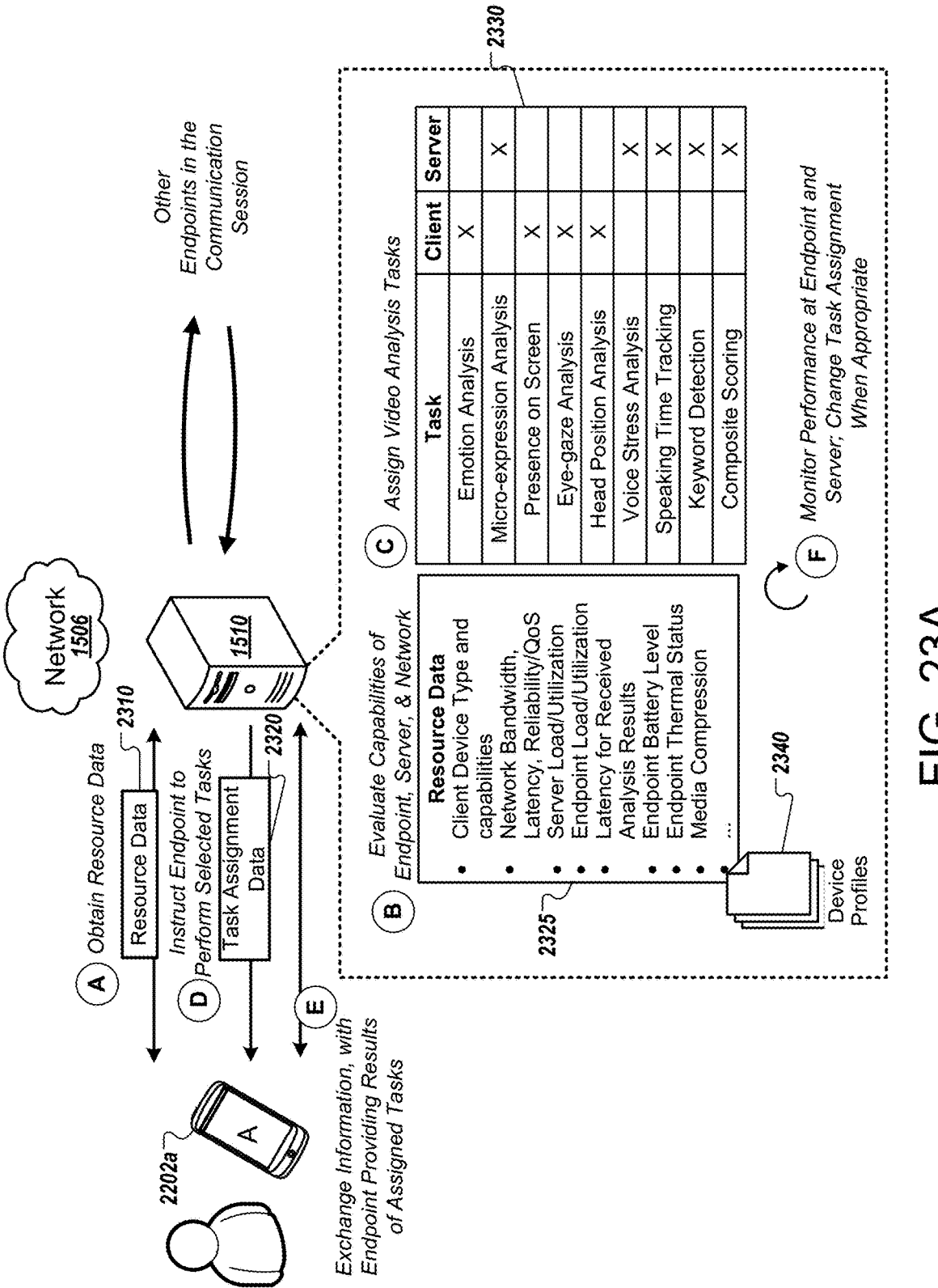

FIG. 23A shows the system in overview. To determine which video analysis tasks to assign to a particular endpoint 2202*a*, the server 1510 obtains resource data 2310 that describes the capabilities of the first endpoint device 2202*a* or of a network connection 1506 of the first endpoint device 2202*a*. For example, the resource data 2310 can indicate the type of endpoint device, such as laptop or mobile phone. The resource data can also indicate the resources available at a particular time during a video conferencing session to support video analysis tasks such as the level of available CPU or memory. To create an assignment 2330 of video analysis tasks for the endpoint device 2202*a*, the server then evaluates resource data of at least one of the endpoint devices 2202*a*, of the server 1510, of the network 1506, or of any combination. For example, the server can have a preconfigured set of video analysis tasks that it assigns to laptops. Alternatively, the server can determine a set of video analysis tasks that will not, in combination, exceed the capabilities of the endpoint device 2202*a*. The server then sends task assignment data 2320 to instruct the endpoint device 2202*a* to perform the video analysis tasks included in the assignment 2330.

Over the course of the video conference, the endpoint devices 2202*a* send to the server 1510 video data and supplemental user state data created when the endpoint devices 2202*a* execute the assigned video analysis tasks. The server 1510 receives from the endpoint devices video data and supplemental user state data, and can execute video analysis tasks to create new supplemental user state. The server 1510 then transmits to the endpoint device 2202*a* content of the communication session and the supplemental user state data. Such supplemental user state data can indicate the results of micro-expression analysis, eye-gaze analysis, among voice-stress analysis, among other options. The content from the communication session can be video and/or audio from other participants.

In step (A), the server 1510 obtains resource data 2310 for the endpoint device 2202*a*. The resource data 2310 is indicative of capabilities of the endpoint device 2022*a*. For example, it can be a broad description of the endpoint type (laptop, mobile phone), a more specific description of the endpoint type (mobile phone model 5), a description of the overall capabilities of the device (10 units of CPU), a description of the endpoint's available resources at a particular time (5 units of CPU are available), or any combination.

Resource data 2310 can include hardware capabilities of the resource. For example, for an endpoint device 2202*a*, hardware capabilities can include total CPU capacity, total storage, total memory, the presence and model of a GPU, Wi Fi capabilities, and cellular capabilities.

In addition, resource data 2310 can include the capabilities of the endpoint device at a particular time during the video conference session. For example, for the endpoint device 2202*a*, such capabilities can include the available CPU capacity and available memory at a particular time during the video conferencing session.

Resource data 2310 can also include capabilities of the resource that vary during the enhanced video conferencing sessions. For example, for the endpoint device 2202*a*, such capabilities of the device can include available CPU capacity, available storage, available memory, remaining battery life, and thermal characteristics. CPU capacity and available memory will vary as the endpoint device performs and completes tasks unrelated to the enhanced video conference. Available storage will be reduced if the user of the endpoint device 2202*a* saves a file to the storage. Battery life of an endpoint device 2202*a* can be reduced when the device is running on battery power and increased when the device 2202*a* is plugged in.

Resource data 2310 can include a prediction of capabilities of the endpoint device at a future point during the video conferencing session. For example, for the endpoint device 2202*a*, predicted capabilities can include the predicted available CPU capacity and predicted available memory one minute after the prediction is made. In some implementations, the prediction is made using a linear regression forecast that uses measurement of actual resource usage over recent period, such as 5 minutes, to predict resource usage 1 minute in the future.

Resource data 2310 can also reflect capabilities of the network 1506. In such cases, resource data 2310 of the network 1506 can include maximum throughput, average throughput, average latency, maximum latency, minimum latency, and other measures of network resources. In some implementations, the server 1510 can obtain resource data reflecting capabilities of the network from a network management module associated with the network 1506.

In addition, resource data 2310 can reflect capabilities of the server 1510. For example, resource data 2310 of the server 1510 can include available CPU capacity, available storage, memory, the presence and model of a GPU, maximum network speed, and other measures of server resources. As with the endpoint device, the capabilities of the server can vary over time, such as increasing or decreasing available memory, and this variance can be reflected in resource data 2310 associated with the server. Resource data of a server can be obtained by querying the server's systems management component.

In varying implementations, resource data 2310 can be obtained from the endpoint device 2202a, the network 1506, the server 1510, or from any combination. The server 1510 will use the resource data 2310 to determine which video analysis tasks to assign to the endpoint device 2202a.

Obtaining resource data 2310 from the endpoint device 2202a can be accomplished using various approaches. In one example, the endpoint device 2202a can transmit a set of resource data 2310 to the server 1510 as a set of {key, value}pairs where they key indicates the type of resource and the value indicates the capacity of that resource. For example, if the CPU at the endpoint device 2202a has a capacity of 8 units, the endpoint device can transmit {"CPU", 8}. The server 1510 can also obtain the resource data 2310 by receiving it from the endpoint device 2202a, querying a data source such as a systems management module, or using a known identifier associated with the endpoint device 2202a to retrieve the resource data from a database that associates identifiers and resource data.

Resource data 2310 can also be determined by inspecting metadata associated with the endpoint device 2202a. For example, the server 1510 can inspect metadata provided by the endpoint device 2202a during the communication session. In some implementations, metadata can include headers made available by the HTTP protocol.

Alternatively or in addition, the server 1510 can generate resource data 2310 by observing interactions with the endpoint device 2202a during the communication session. For example, the server 1510 can measure the time elapsed between the arrival of transmissions from the endpoint device 2202a. In another example, the server 1510 can measure the variability in the time elapsed between the arrival of transmissions from the endpoint device 2202a.

The server 1510 can retrieve and use previously stored resource data 2310. For example, the server 1510 can store profiles that indicate the capabilities of specific models of devices, types of devices, or even specific devices. The profile for a "model 5" phone may indicate 2 GB of memory and 10 units of CPU capacity. The profile for a "model 7" phone may indicate 4 GB of memory and 15 units of CPU capacity. The server 1510 can use the model identifier received from the endpoint device 2202a to select the corresponding profile and determine the capabilities of the endpoint device 2202a from the profile.

In some implementations, resource data 2310 can be associated with a device type and stored in a device profile 2240 that is placed in storage accessible by the server 1510. The device type can indicate the general type of computing device. For example, one computing device type can be a laptop computer which might include a high CPU capacity, another computing device type can include a tablet computer which might include a lower CPU utilization, and third computing device type can include a mobile telephone which includes a still lower CPU utilization.

The device type can also indicate the model of computing device. For example, one computing device type can be mobile telephone model 10 with a relatively high CPU capacity, another computing device type can be an older mobile telephone model 9 with a lower CPU utilization, and third computing device type can be a still older mobile telephone model 8 which includes a still lower CPU utilization.

In step (B), the server 1510 evaluates the capabilities of the endpoint device 2202a, the network, and the server to create a comprehensive set of resource data 2325. To create the set of resource data 2325, the server can combine resource data 2310 obtained from the endpoint device 2202a, server 1510, network 1506 and data obtained from other sources such as systems management modules to determine the capabilities of the endpoint device 2202a, server 1510 and network 1506. In some implementations, the server 1510 aggregates information obtained from all resource data 2310 to create a description 2325 of the capabilities. For example, resource data 2310 from the endpoint device 2202a can indicate capabilities of the endpoint device 2202a, resource data 2310 from the server device 1510 can indicate capabilities of the server 1501, and resource data 2310 from the network 1506 can indicate capabilities of the network 1506.

In some case, the server 1510 might obtain resource data 2310 that provides conflicting indications of the capabilities of the endpoint device 2022a, server 1510 or network 1506. In such cases, the server 1510 can perform conflict resolution. For example, when determining the capabilities of the endpoint device 2202a, the server 1510 can prioritize information received from the endpoint device 2202a over information received from other source. Alternatively, the server 1510 can prioritize the most recent information received.

In step (C), the server 1510 uses the resource data 2325 from step (B) to select video analysis tasks 2330 to assign to the endpoint device 2202a. The video analysis tasks 2330 can include emotion analysis, micro-expression analysis, presence on the screen, eye-gaze analysis, head position analysis, voice stress analysis, speaking time tracking, keyword detection, composite scoring, among other video analysis tasks.

In some implementations, the server 1510 determines an assignment of video analysis tasks 2330 such that the assigned video analysis tasks do not exceed capabilities of the endpoint device 2202a. For example, if the endpoint device 2202a has 10 units of CPU capacity, the server 1510 will not assign video analysis tasks that, in aggregate, require more than 10 units of CPU capacity.

The server 1510 can determine an assignment of video analysis tasks 2330 by evaluating video analysis tasks sequentially. For example, if emotion analysis is the first listed task and imposes a load of 6 units and the endpoint device 2202a has a capacity of 10 units, then the server 1510 would assign the emotion analysis task to the endpoint device. Continuing the example, if micro-expression analysis is the next listed task and imposes a load of 10 units, and the emotion analysis task was already assigned to the endpoint device 2202a, then the server would not assign the micro-expression analysis task as the combined load of emotion analysis and micro-expression analysis would be 16 units, exceeding the capacity of the endpoint device 2022a. Again continuing the example, if voice stress analysis is the next listed task and imposes a load of 4 units, and the emotion analysis task was already assigned to the endpoint device 2202a, then the server would assign the voice stress analysis task as the combined load of emotion analysis and micro-expression analysis would be 10 units, matching the capacity of the endpoint device 2022a in this example. The server 1510 can continue to evaluate and assign video analysis tasks to the video task assignment 2330 until all video tasks have been considered.

In some implementations, the server 1510 can continue to assign video processing tasks 2330 until a condition is satisfied. For example, the server 1510 can assign video processing tasks 2330 until the assigned video processing tasks 2330 exhaust the capabilities of the endpoint device 2202a. Continuing our example, if there are 10 units of processing capacity available at an endpoint device 2202a, and the combined load of video processing tasks assigned 2330 to the endpoint device 2202a is 10 units, the server 1510 will not consider any additional tasks as the currently assigned tasks 2230 completely exhaust the available resource, therefore no additional tasks can be assigned.

In addition, the server 1510 can optimize the use of at least one capability of the endpoint device. For example, if the CPU capacity is 10 units, the server 1510 will consider various combinations of video analysis task assignments and select the assignment that utilizes the most CPU capacity, but does not exceed 10 units. If multiple such assignments 2330 exist, the server 1510 can select the first such assignment identified.

Further, the server 1510 can consider the video analysis tasks based on priority. For example, if both emotion analysis and micro-expression analysis can be performed by the endpoint device 2202a, but not both, and emotion analysis has higher priority, the server 1510 can assign the emotion analysis task to the endpoint device 2202a, but not the micro-expression analysis.

Additionally, the server 1510 can use constrained optimization to assign tasks to the video task assignment 2330 associate with endpoint device 2202a. The constrained optimization method considers the load imposed by at least two video analysis task on at least two capabilities contained in the resource data, optionally along with the priority of the video analysis tasks, to assign video analysis tasks to the endpoint device 2022a.

In step (D), the server 1510 instructs the endpoint device 2022a to perform the set of video analysis tasks 2230 selected in steps (C) by sending task assignment data 2320. The task assignment data 2320 can be a list of video analysis task to be performed by the endpoint device 2202a. The task assignment data 2320 can also be an indicator, such as a number or a string, which is used by the endpoint device 2202a to determine which video analysis tasks it is to execute. The task assignment data 2320 can also include indications of how often the task must be performed, for example, every 10 seconds. The task assignment data 2320 can further include indications of the duration the video analysis tasks must be performed, for example, for 10 iterations, until 5 minutes elapse, and so on. The task assignment data 2320 can as also include an indication of how often results will be supplied, for example, each time a video analysis task is complete, when the results of a video analysis task change, at some fixed duration, such as every 10 seconds, etc.

In step (E), the endpoint device 2202a supplies information to the server 1510 indicating the results of executing the assigned video analysis tasks 2320. The results can include the name of each video analysis task completed and the results of executing that video analysis task. The results can also indicate a location from which the server 1510 can retrieve the results. The endpoint device 2202a can indicate to the server 1510 that it rejects one or more assigned video analysis tasks 2330. The endpoint device 2202a might reject an assigned video analysis task if it determines that it lack the capability to perform the task.

In step (F), the server 1510 monitors performance and can adjust the task assignment data 2320 by performing steps (B), (C) and (D). In such cases, the server monitors the performance of the endpoint device 2202a, the network 1506, the server 1510 or any combination. The monitoring can include obtaining additional resource data 2310 from an endpoint device 2202a. The monitoring can also include evaluating the results received in step (E). For example, if the endpoint device 2022a was instructed to provide results every 5 seconds, and results were arriving every 10 seconds, the server can adjust the task assignment data 2320.

In response to determining that a performance threshold has been exceeded, the server 1510 can create an updated assignment of tasks 2330 to the endpoint device 2202a. For example, if an endpoint device 2202a begins executing programs other than video analysis tasks, the CPU capacity available to execute video analysis tasks can be reduced. If the CPU capacity available to execute video analysis tasks falls below the capacity needed to execute the assigned video analysis tasks, the server 1510 can create an updated list of assigned video analysis tasks 2330.

In some implementations, the server 1510 monitors the performance of the video analysis tasks executing on the endpoint device 2202a. If the performance fails to meet performance objectives, the server 1510 can create an updated assignment of tasks to the endpoint device 2202a. For example, if the endpoint device 2202a is expected to provide to the server 1510 results from micro-expression analysis at least every 3 seconds, and the endpoint device 2202a fails to provide results from micro-expression analysis within a 3-second interval, the server 1510 can create an updated list of video analysis tasks.

Optionally, the server 1510 can create an updated list of video analysis tasks only in response to multiple failures. For example, if the endpoint device 2202a once provides the results from micro-expression analysis after 5 seconds, exceeding the 3-second threshold, but subsequently provides results within the 3 second threshold, the server 1510 would not create an updated list of video tasks. Conversely, if the endpoint device 2202a fails to meet the 3-second for a sustained period, for example, over 1 minute, then the server 1510 can create an updated list of video tasks.

In addition, the server 1510 can receive from the endpoint device 2022a user state data generated by the endpoint device 2202a executing video analysis task assigned to the endpoint device 2320, and resource data, augment the user state data by executing video analysis tasks 2320 assigned to the server 1510, and transmitting to endpoint 2202a video data and the augmented stream of user state data. The video data can include video data received from other endpoint devices 2202a participating in the enhanced video conferencing system.

FIG. 23B illustrates an example of the server 1510 determining an assignment 2320 of video processing tasks to an endpoint device 2202*a*. The server 1510 can maintain a task capability table 2350 that list the capabilities required for an endpoint device 2202*a* to execute a video processing task. Each row of the exemplary task capability table 2350 contains a type of video analysis task, the type of endpoint application that can execute the task, the CPU requirement and the network requirement. For example, the first row of data shows that, for the emotion analysis task, the task can be performed using a web browser or an application native to the endpoint device 2202*a*, the load will be 6 units and the network impact is low. Other implementations of tasks capability tables 2350 can include other capability requirements.

The load imposed can be an aggregate measure of the impact on endpoint device capabilities, for example, combining CPU, storage and memory. Alternatively, the impact on each type of capability, such as CPU, storage and memory, can be separated into multiple columns. The network requirements can be expressed as a combination of network characteristics, such as throughput and latency. Alternatively, each network characteristic can be listed in columns separately.

The load can be indicated by an identifier such as "medium," by a more precise metrics such as 10 units, or by both. Similarly, the network bandwidth required can be indicated by an identifier such as "medium," by a more precise metrics such as 5 Mbit/see, by a range such as 2-5 Mbit/see, or by any combination.

Optionally, empty values in the table 2350 are permitted. Empty values in the task capability table 2350 can be replaced by the server 1510 with default values available to the server 1510. If a video analysis task is omitted from the task capability table 2350, the server 1510 can use default values for that video analysis task.

The server 1510 can store capabilities of an endpoint device of type X in an endpoint capability data structure 2360 that can include the endpoint type, the type of application available on the endpoint, the processing capability and the network bandwidth required. For example, the processing capability can be indicated by an identifier such as "medium," by a more precise metrics such as 10 units or by both. Similarly, the network bandwidth required can be indicated by an identifier such as "medium," by a more precise metrics such as 5 Mbit/see, by a range such as 2-5 Mbit/see, or by any combination. Other capabilities of an endpoint device can also be included.

The server can use the task capability table 2350 and the endpoint capability data structure 2360 to create an assignment viability table 2370. The server can create the assignment viability table 2370 by using the task capability table 2350, which indicates the capabilities required to complete a video processing task, and the endpoint capability data structure 2360, which indicates the capabilities of a particular endpoint 2202*a*, to determine the values in the assignment viability table 2370.

For example, the tasks capability table 2350 shows that emotion analysis can be executed using either a web browser or a native application, that it requires the capability to process 6 units of load, and that its network requirement is low. The endpoint capability data structure 2360 shows that Endpoint X has a web client, is capable of processing 10 units and can handle medium network bandwidth. Combining this information, the server 1510 determines that Endpoint X has the capabilities to perform emotion analysis and stores "Yes" in emotion analysis row of the assignment viability table 2370. Looking now at micro-expression analysis, the tasks capability table 2350 shows that a native client is required, but the endpoint capability data structure 2360 shows only a web client, so the server 1510 determines that Endpoint X does not have the capabilities to perform micro-expression analysis and stores "No" in micro-expression analysis row of the assignment viability table 2370.

Once the server 1510 has created the assignment viability table 2370, the server 1510 creates an assignment of video tasks 2330. In one implementation, the server 1510 excludes all video analysis tasks with a "no" in the "capable" column of the assignment viability table 2370. Next, the server 1510 can select the video analysis with the highest priority and add that to the assignment of video tasks 2330. In the example of FIG. 23B, the highest priority task is emotion analysis. Next, the server updates the endpoint capability data structure 2360 to reflect the capability required to execute the emotion detection task. In this example, the server 1510 reduces the processing capability in the endpoint capability data structure 2360 of Endpoint X from 10 units to 4 units, reflecting the 6 units required to execute the emotion detection task. The server 1510 then recreates the assignment viability table 2370 using the updated endpoint capability data structure 2360 by performing steps described above, and can select additional video analysis tasks. Note that once a video analysis task has been assigned to the endpoint device 2202*a*, that video task is excluded from subsequent assignment viability tables 2370.

FIG. 23C show an exemplary event log 2380 associated with the execution of an enhanced video conference. The first entry show that the server 1510 created an initial assignment 2330 of video analysis tasks 1, 2, 3, 4 and 5 that will be assigned to the endpoint 2202*a*. These tasks might correspond to the first five entries of the task capability table 2350 of FIG. 23B, specifically emotion analysis, micro-expression analysis, presence of screen detection, eye-gaze analysis and head position analysis. The server 1510 passes to the endpoint device 2202*a* task assignment data 2320 associated with the initial assignment 2330, as illustrated in FIG. 23A step (D).

The next entry in the event log 2380 indicates that the server 1510 has detected that the observed latency exceeds a maximum threshold. In response, the server 1510 creates an updated assignment 2330 of video tasks that contains tasks 1, 3, 4 and 5, but does not include task 2, micro-expression analysis. As illustrated in the task capability table 2350 of FIG. 23B, micro-expression analysis has a high network requirement. The server 1510 passes to the endpoint device 2202*a* task assignment data 2320 associated with the updated assignment 2330.

The third and fourth entries in the event log 2380 indicate that the server 1510 has detected that the observed latency continues to exceed a maximum threshold, and that the CPU usage has exceeded a maximum threshold. The server 1510 creates an updated assignment 2330 of video tasks that contains tasks 1, 3 and 4, but does not include task 5, head-position analysis. As illustrated in the task capability table 2350 of FIG. 23B, head-position analysis has a high network requirement and imposes 3 units of load. The server 1510 passes to the endpoint device 2202*a* task assignment data 2320 associated with the updated assignment 2330.

The final entry in the event log 2380 indicates that the server 1510 has detected that CPU usage had fallen below a minimum threshold. The server 1510 creates an updated assignment 2330 that includes tasks 1, 2, 3 and 8, where task 8 indicates keyword detection. As illustrated in the task capability table 2350 of FIG. 23B, keyword detection imposes 4 units of load and had a low network requirement. The server 1510 passes to the endpoint device 2202a task assignment data 2320 associated with the updated assignment 2330.

In some implementations, a method of providing enhanced video communication over a network includes: communicating, by a server system, with a first endpoint device over a communication network during network-based communication session that involves communication among multiple endpoint devices; obtaining, by the server system, resource data for the first endpoint device, wherein the resource data is indicative of capabilities of the first endpoint device or of a network connection of the first endpoint device; selecting, by the server system, one or more video analysis tasks to be performed by the first endpoint device, the one or more video analysis tasks being selected from a set of multiple video analysis tasks based on the capabilities of the first endpoint device or of the network connection of the first endpoint device; and instructing, by the server system, the first endpoint device to perform the selected set of video analysis tasks.

In some implementations, the method includes: receiving, by a server system, from a first endpoint device, video data and a stream of user state data during the network-based communication session; processing, by the server system, the video data and the stream of user state data to generate an augmented stream of user state data, wherein the processing includes performing a set of video analysis tasks; and transmitting, to the first endpoint device over the communication network, (i) content of the network-based communication session and (ii) additional content based on the augmented second stream of user state data.

In some implementations, the resource data is indicative of the capabilities of the endpoint device. The resource data can include hardware characteristics of the endpoint device. The hardware characteristics of the endpoint device can include, for example, CPU capacity, installed memory, storage capacity, or presence of a GPU.

The resource data can include at least one characteristic of the endpoint device that varies during the video conferencing session. The varying characteristics of the endpoint device can include at least one of CPU utilization, available memory, unused storage capacity, thermal characteristics, or remaining battery power level. These characteristics can be measured during the video conferencing session.

The video analysis tasks can be selected such that they do not exceed the capabilities of the endpoint device. The video analysis tasks can be selected based on at least one characteristic of the endpoint device, such that the selection maximizes the use of the at least one characteristic. The selection of video analysis tasks can be based on at least one characteristic of the endpoint device or of the communication network. The selection of video analysis tasks can reflect a priority of the video analysis tasks. Selecting the video analysis tasks can use the resource data to apply constrained optimization to optimize the use of at least one characteristic of the endpoint device or of the network. The video analysis tasks can include at least one of emotion analysis, micro-expression analysis, presence on the screen, eye-gaze analysis, head position analysis, voice stress analysis, speaking time tracking, keyword detection, or composite scoring.

Figure 24A:
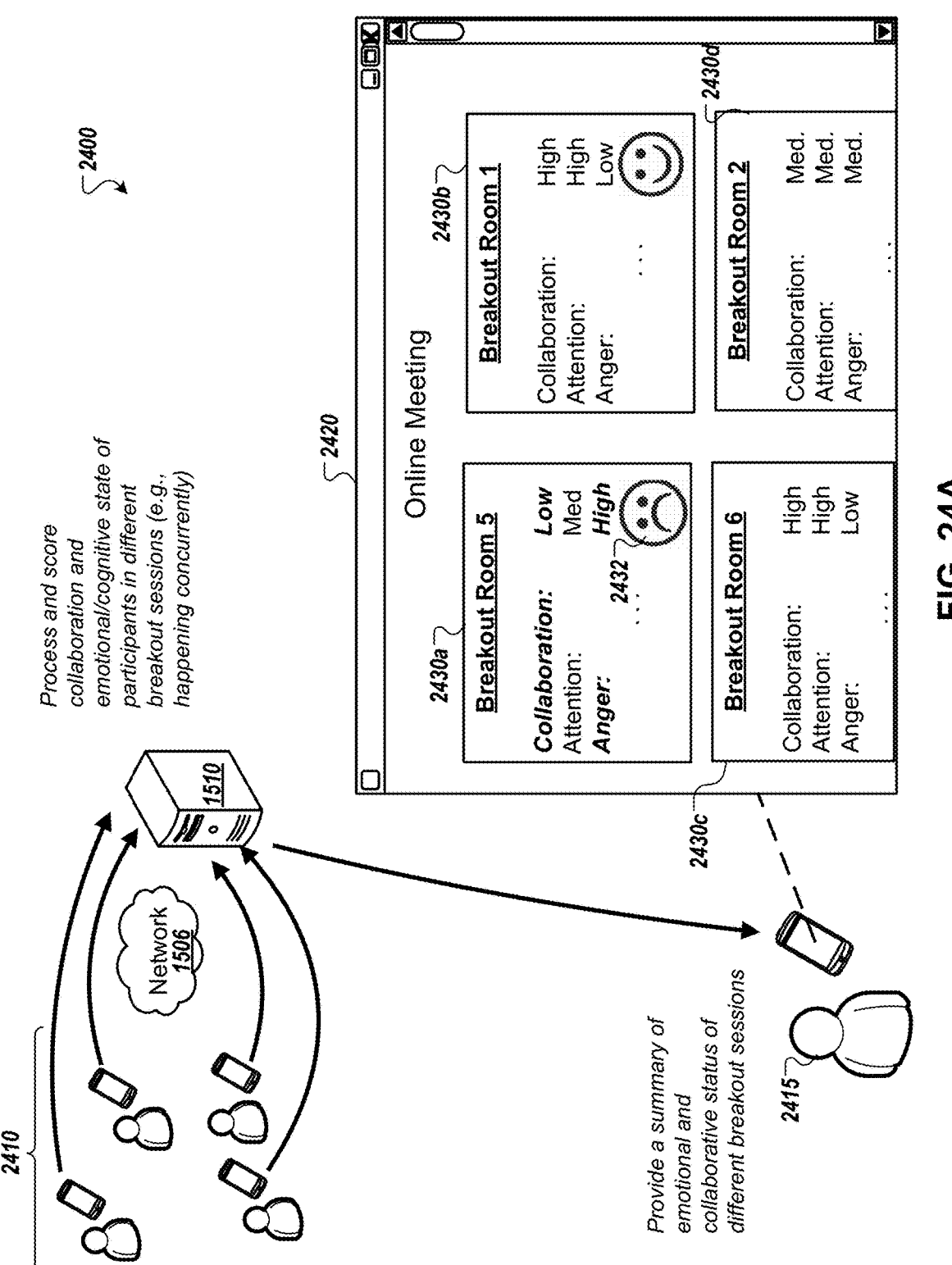
FIGS. 24A-24B are diagrams showing examples of a system managing and analyzing the state of each of various concurrent sub-sessions of a communication session.

FIG. 24A shows an example in which the system provides information about the collaborative and emotional status of participants in different breakout sessions from a communication session.

Many videoconferencing platforms have functionality allowing the host to split the meeting up into breakout sessions. When this occurs, the system can report to the host a summary of the emotional and collaborative status of each breakout session allowing the host to know which breakout sessions to direct their attention to. This functionality can be useful in business meetings, as well as in educational contexts where a teacher may want to see how project teams or small-group discussions are progressing.

As discussed above, the communication system can create a scorecard for the emotional and collaborative state of a meeting, whether the scorecard is provided during or after the meeting. The scores can be based on all the emotional data derived from the meeting, for performance analysis or technique analysis, to inform further steps to improve meetings and techniques going forward.

In a similar manner, when the videoconferencing platform puts participants in breakout rooms, a host (e.g., meeting organizer, moderator, administrator, etc.) can be provided see a live or current summary of the emotional and collaborative status of each breakout session (e.g., each subgroup of participants). This summary information may be additionally or alternatively be provided in post-meeting reports or interfaces.

As an example, a teacher working with remote students may have 10 different breakout sessions, and may want to determine which sessions to join temporarily or check in on. During the breakout sessions, the system generates participant-level emotion and collaboration scores, as well as composite emotion and collaboration scores for each breakout session participant subgroup as a whole. The system can then use these scores to detect conditions that may need to be addressed by the host. For example, the system can detect can when anger or other emotion are rising rapidly or reach a certain threshold, detect when collaboration is low, detect when one person is dominating discussion, detect when the level of engagement is low, and so on. The system can alert the host of these detected conditions and help prioritize which groups may need attention. This type of assistance to a teacher or other host can be a large advantage and allow for even more effective targeted monitoring and help than is available in in-person settings.

The illustrated example shows many different participants 2410 participating in various breakout sessions of a meeting that is taking place at least partially with remote video interactions. The host 2415 is provided data for a user interface 2420 that includes various elements 2430a-2430d that provide information about the emotional and collaborative state of the different breakout sessions that are happening concurrently. The scores, indicators, warnings, recommendations, and other data presented in the user interface 2420 can be updated continually as the scores for the emotional and cognitive states of the participants 2410 are updated based on additional captured data (e.g., audio, video, chat interactions, etc.). In addition, the data elements 2430a-2430d for different breakout sessions can be rearranged or modified to indicate which ones need most urgent attention. For example, the element 2430a providing a summary for Breakout Room 5 is shown at the top to indicate that it has the highest priority for monitoring and potential intervention. The element 2430 also includes an indicator 2432 that the emotional status of the group is poor.

This technique can be used at a more broadly applicable level than simply for breakout sessions or breakout rooms tied to a single meeting. For example, the technique can be used to provide insight into may separate meetings that are occurring concurrently for an organization. For example, a principal of a school can be provided a live dashboard where information is provided about the emotional and collaborative state of the different classes in the school are performing. As another example, a corporate help desk call center can be provided statistics about how different calls are going, based on voice stress analysis, video data if available, and other factors, which can help signal when a manager may need to get involved. In general, the system can generate analytics at a low level (for different individuals or groups), and then aggregate the data at various levels and provide the summaries to a person having responsibility for the meetings.

Figure 24B:
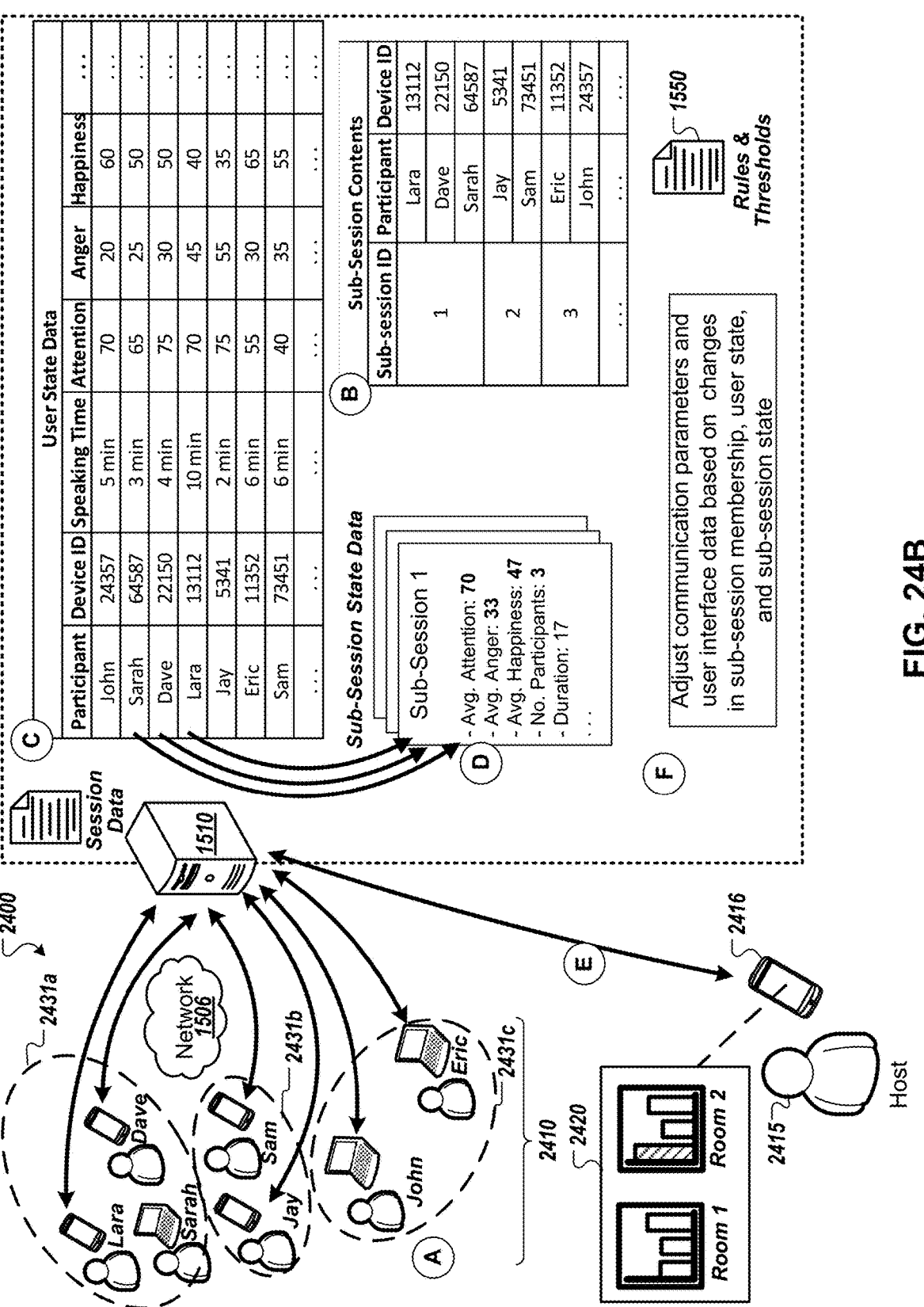

FIG. 24B shows the example system 2400 and the processing of the server system 1510 in greater detail. FIG. 24B shows an example in which the server system 1510 receives and processes data from various participants 2410 during a network-based communication session, such as a video conference, an audio conference, a webinar, etc. The server system 1510 provides information about the state of the communication session and the participants 2410 to the host 2415 associated with the communication session. In the example, the communication session is divided into several sub-sessions, e.g., subsidiary sessions such as breakout rooms. The server system 1510 can detect and monitor the state of each sub-session separately, including monitoring the cognitive and emotional states of the participants 2410 in each sub-session with information from images or video of participants. The server system 1510 then uses the information about the state of the various sub-sessions-including potentially the history, pattern, or trend of monitored state of sub-sessions over time—to classify the different sub-sessions. The server system 1510 communicates with the host's device 2416 to repeatedly update the user interface 2420 that describes the states of the different sub-sessions. This can include updating the interface 2420 to adjust a ranking or presentation order for elements about sub-sessions, or to selectively present information about only a few of the sub-sessions (e.g., a highest-ranking subset or a filtered subset that the server system 1510 determined most urgently in need of interaction or intervention by the host 2415). In addition, the server system 1510 can make the user interface 2420 actionable by including interactive controls (e.g., buttons, sliders, etc.) corresponding to actions for managing the sub-sessions, where the actions and controls can be dynamically selected, as well as presented or removed from the user interface 2420, for different sub-sessions separately. As a result, the interface 2420 can provide a combined summary having information about multiple related sub-sessions and, without having to leave the interface 2420, interact with controls that initiate changes to the underlying sub-sessions to address the conditions that the server system 1510 detects for the sub-sessions.

Each of the participants 2410 has an endpoint device with which to participate in the communication session, e.g., to capture audio and/or video data to share in the communication session over the network 1506 and/or to receive and present audio and/or video content shared by others in the communication session. There are seven participants 2410 (e.g., John, Sarah, Dave, Lara, Jay, Eric, and Sam), each of which participates in the conference using a different endpoint device (e.g., a laptop computer, desktop computer, smart phone, tablet computer, video conferencing system, etc.). The participants 2410 and their respective endpoint devices may be remotely located from each other and from the server system 1510, but in some cases some participants 2410 may be co-located, e.g., in the same room. The server system 1510 provides information about the state of the communication session and the participants 2410 to the host 2415 associated with the communication session, who also has a corresponding endpoint device 2416.

The host 2415 can be a user that has been granted administrative privileges to monitor or manage the communication session. In some cases, the host 2415 can be an administrative user, a moderator, a meeting organizer for the communication session, a presenter, or other person. Typically the host 2415 for a communication session is designated for the communication session, but some video conferencing platforms enable the host role to be shared among multiple users or to be transferred between users during a communication session. A host 2415 may also participate in (e.g., provide a media stream to or receive a media stream from) a sub-session or the main session, but is not required to.

The techniques of FIGS. 24A-25C can be used for various sets of related communication sessions. In many cases a primary or main communication session can enable allow various secondary subsidiary communication sessions, referred to herein as sub-sessions, to be created. These secondary communication sessions often operate concurrently (with the main session and with each other), but with distinct groups of participants. For example, breakout rooms can allow participants in a communication session to meet in smaller groups, and the interactions in each breakout room can be completely isolated in terms of audio and video content from each other and from the main session. Sub-sessions that are created generally remain linked to the main communication session, and typically remain under the control of the same host as the main communication session.

Managing a communication session with multiple concurrent sub-sessions can be very difficult. Most video conferencing platforms limit a host to viewing or participating in one breakout room at a time. To understand the status of the breakout rooms and to determine how interactions are progressing, a host may cycle through the breakout rooms, repeatedly joining and leaving each one, but this gives only a brief sampling of the interactions and can be very disruptive to the participants in the various rooms. The host also cannot reasonably assess the content of multiple concurrent breakout rooms, even if a platform could present them simultaneously. Limited screen space on the host's device further limits the ability for the host to meaningfully gauge the current status and trends in breakout rooms over time during the communication session.

The server system 1510 improves on prior communication systems by monitoring concurrent sub-sessions (e.g., breakout rooms or other related sessions) and providing an interface 2420 that can characterize the status of the different sub-sessions. The server system 1510 can generate and provide, for some or all of various sub-sessions, any of the information that the discussion above explains that server system 1510 can provide for a communication session. In this, the server system 1510 may optionally treat each sub-session as a separate session for the purpose in analyzing the state of the sub-session. The server system 1510 can also provide any of the analysis and interactions that the server system 1510 can provide for groups or subsets of participants can be provided, where the groups or subsets are different sub-sessions or breakout rooms.

For example, the server system 1510 can provide, for individual breakout rooms, items such as: average or aggregate measures of sentiment, engagement, attention, and other attributes for the members of a sub-session (FIG. 9A); classifications of participants within a sub-session (FIG. 9B); measures of speaking time for a sub-session and/or participants within the sub-session (FIG. 9C); measures of or classifications for cognitive and emotional states of individual participants in a sub-session (FIG. 9D); charts, graphs, or other visualizations indicting the distribution or clustering of participant states within a sub-session (FIGS. 10A-10D); distribution of speaking time (FIGS. 11A-11D); and so on. The server system 1510 can also provide visualizations, such as charts, graphs, tables or other visual representations, comparing characteristics of different sub-sessions (e.g., showing differences among the scores for different sub-sessions for one or more characteristics). Just as the server system 1510 can provide classifications for individual participant state (FIG. 12A), or suggestions or determinations about different individuals (FIGS. 12B-12C), the server system 1510 can also provide classifications, suggestions, and determinations about different sub-sessions. The server system 1510 can generate scores for various aspects of the state of a sub-session (e.g., average engagement level in the sub-session, average attention level in the sub-session, etc.) and provide charts or graphs that show how these scores have varied over time (e.g., similar to FIG. 13).

In many cases, the server system 1510 monitors multiple concurrently-running sub-sessions and updates the user interface 2420 of the host 2415 as the sub-sessions proceed. This enables the server system 1510 to provide, in a summary or overview interface, rich information derived from the ongoing, underlying sub-sessions that the host 2415 cannot view together. While this capability is a major advantage, the server system 1510 can also use the analysis of the different sub-sessions to also adjust both the interface 2420 as well as the sub-sessions themselves. For example, the server system 1510 can cause the interface 2420 to be adjusted to re-arrange the interface elements for different sub-sessions, or to rank or filter the interface areas for different sub-sessions. The server system 1510 can also provide interactive controls in the interface 2420 that are actionable to cause the server system 1510 to initiate any of a variety of actions to adjust different sub-sessions. The interactive controls can be selectively presented based on the server system's 1510 measures or classifications of the different sub-sessions, which are determined for a sub-session from the face analysis and/or audio analysis for participants in the sub-session. In other words, as a communication session progresses, the server system 1510 can cause controls for different management actions for a sub-session to be presented and removed over time according to the changing conditions in a sub-session, and the interactive controls provided for different sub-sessions can vary independently from each other.

Using the techniques discussed above, the server system 1510 obtains information about the cognitive or emotional state of participants in each sub-session. Also as discussed above, this information can be generated or provided in data streams to provide an ongoing, periodic measure of the state of individuals and sub-sessions. The server system 1510 can classify the sub-sessions and detect events and trends that develop in the sub-sessions. The server system 1510 determines when certain conditions or events occur, and in response to the determination the server system 1510 can update the interface 2420 to alert the host 2415. The server system's analysis of the states of the sub-sessions also enables the server system 1510 to prioritize the sub-sessions, for example, ranking or filtering sub-sessions according to one or more measures of average emotional or cognitive attributes of participants. This prioritization can be used to adjust the interface to efficiently use limited screen space.

Figure 25A:
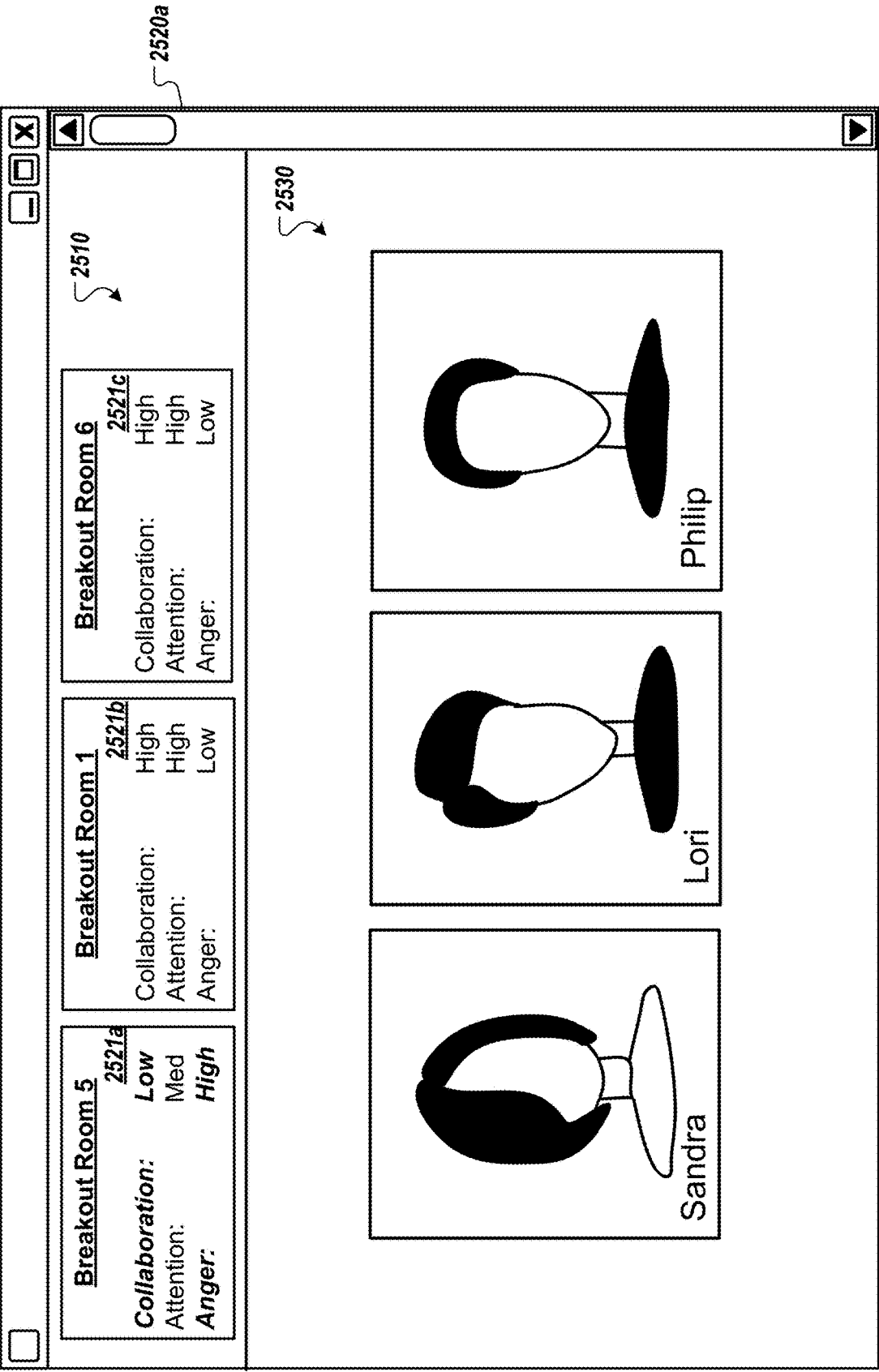
FIGS. 25A-25C are diagrams showing examples of user interfaces for managing and analyzing the state of each of various concurrent sub-sessions of a communication session.

For example, the host 2415 may desire to participate in the main session or in a sub-session, at a time when many breakout rooms are active. Providing information about each of the sub-sessions can be prohibitive, as this would often take space away from the video streams of participants the host 2415 is interactive with. To provide efficient monitoring of sub-sessions not being presented to the host 2415, the server system 1510 can rank sub-sessions according to which sub-sessions have most urgent need for intervention (e.g., highest composite score for anger, lowest score for collaboration, highest speaking time imbalance among participants, or a composite score based on multiple factors). The server system 2415 causes information for only the high-ranking sub-sessions (e.g., those most in need of adjustment) to be presented, leaving the space for the host 2415 to view content of a sub-session concurrently (FIG. 25A).

In some cases, the server system 1510 can be configured to recommend or to automatically carry out various changes to sub-sessions depending on the emotional and cognitive states of the participants in the sub-sessions. Actions for adjusting or managing sub-sessions can have predetermined conditions or triggers to define situations when the actions become relevant and appropriate to a sub-session. When a predetermined condition or trigger for an action is detect, the server system 1510 can (1) update the interface 2420 to recommend the action for the particular sub-session for which the condition was detected, (2) updated the user interface 2420 to include interactive user interface elements (e.g., buttons, sliders, etc.) configured to perform the action, or (3) perform the action automatically. The actions can include changing the set of participants in one or more sub-sessions, such as removing a participant from a sub-session (e.g., sending them back to the main communication session, potentially also prohibiting or blocking that participant from later re-joining of the sub-session), reassigning participants between sub-sessions, terminating a sub-session (e.g., ending a breakout room and bringing participants back to the main session), creating a new sub-session and adding participants to it, or imposing or changing limits on the number of participants that can concurrently be in a sub-session (e.g., imposing or lowering a limit when attention levels in the sub-session fall below a threshold). Other actions that the server system 1510 considers can alter other properties of the sub-session, such as initiating a break or pause in the sub-session, distributing recorded media (e.g., showing a video clip to raise attention levels), imposing or adjusting speaking time limits for members in a sub-session, increasing or decreasing the volume of audio content, sending alerts to individual participants, and so on. For each type of action, a corresponding rule can be set, with corresponding conditions, triggers, thresholds, or other criteria with which the server system 1510 can evaluate to detect when to recommend, provide a user interface for, or to carry out an action that adjusts the sub-sessions.

The interface 2420 can be presented through a web page, web application, native application, or other techniques. The interface 2420 can be provided as a dashboard or collection of information, or can be provided alongside other media content of a communication session, such as through a toolbar, status pane, frame, or other section of a user interface. The user interface elements indicating the status of one or more sub-sessions can be provided dynamically in response to detecting certain states or conditions from analysis of a sub-session, with information being provided in, for example, an information pane that slides into view, a pop-up window, an alert or notification, or other user interface area.

In some implementations, the server 1510 handles both the collection and distribution of media data for the communication session and sub-sessions, as well as analysis of participant state and sub-session state and providing data for the interface 2420. In this case, there can be a single server system to support the communication session, as shown in FIG. 22A. In other implementations, the server system 1510 can provide analysis but a separate server system, such as server 2230 in FIGS. 22B and 22C, can carry out the exchange of media for the communication session and the sub-sessions.

To obtain information about user cognitive or emotional states, the processing of images, video, audio or other sensed data can be performed by the server system 1510, but the endpoint devices, or split between endpoints and the server system 1510 as discussed above.

FIG. 24B shows a series of stages, stage (A) through stage (F), which illustrate a flow of data and may be performed in the order describes or in another order. Through the operations shown, the server system 1510 identifies the sub-sessions and their participants, characterizes the states of the sub-sessions based on the emotional and cognitive characteristics of the participants in the respective sub-sessions, and adjusts the sub-sessions or the interface 2420 based on the states of the sub-sessions.

In stage (A), the server system 1510 identifies multiple sub-sessions of a network-based communication session. The communication session can be one in which multiple remote endpoint devices each provide media streams over the communication network 1506. The sub-sessions occur concurrently and include different subsets of the endpoint devices. Each sub-session involves sharing media streams among the subset of endpoint devices included in the sub-session.

In the example, the server system 1510 identifies three sub-sessions, each with a different distinct, non-overlapping subset of participants and endpoint devices. The server system 1510 can access records, such as session data, indicating the sub-sessions that exist and are related to (e.g., split off from or otherwise linked to) the main session. When the server system 1510 serves as a video conference platform and manages the sessions, and the server system 1510 has the information readily available. In other implementations, such as where the server system 1510 provides analysis functions in concert with another server system that actually hosts a video conference, the server system 1510 can interact with the other server to request and receive data indicating the number of sub-sessions. As another option, the endpoint devices 1510 can each be configured to send, in their messages to the server system 1510, data indicating a name, code, or other identifier for the session or sub-session that they have joined.

In stage (B), the server system 1510 identifies the endpoint devices included in each sub-session. Endpoint devices can be identified by a device identifier, user account, user name, or other appropriate identifier. As illustrated, for each sub-session, the server system 1510 can determine a list of the participants and/or endpoint devices in the sub-session. In the example, the server system 1510 determines and stores information indicating that a first subset 2431*a* of the participants 2410 includes Lara, Sara, and Dave; a second subset 2431*b* of the participants 2410 includes Jay and Sam; and a third subset 2431*c* of the participants 2410 includes John and Eric. The number of sub-sessions as well as the membership in each sub-session may vary overtime, and so the server system 1510 monitors for changes.

In stage (C), the server system 1510 obtains user state data for each of the endpoint devices. The user state data for each endpoint device is generated based on analysis of media the endpoint device captured by the endpoint device during the communication session. For example, as discussed above, the user state data can be data indicating estimated cognitive or emotional state information derived from face images of the user, video of the face of the user, audio including speech spoken by the user, content of speech (e.g., words) spoken by the user, and so on. Each endpoint device may perform emotion estimation and other processing locally using models or algorithms, or the processing can be done by the server 1510, or the processing can be split between the endpoint device and the server system 1510. User state data can be generated using any of the techniques discussed above, including determination of emotional and/or cognitive state information, the detection of micro-expressions, results of analysis of audio, images, and video, and more. As another example, various analysis techniques are discussed with respect to FIGS. 22D-23C, and any or all of these techniques can be used.

In stage (D), the server system 1510 aggregates the user state data for each sub-session. The server system 1510 determines a sub-session state for each of the sub-sessions. Each sub-session state is determined based on the user state data for the subset of endpoint devices identified as being included in the sub-session. The sub-session state can be one or more values for different attributes or characteristics, such as average values for attention, collaboration, engagement, happiness anger, and so on. The aggregation can include any of various functions, so that the aggregate data represents a minimum, maximum, mean, median, or other determination based on user state data for multiple participants in the sub-session. The sub-session state data can also include measures of other properties of the sub-session, such as the number of participants currently in the sub-session, the duration of the sub-session, information about speaking time of participants in the sub-session or a distribution of speaking time among the participants in the sub-session, and so on. Various techniques of aggregating user state data are discussed above and the server system 1510 can use any or all of these techniques (see, e.g., FIG. 15-18 and corresponding description). For example, the techniques discussed for step 1704 of the process 1700 shown in FIG. 18 can be used, among others.

The server system 1510 can store various rules and thresholds 1550 that can be used to further characterize the state of interactions among the participants in a sub-session. For example, the rules and thresholds can be used to classify interactions and determine that a sub-session has high, medium, or low levels of engagement, where each of the classifications correspond to different ranges of values for attention, speaking time distribution, or other parameters. As another example, the server system can be configured to detect predetermined conditions such as a member of a sub-session exceeding a speaking time threshold, or negative or positive emotional states persisting for a certain amount of time (on an individual or aggregate group basis).

In some implementations, the thresholds or criteria used are adjustable or variable based on the states of other members of the group. For example, the threshold amount of speaking time at which the server system 1510 warns a participant or takes other action may vary based on the emotional states of the remainder of the participants in the sub-session who are not currently talking. The server system

1510 can enforce a first time limit (e.g., 3 minutes) when the rest of the participants have low engagement and/or high negative emotion levels, but the server system 1510 may apply a second time limit that is higher (e.g., 6 minutes) when other participant states are present among the rest of the participants in the sub-session, to allow a speaker more time if the others have high engagement and have high levels of positive emotion. As another way to implement this, the server system 1510 may delay or override certain actions (e.g., warning a user to end speaking or cutting off trans-mitted audio) when certain desirable conditions occur (e.g., high engagement, high positive emotion, etc.).

The rules and thresholds 1550 can specify various differ-ent actions or adjustments that are applicable to address different sub-session states or different combinations of sub-session attributes. For example, if participant engage-ment has remained below a minimum threshold for at least a minimum amount of time, the rules can indicate that the state calls for showing a video or taking a 2-minute break. The rules can specify various different types of actions, such as changing membership of the sub-sessions, playing a video or other pre-recorded content to participants in the sub-session, sending an alert (e.g., a reminder, request, notification, etc.) to a specific individual whose user state data satisfies certain predetermined thresholds, sending an alert to multiple or all participants of a sub-session, having the host 2415 join a particular sub-session, and so on.

The actions selected as appropriate for the current sub-session state can be used to provide interactive user interface controls on the user interface 2420. For example, if the comparison of sub-session state data with corresponding criteria indicates that ending a particular breakout room is warranted given the monitoring data (e.g., due to low engagement and high negative emotion; due to a low num-ber of participants and high average level of anger; etc.), then the server system 1510 can provide data causing the device 2416 to present an on-screen button that will initiate termination of the breakout room (and bring the participants back to the main session) in response to the host 2415 clicking the button. In this manner, the server system 1510 can dynamically add and remove different user interface controls for different sub-sessions based on their different sub-session states. In addition to adding or removing user interface controls, the server system 1510 may instruct that certain controls that may have already existed in the inter-face 2420 be placed at new position or with a new formatting (e.g., changed size, font, color, emphasis, etc.) in response to the applicability of that action being determined to be high. The controls can enable the host 2415 to change sub-session membership, content, and other parameters from the inter-face 2420, without needing to enter the different sub-sessions to make the changes. The interface 2420 can optionally have an area defined for each of different sub-sessions, and the controls for each sub-session, when appli-cable, can be populated in the area corresponding to that sub-session. The areas for the sub-sessions can each include indicators and other data describing sub-session state infor-mation determined (e.g., scores or values for attributes, classifications, visualizations, symbols, etc.), and the areas themselves may be selectively displayed to conserve limited display space, e.g., by showing the information for sub-sessions that the server system 1510 indicates are classified as needing adjustment, or for which have experienced recent changes in state.

In stage (E), the server system 1510 communicates over the communication network 1506 with a remote device (e.g., device 2416 of the host 2415) associated with the communication session to cause a user interface 2420 of the remote device to indicate the sub-session states determined for each of the multiple sub-sessions. The data for the user interface 2420 can be provided during the communication session and can be refreshed periodically so that the interface 2420 provides a substantially real-time view of the status of interactions and cognitive or emotional states among the participants in the sub-sessions. The interactive controls that are provided in the interface 2420 can also provide the ability for the host 2415 to initiate on interventions that the server system 110 recommends, and to quickly make changes across multiple different sub-sessions.

The server system 1510 can generate and provide, for individual sub-sessions, any of the indicators, scores, visu-alizations, or other representations of user state discussed above for individuals, groups, or communication sessions. For example, indicators and outputs as shown in user interfaces of FIGS. 9A-17 can be provided in the user interface 2420, with the server system 1510 generating and sending the content to be rendered and displayed a the device 2416.

In stage (F), the server system 1510 adjusts communica-tion parameters and user interface data for the interface 2420. These adjustments can be made based on monitored changes, such as change in the number of sub-sessions and change in the sets of participants in the sub-sessions. In addition, the changes can be made based on changes in user state and sub-session state.

FIG. 25A is an example user interface 2520a that can be used to monitor sub-sessions such as breakout rooms. The interface 2521a includes a status monitoring area 2510 that is presented as a toolbar or pane that can be persistent across changes to view different sets of participants or to view content from different sub-sessions. As another option, the area 2520 may be configured to remain hidden out of view, and then slide in to place or drop down in response to an interaction by the host 2415 with a button or other on-screen element that triggers presentation of the area 2510. The interface 2521b also includes a viewing area 2530 showing content of the communication session, e.g., images or video of participants in the main communication session or a sub-session the host has joined. As illustrated, the status monitoring area 2520 can be integrated with the viewing area 2530 so the host 2415 can view the status of various breakout rooms, especially those that need adjustment most, while participating in one of the sub-sessions.

The status monitoring area 2510 includes cards 2512a-2512c that provide information about three of the sub-sessions that are ongoing. The server system 1510 ranks the various sub-sessions based on the properties in the sub-session state data. For example, the server system 1510 can score the sub-sessions by determining for each sub-session a weighted average across the three properties displayed, e.g., level of collaboration, attention and anger. With the score for each sub-session, the server system 1510 can rank the sub-sessions according to the scores, with the highest-ranking subset being those that have the most urgency for the host 2415 to address (e.g., due to issues such as high anger, low attention, low collaboration, or combinations of these). The server system 1510 then provides the informa-tion for the cards 2512a-2512c, along with the ranking or scores for the cards, so that the highest-ranking subset can be displayed.

Figure 25B:
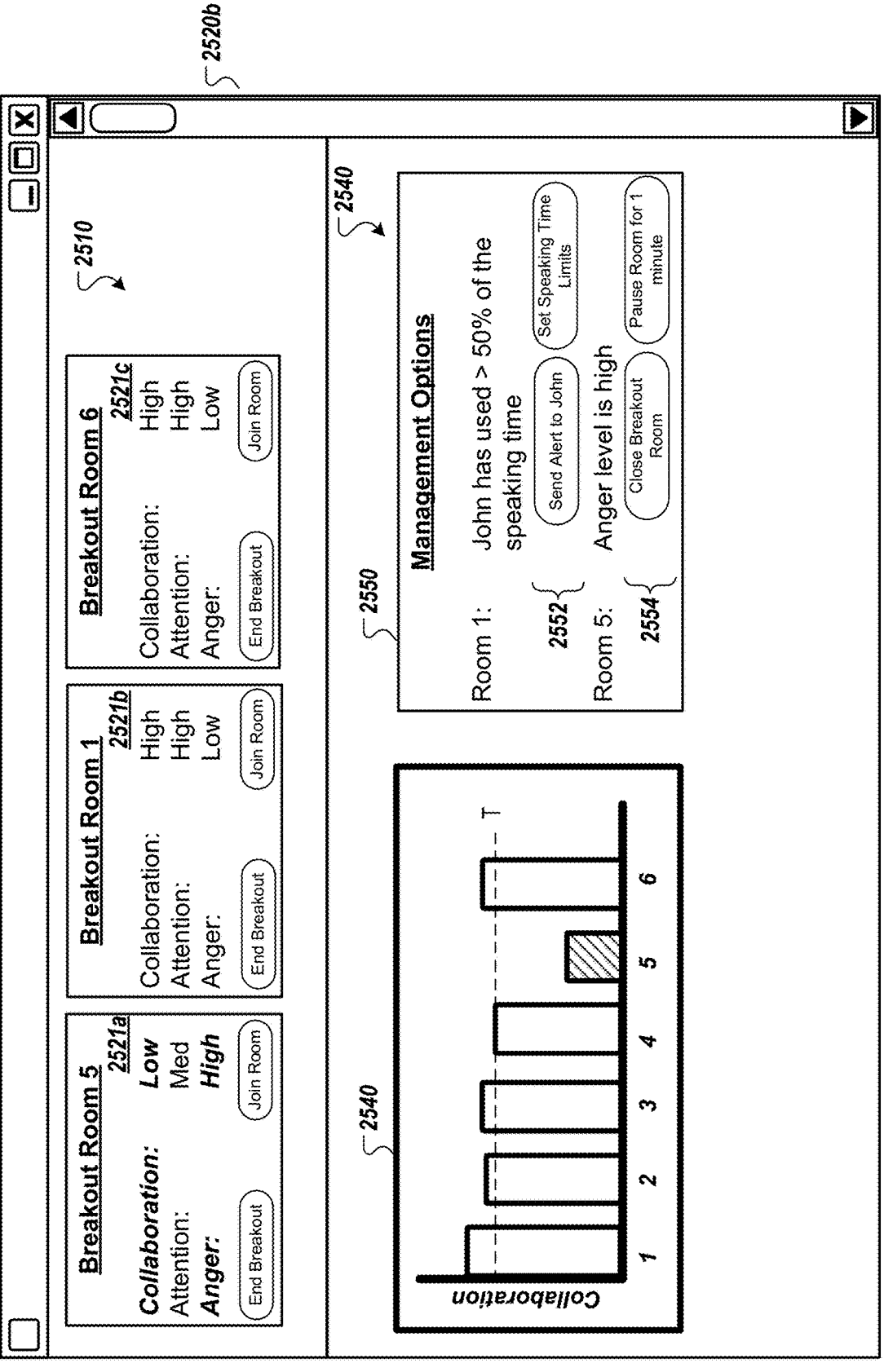

FIG. 25B shows another example user interface 2520b that can be used to monitor sub-sessions such as breakout rooms. The interface 2520b includes the status monitoring area 2510 that includes cards 2521a-2521c that respectively describe the state of different sub-sessions. These cards 2521a-2521c also include interactive controls 2540 that enable the host 2415 to trigger the server system 2510 to adjust the different sub-sessions individually. For example, in this example, each card 2521a-2521c has a button enabling the host 2415 to end the breakout room or to join the breakout room. The set of interactive controls in each card 2521a-2521c can be a standard set, consistent for each card, or can be dynamically determined based on the sub-session state data for the sub-session. For example, in the card 2521a, based on the low collaboration and high anger level and the amounts of time that these conditions have persisted, the system 1510 may automatically determine an action to improve the experience of these participants, such as to merge the breakout room with another, to warn a participant having a negative effect on the emotional state of other participants, to mute a participant, to initiate a pause or break in the sub-session, or perform another action. The system 1510 can determine which of various potential options is most applicable, based on a set of rules, thresholds, or models. Then the system 1510 can send instructions or user interface data to the device 2416 of the host 2415 that causes a browser or other application on the device 2416 to show a control for the selected action(s). Interaction with the control by the host 2415 causes the device 2416 to inform the server system 2510 and make the corresponding adjustments to the sub-session.

The user interface 2520b also includes a second monitoring area 2540 instead of a viewing area for media shared in the communication session or in sub-sessions. The area 2540 shows additional information about the state of the sub-sessions, and can include information that compares the state of different sub-sessions or identifies differences among them. For example, a chart 2542 shows the collaboration levels across all of the six sub-sessions that are currently in progress. This chart 2542 and others for other properties of sub-session state can show the overall state of the communication session by aggregating state information across the various sub-sessions. This example shows very clearly that that the sub-session for breakout room 5 has a much lower collaboration level than the others, and that the collaboration level is below a threshold T, which can represent, for example, a predetermined target level, a minimum level for effective interaction, an average across the various sub-sessions, and so on. As with breakout room 5, sub-sessions that are outliers by varying from the range that is expected or from the range of other sub-sessions can be identified with markings on the interface 2520b.

The user interface 2520b also includes a recommendation area 2550 where notifications and alerts, including recommendations of actions for specific sub-sessions and potentially for specific users within those sub-sessions, are provided. In addition to or instead of recommendations, the area 2550 can include interactive controls that enable a user to initiate specific actions for the sub-sessions. In the example, the server system 1510 has determined that a particular user in room 1, John, has used more than 50% of the speaking time. This condition was one of a predetermined set that the server 1510 monitors, and the rules the server 1510 processes indicate that an alert to the user or setting a speaking time limit may correct the issue. As a result, the server 1510 sends instructions or user interface data to the device 2416, causing the device 2416 to notify the host 2415 of the detected condition as well as present user interface elements 2552 for the different actions selected. The controls 2552 are configured so that the host 2415 can interact with these controls 2552 to cause the server 1510 to carry out the corresponding actions. The recommendation area 2550 also includes a notice that the anger level is high for breakout room 5, for example, representing a classification that the server 1510 determined for the sub-session or that a measure of anger (e.g., maximum among the participants, average among the participants, etc.) exceeds a threshold. The area 2550 includes interactive controls 2554 that enable the host 2415 to initiate different actions that the server system 1510 determined to be applicable to correcting the condition detected, e.g., to close the breakout room or to pause communication in the room temporarily (e.g., for one minute).

In some implementations, the server system 1510 may be configured to automatically carry out certain management actions to manage sub-sessions without requiring the input or confirmation of the host 2415, for example, when the severity of the condition detected or when the confidence level for the need to perform the action is very high.

Figure 25C:
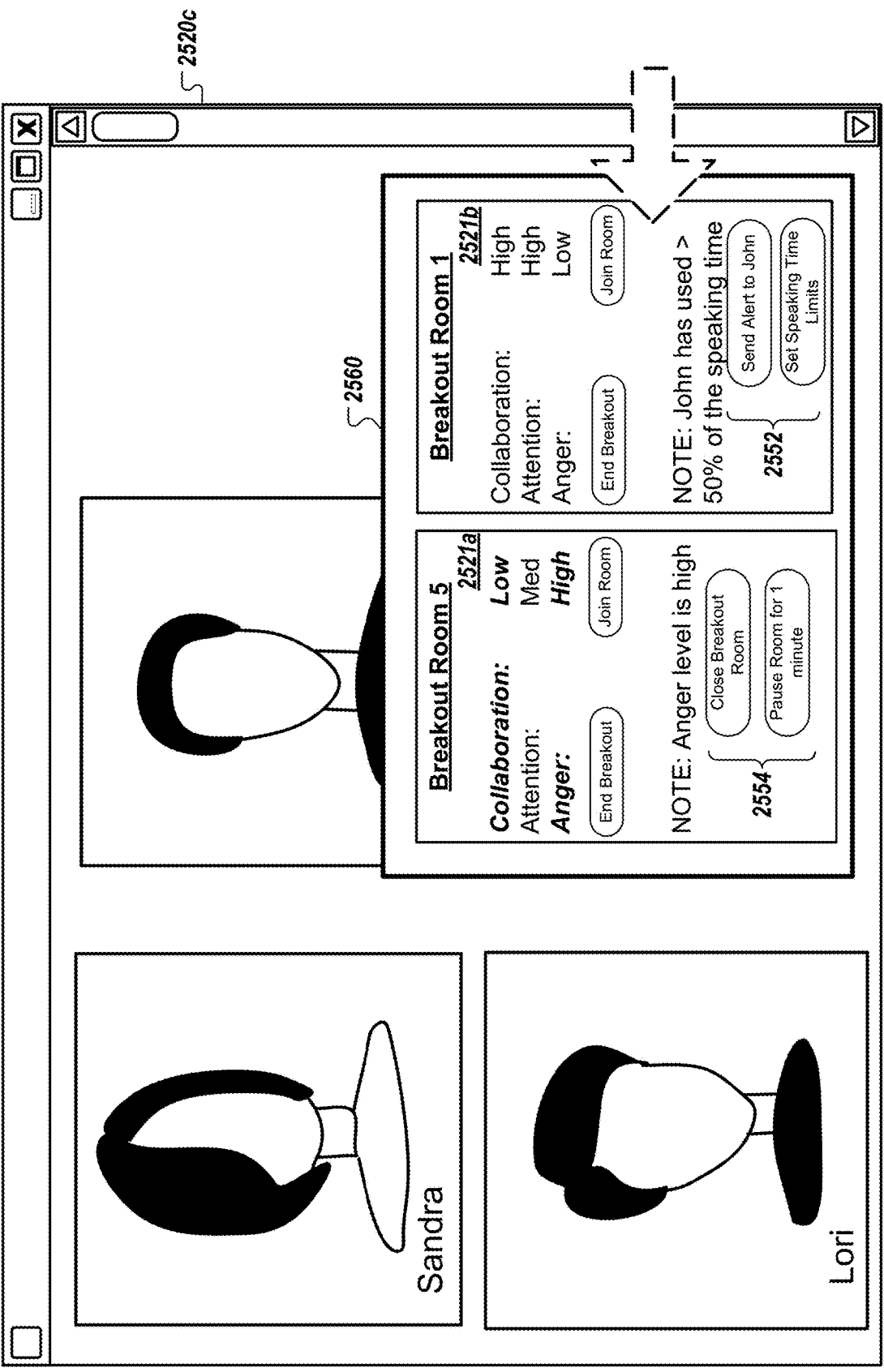

FIG. 25C shows another example user interface 2520c that can be used to monitor sub-sessions such as breakout rooms. In this example, the information about breakout rooms can be shown or hidden dynamically. In some cases, state data for sub-sessions is hidden until a condition is reached, indicating that one or more sub-sessions are not proceeding according to a standard. For example, the device 2416 can show content of a communication session (e.g., the main communication session or a sub-session) and monitor the state of different sub-sessions. When a predetermined condition is detected, such as an anger level above a threshold, collaboration below a threshold, etc., the server system 1510 can instruct the device 2416 to present the monitoring area 2560. Other conditions can include detection of a particular combination of conditions occurring together in a sub-session, detection of a pattern or trend in the state of a sub-session over time, or determining that one or more conditions of participants in a sub-session have persisted for at least a minimum amount of time. In the example, the insertion of the monitoring area 2560 is animated as a panel sliding in from the right side of the user interface 2520c. The monitoring area 2560 is provided as an overlay or layer over the portion of the interface 2520c showing the media content from the communication session. As with the interface 2520b of FIG. 25B, the area 2560 can include customized notifications and interactive elements 2552, 2554 that are selected for different sub-sessions based on the state information for the sub-sessions. With the features shown in FIG. 25C, the host 2425 can participate in a breakout room unencumbered by status information, but still be informed of conditions in any of the breakout rooms that need to be addressed as those conditions occur.

Figure 15:
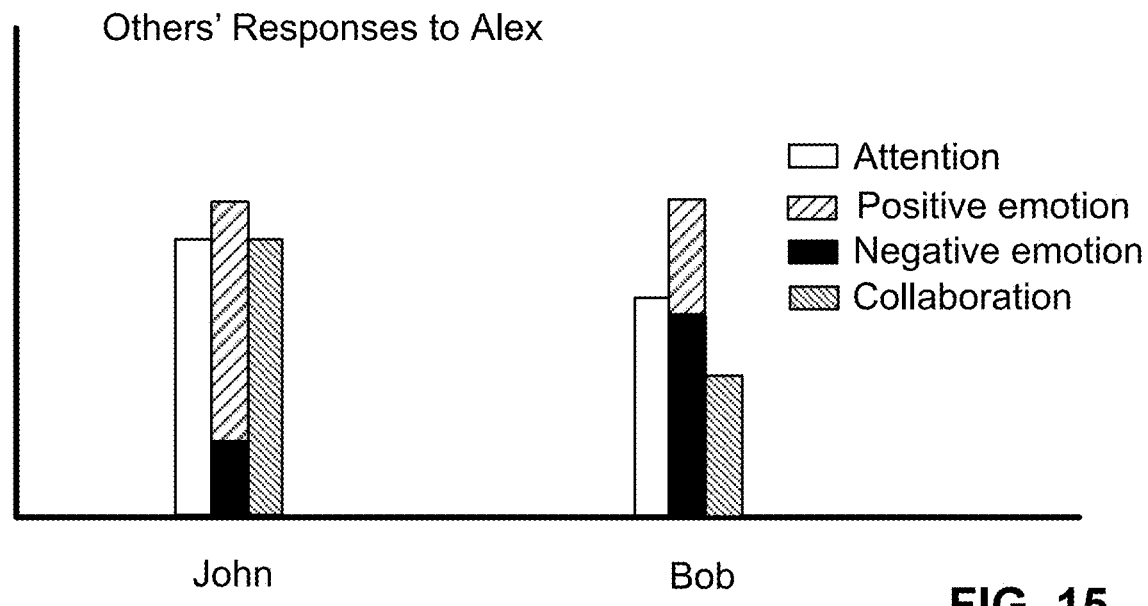

The server system 1510 can be configured to track the progression of status information for individuals, sub-sessions, and the communication session as a whole. The server system 1510 can use the information generate reports that can be provided after the communication session ends to characterize the interactions that occurred. This information can be broken down by sub-session, with separate charts, graphs, indicators, and other information representing the interactions that occurred in each sub-session. For each sub-session, the report can show the progression of different state characteristics overtime (e.g., showing charts or graphs showing how speaking time, attention, anger, etc. varied for the sub-session as a whole or for individual participants), indicating measures of how participants in the sub-session reacted to each other, indicating a distribution of speaking time within the sub-session, and so on. The report can be provided as a post-meeting scorecard that rates different sub-sessions with respect to monitored characteristics (e.g., attention, collaboration, emotions, etc.), whether on an absolute scale or relative to the other sub-sessions (e.g., a ranking of the sub-sessions). The report can include information such as shown in FIGS. 13-15 discussed above, but with the information provided for the sub-sessions rather than a single communication session as a whole.

While various examples in FIGS. 24A-25C focus on a situation where sub-sessions are linked to split off from a primary communication session, the same techniques are applicable for monitoring and managing communication sessions that are not so linked. For example, an administrator or manager may desire to monitor multiple independent communication sessions that are occurring concurrently, even if they have different hosts or are not linked to a single primary communication session. In this case, the communication sessions may be related by being associated with a same organization (e.g., a company, school, school district, etc.) or corporate user account. The system 1510 can enable an administrator to specify several different communication sessions to be monitored, for example, by specifying URLs for the sessions or selecting them from a set of scheduled or active sessions known to the server. When the user has authorization (e.g., permissions) to manage the sessions, the system 1510 can monitor and provide information and interactive tools for each of the communication sessions, even if they are not breakout rooms or otherwise subsidiaries to a main communication session. This can enable an administrator to monitor and manage multiple communication sessions which may have different hosts, from a single management interface, using the techniques shown in FIGS. 24A-25C. Each different session, as well as sub-sessions of them if there are any, can be separately analyzed and monitored just as individual sub-sessions are in the examples above.

FIG. 26 shows an example of a system in which participants may use holographic projections or other techniques to provide three-dimensional representations during remote interactions. In general, all of the techniques discussed herein can be used with data streams involving multiple cameras per participant, capture of three-dimensional data, and output of representations of participants in any form (e.g., on a display screen, as a holographic projection, projected to a viewer's eye in an virtual reality or augmented reality headset, etc.).

One or more participants may use multiple cameras to capture their data during communication sessions. For example, users may have two or three cameras, or more, that capture information from different perspectives and locations concurrently. The cameras may be part of the same device or may be separate devices. As an example, a participant may use a stereo camera system that captures multiple images essentially simultaneously to allow a 3D representation of the user to be generated. Another example is an RGBD imaging system providing data for red, green, blue, and depth information. As an another example, an imaging system may include one or more visible light cameras and one or more cameras for another spectrum of light, such as infrared, which can be used for depth data capture.

With information about the three-dimensional contours of a user's face and potentially also about the user's environment, the system may be configured to generate and provide 3D video data or holographic image data (e.g., data for holographic presentation). For example, a participant client device may generate data representations for 3D holographic projections, and may send them to a server system for display to be forwarded on to other participants. Participant's devices may also display holographic images through a holographic projector 2610. As a result, the output to a user may not be an output on a two-dimensional screen. In general, all of the techniques discussed above can be used with 3D image capture as well as holographic output to participants, as well as other types of output.

In some implementations, the use of 3D image capture techniques can provide enhanced detection of emotional and cognitive status of participants as well as better detection of gestures, reactions, micro-expressions, and the other aspects the system assesses. This analysis may be done at the participant side, e.g., at the source where the 3D image data is captured. The 3D image data may additionally or alternatively be analyzed at a server for a communications platform, or potentially at a client device for a participant that receives the data.

FIG. 27 shows an example of a system in which facial feature matrices are provided rather than video data streams, and the facial feature matrices can be used to provide animated or rendered representations of participants. The facial feature data can be used to provide a computer-rendered representation of a user's face rather than a video image. As another example, the facial feature data may be used to provide a rendered avatar to represent the user, e.g., an animated character such as a cartoon, an animal, a robot, etc. The output, whether of the user's face or of an avatar that appears different from the user, can be rendered to reflect the facial characteristics and movements of the corresponding participant. For example, an avatar's facial characteristics can be adjusted based on the changes in facial features indicated in the facial feature matrices.

A communication session may support the generation and output of an avatar to represent a person rather than a photo or video image capture of the participant. For example, the system may generate an animated character in two-dimensional or three-dimensional rendering that represents a participant. The avatar for a participant may be updated in real time to reflect the expressions, gestures, mood, and movements of the corresponding participant. The expressions can be updated in real time or substantially real time, based on matrices of facial feature data that generated from video of the participant are streamed from the participant's device.

To generate the avatars, for a participant the system may extract or generate a matrix of facial feature points from the video data for the participant. These points may be 2D or 3D coordinates for certain landmarks of the face. The capturing device, such as a user phone, laptop, tablet computer, etc., can generate the facial feature point matrix repeatedly, such as for each frame, or for every five frames, or every 10 frames. Then, instead of sending a video stream for a video conference or other communication session, the participant's device can send a stream of facial feature point matrices instead.

On the receiving computer, the facial feature points will enable a live reconstruction and rendering of the emotion, expressions, and movements of the participant, for example, on a computer-rendered version of the person's face or an avatar for the person that may look nothing like the person's real-world appearance (e.g., an animal, a space alien, a robot, etc.). The transmission of facial feature vectors allows for lower bandwidth transmissions, as well as the animation of avatars or other animated representations that show expressions that track the actual expressions and mood of the real-life participant.

In the illustrated example, the facial features of a user 2710 are converted into feature matrices that are then used to animate and set the expression of an avatar 2715 for the user 2710 that is presented on the devices of other users 2720, 2730. The user 2710 is scowling so the facial features are incorporated into the rendering so the avatar 2715 has a similar expression. In some cases, emotion detection and other facial image processing can be used to determine an emotional and cognitive state of the user 2710, and that information can be used to further incorporate indications of emotion into the expression of the avatar 2715.

In some cases, the facial feature matrix can be used in determining the emotional and cognitive state of the participant. The facial feature matrix data stream may be a data source from which the emotion and cognitive state information is derived, or may be used in addition to analysis performed on the raw video data captured.

Although several example implementations of the invention have been described in detail, other implementations of the invention are possible.

All the features disclosed in this specification may be replaced by alternative features serving the same, equivalent or similar purpose unless expressly stated otherwise. Thus, unless stated otherwise, each feature disclosed is one example only of a generic series of equivalent or similar features.

A number of implementations have been described. Nevertheless, various modifications may be made without departing from the spirit and scope of the disclosure. For example, various forms of the flows shown above may be used, with steps re-ordered, added, or removed.

Embodiments of the invention and all of the functional operations described in this specification can be implemented in digital electronic circuitry, or in computer software, firmware, or hardware, including the structures disclosed in this specification and their structural equivalents, or in combinations of one or more of them. Embodiments of the invention can be implemented as one or more computer program products, e.g., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a tablet computer, a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the invention can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the invention can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the invention, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

The invention claimed is:

1. A method performed by one or more computing devices, the method comprising:

receiving, by the one or more computing devices, facial feature information over a communication network during a communication session, wherein the facial feature information comprises one or more facial feature matrices that describe features of a face of a remote participant of the communication session, and wherein the one or more facial feature matrices are derived from image data or video data captured by a camera during the communication session;

determining, by the one or more computing devices, an emotional or cognitive state of the remote participant based on the one or more facial feature matrices in the received facial feature information;

generating, by the one or more computing devices, a representation of the remote participant based on the one or more facial feature matrices in the received facial feature information, wherein the representation of the remote participant is a computer-generated graphical representation of a face generated based on the one or more facial feature matrices; and displaying, by the one or more computing devices, the representation, wherein the computer-generated graphical representation of the face is rendered or animated, based on the determined emotional or cognitive state, to incorporate one or more indications of the emotional or cognitive state determined based on the one or more facial feature matrices in the received facial feature information.

2. The method of claim 1, wherein the communication session involves communication between at least a first computing device and a second computing device over a communication network, wherein the remote participant is a user of the second computing device; and wherein the receiving, determining, generating, and displaying are performed by the first computing device.

3. The method of claim 2, further comprising:

obtaining, by the first computing device, image data or video data for a user of the first computing device during the communication session;

generating, by the first computing device, a set of first facial feature matrices from obtained image data or video data for a face of the user of the first computing device; and sending, by the first computing device, the set of first facial feature matrices to the second computing device over the communication network, wherein receiving the facial feature information over the communication network comprises receiving a set of second facial feature matrices that the second computing device generated from image data or video data for a face of the remote participant.

4. The method of claim 2, wherein receiving the facial feature information comprises receiving, by the first computing device, a series of facial feature matrices sent over the communication network by the second computing device, wherein the series of facial feature matrices indicates expressions or movements of the remote participant during a portion of the communication session, wherein the first computing device does not receive image data or video data of the remote participant corresponding to the portion of the communication session.

5. The method of claim 1, wherein receiving the facial feature information comprises receiving a stream of facial feature matrices indicating a set of expressions and movements of the remote participant during the communication session, without receiving image data or video data of the remote participant corresponding to the set of expressions and movements of the remote participant; and wherein displaying the representation comprises repeatedly updating the computer-generated graphical representation of the face during the communication session to indicate expressions, movements, and changes in emotion of the remote participant during the communication session based on the received stream of facial feature matrices.

6. The method of claim 1, wherein generating the representation comprises generating a rendering of an avatar of the participant that is displayable to indicate facial features and expressions of the remote participant on the avatar, wherein the computer-generated graphical representation of the face is a graphical representation of the face of the avatar.

7. The method of claim 6, wherein displaying the representation comprises displaying the rendering of the avatar to incorporate indications of emotion into the expression of the avatar based on the determined emotional or cognitive state.

8. The method of claim 6, wherein displaying the representation comprises adjusting visual characteristics of face of the avatar based on changes in facial features indicated by a series of matrices of facial feature information received over the communication network during the communication session.

9. The method of claim 6, wherein the avatar is a computer-rendered representation of the face of the remote participant that is reconstructed from the one or more facial feature matrices.

10. The method of claim 6, wherein the avatar is an animated character that is different from the remote participant.

11. The method of claim 6, wherein the rendering of the avatar is a two-dimensional representation.

12. The method of claim 6, wherein the rendering of the avatar is a three-dimensional representation.

13. The method of claim 1, wherein receiving the one or more facial feature matrices comprises receiving one or more matrices of facial feature points.

14. The method of claim 13, wherein the facial feature points indicate two-dimensional or three-dimensional coordinates for landmarks of the face of the remote participant.

15. The method of claim 1, wherein the communication session involves communication between at least a first computing device and a second computing device over a communication network, wherein the remote participant is a user of the second computing device; and wherein the method comprises:

generating, by the first computing device, a stream of matrices of facial feature points comprising coordinates for landmarks on a face of a user of the first computing device, and wherein the stream of matrices of facial feature points is derived from a stream of video data captured by a camera of the first computing device during the communication session; and sending, by the first computing device, the stream of matrices of facial feature points to the second computing device over the communication network during the communication session without sending the stream of video data over the communication network.

16. The method of claim 15, wherein the method comprises comprising sending, by the first computing device, a stream of matrices of facial feature information, wherein the matrices of facial feature information are respectively determined from different frames of video data captured by the camera of the first computing device during the communication session.

17. The method of claim 16, wherein the matrices of facial feature information are sent periodically at a predetermined interval during the communication session.

18. The method of claim 6, wherein avatar has a cartoon face or a non-human face.

19. The method of claim 6, wherein the avatar for the remote participant has a face that is different from a face of the remote participant.

20. A system comprising:

one or more computing devices; and one or more computer-readable media storing instructions that are operable, when executed by the one or more computing devices, to cause the one or more computing devices to perform operations comprising:

receiving, by the one or more computing devices, facial feature information over a communication network during a communication session, wherein the facial feature information comprises one or more facial feature matrices that describe features of a face of a remote participant of the communication session, and wherein the one or more facial feature matrices are derived from image data or video data captured by a camera during the communication session;

determining, by the one or more computing devices, an emotional or cognitive state of the remote participant based on the one or more facial feature matrices in the received facial feature information;

generating, by the one or more computing devices, a representation of the remote participant based on the one or more facial feature matrices in the received facial feature information, wherein the representation of the remote participant is a computer-generated graphical representation of a face generated based on the one or more facial feature matrices; and displaying, by the one or more computing devices, the representation, wherein the computer-generated graphical representation of the face is rendered or animated, based on the determined emotional or cognitive state, to incorporate one or more indications of the emotional or cognitive state determined based on the one or more facial feature matrices in the received facial feature information.

21. One or more non-transitory computer-readable media storing instructions that are operable, when executed by one or more computing devices, to cause the one or more computing devices to perform operations comprising:

receiving, by the one or more computing devices, facial feature information over a communication network during a communication session, wherein the facial feature information comprises one or more facial feature matrices that describe features of a face of a remote participant of the communication session, and wherein the one or more facial feature matrices are derived from image data or video data captured by a camera during the communication session;

determining, by the one or more computing devices, an emotional or cognitive state of the remote participant based on the one or more facial feature matrices in the received facial feature information;

generating, by the one or more computing devices, a representation of the remote participant based on the one or more facial feature matrices in the received facial feature information, wherein the representation of the remote participant is a computer-generated graphical representation of a face generated based on the one or more facial feature matrices; and displaying, by the one or more computing devices, the representation, wherein the computer-generated graphical representation of the face is rendered or animated, based on the determined emotional or cognitive state, to incorporate one or more indications of the emotional or cognitive state determined based on the one or more facial feature matrices in the received facial feature information.

* * * * *